(12) United States Patent
Michaels

(10) Patent No.: US 8,210,205 B2
(45) Date of Patent: Jul. 3, 2012

(54) ROTARY VALVE ASSEMBLY

(76) Inventor: Gregory A. Michaels, Seven Hills, OH (US)

( * ) Notice: Subject to any disclaimer, the term of this patent is extended or adjusted under 35 U.S.C. 154(b) by 1240 days.

(21) Appl. No.: 11/716,489

(22) Filed: Mar. 9, 2007

(65) Prior Publication Data

US 2007/0246678 A1  Oct. 25, 2007

Related U.S. Application Data

(60) Provisional application No. 60/780,694, filed on Mar. 9, 2006.

(51) Int. Cl.
*F16K 11/06* (2006.01)
(52) U.S. Cl. .............. 137/625.46; 137/625.43
(58) Field of Classification Search .............. 137/625.4, 137/625.43, 625.46
See application file for complete search history.

(56) References Cited

U.S. PATENT DOCUMENTS

| | | | |
|---|---|---|---|
| 2,944,627 A | 7/1960 | Skarstrom | |
| 3,313,091 A | 4/1967 | Berlin | |
| 3,396,904 A * | 8/1968 | Janette | 251/78 |
| 3,812,882 A * | 5/1974 | Taylor | 137/556.6 |
| 3,923,477 A | 12/1975 | Armond et al. | |
| 4,272,265 A | 6/1981 | Snyder | |
| 4,399,838 A * | 8/1983 | Poujol | 137/625.29 |
| 4,469,494 A | 9/1984 | van Weenen | |
| 4,532,961 A * | 8/1985 | Walton et al. | 137/625.31 |
| 4,534,346 A | 8/1985 | Schlaechter | |
| 4,554,948 A * | 11/1985 | Bergmann | 137/625.31 |
| 4,674,537 A * | 6/1987 | Bergmann | 137/625.31 |
| 4,787,417 A | 11/1988 | Windsor, Jr. | |
| 4,892,566 A | 1/1990 | Bansal et al. | |
| 4,900,338 A | 2/1990 | Shiomi et al. | |
| 4,925,464 A | 5/1990 | Rabenau et al. | |
| 5,074,333 A * | 12/1991 | Martin | 137/625.3 |
| 5,112,367 A | 5/1992 | Hill | |
| 5,127,438 A * | 7/1992 | Williams | 137/625.31 |
| 5,268,021 A | 12/1993 | Hill et al. | |
| 5,366,541 A | 11/1994 | Hill et al. | |
| 5,370,728 A | 12/1994 | LaSala et al. | |
| 5,417,083 A * | 5/1995 | Eber | 62/528 |
| 5,593,478 A | 1/1997 | Hill et al. | |
| 5,658,371 A | 8/1997 | Smolarek et al. | |
| 5,679,134 A | 10/1997 | Brugerolle et al. | |
| 5,730,778 A | 3/1998 | Hill et al. | |
| 5,785,740 A | 7/1998 | Brugerolle et al. | |
| 5,807,423 A | 9/1998 | Lemcoff et al. | |
| 5,814,130 A | 9/1998 | Lemcoff et al. | |
| 5,814,131 A | 9/1998 | Lemcoff et al. | |
| 5,876,485 A | 3/1999 | Andreani | |
| 5,912,426 A | 6/1999 | Smolarek et al. | |

(Continued)

*Primary Examiner* — John Fox
(74) *Attorney, Agent, or Firm* — Emerson Thomson Bennett; Roger D. Emerson; Ray C. Meiers

(57) ABSTRACT

A rotary valve assembly for use in a process provides fluid communication and enables variable conduit interconnection and flow passage. Process cycle time is variable by means of rotational speed of through one or more apertures of a third valve member and respective alignment with one or more apertures of a first valve member and one or more apertures of a second valve member. Process step time is variable by means of adjustable position and variable alignment of aperture(s) of the first valve member and the second valve member. The rotary valve assembly provides for gradual transition and flow passage between process steps, flow metering, mixing, reversal, or any combination thereof. Process systems including the rotary valve include an adsorption process, humidity control process, heat pump process and/or water purification process among others.

12 Claims, 104 Drawing Sheets

U.S. PATENT DOCUMENTS

| | | | |
|---|---|---|---|
| 6,056,804 A | 5/2000 | Keefer et al. | |
| 6,143,056 A | 11/2000 | Smolarek et al. | |
| 6,192,922 B1 * | 2/2001 | MacGibbon et al. | 137/486 |
| 6,253,778 B1 | 7/2001 | Smolarek et al. | |
| 6,311,719 B1 | 11/2001 | Hill et al. | |
| 6,344,069 B2 | 2/2002 | Smolarek et al. | |
| 6,457,485 B2 | 10/2002 | Hill et al. | |
| 6,514,319 B2 | 2/2003 | Keefer et al. | |
| 6,936,091 B2 | 8/2005 | Bayreuther | |
| 7,152,620 B2 * | 12/2006 | Baumgarten et al. | 137/311 |

* cited by examiner

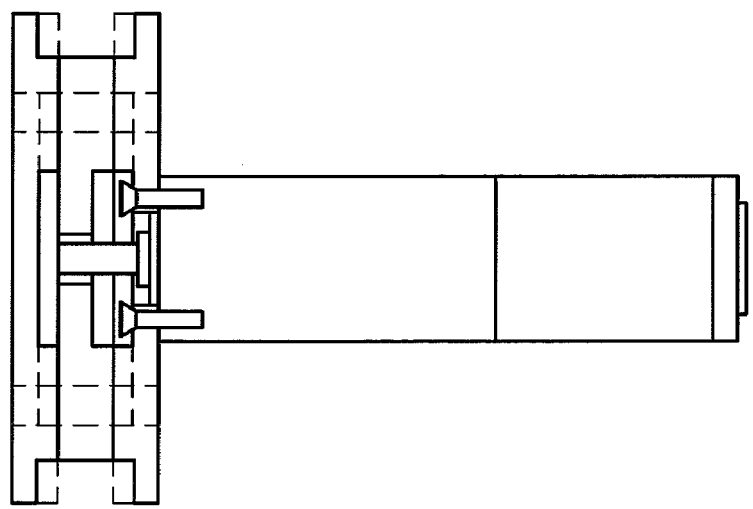
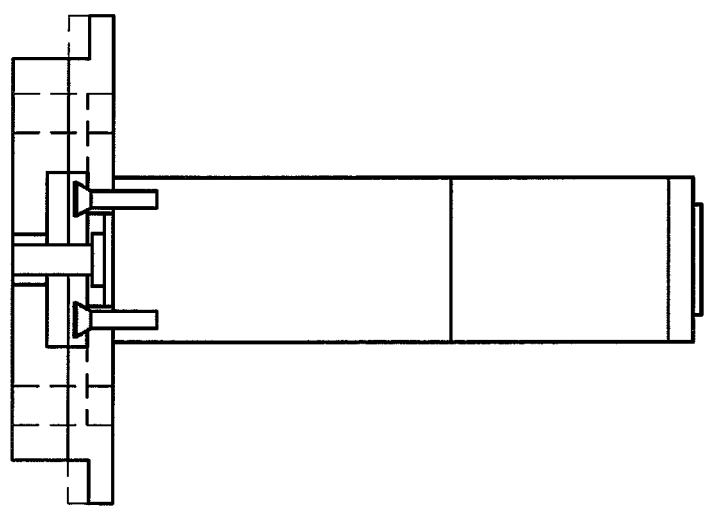
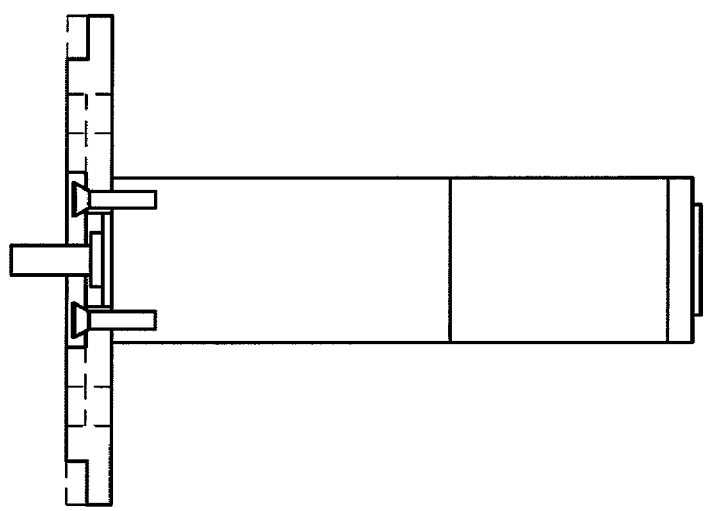
FIG.-19

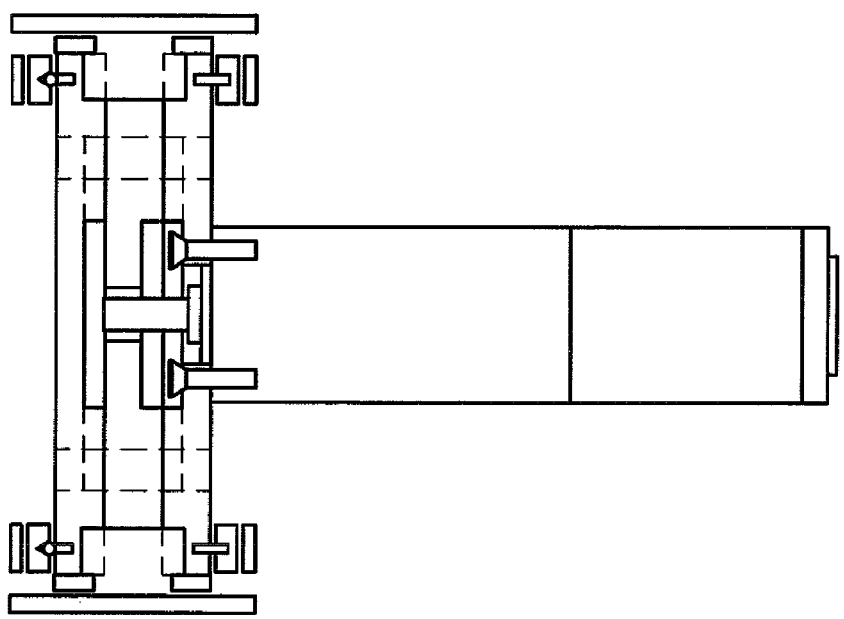
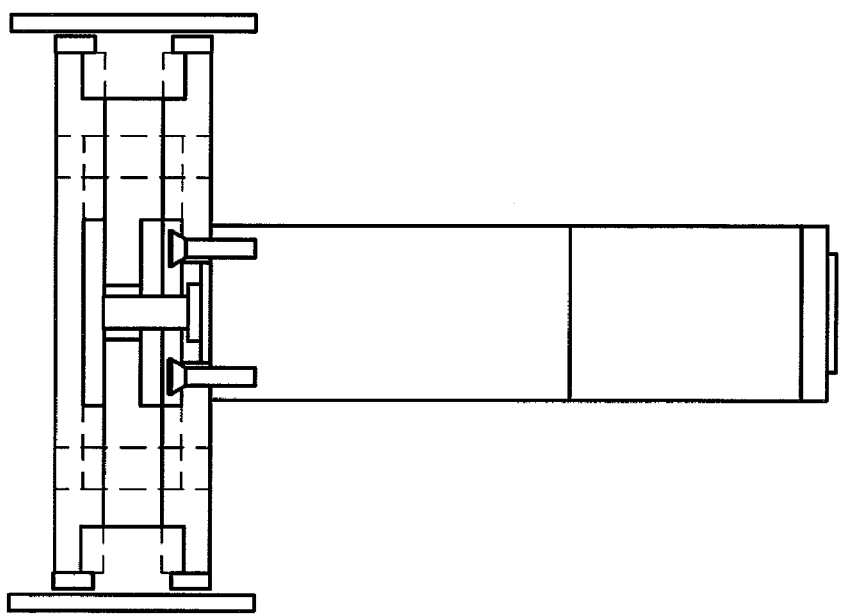
FIG.-20

$\Theta = 1/2$ DETENT ANGLE
$F_{MOTOR}$ = MOTOR TORQUE/DETENT CIRCLE RADIUS
$F^2_{MOTOR} = (F_{DOWN} \times \sin\Theta)^2 + F_{SIDE} \times \cos\Theta)^2$
$F_{SPRING}$ = FORCE TO DISENGAGE BALL

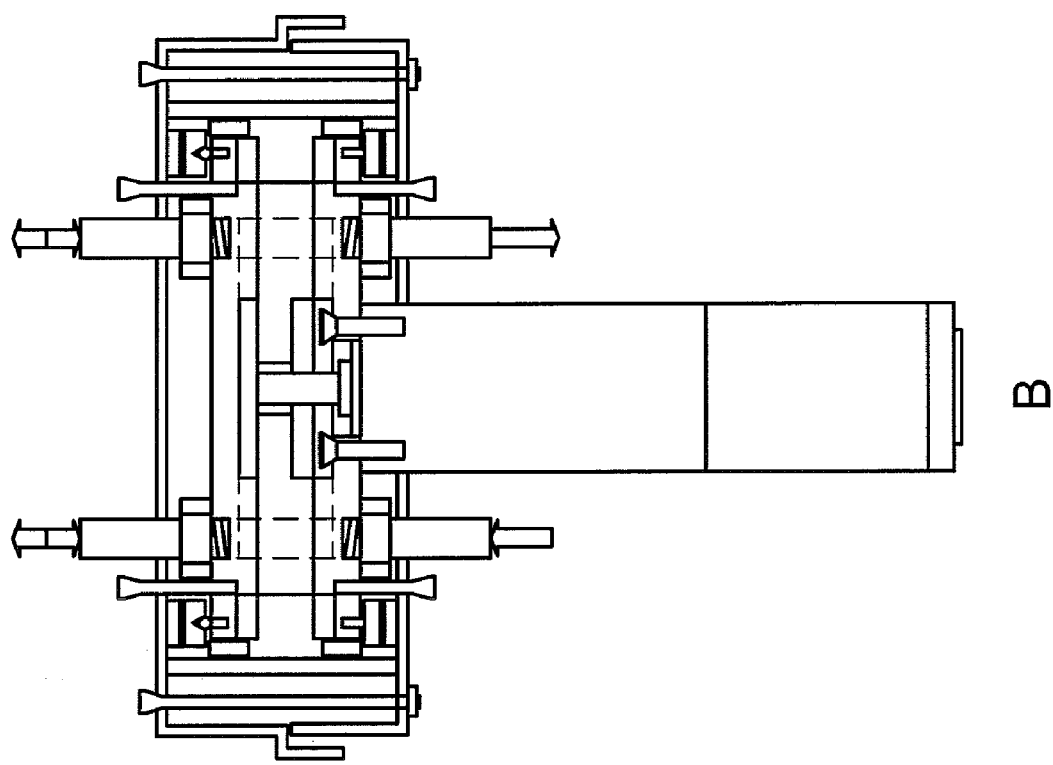
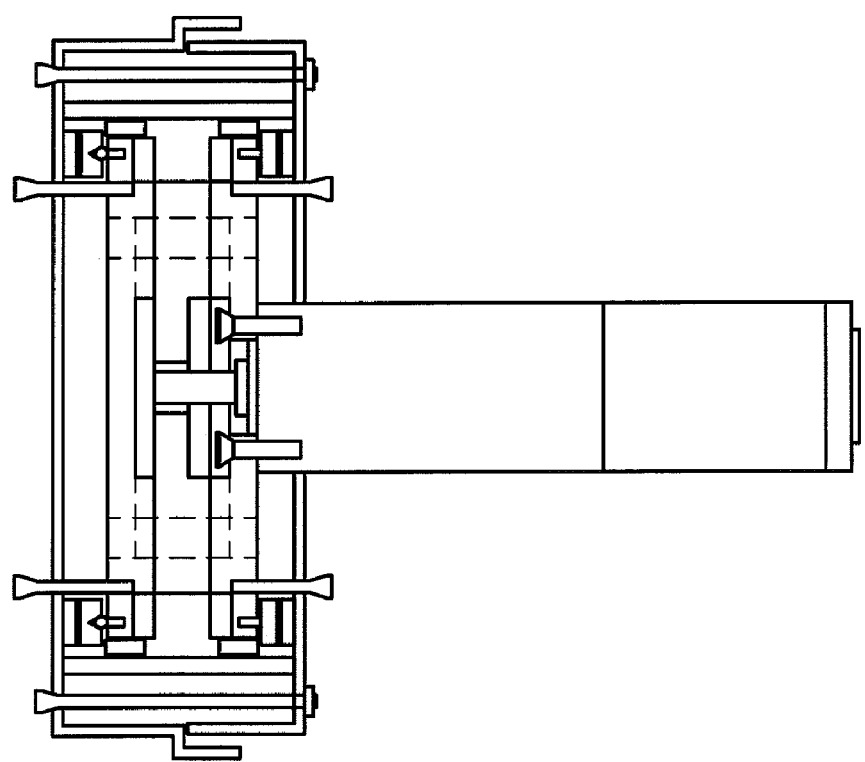
FIG.-23

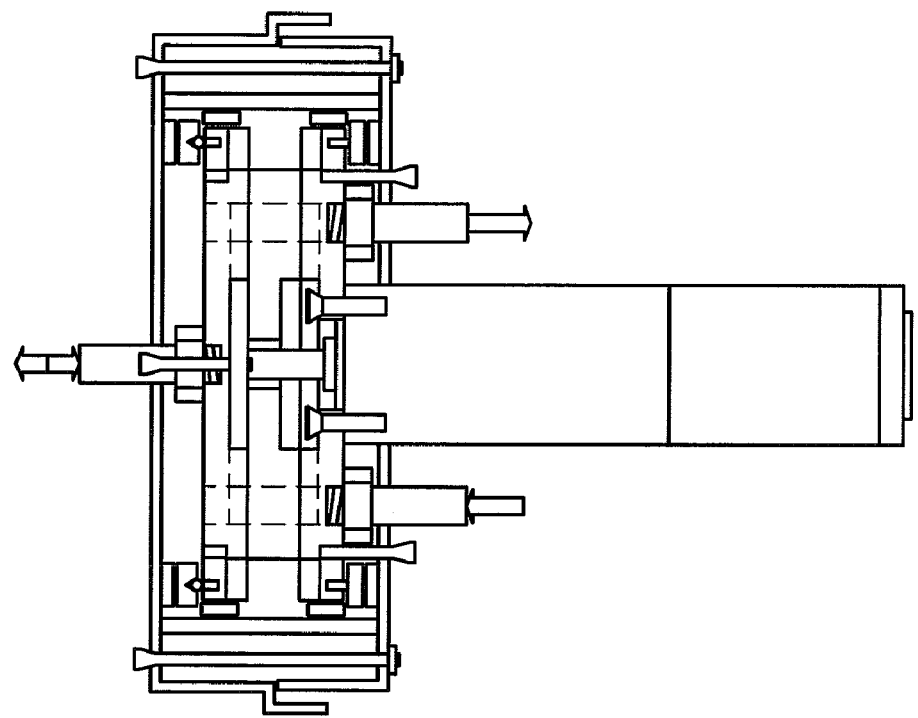
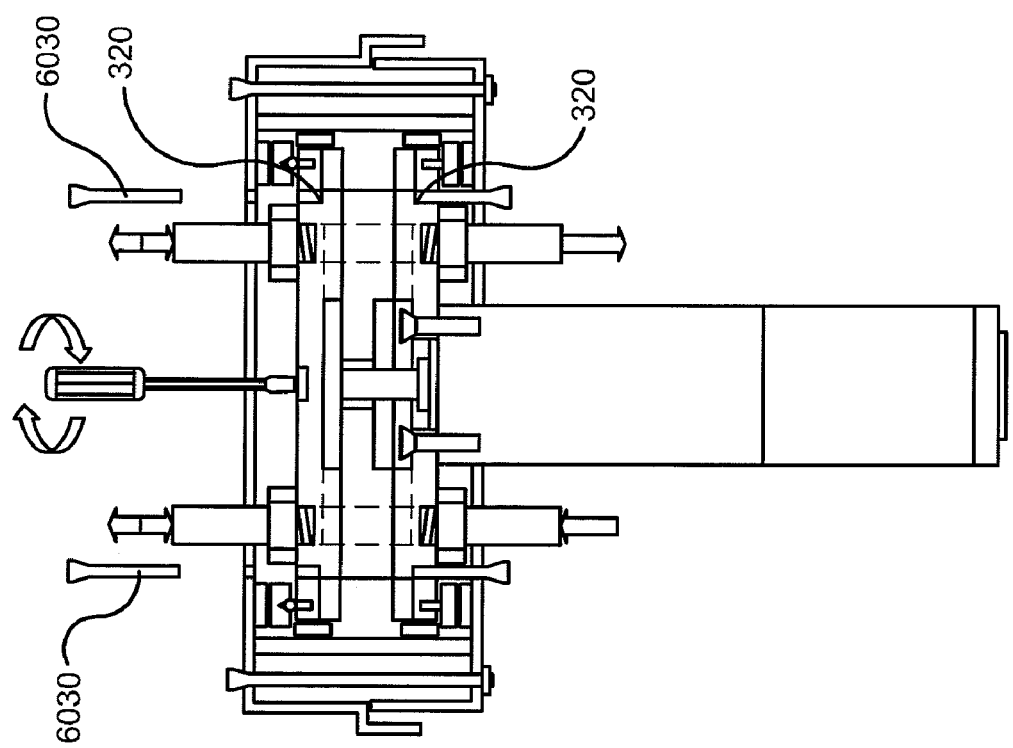
FIG.-25

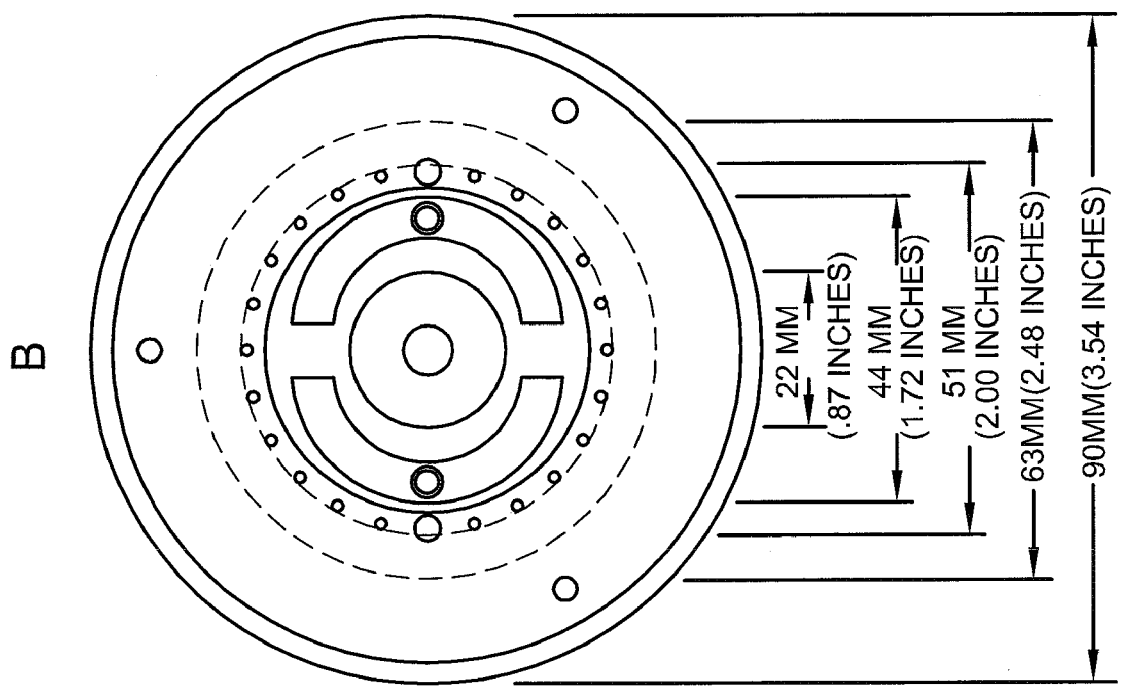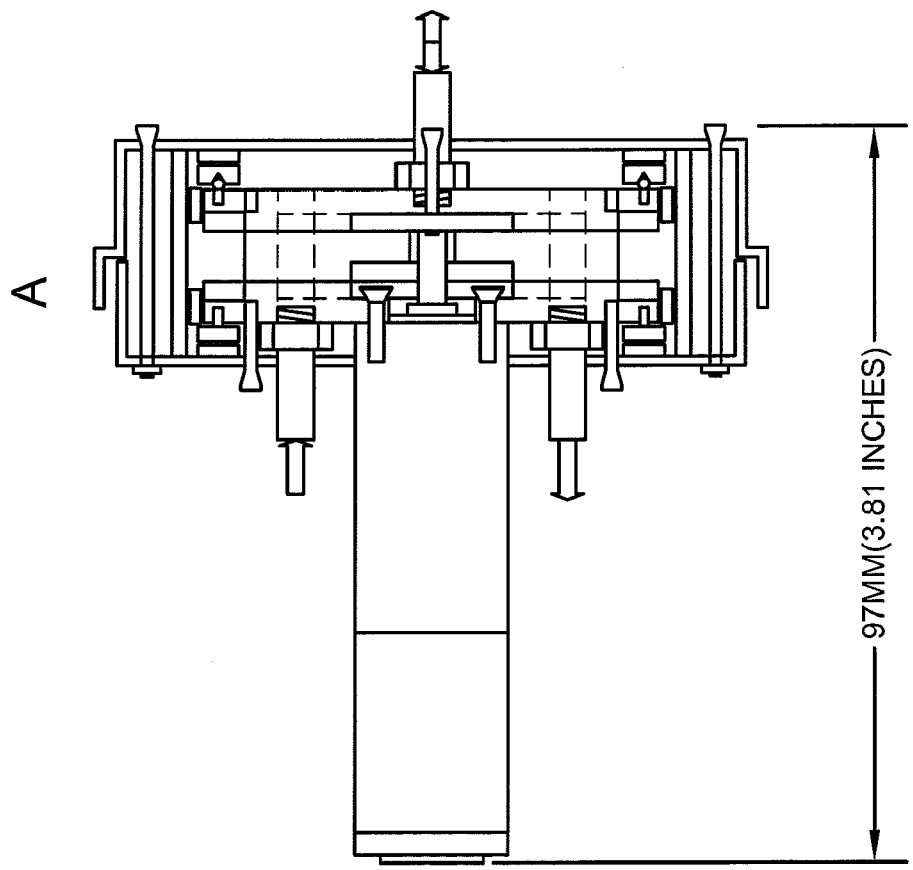
FIG.-26

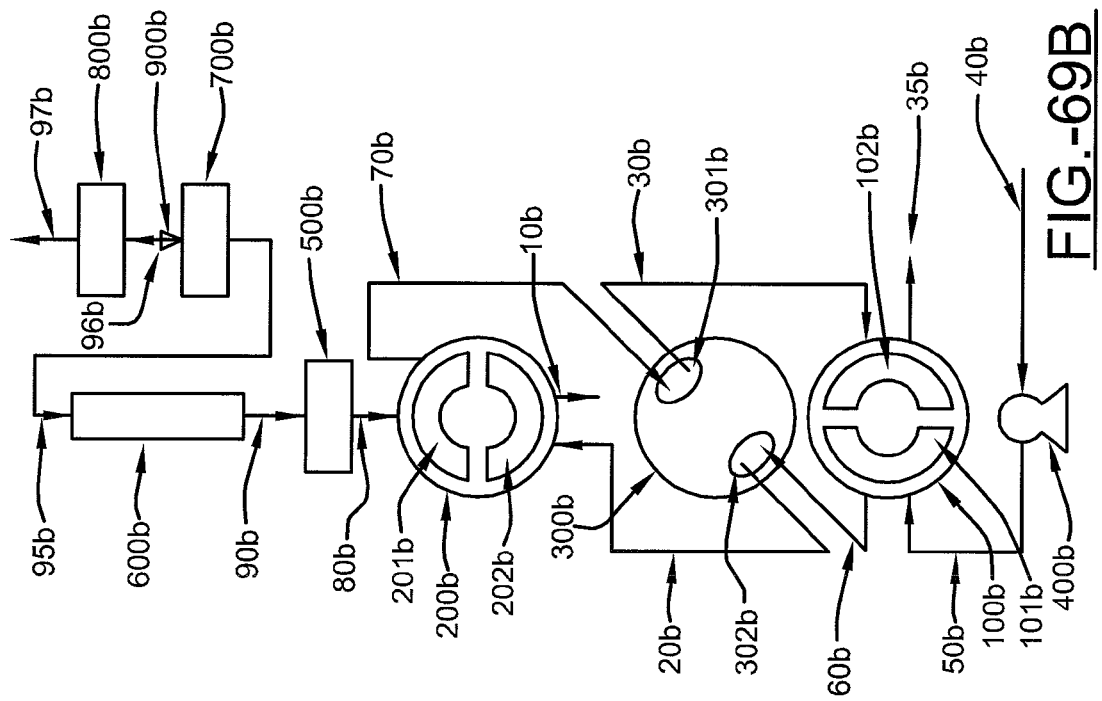
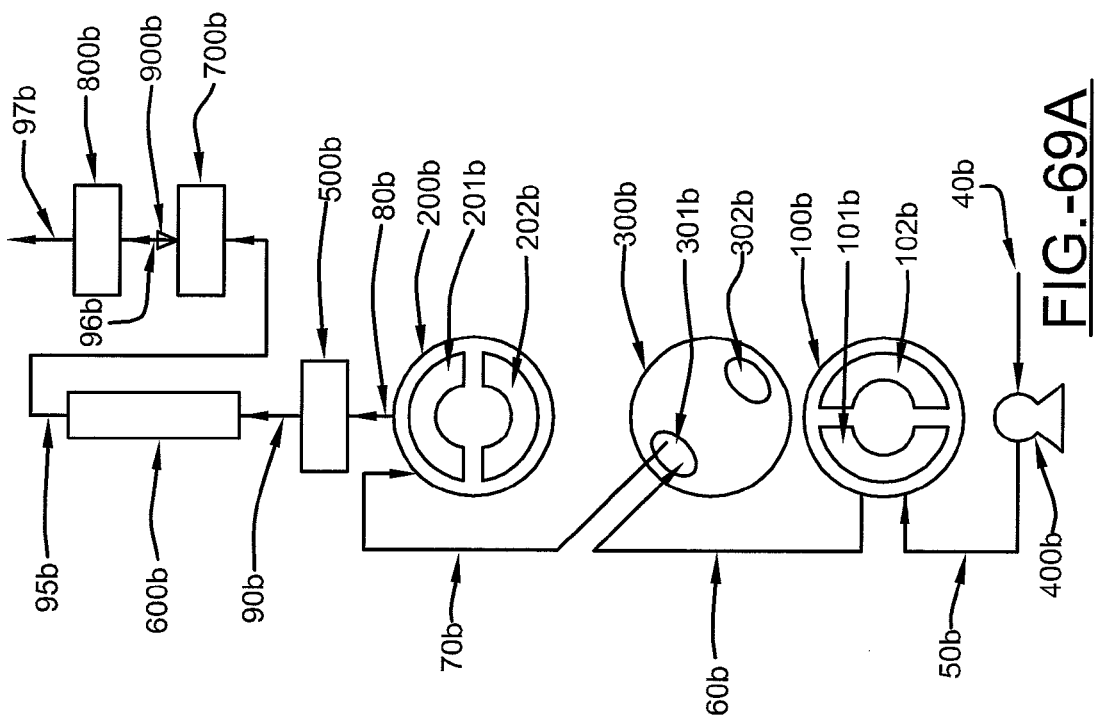

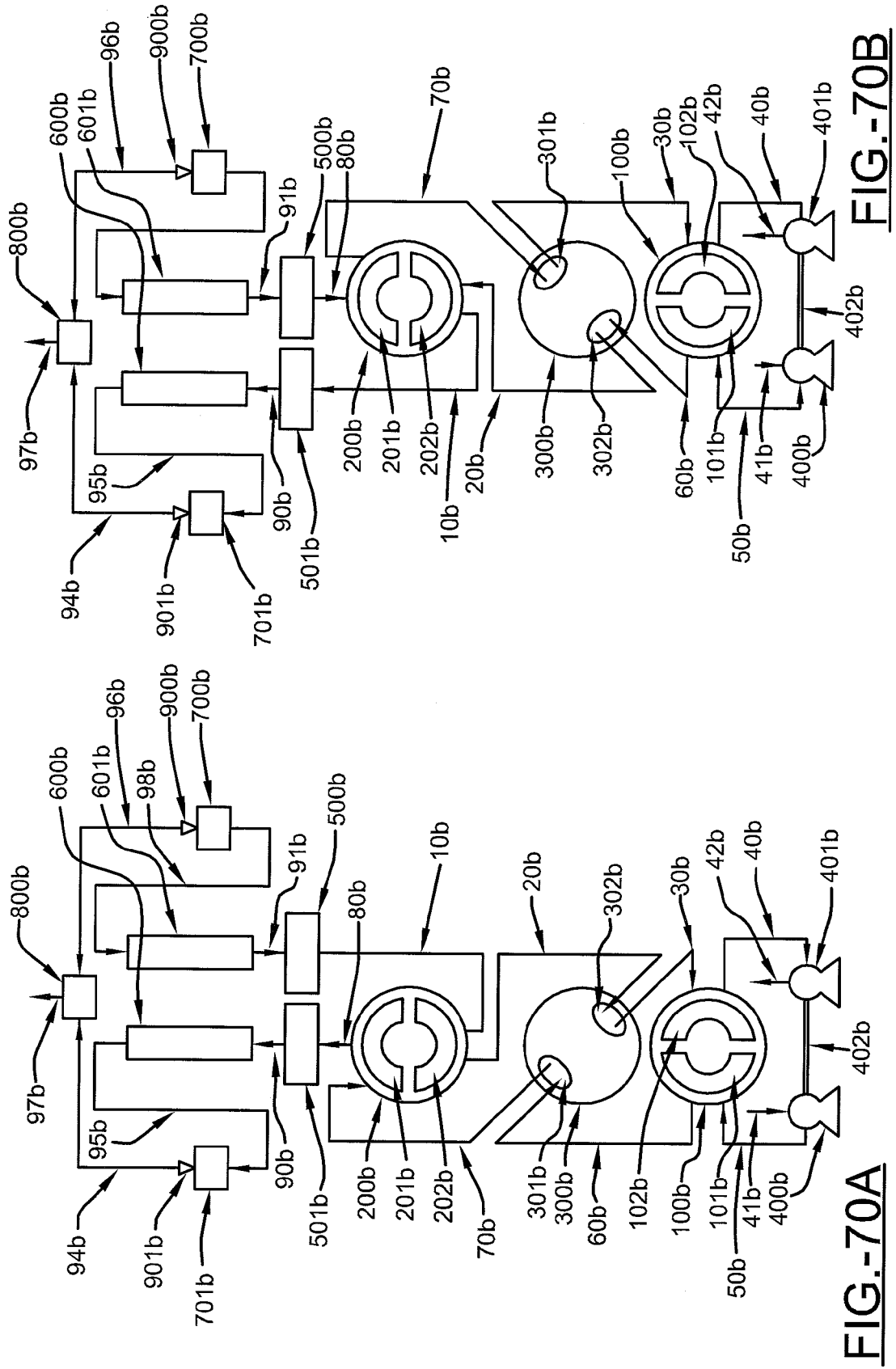

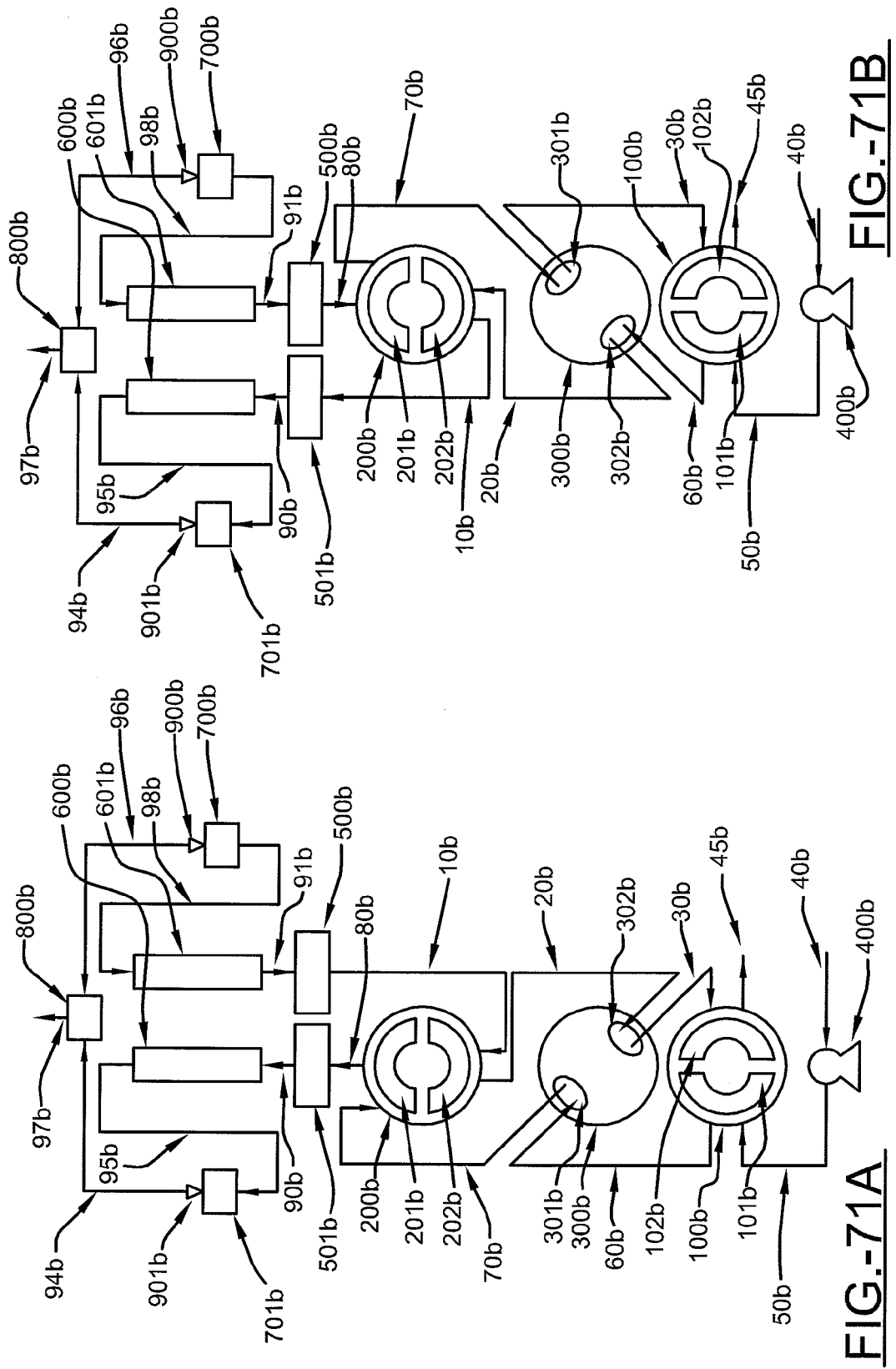

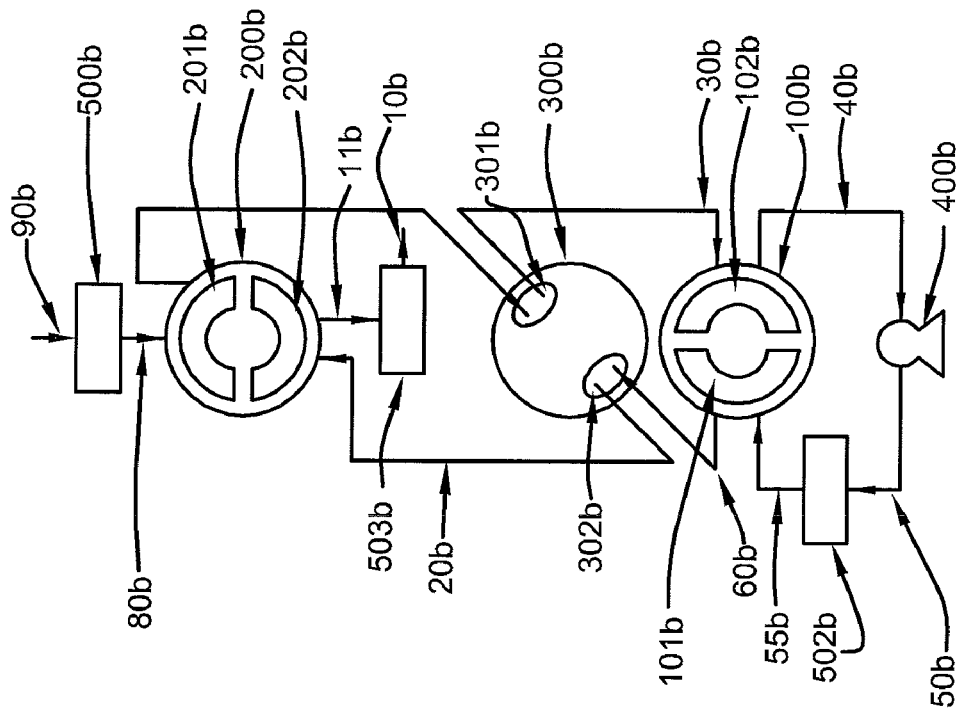
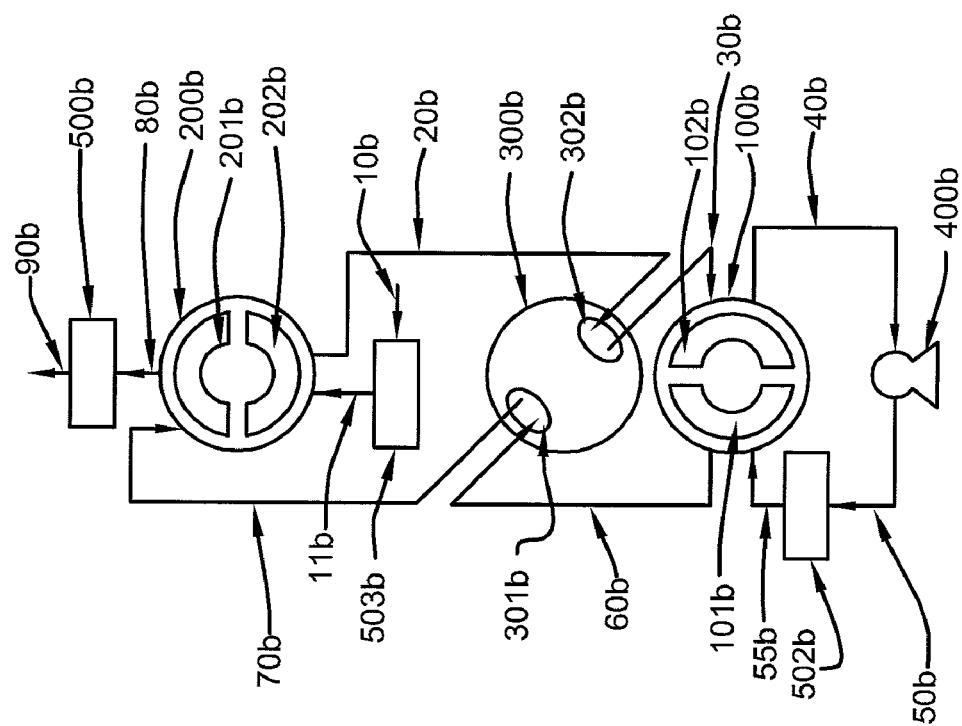

ROTARY VALVE ASSEMBLY

CROSS-REFERENCE TO RELATED APPLICATIONS

This application claims the benefit of U.S. Provisional Application No. 60/780,694, filed on Mar. 9, 2006.

BACKGROUND OF THE INVENTION

1. Field of the Invention

The present invention is directed generally to a valve assembly, and more specifically, to an adjustable rotary valve assembly for selectively controlling the flow of a fluid and a fluid-flow process including said rotary valve assembly.

2. Description of Related Art

Previous valve assemblies are of limited use for fluid flow applications because of their lack of flow-control adaptability, reversal or metering. Generally, prior art processes employ numerous separate valves and sophisticated electronics to control the cooperation of those valves to bring about a desired process fluid flow control. This need for multiple valves and control circuitry to coordinate the operation of the many valves made process fluid control complex and expensive.

For example, storage of cigars at a proper relative humidity is essential for preservation of quality and flavour. Generally, cigar manufacturers recommend storage between 60% and 70% relative humidity, with preferably greater than 63% and less than 68% relative humidity. Cigar storage outside these generally accepted limits may be detrimental to flavour, draw, burn and other favourable characteristics. Cigar storage in a control environment such as a humidor generally made of moisture absorbing wood, such as Spanish Cedar or Mahogany maintain freshness of cigars without imparting undesirable flavours measurement of relative humidity is generally by means of mechanical hygrometer and/or chemical or electronic moisture sensor.

Humidity maintenance within a humidor can be active or passive. Active humidity control uses a humidity sensor as feedback to a fan circulating air over a moisture source. Relative humidity lower than a set point results in evaporation of water and increase in humidity within the humidor. One limitation to such a humidifier system is an inability to remove excess moisture. If the relative humidity within a humidor is greater than desired, humidifier only systems provide no relief. Passive humidity control systems do not provide circulation within a humidor and use physical-chemical properties of materials, e.g., propylene glycol solutions, silica gel, salts and other compounds to regulate relative humidity in stagnant air. Changes in relative humidity within a humidor, i.e., either increase or decrease result in acceptance or rejection of water to maintain an equilibrium with air. These materials have an ability to both to acts a both humectant and desiccant. Limitations of passive materials, mixtures and/or solution result from constant equilibrium humidity at constant solution concentrations, mixture proportions or moisture content, an equilibrium relative humidities may be higher or lower than desired and as these materials, solutions and/or mixtures modulate humidity within a humidor the equilibrium relative humidity may change. Thus, both active and passive systems have significant shortcomings, and systems employing a multitude of conventional valves is impractical due to cost and complexity.

According to another example, conventional in-home oxygen concentrators have sophisticated designs capable of providing purity or oxygen at 95% or better, variable oxygen flowrates up to six liters per minute, reliable components and warranty of five years or more and ease of product maintenance.

The number of components in an in-home oxygen concentrator can exceed one-hundred. In general, systems include an air compressor, and a typical valving scheme including many independently-controlled valves to direct gas flow in conduits, several separate process fluid flow conduits, check valves, tubing connectors, fittings and the like are necessary as well as a heat exchanger to expel compressive heat, a fan to circulate cooling air and disperse oxygen deplete air, an intake air and output bacterial filter are all fit within a cabinet enclosure with control panel. A flow valve regulates patient flow and in some cases electronic circuitry controls process cycle time and process step time. The in-home oxygen concentrator generally consumes about 400 watts electrical power, emits 40 to 48 decibels relative sound pressure, weighs nearly 60 pounds and occupies at least two cubic feet of volume.

Accordingly, there is a need in the art for a valve assembly that can be adjusted to provide variable cycle times and process step time, for example. The valve assembly can be a low-cost, simple design that can be operated manually, semi-automatically, automatically, or any combination thereof, as desired. Alternately, the valve assembly can optionally permit variable process fluid flow directions without requiring changes to existing process plumbing configurations.

BRIEF SUMMARY OF THE INVENTION

Although the discussion to follow is general to fluid flow control those skilled in the art will readily realize various applications of the present rotary valve for mixing, metering and flow reversal e.g., for separation process, e.g., pressure swing adsorption separations medical, industrial or agricultural oxygen or hydrogen separation from reformed carbon dioxide, refrigeration and heating cycles, e.g., heat pumps, air conditioners, refrigerators and freezers, dehumidification, e.g., cigar humidors, wine cellars and food preservers or moisture removal process gases like natural gas.

The novel rotary valve assembly described herein provides a means to optimize a process, decrease complexity of design and increase efficiency of a system. Such advantageous effects provide opportunity to lower capital equipment cost.

According to an aspect of the present invention, the rotary valve assembly can be combined with fluid flow conduits wherein adjustable valve members provide a means to vary process step times and a rotary member provides a means to vary overall process cycle time. The novel rotary valve assembly is versatile and applicable systems with a single or multiple inputs and multiple or no outputs, i.e., off position. Simple positional adjustment provides variable alignment of an aperture or apertures of a first valve member and an aperture or apertures of a second valve member and thereby enable variable process step times as part of a process cycle. The overall cycle time is variable by means of adjustable speed control of a third rotary valve member and interconnection of a through aperture or through apertures thereof with variable position apertures of first and second valve members.

Adjustments of process steps and cycle times may be made manually as a system factory setting, service center or field maintenance or in situ as part of a closed-loop feedback provides a variable process step time and means of process optimization. Moreover, process cycle time becomes adjustable by means of variable speed rotation of a rotary valve member. Either simple manual adjustment or sophisticated closed-loop feedback provides a variable process cycle time and means of process optimization.

The novel variable process step time provides for simple continuous forward rotary drive means and a factory preset process step time or periodic service center or field adjustment or a more sophisticated approach with continuous rotation of one valve member and intermittent adjustment by a second rotary valve member by means of a closed-loop feed back provides a means of process optimization. The novel rotary valve assembly is readily adaptable to variable process cycle time by means of variable speed valve member rotation and closed loop feedback of process variable.

The communication time for each conduit depends upon the angular distance of each through aperture in first valve member, second valve member and third valve member and the relative angular speed of the third valve member to the first valve member and second valve member. Embodiments provide at least one aperture in a first valve member, at least one aperture of a second valve member and at least one through aperture of a third valve member and combinations thereof.

Preferable configurations with two through apertures of the third valve member are with through apertures of equal size and slightly greater in length than the distance between through apertures in the first valve member and/or second valve member to provide momentary interconnection of through apertures of first valve member or through apertures of second valve member. Momentary interconnection of through apertures of a valve member avoids outlet dead-head or inlet starvation resulting from respective disconnection of an inlet or outlet during transition from one through apertures to another. Transition from first aperture to second aperture of first valve member and transition for first aperture to second aperture of second valve member by means of interconnection of first through aperture and second through aperture of third valve member is simultaneous but gradual and avoids detrimental effects of instantaneous pressure changes on system and component performance e.g. power consumption, noise, vibration, component wear, system reliability and useful life.

Rotational speed of third valve member defines a process cycle time. Each aperture of first valve member interconnects with each aperture of second valve member by means of rotary through aperture of third valve member. Process cycle time is generally constant but may require adjustment from time to time to account from changes in compressor, blower or pump output. Factors affecting output include seal wear, altitude, filter occlusion and valve friction and the like. One advantage of a variable speed electric motor is an ability to easily adjust rotational speed. Speed variations arise from mechanical gear ratios or electric voltage, current and/or frequency. Alternate means of variable speed drives include pneumatic power, hydraulic power among others.

Continuous constant speed rotary motion of third valve facilitates low cost electric motor operation with a time control. However, various aperture size combinations along with variable and intermittent rotary speed may provide optimal performance in some configurations, conditions and/or control means. Rotation of the third valve member may be in forward or reverse direction, continuous or intermittent with constant or variable speed depending on desirous communication for each conduit.

The process cycle is independent of direction of rotation and as a result a third valve member may rotate clockwise or counterclockwise. Contrarily, process step time is dependent of direction of rotation for positional adjustment provided a 180° relative rotation limit. Rotation of first valve member or second valve member relative to second valve member or first valve member respectively beyond 180° does not provide unique process step times, rather repeats previously attainable setting. Generally, rotational limits of 0° to 180° provide simpler operation, but are not limitations to device design. Interconnection time of apertures of first valve member and second valve member depends on rotational speed of a third valve member.

According to other embodiments, the present rotary valve provides for manual rotation of a third valve member as in some flow reversal applications, e.g., reversal of a heat pump from heating to cooling. Another embodiment provides a low cost variable speed electric motor and a drive mechanism for a third valve member to control process cycle time. Such drive mechanisms are found in battery operated power screwdrivers and other power tools for example. Other simple embodiments use alternating current synchronous motors such as those commonly found in clocks and a drive mechanism to provide constant speed rotation. Whereas a more sophisticated embodiment provides a feedback loop and varies rotational speed accordingly to optimize process cycle time.

Relative rotational position of the first valve member to the second valve member provides means to adjust process step time. A simple embodiment provides manual adjustment by means of mechanical fastener or detent mechanism and a more sophisticated embodiment provides automatic adjustment by means of feedback loop and secondary drive mechanism to rotate first valve member relative to second valve member and optimize process step time.

Conduit attachments to a first valve member and a second valve member are by means of standard fluid fittings, connectors and seals. First valve member and second valve member are generally stationary with consideration of maximum 180° relative rotation of any combination of first valve member or second valve member or both as necessary for unique process step time adjustments. Another embodiment in a valved system provides relative rotation of a valve member with flow conduits to outlets and a stationary valve member with conduits to inlets e.g., a compressor, blower or pump.

Another embodiment of the novel rotary valve assembly provides easy inlet connection to compressor, blower or pump and outlet connection to control environment, ambient air or process vessel. First and second valve members are relatively stationary insofar as movement is limited to about 0° to about 180° angular degrees about a central axis for unique adjustments to optimize performance for a given application. Communication to compressor, blower or pump is by means of standard fittings, tubing, connectors and the like. A rotary third valve member axially between first and second valve member provides interconnections between conduits of first valve member and conduits of second valve member.

A first drive means connects to third valve member by means of a through hole in either first valve member or second valve member. A similar through hole may be included with other valve member to provide a reduction in surface area and resultant friction and ease of rotation. A shaft with a flat surface a "D" shape hole in third valve member and provides drive. Alternately, a gear may communicate directly to a geared circumference of a rotary third valve member and provide rotation thereof.

Flow passage from conduits of first valve member to conduits of second valve member result of the angular offset of apertures of first valve member and second valve member. Sequential alteration of flow passage interconnection of conduits of first valve member and conduits of second valve member results from the relative position of stationary apertures of first valve member to that of second valve member and rotating apertures of third valve member.

A second drive means may be employed to actuate the first or second valve member, or both the first and second valve members and adjust position of respective apertures. Such a second drive means may be a second motor, clutch attachment to first motor for automatic adjustments or threaded assembly, key-way or detent for manual adjustment.

Similarly, a separate drive mechanism may be applied to a first valve member, second valve member or both first and second valve members. The valve member without drive means transit of third valve member may facilitate component layout and assembly. A second drive mechanism provides a means to adjust manually or automatically the offset between through apertures of first valve member and second valve member and thereby determine process step times duration.

Apertures need only have sufficient surface engagement to provide adequate sealing and valve action. Use of non-reactive, non-volatile greases, e.g., silicone vacuum grease provide a viscous layer between engaged surfaces and increase seal efficacy. In some applications, valve materials may not require additional lubrication.

Such valve member need materials sufficient to maintain sealing surfaces during useful life of system. The surface must remain relatively flat to one another and be resistant to surface damage such as scratches from contaminants ejected by and through a compressor. Such contaminants include machining debris upon initial break-in of compressor, blower or pump or particulate from ambient surroundings. Such materials include ceramic, metal and plastic.

Means of manufacture include pressing, firing, grinding and polishing for ceramics, stamping or machining for metals and molding or machining for plastics. Metals may be cut from bas stock or casts in moulds.

Alternately, a gasket or seal material around apertures on sealing surface may be useful for a high pressure or vacuum application. Moreover, a ball bearing and bearing race on sealing surface may provide utility to decrease power consumption in some applications.

A support subassembly employs a means to maintain sealing surfaces of first valve member, second valve member and third valve member. Typically three springs reside in a non-sealing surface of the first valve member and a support ring to provide a constant axial force between first valve member sealing surface and first sealing surface of third valve member. A pliable gasket maintains contact between support ring and a housing. Anti-rotation pins connect a housing and first valve member and prevent rotation of first valve member relative to housing. Position pins are not fixed axially and allows the first valve member to move freely and accommodate undulations due to interactions with third valve member.

A detent subassembly provides recesses for a spring loaded ball to reside. Typically, three springs reside in non-sealing surface of second valve member with balls atop. A ring with recesses to accept these balls allows rotation of second valve member. A pliable gasket material resides between non-recess side of detent ring and housing. Position pins connect between housing and non-sealing surface of second valve member and prevent rotation of second valve member relative to housing. Removal of position pins allows rotation of second valve member from one detent position to another and thereby adjustment of valve. Positions pins are not fixed axially and allow the second valve member to move freely due and accommodate undulations due to interactions with third valve member. The springs provide a constant force and maintain sealing surfaces of second valve member and third valve member.

An alignment subassembly maintains first valve member, second valve member and third valve member in proper orientation. A pliable gasket material covers the radial surface of each the first valve member and second valve member. A rigid collar envelops first valve member, second valve member and third valve member and provides a stop to maintain spring loads on the assembly.

A housing subassembly consists of a top housing and a bottom housing. These housing parts interconnect to enclose the valve members, provide load to the springs by means of generally three bolts with accompanying nuts, a rigid stop for anti-rotation pins and position pins.

Prior art describe systems by which a series of independently actuated valves and control means permit flow in a system. This novel rotary valve assembly obviates a need for such a series of independently actionable valves and need for sophisticated control thereof. Moreover prior art rotary devices have fixed process step times as a function of flow passage and aperture geometry which do not readily provide adjustability or process optimization.

According to one aspect, the present invention provides a rotary valve assembly for controlling process fluid flow. The rotary valve comprises a first valve member disposed within a fluid flow path and including an aperture formed therein through which the process fluid introduced to the rotary valve can flow, a second valve member including an aperture formed therein that is at least partially aligned with the aperture formed in the first valve member within the fluid flow path and through which the process fluid can flow to be discharged from the rotary valve, and a third valve member disposed within the fluid flow path between the first valve member and the second valve member and including at least one aperture formed therein. An alignment of the aperture formed in the third valve member relative to at least one of the aperture formed in the first valve member and the aperture formed in the second valve member is adjustable to selectively establish a conduit through which the process fluid can flow.

According to another aspect, the first valve member of the rotary valve assembly includes a plurality of apertures formed therein and a separate input conduit in fluid communication with each of said apertures. At least one of the first and second valve members is rotatable about a primary axis to at least partially align the aperture formed in the second valve member with one or more of the plurality of apertures formed in the first valve member within the fluid flow path to establish a desired output from the rotary valve.

According to another aspect, a first input conduit is in fluid communication with one of the plurality of apertures formed in the first valve member to establish an internal passage between the rotary valve and a desiccant environment. A second input conduit can optionally be provided in fluid communication with another of the plurality of apertures formed in the first valve member to establish an internal passage between the rotary valve and a humid environment.

According to another aspect, the rotary valve of the present invention includes a first input conduit in fluid communication with one of the plurality of apertures formed in the first valve member to establish an internal passage between the rotary valve and a vacuum environment. A second input conduit can optionally also be provided in fluid communication with another of the plurality of apertures formed in the first valve member to establish an internal passage between the rotary valve and an environment in which a fluid is input at an elevated pressure. The vacuum environment can be established by an inlet of a compressor and the elevated pressure can be established by an output of the compressor.

According to another aspect, the second valve member includes a plurality of apertures formed therein and a separate output conduit in fluid communication with each of said apertures. At least one of the first and second valve members is rotatable about a primary axis to at least partially align the aperture formed in the first valve member with one or more of the plurality of apertures formed in the second valve member within the fluid flow path to establish a desired output from the rotary valve.

According to another aspect, the third valve member includes a plurality of apertures formed therein and an alignment of the plurality of apertures formed in the third valve member relative to at least one of the aperture formed in the first valve member and the aperture formed in the second valve member is adjustable to selectively establish a conduit through which the process fluid can flow through the first second and third valve members.

According to another aspect, the first valve member includes a plurality of apertures formed therein, each of said apertures being at least partially aligned with the aperture formed in the second valve member. A separate input can optionally be provided in fluid communication with each of the plurality of apertures formed in the first valve member and the alignment of the aperture formed in the third valve member relative to the plurality of apertures formed in the first valve member can optionally be adjustable to selectively establish fluid communication between the plurality of apertures formed in the first valve member and the aperture formed in the second valve member.

According to another aspect, the third valve member is rotatable about a central axis along which the first, second and third valve members are coaxially aligned. The rotary valve assembly can optionally further comprise a motor, such as an electric, hydraulic, pneumatic or other type of prime mover operatively coupled to the third valve member to drive rotation of the third valve member about the central axis.

According to another aspect, the third valve member includes a surface that engages a surface of the first valve member and a surface that engages the second valve member to interfere with process fluid flow through the valve when the aperture formed in the third valve member is not at least partially aligned with the apertures formed in the first and second valve members.

According to yet another aspect at least one of the first and second valve members is rotationally adjustable about a central axis to a plurality of discrete angular orientations. A detent ring can optionally be provided to the rotary valve assembly to define each of the plurality of discrete angular orientations.

According to yet another aspect, the present invention provides a humidity control apparatus for controlling humidity within a closed environment comprising a desiccant, a humidifier and the rotary valve assembly described herein.

According to yet another aspect, the present invention provides a heat pump for controlling a temperature within a closed environment comprising an evaporator, a condenser and the rotary valve assembly described herein.

According to yet another aspect, the present invention provides an oxygen concentrator comprising the rotary valve assembly described herein and at least one component selected from the group consisting of: an adsorbent bed, a compressor, a blower, and a pump.

According to yet another aspect, the present invention provides a water purification system for reducing a level of impurities in water to a reduced level that is less than an original level of said impurities in the water when the water was introduced to the water purification system, the water purification system comprising the rotary valve assembly described herein and an evaporator, a condenser, or both an evaporator and a condenser.

BRIEF DESCRIPTION OF THE DRAWINGS

The invention may take physical form in certain parts and arrangement of parts, embodiments of which will be described in detail in this specification and illustrated in the accompanying drawings which form a part hereof, and wherein:

FIG. 8-II is an exploded view of first, second and third valve members of a rotary valve assembly adjusted for unequal process steps depicting rotary second valve member in a 85% first process step and a 25% second process step position;

FIG. 8-III is an exploded view of first, second and third valve members of a rotary valve assembly adjusted for equal process steps depicting rotary second valve member in a 50% first process step position, a 50% second process step position;

FIG. 8-IV is an exploded view of first, second and third valve members of a rotary valve assembly adjusted for unequal process steps depicting rotary second valve member in a 25% first process step position, a 85% second process step position;

FIG. 8-V is an exploded view of first, second and third valve members of a rotary valve assembly adjusted for nil and infinite process steps depicting rotary second valve member in a 0% first process step position, a 100% first process step position;

FIG. 9-II is a layout view of first, second and third valve members of a rotary valve assembly adjusted for unequal first process step and second process step depicting rotary second valve member demonstrating 135° alignment for first process step and 45° alignment for second process step and resulting in 75% first process step and 25% second process step respectively;

FIG. 9-III is a layout view of first, second and third valve members of a rotary valve assembly adjusted for equal first process step and second process step depicting rotary second valve member demonstrating 90° alignment for first process step and 90° alignment for second process step and resulting in 50% first process step and 50% second process step respectively;

FIG. 9-IV is a layout view of first, second and third valve members of a rotary valve assembly adjusted for unequal first process step and second process step depicting rotary second valve member demonstrating 45° alignment for first process step and 135° alignment for second process step and resulting in 25% first process step and 75% second process step respectively;

FIG. 9-V is a layout view of first, second and third valve members of a rotary valve assembly adjusted for no first process step and infinite second process step depicting rotary second valve member demonstrating 180° alignment for first process step and 180° alignment for second process step and resulting in 0% first process step and 100% second process step position respectively;

FIG. 19A-C are views of embodiments of a motor drive and valve assembly;

FIG. 20 shows layout views of an embodiment of (A) an alignment assembly and (B) a detent assembly;

FIG. 23 shows an embodiment of (A) a housing assembly and (B) a flow conduit assembly;

FIG. 25 illustrates embodiments of process step time adjustment and a rotary valve assembly set for equal process times;

FIG. 26 shows a partially cutaway view and an end view of an embodiment of a rotary valve assembly;

FIG. 69A is an exploded view of an embodiment of a single adsorbent bed pressure swing adsorption system for oxygen concentration with a pressurization process step and a rotary valve adjusted for equal pressurization and depressurization steps;

FIG. 69B is an exploded view of an embodiment of a single adsorbent bed pressure swing adsorption system for oxygen concentration with a depressurization process step and a rotary valve adjusted for equal pressurization and depressurization steps;

FIG. 70A is an exploded view of an embodiment of a paired adsorbent bed vacuum-pressure swing adsorption system for oxygen concentration with pressurization process step and a rotary valve adjusted for equal pressurization and depressurization steps;

FIG. 70B is an exploded view of an example of a paired adsorbent bed vacuum-pressure swing adsorption system for oxygen concentration with a depressurization process step and a rotary valve adjusted for equal pressurization and depressurization steps;

FIG. 71A is an exploded view of an embodiment of a paired adsorbent bed pressure swing adsorption system with a pressurization process step and a rotary valve adjusted for equal pressurization and depressurization steps;

FIG. 71B is an exploded view of an embodiment of a paired adsorbent bed pressure swing adsorption system for oxygen concentration with depressurization process step and a rotary valve adjusted for equal pressurization and depressurization steps;

FIG. 72A is a layout view of an embodiment of a rotary valve assembly adjusted for equal pressurization and depressurization steps depicting a pressurization step and a first surge vessel acting as feed air filter and exhaust muffler, a second surge vessel acting as a heat exchanger and a third surge vessel acting as a void gas collector;

FIG. 72B is a layout view of an embodiment of a rotary valve assembly adjusted for equal pressurization and depressurization steps depicting a depressurization step and a first surge vessel acting as feed air filter and exhaust muffler, a second surge vessel acting as a heat exchanger and a third surge vessel acting a void gas collector;

DETAILED DESCRIPTION OF ILLUSTRATIVE EMBODIMENTS

Figure 1:
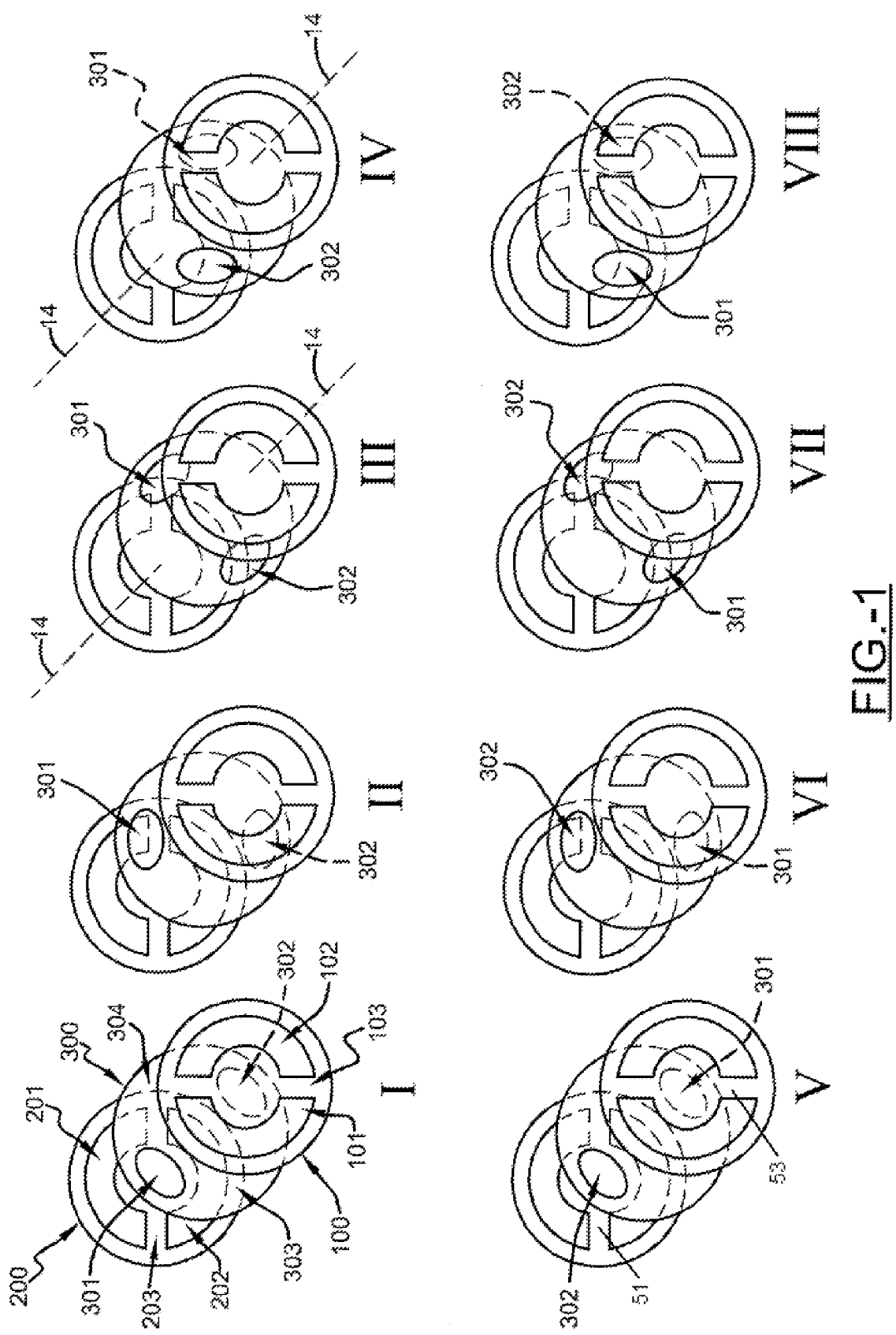
FIG. 1 is an exploded view of valve members of a rotary valve assembly according to an embodiment of the present invention adjusted for equal process steps depicting eight positions (I-VIII) of the third valve member in successive 45° positions that comprise two process cycles.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Rotary Valve

The novel rotary valve described herein combines variable process cycle time and variable process step time in an integral assembly for use with process fluid flow systems and thereby provides for a process optimization of any such system. Process applications include flow reversal, flow mixing, flow metering and the like without requiring significant alterations to existing process-fluid-flow conduits, as described in detail below.

According to an embodiment, a first valve member with a aperture, a second valve member with a aperture and a third valve member with a through aperture provides a variable on-off flow assembly with on input and one output.

(ii) in another embodiment a first valve member with a first aperture and a second aperture, a second valve member with a aperture and a third valve member with a through aperture provides a variable on-off flow assembly with two inputs and one output;

(iii) in another embodiment a first valve member with a first aperture and a second aperture, a second valve member with a first aperture and a second aperture and a third valve member with a through aperture provides a variable flow assembly with two inputs and two output;

(vi) in another embodiment a first valve member with a first aperture and a second aperture, a second valve member with a first aperture and a second aperture and a third valve member with a first through aperture and a second through aperture provides a variable flow assembly with two inputs and two outputs.

Drive mechanism adapts for variable speed by means of alternating or direct current electric motor or other power source. Transition between process steps in gradual and minimizes detrimental effects of rapid changes e.g., avoids compressor, blower or pump output dead-head or inlet starvation.

In another embodiment a system the novel rotary valve described herein provides adjustment of process step time to compensate for variable performance of process vessels. This unique and novel rotary valve assembly described herein provides a means to adjust process step time between 100% and 0% to the converse of 0% and 100% without need for expensive electronic circuitry.

As such the first valve member and second valve member offset of 90° angular degrees provides equal process step times. Adjustment of valve member aperture offset may be accomplished manually at factory, service center or in field or automatically with closed loop feed back of product gas concentration.

FIG. 1 depicts an exploded view of valve members (100), (200), (300) of a rotary valve assembly according to an embodiment of the present invention in different relative angular orientations. Each of the valve members shown in FIG. 1 are coaxially aligned along axis 14, and one or more of the valve members (100), (200), (300) is rotationally adjustable about axis 14 relative to at least one of the other valve members (100), (200), (300).

The first valve member (100) includes at least a first aperture (101) formed therein through which a fluid can travel, and optionally, a second aperture (102) formed therein. When at least one of the first aperture (101) and second aperture (102) become at least partially aligned with a first through aperture (301) of a third valve member (300) and at least a first aperture (201) or second aperture (202) of second valve member (200), this relative alignment enables communication of the fluid through a flow passage from conduit(s) in fluid communication with a first valve member (100) to one or more conduit(s) in fluid communication with a second valve member (200).

The second valve member (200) includes at least a first aperture (201) formed therein, and optionally a second aperture (202) that can each be at least partially aligned with a through aperture (301) formed in the third valve member (300) to establish fluid communication between the first and second valve members (100) and (200). When such fluid communication is established, there is at least partial alignment of at least a first through aperture (301) formed in the third valve member (300) and at least one aperture of the first and second valve members (100) and (200) which forms a flow passage through the first valve member (100), second valve member (200) and third valve member (300).

The third valve member (300) includes at least a first through aperture (301), and optionally a second through aperture (302) or a plurality of additional through apertures that can be selectively aligned with at least one aperture formed in each of the first and second valve members (100) and (200) to establish a fluid flow path.

According to the configuration embodiments shown in FIG. 1, first valve member (100) with a first aperture (101) and a second aperture (102) in a form of arcuate slots diametrically opposed generally by 180°. A first surface (103) of first valve member (100) provides engagement to a third valve member. Conduits connected to these slots provide flow passage means to inlets. The slots are separated by unslotted area sufficient for sealing and resulting in preferred flow by means of aperture.

A second valve member (200) with a first aperture (201) and a second aperture (202) in a form of arcuate slots diametrically opposed generally by 180°. A first surface (203) of second valve member (200) provides engagement to a third valve member. Conduits connect to these slots to provide flow passage means to outlets. The slots are separated by unslotted area sufficient for sealing and resulting in preferred flow by means of through aperture interconnection First aperture (100) and second aperture (102) of first valve member (100) and first aperture (201) and second aperture (202) of second valve member (200) are radially coincident to provide flow passage means therethrough.

A third valve member (300) with a first through aperture (301) and a second through aperture (302) in a form of arcuate slots diametrically opposed generally by 180° and radially coincident to first aperture (100) and second aperture (102) of first valve member (100) and first aperture (201) and second aperture (202) of second valve member (200). A first surface (303) of the third valve member (300) engages the first surface (103) of first valve member (100) and a second surface (304) of third valve member (300) engages first surface (203) of the second valve member (200) to create preferential flow passages and sealing surfaces. Such sealing surfaces provide preferable flow passage to and from conduits by means of first aperture (101) and second aperture (102) of first valve member (100) and first aperture (201) and second aperture (202) second valve member (200) by means of interconnection of first through aperture (301) and second through aperture (302) of third valve member (300).

FIG. 1-I further depicts the following: (I) A first through aperture (101) of a first valve member interconnected with a first aperture (201) of a second valve member (200) by means of a first through aperture (301) of a third valve member (300) and a second aperture (102) of first valve member (100) interconnected with a second aperture (202) of a second valve member (200) by means of a second through aperture (302) of a third valve member (300);

FIG. 1-(II) first aperture (101) and second aperture (102) of first valve member (100) interconnected with first aperture (201) of second valve member (200) by means of first through aperture (301) of third valve member (300) and first aperture (101) and second aperture (102) of first valve member (100) interconnected with second aperture (202) of second valve member (200) by means of second aperture (302) of third valve member (300);

FIG. 1-(III) second aperture (102) of first valve member (100) interconnected with first aperture (201) of second valve member (200) by means of first through aperture (301) of third valve member (300) and first aperture (101) of first valve member (100) interconnected with second aperture (201) of second valve member (200) by means of second through aperture (302) of third valve member (300);

FIG. 1-(IV) first aperture (101) of first valve member (100) interconnected with first aperture (201) of second valve member (200) and second aperture (202) of second valve member (200) by means of second through aperture (302) of third valve member (300) and second aperture (102) of first valve member (100) interconnected with first aperture (201) of second valve member (200) and second aperture (202) of second valve member (200) by means of first through aperture (301) of third valve member (300);

FIG. 1-(V) first aperture (101) of a first valve member interconnected with a first aperture (201) of a second valve member (200) by means of a second through aperture (302) of a third valve member (300) and second aperture (102) of first valve member (100) interconnected with a second aperture (202) of a second valve member (200) by means of a first through aperture (301) of a third valve member (300);

FIG. 1-(VI) first aperture (101) and second aperture (102) of first valve member (100) interconnected with first aperture (201) of second valve member (200) by means of second through aperture (302) of third valve member (300) and first aperture (101) and second aperture (102) of first valve member (100) interconnected with second aperture (202) of second valve member (200) by means of first through aperture (301) of third valve member (300);

FIG. 1-(VII) second aperture (102) of first valve member (100) interconnected with first aperture (201) of second valve member (200) by means of second through aperture (302) of third valve member (300) and first aperture (101) of first valve member (100) interconnected with second aperture (202) of second valve member (200) by means of first through aperture (301) of third valve member (300);

FIG. 1-(VIII) first aperture (101) of first valve member (100) interconnected with first aperture (201) of second valve member (200) and second aperture (202) of second valve member (200) by means of first through aperture (301) of third valve member (300) and second aperture (102) of first valve member (100) interconnected with first aperture (201) of second valve member (200) and second aperture (202) of second valve member (200) by means of second through aperture (302) of third valve member (300).

Figure 2:
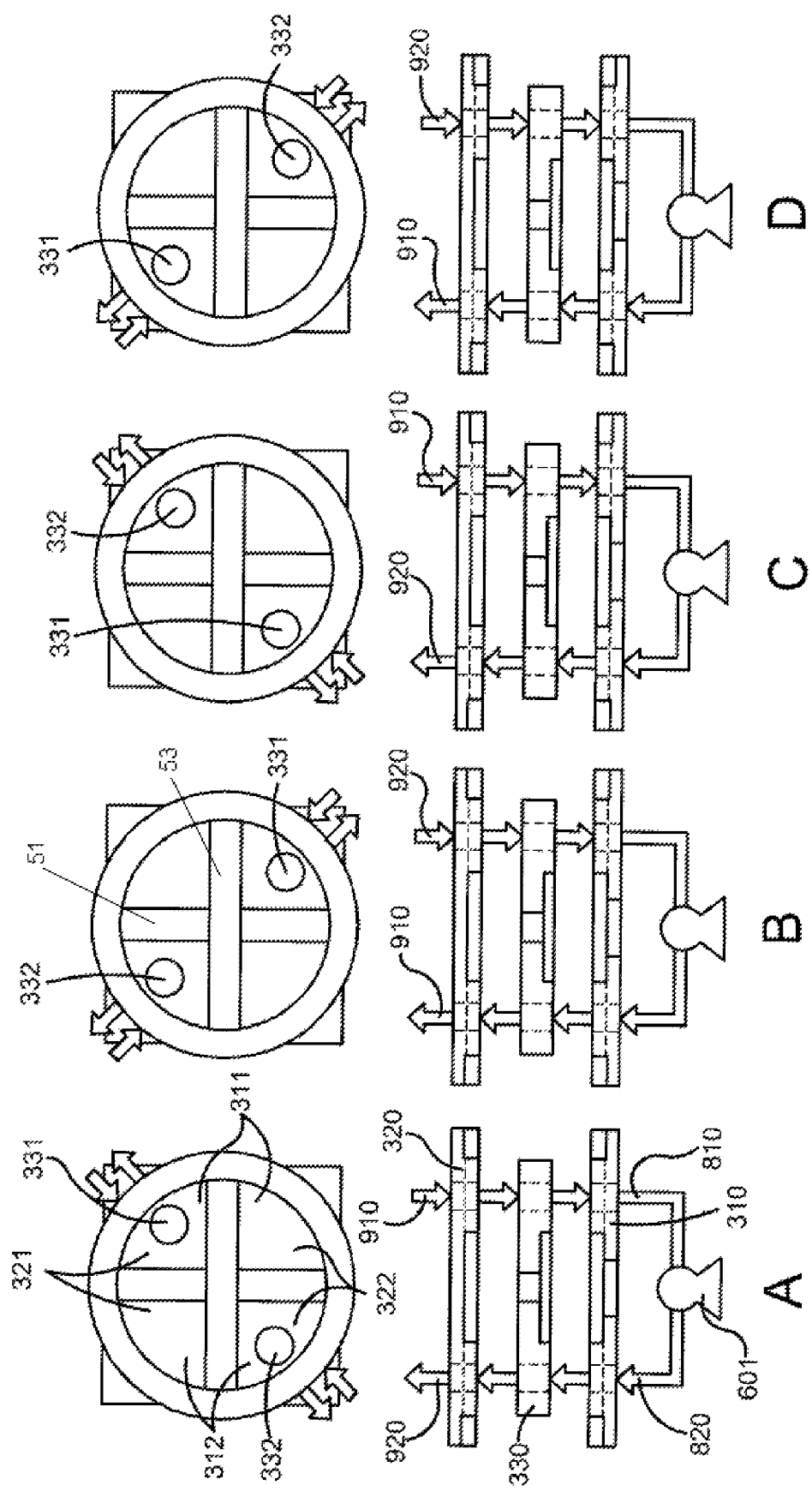
FIG. 2A is a side view and FIG. 2AA is top view of first, second and third valve members of a rotary valve assembly depicting process fluid flow in a first direction with third valve member in a first position and subsequent interconnection of first aperture of first valve member and first aperture of second valve member and first through aperture of third valve member and second aperture of first valve member and second aperture of second valve member and second through aperture of third valve member.
FIG. 2B is a side view and FIG. 2BB is a top view of first, second and third valve members of a rotary valve assembly depicting process fluid flow in a second direction with third valve member in a second position and subsequent interconnection of second aperture of first valve member and first aperture of second valve member and first through aperture of third valve member and first aperture of first valve member and second aperture of second valve member and second through aperture of third valve member.
FIG. 2C is a side view and FIG. 2CC is a top view of first, second and third valve members of a rotary valve assembly depicting flow in said first direction with third valve member in a third position and subsequent interconnection of second aperture of first valve member and second aperture of second valve member and first through aperture of third valve member and first aperture of first valve member and first aperture of second valve member and second through aperture of third valve member.
FIG. 2D is a side view and FIG. 2DD is a top view of first, second and third valve members of a rotary valve assembly depicting flow in said second direction with third valve member in a fourth position and subsequent interconnection of first aperture of first valve member and second aperture of second valve member and first through aperture of third valve member and second aperture of first valve member and first aperture of second valve member and second through aperture of third valve member.

FIG. 2 is an animation view of novel rotary assembly depicting flow reversal of an inlet and an outlet of a compressor, blower or pump (601) by means of successive 45° positions of third valve member (330) and subsequent interconnection of apertures of first valve member (310) and apertures of second valve member (320) and through apertures of third valve member (330). The first valve member (310) is in fluid communication with a first conduit (810) and a second conduit (820). The second valve member (320) is in fluid communication with a third conduit (910) and a fourth conduit (920).

FIG. 2A is an animation view of novel rotary assembly depicting flow in a first direction from an inlet (910) to an outlet (920) with third valve member (330) in a first position and subsequent interconnection of first aperture (311) of first valve member (310) and first aperture (321) of second valve member (320) and first through aperture (331) of third valve member (330) and second aperture (312) of first valve member (310) and second aperture (322) of second valve member (320) and second through aperture (332) of third valve member (330). FIG. 2A shows the first valve member 310 having a cross bar 51 and the second valve member 320 having a cross bar 53.

FIG. 2B is an animation view of novel rotary assembly depicting flow in a second direction from the fourth conduit (920) to the third conduit (910) with third valve member (330) in a second position and subsequent interconnection of second aperture (312) of first valve member (310) and first aperture (321) of second valve (320) member and second through aperture (332) of third valve member (330) and first aperture (311) of first valve member (310) and second aperture (322) of second valve member (320) and first through aperture (331) of third valve member (330). In the second position, the fluid can flow from the fourth conduit (920) through the second aperture (322) of second valve member (320), the first through aperture (331) of third valve member (330), the first aperture (311) of first valve member (310), the first conduit (810), the inlet of the compressor (601), the outlet of the compressor (601), the second conduit (820), the second aperture (312) of first valve member (310), the second through aperture (332) of third valve member (330), and through the first aperture (321) of second valve member (320) to the third conduit (910).

FIG. 2C is an animation view of novel rotary assembly depicting flow in said first direction from the first conduit (910) to the second conduit (920) with third valve member (330) in a third position and subsequent interconnection of second aperture (312) of first valve member (310) and second aperture (322) of second valve member (320) and first through aperture (331) of third valve member (330) and first aperture (311) of first valve member (310) and first aperture (321) of second valve member (320) and second through aperture (332) of third valve member (330). In the third position, the fluid can flow from the third conduit (910) through the first aperture (321) of second valve member (320), the second through aperture (332) of third valve member (330), the first aperture (311) of first valve member (310), the first conduit (810), the inlet of the compressor (601), the outlet of the compressor (601), the second conduit (820), the second aperture (312) of first valve member (310), the first through aperture (331) of third valve member (330), and through the second aperture (322) of second valve member (320) to the fourth conduit (920).

FIG. 2D is an animation view of novel rotary assembly depicting flow in said second direction from the fourth conduit (920) to the first conduit (910) with third valve member (330) in a fourth position and subsequent interconnection of first aperture (311) of first valve member (310) and second aperture (322) of second valve member (320) and second through aperture (332) of third valve member (330) and second aperture (312) of first valve member (310) and first aperture (321) of second valve member (320) and first through aperture (331) of third valve member (330). In the fourth position, the fluid can flow from the fourth conduit (920) through the second aperture (322) of second valve member (320), the second through aperture (332) of third valve member (330), the first aperture (311) of first valve member (310), the first conduit (810), the inlet of the compressor (601), the outlet of the compressor (601), the second conduit (820), the second aperture (312) of first valve member (310), the first through aperture (331) of third valve member (330), and through the first aperture (321) of second valve member (320) to the third conduit (910).

Figure 3:
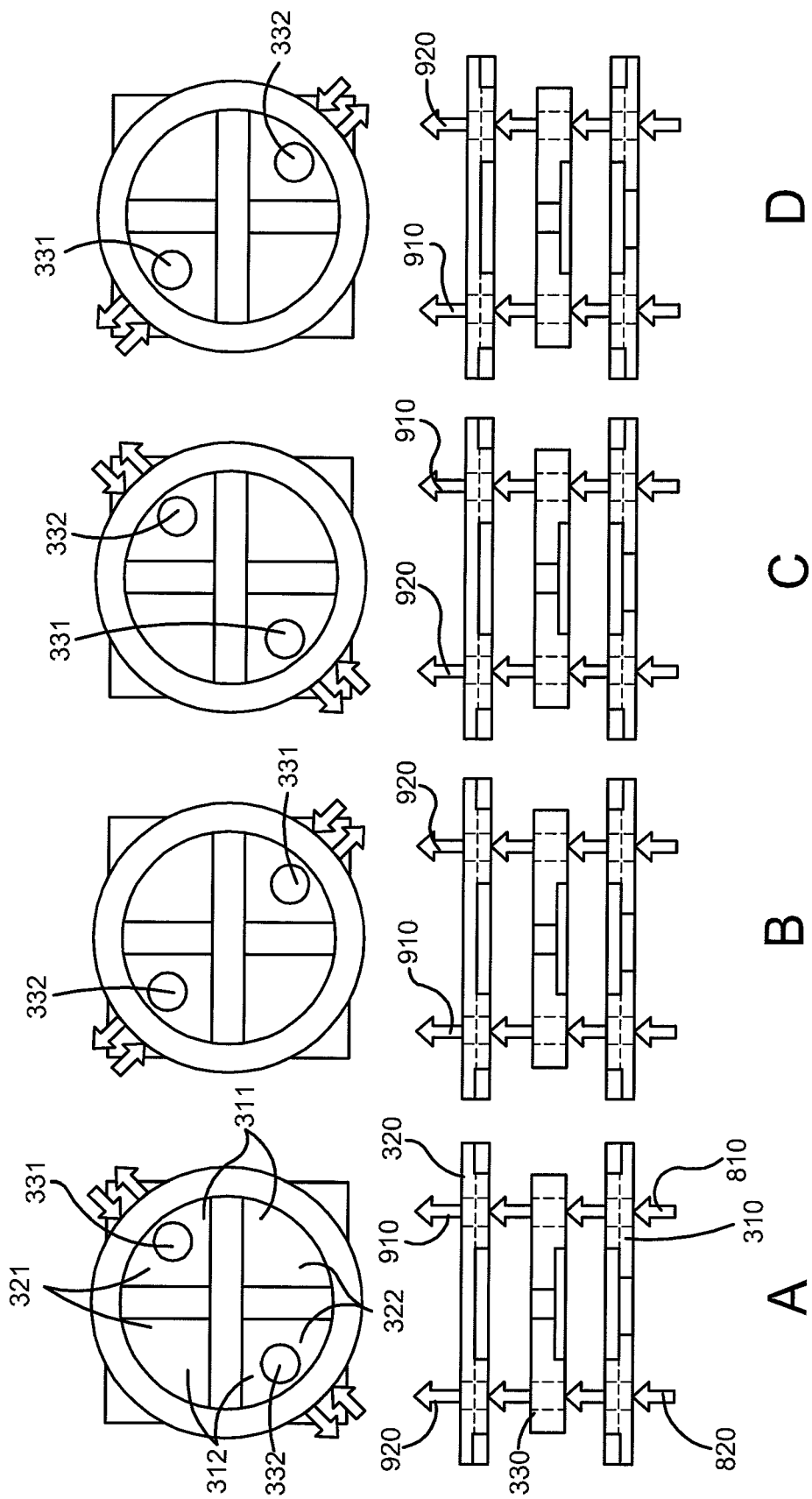
FIG. 3A is a view of first, second and third valve members of a rotary valve assembly depicting process fluid flow from a first input conduit to a first output conduit and a second input conduit to a second output conduit with a third valve member in a first position and subsequent interconnection of first aperture of first valve member and first aperture of second valve member and first through aperture of third valve member and second aperture of first valve member and second aperture of second valve member and second through aperture of third valve member.
FIG. 3B is a view of first, second and third valve members of a novel rotary valve assembly depicting process fluid flow from said first input conduit to said second output conduit and said second input conduit to said first output conduit with third valve member in a second position and subsequent interconnection of second aperture of first valve member and first aperture of second valve member and first through aperture of third valve member and first aperture of first valve member and second aperture of second valve member and second through aperture of third valve member.
FIG. 3C is a view of first, second and third valve members of a rotary valve assembly depicting process fluid flow from said first input conduit to said first output conduit and said second input conduit to said second output conduit with third valve member in a third position and subsequent interconnection of second aperture of first valve member and second aperture of second valve member and first through aperture of third valve member and first aperture of first valve member and first aperture of second valve member and second through aperture of third valve member.
FIG. 3D is a view of first, second and third valve members of a rotary valve assembly depicting process fluid flow from said first input conduit to said second output conduit and said second input conduit to said first output conduit with third valve member in a fourth position and subsequent interconnection of first aperture of first valve member and second aperture of second valve member and first through aperture of third valve member and second aperture of first valve member and first aperture of second valve member and second through aperture of third valve member.

FIG. 3 is an animation view of novel rotary assembly depicting flow mixture by means of successive 45° positions of third valve member (330) and subsequent interconnection of a first inlet (810) and a second inlet (820) with a first outlet (910) and a second outlet (920) by means first aperture (311) and second aperture (312) of first valve member (310) and first aperture (321) and second aperture (322) of second valve member (320) and first through aperture (331) and second through aperture (332) of third valve member (330).

FIG. 3A is an animation view of novel rotary assembly depicting flow from a first input conduit (810) to a first output conduit (910) and a second input (820) conduit to a second output conduit (920) with a third valve member (330) in a first position and subsequent interconnection of first aperture (311) of first valve member (310) and first aperture (321) of second valve member (320) and first through aperture (331) of third valve member (330) and second aperture (312) of first, valve member (310) and second aperture (322) of second valve member (320) and second through aperture (332) of third valve member (330).

FIG. 3B is an animation view of novel rotary assembly depicting flow from said first input conduit (810) to said second output (920) conduit and said second input conduit (820) to said first output conduit (910) with third valve member (330) in a second position and subsequent interconnection of second aperture (312) of first valve member (310) and first aperture (321) of second valve member (320) and first through aperture (331) of third valve member (330) and first aperture (311) of first valve member (310) and second aperture (322) of second valve member (320) and second through aperture (332) of third valve member (330).

FIG. 3C is an animation view of novel rotary assembly depicting flow from said first input conduit (810) to said first output conduit (910) and said second input conduit (820) to said second output conduit (920) with third valve member (330) in a third position and subsequent interconnection of second aperture (312) of first valve member (310) and second aperture (322) of second valve member (320) and first through aperture (331) of third valve member (330) and first aperture (311) of first valve member (310) and first aperture (321) of second valve member (320) and second through aperture (332) of third valve member (330).

FIG. 3D is an animation view of novel rotary assembly depicting flow from said first input conduit (810) to said second output conduit (920) and said second input conduit (820) to said first output conduit (910) with third valve member (330) in a fourth position and subsequent interconnection of first aperture (311) of first valve member (310) and second aperture (322) of second valve member (320) and first through aperture (331) of third valve member (330) and second aperture (212) of first valve member (310) and first aperture (321) of second valve member (320) and second through aperture (332) of third valve member (330).

Figure 4:
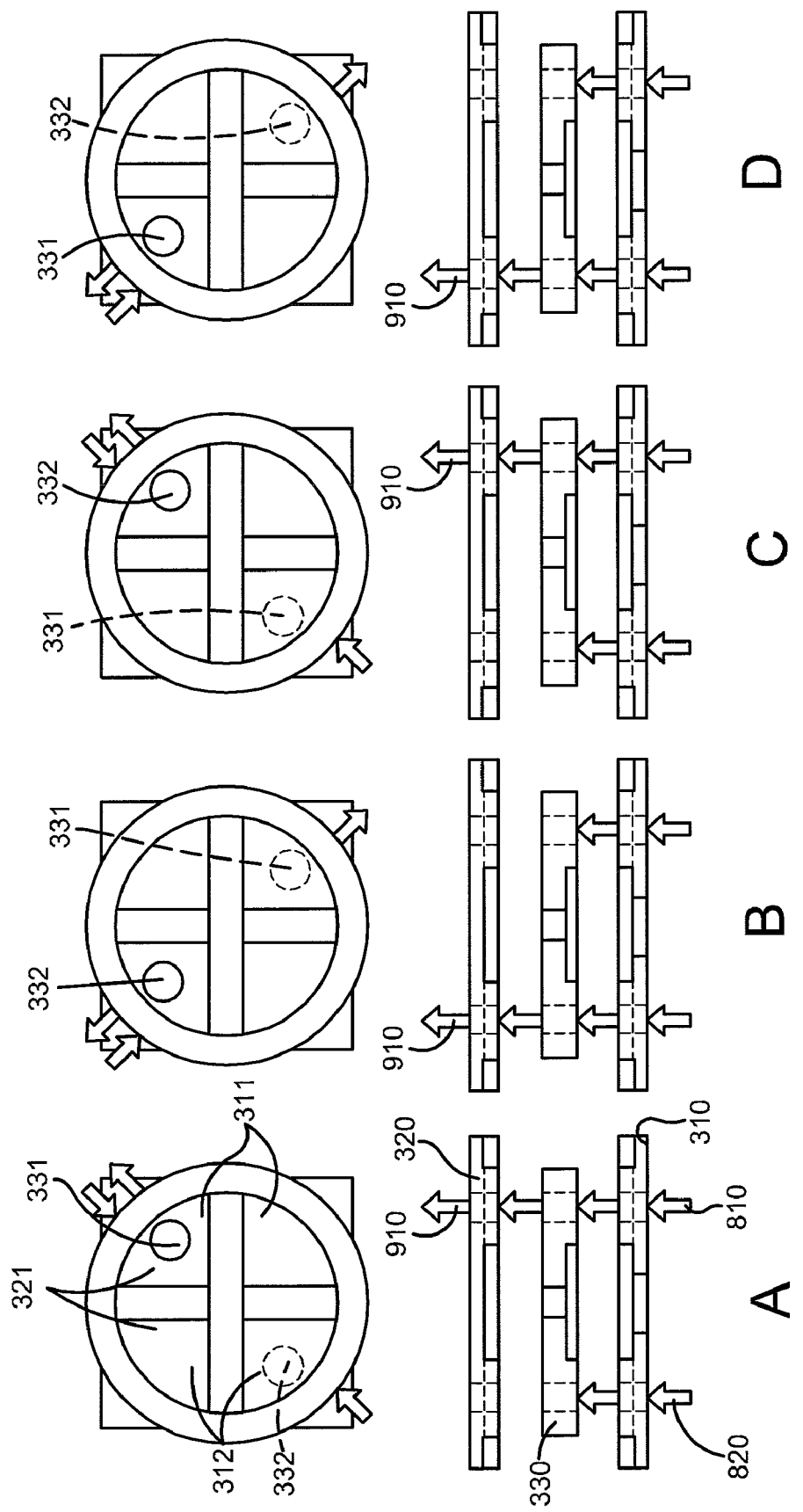
FIG. 4A is a view of first, second and third valve members of a rotary valve assembly depicting process fluid flow from a first input conduit to a output conduit with third valve member in a first position and subsequent interconnection of first aperture of first valve member and aperture of second valve member and first through aperture of third valve member.
FIG. 4B is a view of first, second and third valve members of a rotary valve assembly depicting process fluid flow from said second input conduit to output conduit with third valve member in a second position and subsequent interconnection of second aperture of first valve member and aperture of second valve member and second through aperture of third valve member.
FIG. 4C is a view of first, second and third valve members of a rotary valve assembly depicting process fluid flow from a first input conduit to said output conduit with third valve member in a third position and subsequent interconnection of second aperture of first valve member and first aperture of second valve member and second through aperture of third valve member.
FIG. 4D is a view of first, second and third valve members of a rotary valve assembly depicting process fluid flow from said second input conduit to said output conduit with third valve member in a fourth position and subsequent interconnection of second aperture of first valve member and aperture of second valve member and first through aperture of third valve member.

FIG. 4 is an animation view of novel rotary assembly depicting flow metering by means of successive 45° positions of a third valve member (330) and subsequent interconnection of a first inlet (810) and a second inlet (820) with an outlet (910) by means a first aperture (311) and second aperture (312) of a first valve member (310) and an aperture (321) of a second valve member (320) and a first through aperture (331) and a second through aperture (332) of a third valve member (330).

FIG. 4A is an animation view of novel rotary assembly depicting flow from a first input conduit (810) to an output conduit (910) with a third valve member (330) in a first position and subsequent interconnection of a first aperture (311) of first valve member (310) and aperture (321) of second valve member (320) and first through aperture (331) of third valve member (330).

FIG. 4B is an animation view of novel rotary assembly depicting flow from said second input conduit (820) to output conduit (910) with third valve member (330) in a second position and subsequent interconnection of second aperture (312) of first valve member (310) and aperture (321) of second valve member (320) and second through aperture (332) of third valve member (330).

FIG. 4C is an animation view of novel rotary assembly depicting flow from a first input conduit (810) to said output conduit (910) with third valve member (330) in a third position and subsequent interconnection of second aperture (312) of first valve member (310) and aperture (321) of second valve member (320) and second through aperture (332) of third valve member (330).

FIG. 4D is an animation view of novel rotary assembly depicting flow from said second input conduit (820) to said output conduit (910) with third valve member (330) in a fourth position and subsequent interconnection of second aperture (312) of first valve member (310) and aperture (321) of second valve member (320) and first through aperture (330) of third valve member (330).

Figure 5:
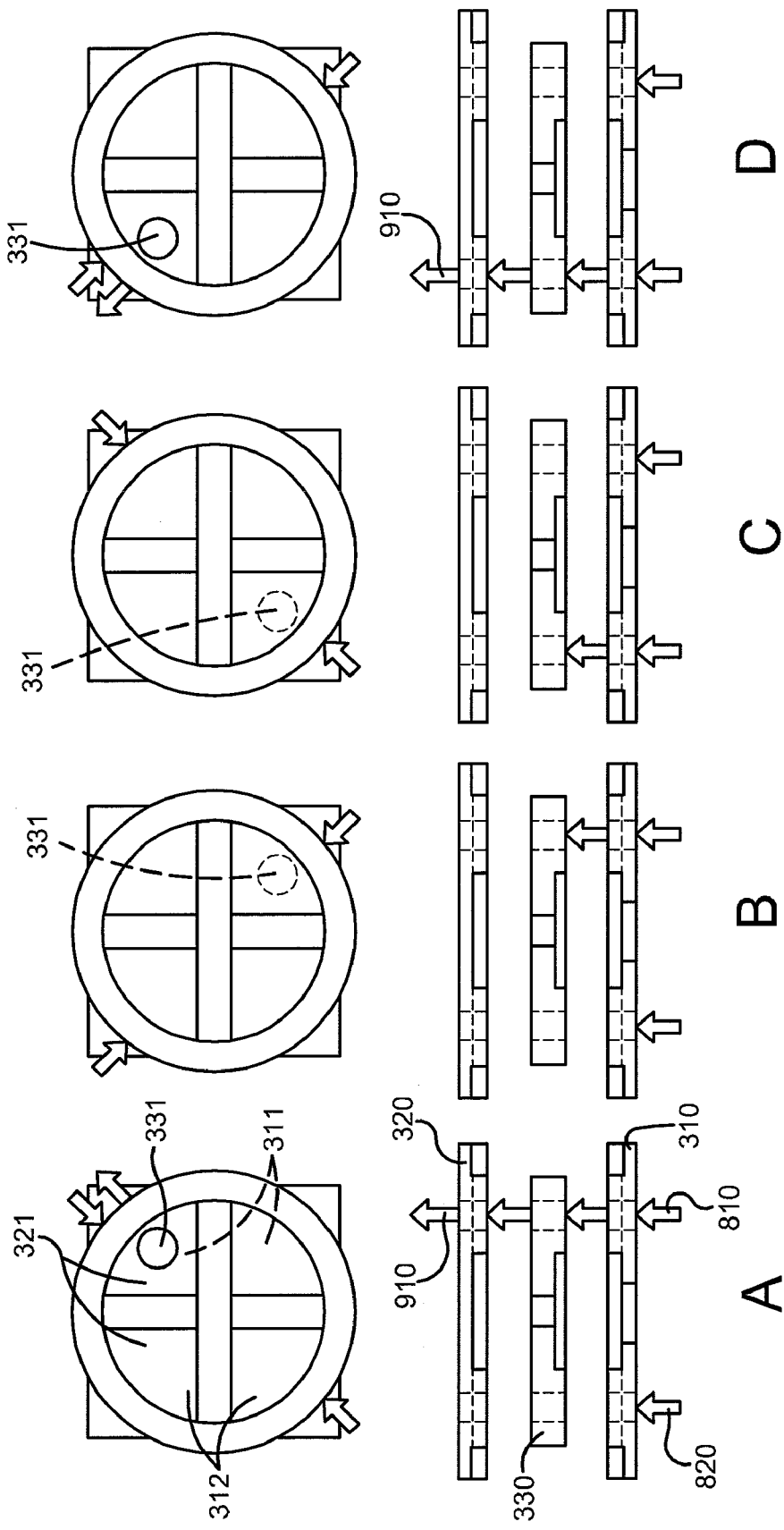
FIG. 5A is a view of first, second and third valve members of a rotary valve assembly depicting process fluid flow from a first input conduit to an output conduit with third valve member in a first position and subsequent interconnection of first aperture of first valve member and an aperture of second valve member and a through aperture of third valve member.
FIG. 5B is a view of first, second and third valve members of a rotary valve assembly depicting non-flow from a first input conduit or a second input conduit to an output conduit with third valve member in a second position.
FIG. 5C is a view of first, second and third valve members of a rotary valve assembly depicting non-flow from a first input conduit or a second input conduit to an output conduit with third valve member in a third position.
FIG. 5D is a view of first, second and third valve members of a rotary valve assembly depicting process fluid flow from said a second input conduit to an output conduit with third valve member in a fourth position and subsequent interconnection of second aperture of first valve member and an aperture of second valve member and through aperture of third valve member.

FIG. 5 is an animation view of novel rotary assembly depicting flow metering by means of successive 45° positions of third valve member (330) and subsequent interconnection of a first inlet (810) and a second inlet (820) with an outlet (910) by means of a first aperture (311) and a second aperture (312) of first valve member (310) and an aperture (321) of second valve member (320) and a through aperture (331) of third valve member (330).

FIG. 5A is an animation view of novel rotary assembly depicting flow from a first input conduit to an output conduit with third valve member in a first position and subsequent interconnection of first aperture of first valve member and an aperture of second valve member and a through aperture of third valve member.

FIG. 5B is an animation view of novel rotary assembly depicting non-flow from a first input conduit or a second input conduit to an output conduit with third valve member in a second position.

FIG. 5C is an animation view of novel rotary assembly depicting non-flow from a first input conduit or a second input conduit to an output conduit with third valve member in a third position.

FIG. 5D is an animation view of novel rotary assembly depicting flow from said a second input conduit to an output conduit with third valve member in a fourth position and subsequent interconnection of second aperture of first valve member and an aperture of second valve member and through aperture of third valve member.

Figure 6:
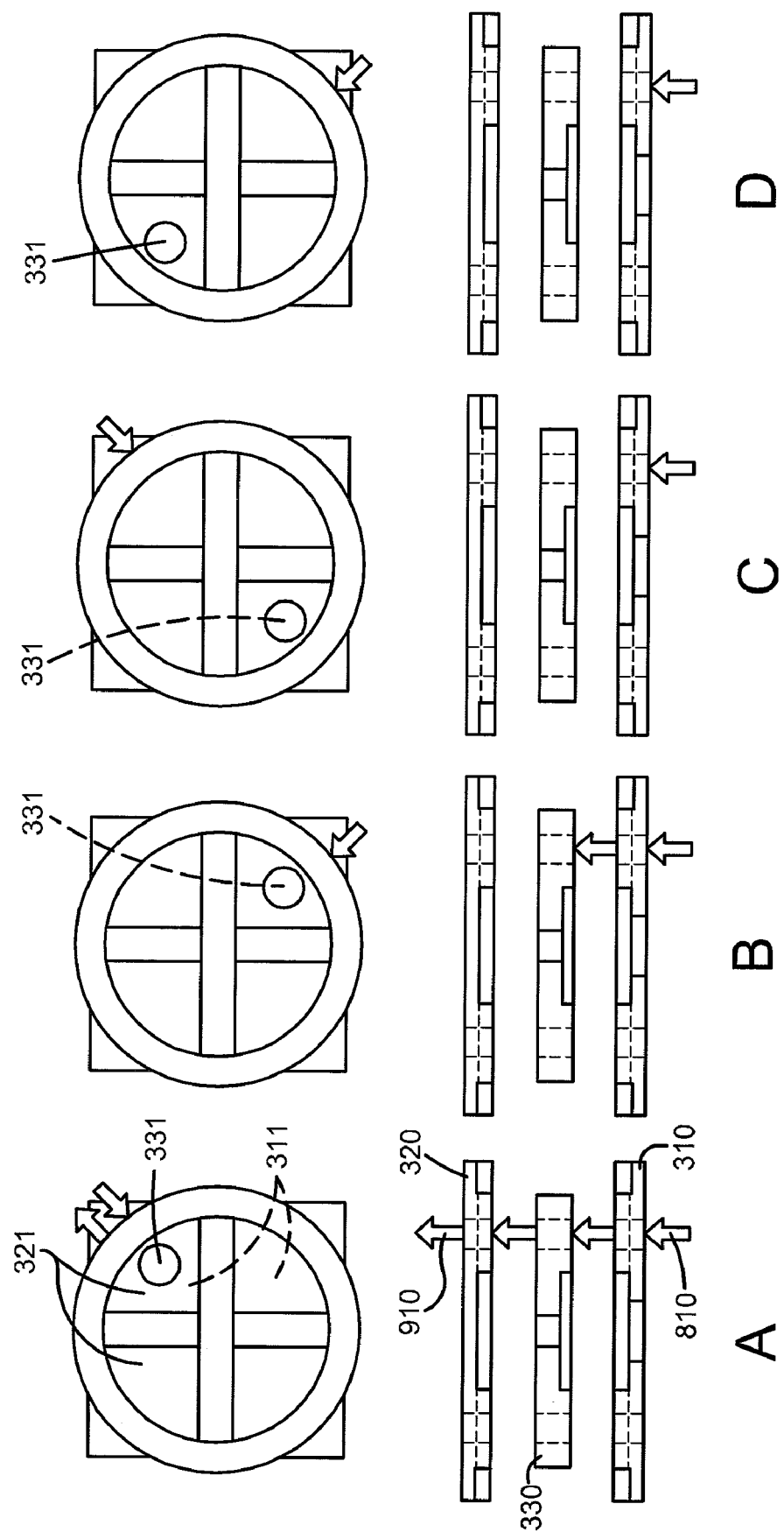
FIG. 6A is a view of first, second and third valve members of a rotary valve assembly depicting process fluid flow from an input conduit to an output conduit with third valve member in a first position and subsequent interconnection of an aperture of a first valve member and an aperture of a second valve member and a through aperture of third valve member.
FIG. 6B is a view of first, second and third valve members of a rotary valve assembly depicting non-flow from an input conduit to an output conduit with third valve member in a second position.
FIG. 6C is a view of first, second and third valve members of a rotary valve assembly depicting non-flow from an input conduit to an output conduit with third valve member in a third position.
FIG. 6D is a view of first, second and third valve members of a rotary valve assembly depicting non-flow from an input conduit to an output conduit with third valve member in a fourth position.

FIG. 6 is an animation view of novel rotary assembly depicting flow metering by means of successive 45° positions of third valve member (330) and subsequent interconnection of an inlet (810) with an outlet (910) by means of an aperture (311) of a first valve member (310) and an aperture (321) of a second valve member (320) and a through aperture (331) of third valve member (330).

FIG. 6A is an animation view of novel rotary assembly depicting flow from an input conduit (810) to an output conduit (910) with third valve member (330) in a first position and subsequent interconnection of an aperture (311) of a first valve member (310) and an aperture (321) of a second valve member (320) and a through aperture (331) of third valve member (330).

FIG. 6B is an animation view of novel rotary assembly depicting non-flow from an input conduit (810) to an output conduit (910) with third valve member (330) in a second position.

FIG. 6C is an animation view of novel rotary assembly depicting non-flow from an input conduit (810) to an output conduit (820) with third valve member (330) in a third position.

FIG. 6D is an animation view of novel rotary assembly depicting non-flow from an input conduit (810) to an output conduit (910) with third valve member (330) in a fourth position.

Figure 7:
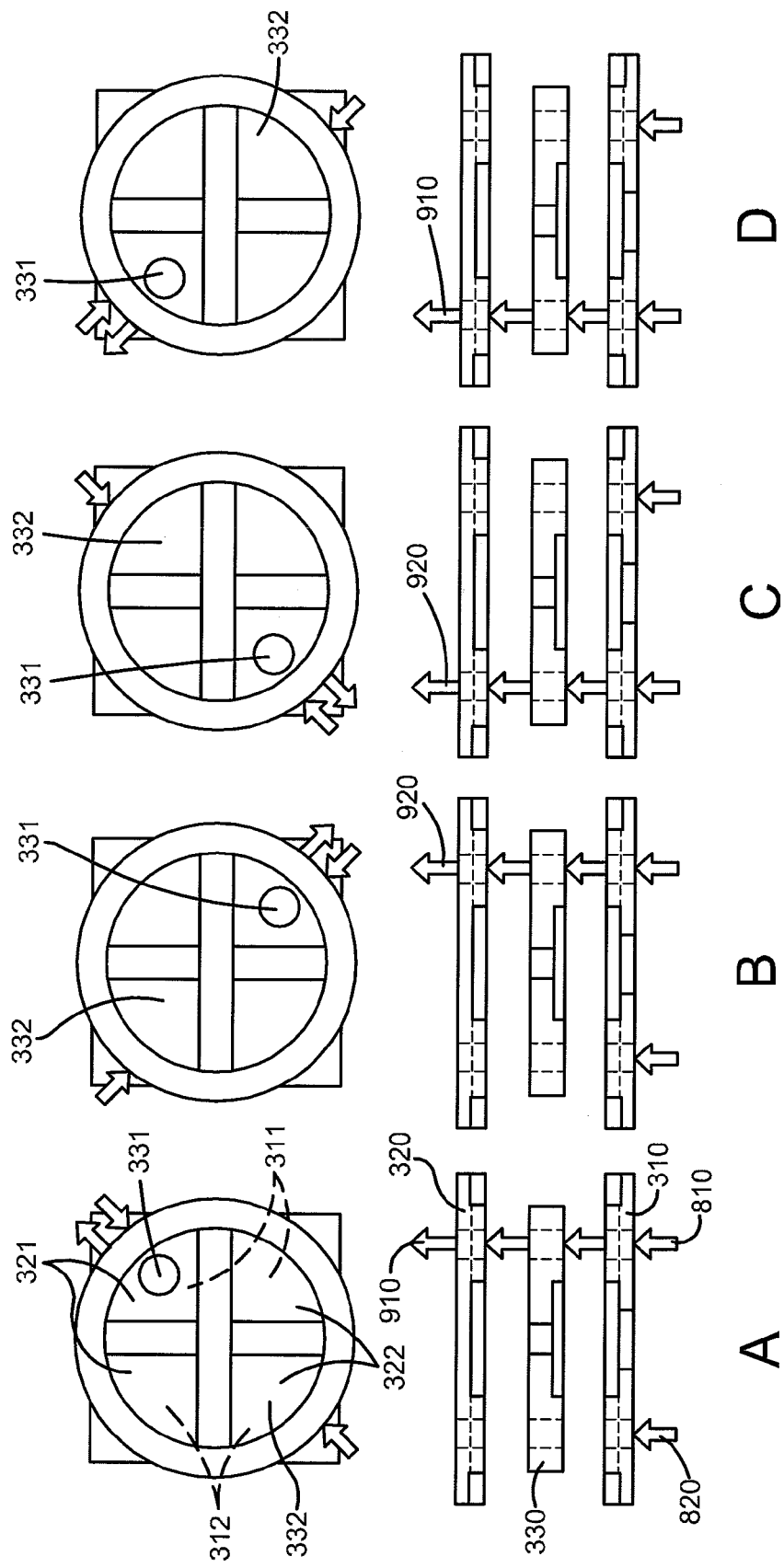
FIG. 7A is a view of first, second and third valve members of a rotary valve assembly depicting process fluid flow from a first input conduit to a first output conduit with third valve member in a first position and subsequent interconnection of a first aperture of first valve member and a first aperture of second valve member and a through aperture of third valve member.
FIG. 7B is a view of first, second and third valve members of a rotary valve assembly depicting process fluid flow from first input conduit to a second output conduit with third valve member in a second position and subsequent interconnection of a first aperture of first valve member and a second aperture of second valve member and a through aperture of third valve member.
FIG. 7C is a view of first, second and third valve members of a rotary valve assembly depicting process fluid flow from a second input conduit to a second output conduit with third valve member in a third position and subsequent interconnection of a second aperture of first valve member and a second aperture of second valve member and a through aperture of third valve member.
FIG. 7D is a view of first, second and third valve members of a rotary valve assembly depicting process fluid flow from a second input conduit to a first output conduit with third valve member in a fourth position and subsequent interconnection of second aperture of a first valve member and a first aperture of second valve member and a through aperture of third valve member.

FIG. 7 is an animation view of novel rotary assembly depicting flow metering by means of successive 45° positions of third valve member (330) and subsequent interconnection of a first inlet (810) and a second inlet (820) with a first outlet (910) and a second outlet (920) by means a first aperture (311) and a second aperture (312) of first valve member (310) and a first aperture (321) and a second aperture (322) of a second valve member (320) and a through aperture (331) of a third valve member (330).

FIG. 7A is an animation view of novel rotary assembly depicting flow from a first input conduit (810) to a first output conduit (910) with third valve member (330) in a first position and subsequent interconnection of a first aperture (311) of first valve member (310) and a first aperture (321) of second valve member (320) and a through aperture (331) of third valve member (330).

FIG. 7B is an animation view of novel rotary assembly depicting flow from first input conduit (810) to a second output conduit (920) with third valve member (330) in a second position and subsequent interconnection of a first aperture (311) of first valve member (310) and a second aperture (322) of second valve member (320) and a through aperture (331) of third valve member (330).

FIG. 7C is an animation view of novel rotary assembly depicting flow from a second input conduit (820) to a second output conduit (920) with third valve member (330) in a third position and subsequent interconnection of a second aperture (312) of first valve member (310) and a second aperture (322) of second valve member (320) and a through aperture (331) of third valve member (330).

FIG. 7D is an animation view of novel rotary assembly depicting flow from a second input conduit (820) to a first output conduit (910) with third valve member (330) in a fourth position and subsequent interconnection of second aperture (312) of a first valve member (310) and a first aperture (321) of second valve member (320) and a through aperture (331) of third valve member (330).

Figure 8:
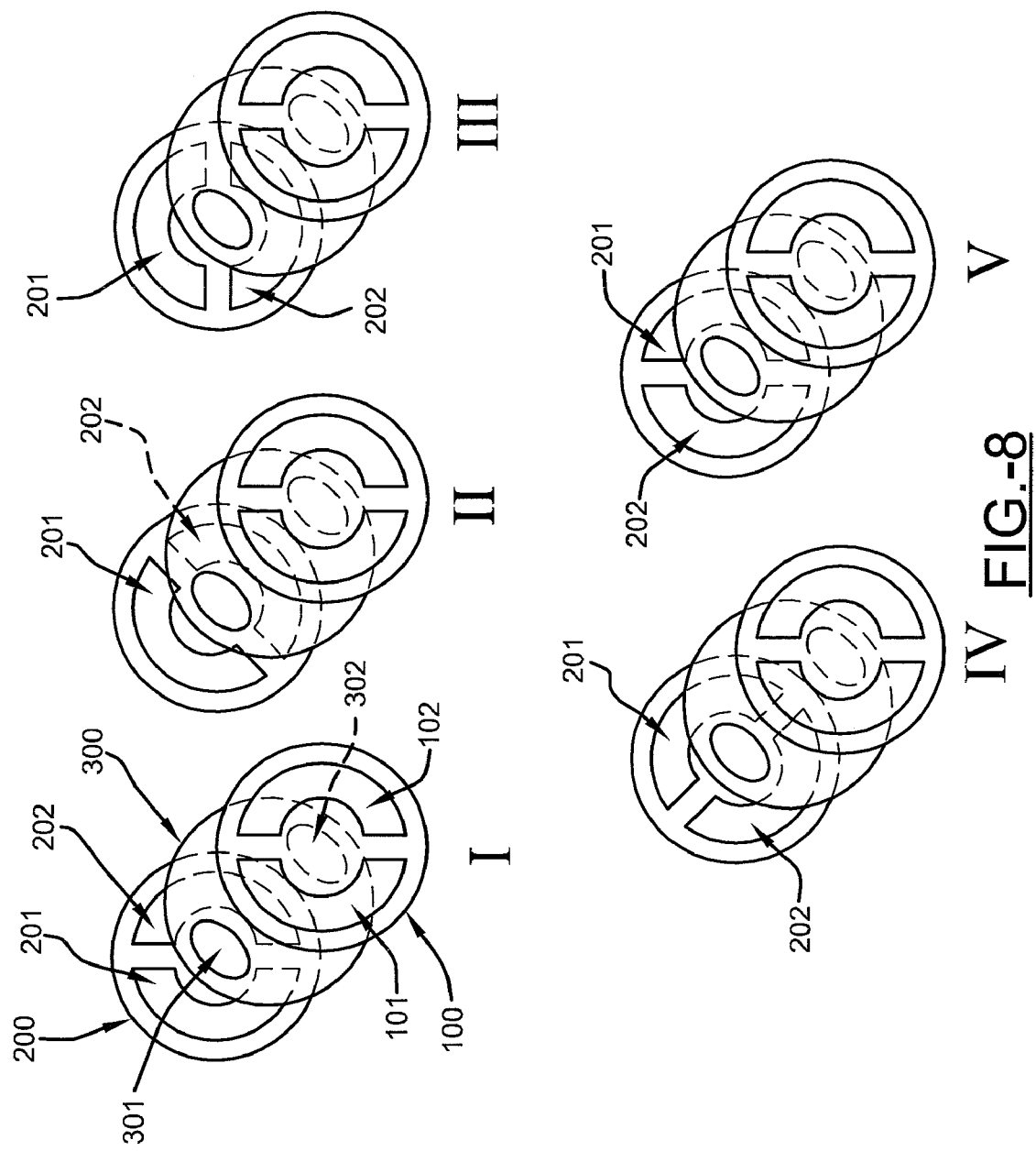
FIG. 8-I is an exploded view of first, second and third valve members of a rotary valve assembly adjusted for infinite and nil process steps depicting second valve member in a 100% first process step and 0% second process step position.

FIG. 8 depicts a layout view of relative rotation of a first valve member (100) to a second valve member (200) and independent of a third valve member (300). A first aperture (101) and a second aperture (102) of a first valve member (100) and a first aperture (201) and a second aperture (202) of a second valve member (200) relatively rotate wherein 0° degree offset or coincident corresponds with 0% first process step, 45° corresponds to 75% first process step, 90° degree offset or perpendicular corresponds to 50% first process step, 135° corresponds to 25% first process step and 180° degree offset or diametric corresponds to 0% first process step. The percentage of a complete cycle allocated to a first process step and a second process step, e.g., pressurization and depressurization of an adsorbent bed changes from 100% at coincident aperture positions, 50% at perpendicular through aperture positions and 0% at diametric aperture positions. Although completely coincident or diametric aperture positions do not provide for an alternating cycle, these positions provide limits of a continuum.

Figure 9:
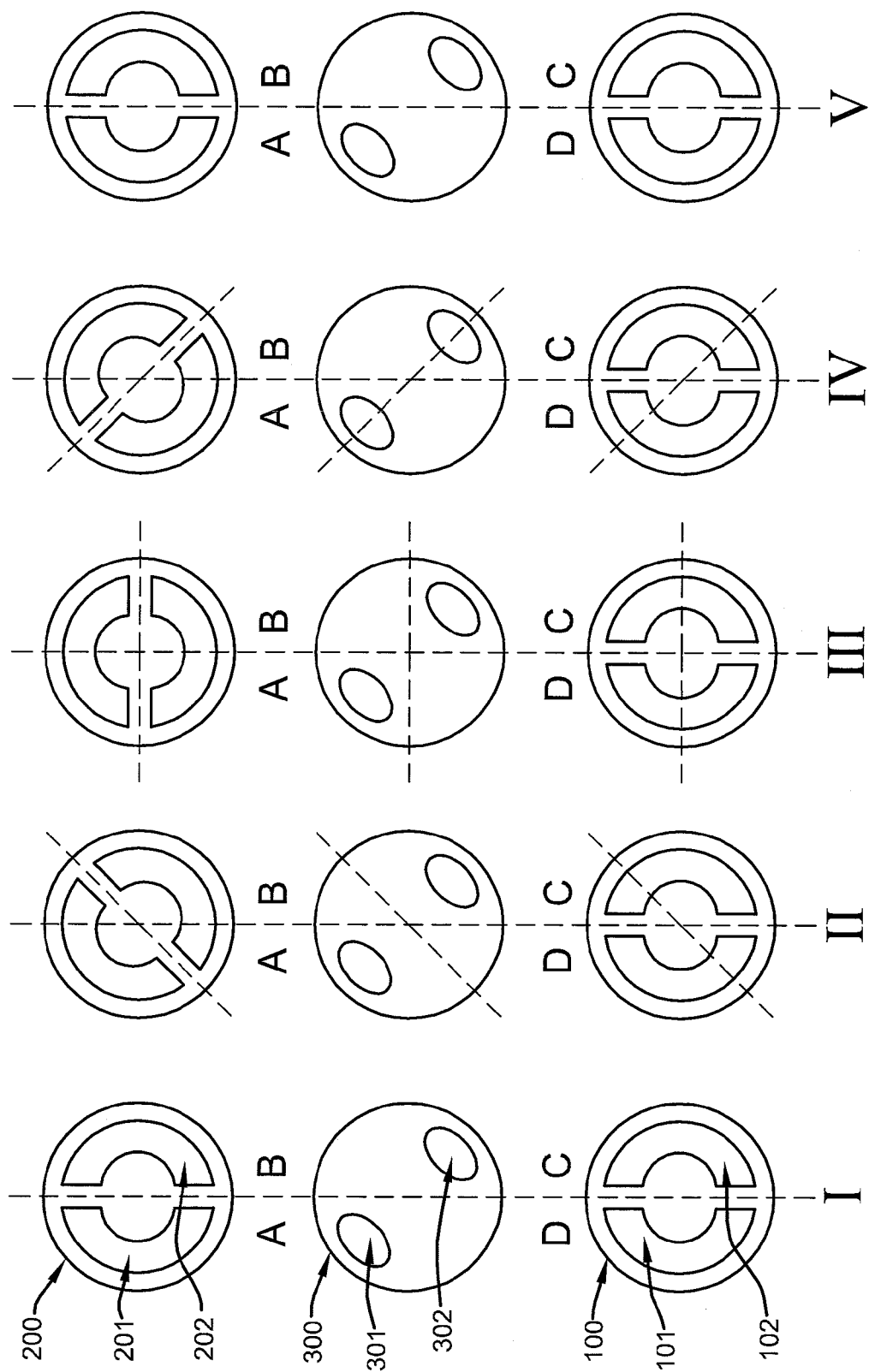
FIG. 9-I is a layout view of first, second and third valve members of a rotary valve assembly adjusted for an infinite first process step and nil second process step depicting second valve member demonstrating 180° alignment for first process step and 180° alignment for second process step and resulting in 100% first process step and 0% second process step respectively.

FIG. 8-(I) further depicts through aperture alignment as follows: interconnection of first aperture (101) of first valve member (100) with first aperture (201) of second valve member (200) by means of rotation of first through aperture (301) of third valve member (300) or second through aperture (302) of third valve member (300) from (D) to (A) is 180° and interconnection of second aperture (102) of first valve member (100) with second aperture (202) of second valve member (200) by means of rotation of second through aperture (302) of third valve member (300) or first through aperture (301) of third valve member (300) from (B) to (C) 180°;

FIG. 8-(II) interconnection of first aperture (101) of first valve member (100) with first aperture (201) of second valve member (200) by means of rotation of first through aperture (301) of third valve member (300) or second through aperture (302) of third valve member (300) within quadrant (A) is 135°, interconnection of second aperture (102) of first valve member (100) with second aperture (202) of second valve member (200) by means of rotation of second through aperture (302) of third valve member (300) or first through aperture (301) of third valve member (300) within quadrant (C) 135°; interconnection of second aperture (102) of first valve member (100) with first aperture (201) of second valve member (200) by means of rotation of second through aperture (301) of third valve member (300) or second through aperture (302) of third valve member (300) within quadrant (B) is 45°, interconnection of second aperture (102) of first valve member (100) with second aperture (202) of second valve member (200) by means of rotation of second through aperture (302) of third valve member (300) or first through aperture (301) of third valve member (300) within quadrant (D) 45°;

FIG. 8-(III) interconnection of first aperture (101) of first valve member (100) with first aperture (201) of second valve member (200) by means of rotation of first through aperture (301) of third valve member (300) or second through aperture (302) of third valve member (300) within quadrant (A) is 90°, interconnection of second aperture (102) of first valve member (100) with second aperture (202) of second valve member (200) by means of rotation of second through aperture (302) of third valve member (300) or first through aperture (301) of third valve member (300) within quadrant (C) 90°; interconnection of second aperture (102) of first valve member (100) with first aperture (201) of second valve member (200) by means of rotation of second through aperture (302) of third valve member (300) or second through aperture (301) of third valve member (300) within quadrant (B) is 90°, interconnection of second aperture (102) of first valve member (100) with second aperture (202) of second valve member (200) by means of rotation of second through aperture (302) of third valve member (300) or first through aperture (301) of third valve member (300) within quadrant (D) 90°;

FIG. 8-(IV) interconnection of first aperture (101) of first valve member (100) with first aperture (201) of second valve member (200) by means of rotation of first through aperture (301) of third valve member (300) or second through aperture (302) of third valve member (300) within quadrant (A) is 45°, interconnection of second aperture (102) of first valve member (100) with second aperture (202) of second valve member (200) by means of rotation of second through aperture (302) of third valve member (300) or first through aperture (301) of third valve member (300) within quadrant (C) 45°; interconnection of second aperture (102) of first valve member (100) with first aperture (201) of second valve member (200) by means of rotation of first through aperture (301) of third valve member (300) or second through aperture (302) of third valve member (300) within quadrant (B) is 135°, interconnection of second aperture (102) of first valve member (100) with second aperture (202) of second valve member (200) by means of rotation of second through aperture (302) of third valve member (300) or first through aperture (301) of third valve member (300) within quadrant (D) 135°;

FIG. 8-(V) interconnection of first aperture (101) of first valve member (100) with first aperture (201) of second valve member (200) by means of rotation of first through aperture (301) of third valve member (300) or second through aperture (302) of third valve member (300) from (D) to (A) is 0° and interconnection of second aperture (102) of first valve member (100) with second aperture (202) of second valve member (200) by means of rotation of second through aperture (302) of third valve member (300) or first through aperture (301) of third valve member (300) from (B) to (C) 0°;

FIG. 9 depicts an exploded view of relative rotation of a first valve member (100) to a second valve member (200) and independent of a third valve member (300). Relative position of first valve member (100) to second valve member (200) provides alignment overlap and defines process step time proportion. A first aperture (101) and a second aperture (102) of a first valve member (100) and a first aperture (201) and a second aperture (202) of a second valve member (200) relatively rotate from 0° degree offset or coincident to 90° degree offset or perpendicular to 180° degree offset or diametric but are stationary relative to a rotating first through aperture (301) third valve member (300) and a second through aperture (302) of a third valve member (300). The percentage of a complete cycle allocated to a first process step and a second process step, e.g., pressurization and depressurization of a single adsorbent bed or pressurization of a first adsorbent and pressurization of a second adsorbent bed changes from 100% at coincident aperture positions, 50% at perpendicular aperture positions and 0% at diametric aperture positions. Although completely coincident or diametric aperture positions do not provide for an alternating cycle, these positions provide limits of a continuum.

Figure 10:
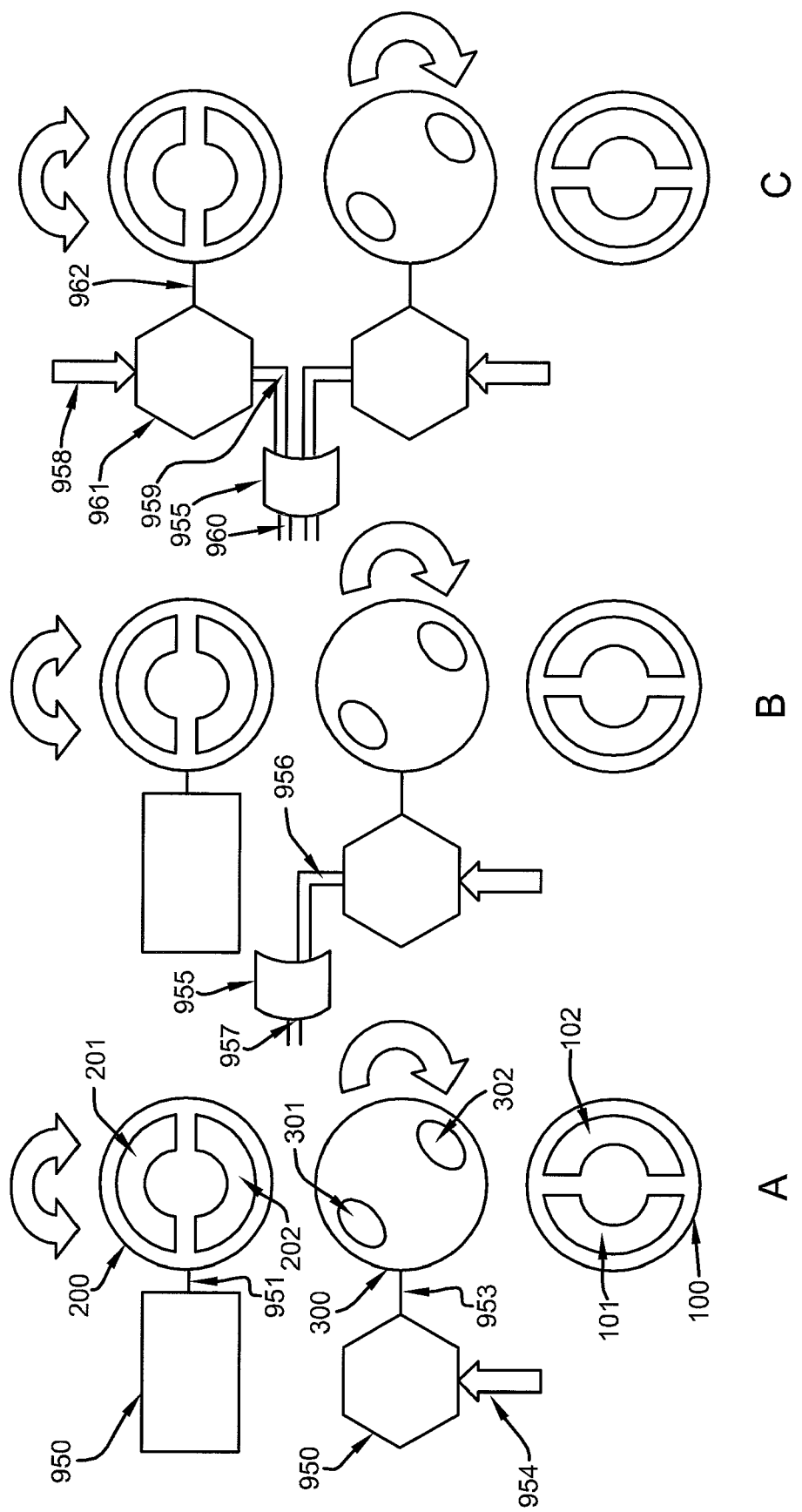
FIG. 10A is a layout view of first, second and third valve members of a rotary valve assembly adjusted for equal first process step and second process step depicting a driver operatively coupled to the third valve member and a power source, as well as an adjustor operatively coupled to the second valve member.
FIG. 10B is a layout view of first, second and third valve members of a rotary valve assembly adjusted for equal first process step and second process step depicting a driver operatively coupled to the third valve member, a power source and a controller; as well as an adjustor operatively coupled to the second valve member.
FIG. 10C is a layout view of first, second and third valve members of a rotary valve assembly adjusted for equal first process step and second process step depicting a driver operatively coupled to the third valve member, a power source and a control means; as well as an adjustor operatively coupled to the second valve member, a power source and a controller.

FIG. 9-(I) further depicts relative rotation of novel rotary valve assembly as follows: a first valve member (100) to a second valve member (200) and independent of a third valve member (300);

relative position of a first aperture (201) of second valve member (200) and second aperture (202) of second valve member (200) to a first aperture (101) of a first valve member (100) and a second aperture (102) of a first valve member (100) at 0° offset;

FIG. 9-(II) relative position of a first aperture (201) of second valve member (200) and second aperture (202) of second valve member (200) to a first aperture (101) of a first valve member (100) and a second aperture (102) of a first valve member (100) at 45° offset;

FIG. 9-(III) relative position of a first aperture (201) of second valve member (200) and second aperture (202) of second valve member (200) to a first aperture (101) of a first valve member (100) and a second aperture (102) of a first valve member (100) at 90° offset;

FIG. 9-(IV) relative position of a first aperture (201) of second valve member (200) and second aperture (202) of second valve member (200) to a first aperture (101) of a first valve member (100) and a second aperture (102) of a first valve member (100) at 135° offset; and FIG. 9-(V) relative position of a first aperture (201) of second valve member (200) and second aperture (202) of second valve member (200) to a first aperture (101) of a first valve member (100) and a second aperture (102) of a first valve member (100) at 180° offset FIG. 10 is a layout view of novel rotary valve assembly adjusted for equal process steps depicting a first valve member (100) with a first aperture (101) and a second aperture (102), a second valve member (200) with a first aperture (201) and a second aperture (202), a third valve member (300) with a first through aperture (301) and a second through aperture (302), a first drive means (952), a first drive mechanism (953), a power source (954), an adjustment means (950), an adjustment mechanism (951), a second drive means (961), a second power source (958), a control means (955), a first feedback variable loop (956), a first feedback variable (957), a second feedback loop (959) and a second feedback variable (960).

FIG. 10A is a layout view of novel rotary valve assembly adjusted for equal process steps depicting a first drive means (952) in communication with a first drive mechanism (953) and a third valve member (300). A power source (954) provides means to rotate third valve member (300) about a center axis. An adjustment means (950) in communication with an adjustment mechanism (951) and a second valve member with a first through aperture (201) and second aperture (202) provides relative rotation to first aperture (101) of first valve member (100) and second aperture (102) of first valve member (100) and enables variable process cycle step time.

In a preferred embodiment a first drive means (952) provides variable speed rotation of third valve member (300) and enable variable process cycle time. In a preferred embodiment a first drive means (952) is a variable speed electric motor. An alternating current motor provides speed as a function of current frequency, whereas a direct current motor provides speed as a function of current magnitude. A first drive mechanism provides a rotating shaft to a surface of third valve member (300) by means of through hole in first valve member. An alternate embodiment provides first drive mechanism (953) as a gear in communication with a geared circumfrential surface of third valve member (300). An adjustment means (950) in communication with an adjustment mechanism (951) provides variable rotational position of first aperture (201) of a second valve member (200) and second aperture (202) of second valve member (200) to a first aperture (101) of a first valve member (100) and second aperture (102) of first valve member (100) and enables variable process step time. An adjustment means may be a manual turn engagement of second valve member (200) in combination with an adjustment mechanism (951) of a spring and ball engagement of a detent surface of second valve member (200) or a threaded engagement and positional fastener.

FIG. 10B is a layout view of novel rotary valve assembly adjusted for equal process steps as depicted in FIG. 10A and with addition of a control means (955) to provide automatic rotary speed variation of third valve member (300) with feedback loop (956) and a process variable (957), e.g., adsorbent bed pressure or product concentration to optimize process by means of cycle time adjustment.

FIG. 10C is a layout view of novel rotary valve assembly adjusted for equal process steps as depicted in FIG. 10B and additional second drive means (961), a second power source (958), a second drive means and second drive mechanism (962) in communication with a second valve member (200), a control means (955), a second feedback loop (959) and a process variable (960), e.g., adsorbent bed pressure or product concentration to optimize production by means of process step time adjustment. A second drive means (961) provides automatic adjustment of rotational position of second valve member (200) to first valve member (100). A second drive means may comprise a reversible electric motor with positional index.

Rotational speed of third valve member defines a process cycle time. Aperture(s) of first valve member (100) interconnects with aperture(s) of second valve member (200) by means of rotary through aperture(s) of third valve member (300). Process cycle time is generally constant but may require adjustment from time to time to account from changes in input. Factors affecting input could be compressor, blower or pump seal wear, altitude, filter occlusion and valve friction. One advantage of a variable speed electric motor is an ability to easily adjust rotational speed. Speed variations arise from mechanical gear ratios or electric voltage, current and/or frequency. Alternate means of variable speed drives include pneumatic power among others.

Continuous constant speed rotary motion of third valve facilitates low cost electric motor operation with a time control. However, various slot size combinations along with variable and intermittent rotary speed may provide optimal performance in some configurations, conditions and/or control means. Rotation of the third valve member (300) may be in forward or reverse direction, continuous or intermittent with constant or variable speed depending on the communication desired for each conduit.

Figure 11:
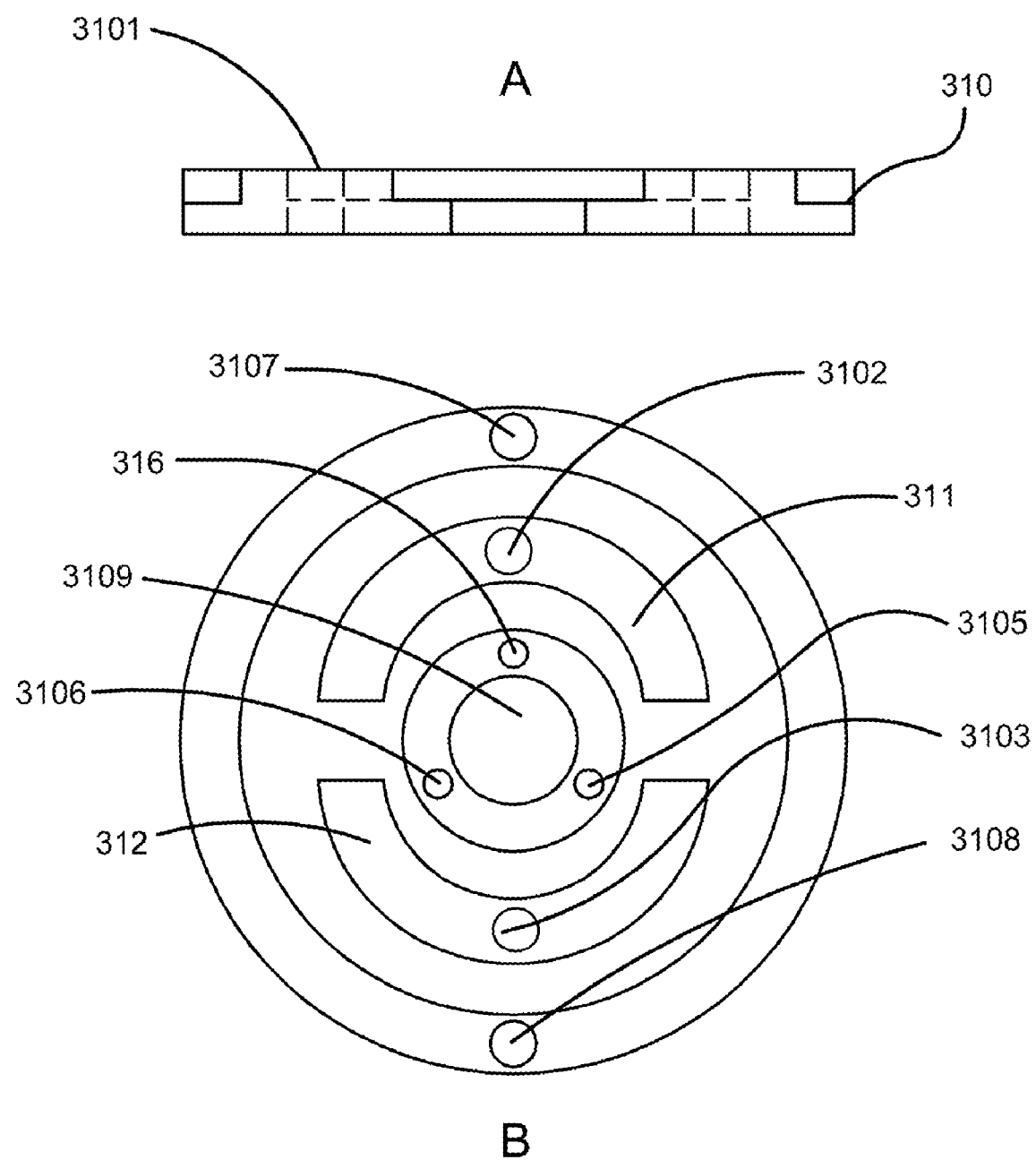
FIG. 11 is a view of an embodiment of a first valve member subassembly.

FIG. 11 depicts both a side view (A) and top view (B) of a first valve member (310) of a novel rotary valve assembly. First valve member has a sealing surface (3101), a first aperture (311) and a second aperture (312), a first flow conduit (3102) and a second flow conduit (3103), a first drive fastener (3104), a second drive fastener (3105) and a third drive fastener (3106), a first anti-rotation pin engagement (3107) and a second anti-rotation pin engagement (3108) and a drive aperture (3109). Alternately, a first gasket around first aperture (311) and second gasket around second aperture (312) on sealing surface (3101) may be useful to provide additional seals necessary for a high pressure or vacuum application. Moreover, a bearing race on sealing surface (3101) may provide utility to decrease power consumption in some applications.

Figure 12:
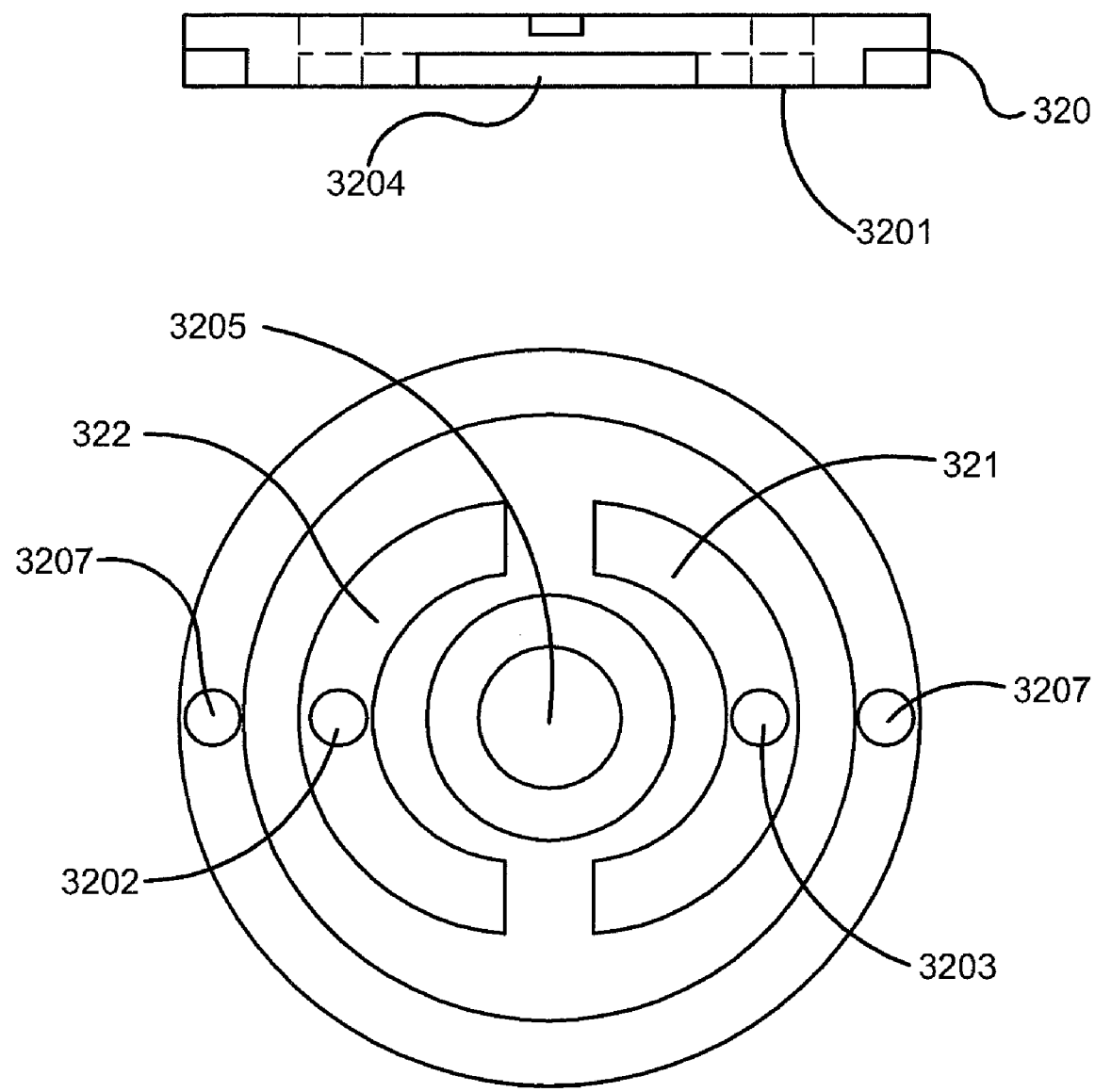
FIG. 12 is a view of an embodiment of a second valve member subassembly.

FIG. 12 depicts both a side view (A) and top view (B) of a second valve member (320) of a novel rotary valve assembly. Second valve member has a sealing surface (3201), a first aperture (321) and a second aperture (322), a first flow conduit (3202) and a second flow conduit (3203), a drive clearance space (3204), a positional adjustment keyway (3205), a first aperture position pin engagement (3206) and a second aperture position pin engagement (3207). Alternately, a first gasket around first aperture (321) and second gasket around second aperture (322) on sealing surface (3101) may be useful to provide additional seals necessary for a high pressure or vacuum application. Moreover, a bearing race on sealing surface (3201) may provide utility to decrease power consumption is some applications.

Figure 13:
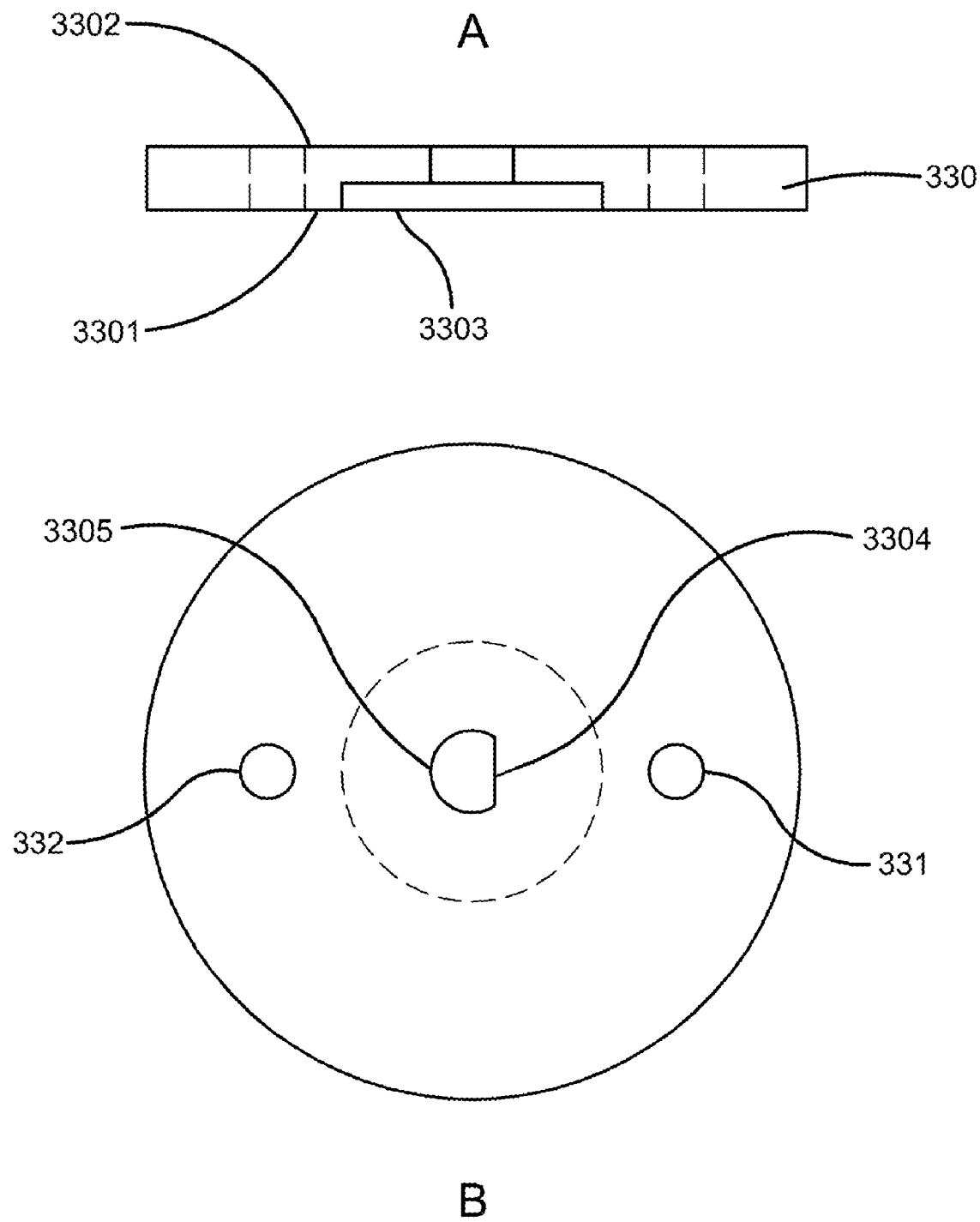
FIG. 13 is a view of an embodiment of a third valve member subassembly.

FIG. 13 depicts both a side view (A) and top view (B) of a third valve member (330) of a novel rotary valve assembly. Third valve member has a first sealing surface (3301) and a second sealing surface (3302), a first aperture (331) and a second aperture (332), a drive clearance space (3303), a drive engagement surface (3304) and a drive aperture (3305). Alternately, a gradual taper leading to a recessed or rounded edge around first through aperture (331) and second through aperture (332) on both first sealing surface (3301) and second sealing surface (3302) may provide longer life to aperture gaskets on first valve member (310) and second valve member (320). Moreover, a three ball bearing inset on first sealing surface (3301) and second sealing surface (3302) for engagement with bearing race on first valve member (310) and second valve member (320) may provide utility to decrease power consumption is some applications.

Figure 14:
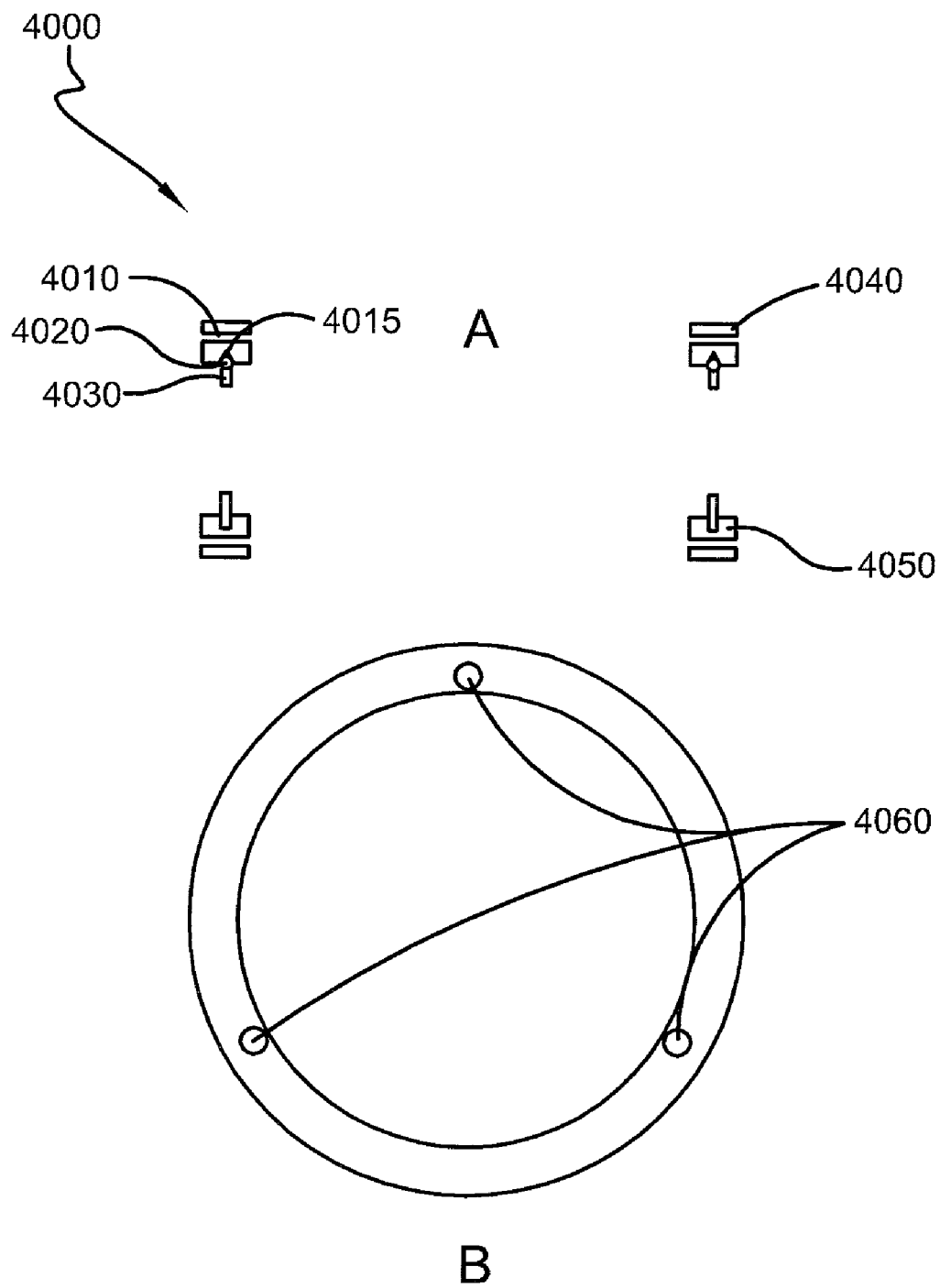
FIG. 14 is a view of an embodiment of a detent subassembly.

FIG. 14 depicts both side view (A) and top view (B) of a detent subassembly (4000) of a novel rotary valve assembly. Detent subassembly has a detent ring (4010) with a detent (4015), a detent ball (4020), a detent spring (4030), a gasket (4040), a mounting ring (4050), a bolt opening (4060). Preferably detent ring (4010) has more than one detent (4015), three detent balls (4020), three detent springs (4030), two gaskets (4040), one ring (4050) and three bolt openings (4060).

Figure 15:
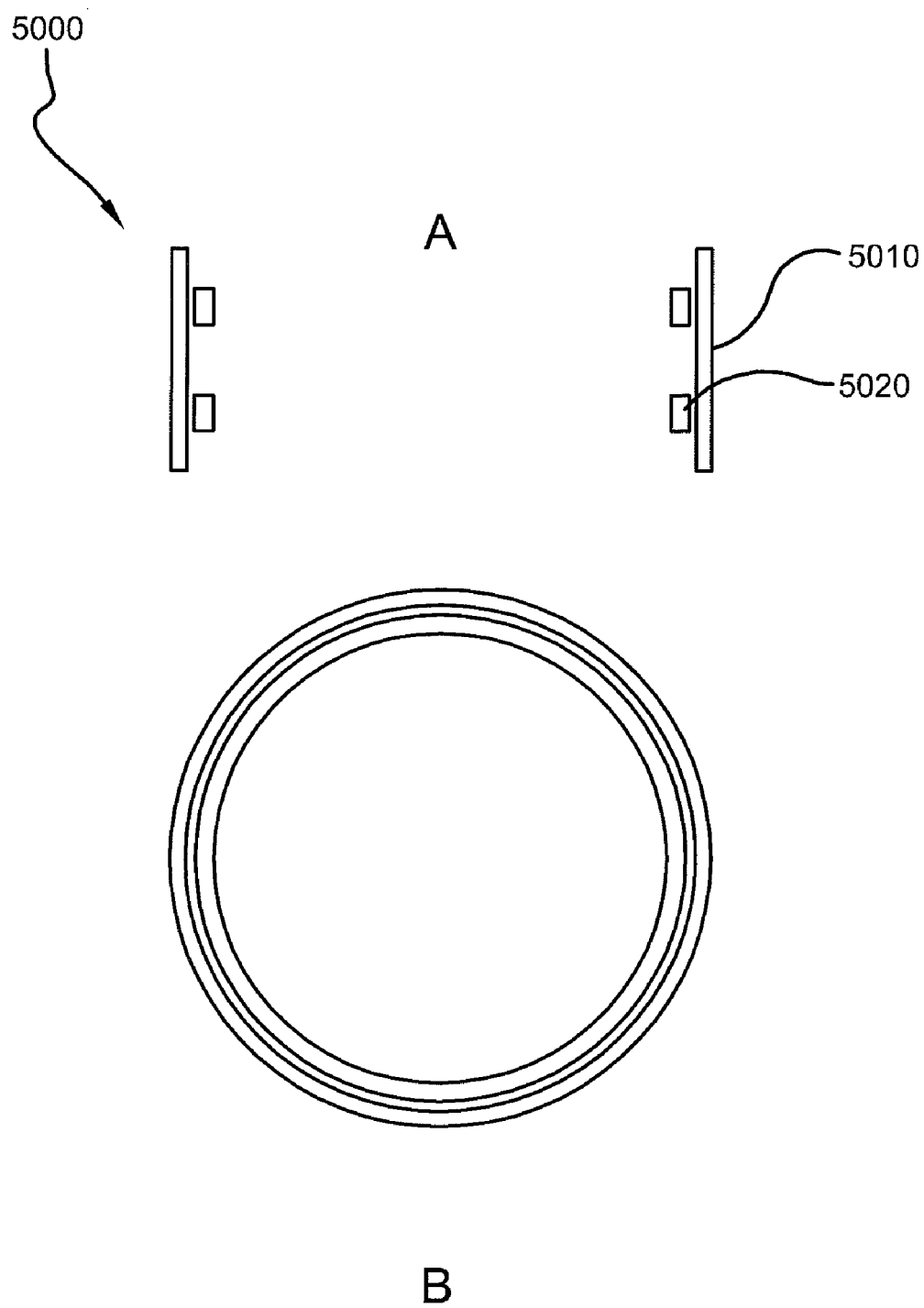
FIG. 15 is a view of an embodiment of an alignment subassembly.

FIG. 15 depicts both side view (A) and top view (B) of an alignment subassembly (5000) of a novel rotary valve assembly. Alignment subassembly has collar (5010) with a gasket (5020) and preferably two gaskets (5020).

Figure 16:
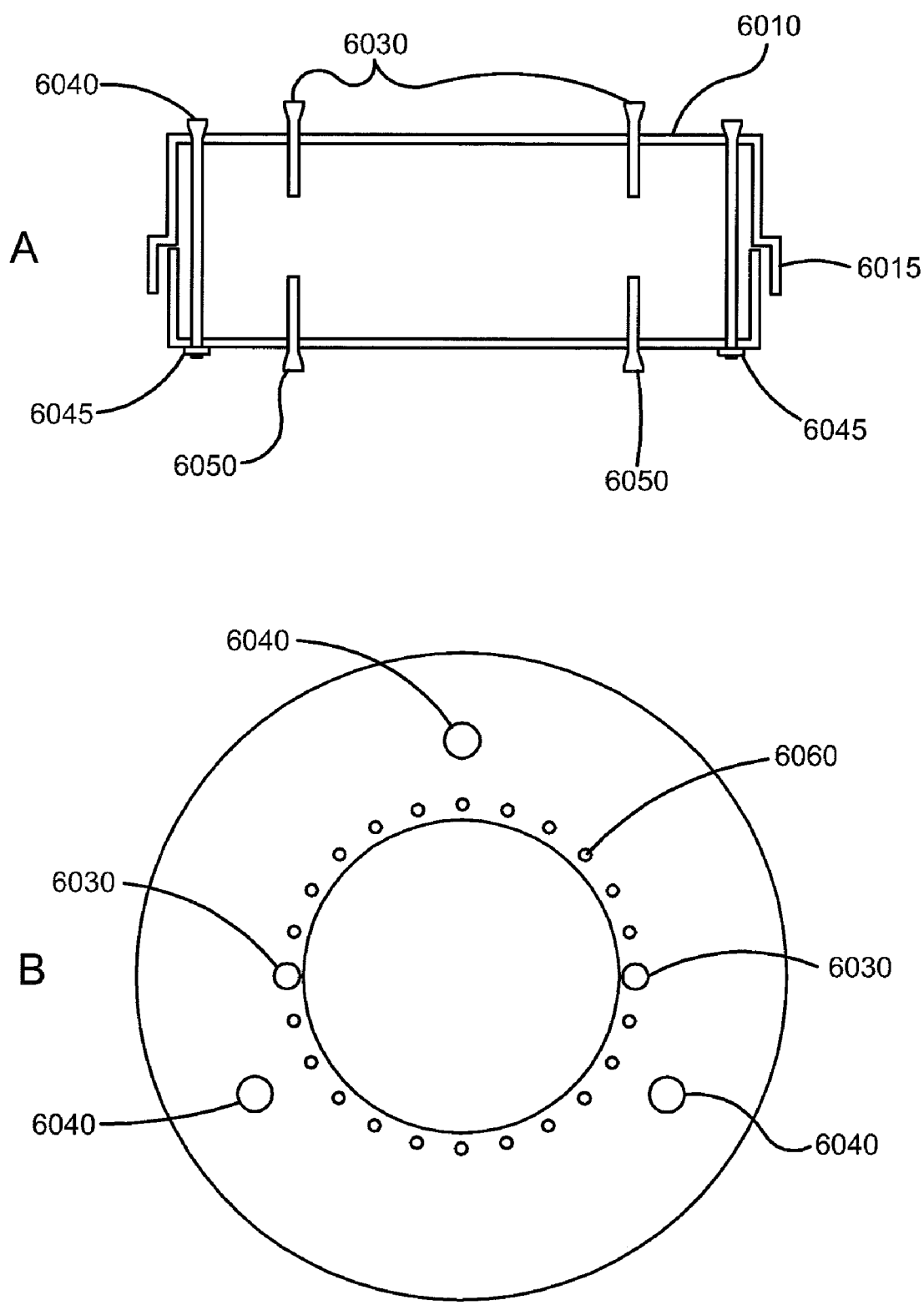
FIG. 16 is a view of an embodiment of a housing subassembly.

FIG. 16 depicts both a side view (A) and to view (B) of a housing subassembly (6000) of a novel rotary valve assembly. Housing subassembly has top housing (6010) with a housing overlap (6015) and bottom housing (6020), a aperture position pin (6030), a bolt (6040) and nut (6045), an anti-rotation pin (6050), aperture position engagement (6060). Preferably a housing subassembly (6000) has one top housing (6010) with a circumfrential housing overlap (6015) and one bottom housing (6020), two aperture position pins (6030), three bolts (6040) and three nuts (6045), two anti-rotation pins (6050) and at multiple aperture position engagement pairs (6060).

Figure 17:
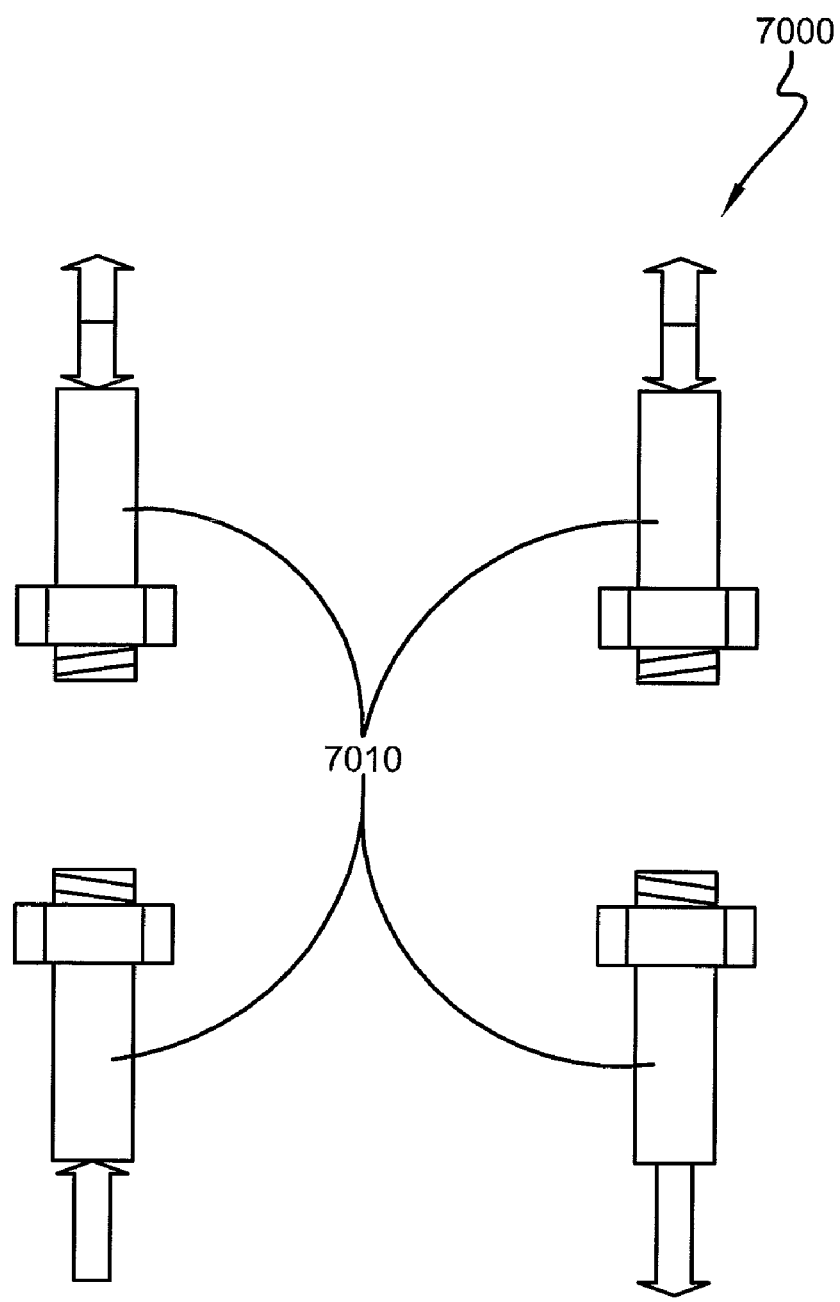
FIG. 17 is a view of an embodiment of a flow conduit subassembly.

FIG. 17 depicts a side view of a flow conduit subassembly (7000) of a novel rotary valve assembly. Flow conduit subassembly a flow conduit (7010). Preferably a flow conduit subassembly (7000) has four flow conduits (7010).

Figure 18:
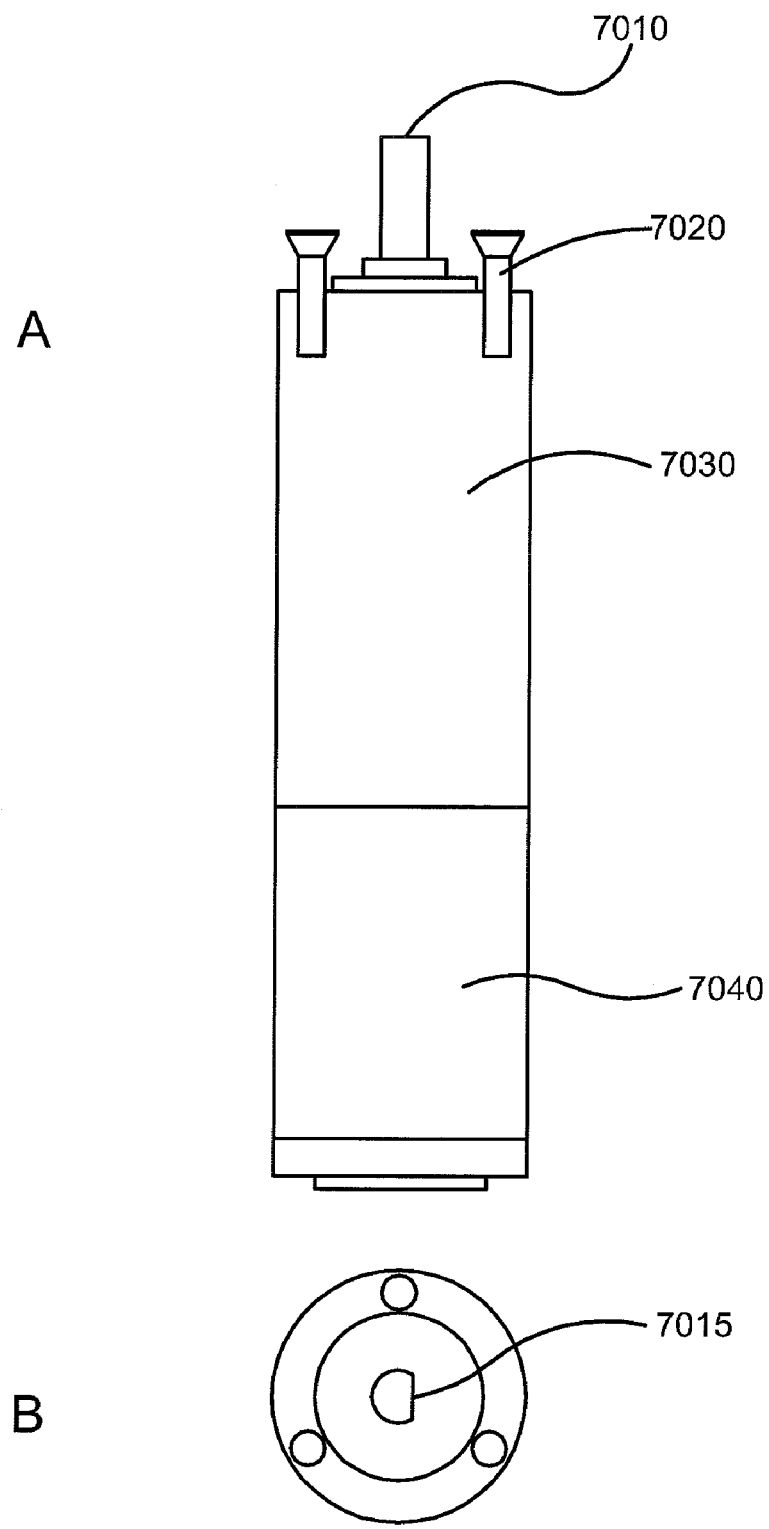
FIG. 18 is a view of an embodiment of a motor drive subassembly.

FIG. 18 depicts both a side view (A) and top view (B) of a drive subassembly (8000) of a novel rotary valve assembly. Drive subassembly has a drive (8010) with drive engagement (8015), mounting fasteners (8020), gear reduction (8030) and a motor (8040). Preferably a drive subassembly (8000) has at least three mounting fasteners (8020). A motor may be synchronous alternating current, direct current or pneumatic.

FIG. 19 depicts a side view of a drive mount assembly (9000) of a novel rotary valve assembly. Drive mount assembly has a drive subassembly (8000) and (A) a first valve member (310), (B) a first valve member (310) and third valve member (330) and (C) a first valve member (310), third valve member (330) and second valve member (330) drive engagement (8015), mounting fasteners (8020), gear reduction (8030) and a motor (8040). Preferably a drive subassembly (8000) has at least three mounting fasteners (8020). A motor may be synchronous alternating current, direct current or pneumatic.

FIG. 20 depicts a side view of a alignment and detent assembly (10000) of a novel rotary valve assembly. Alignment and detent mount assembly has and drive mount assembly (9000) and (A) an alignment subassembly (5000) and (B) a detent subassembly (4000).

Figure 21:
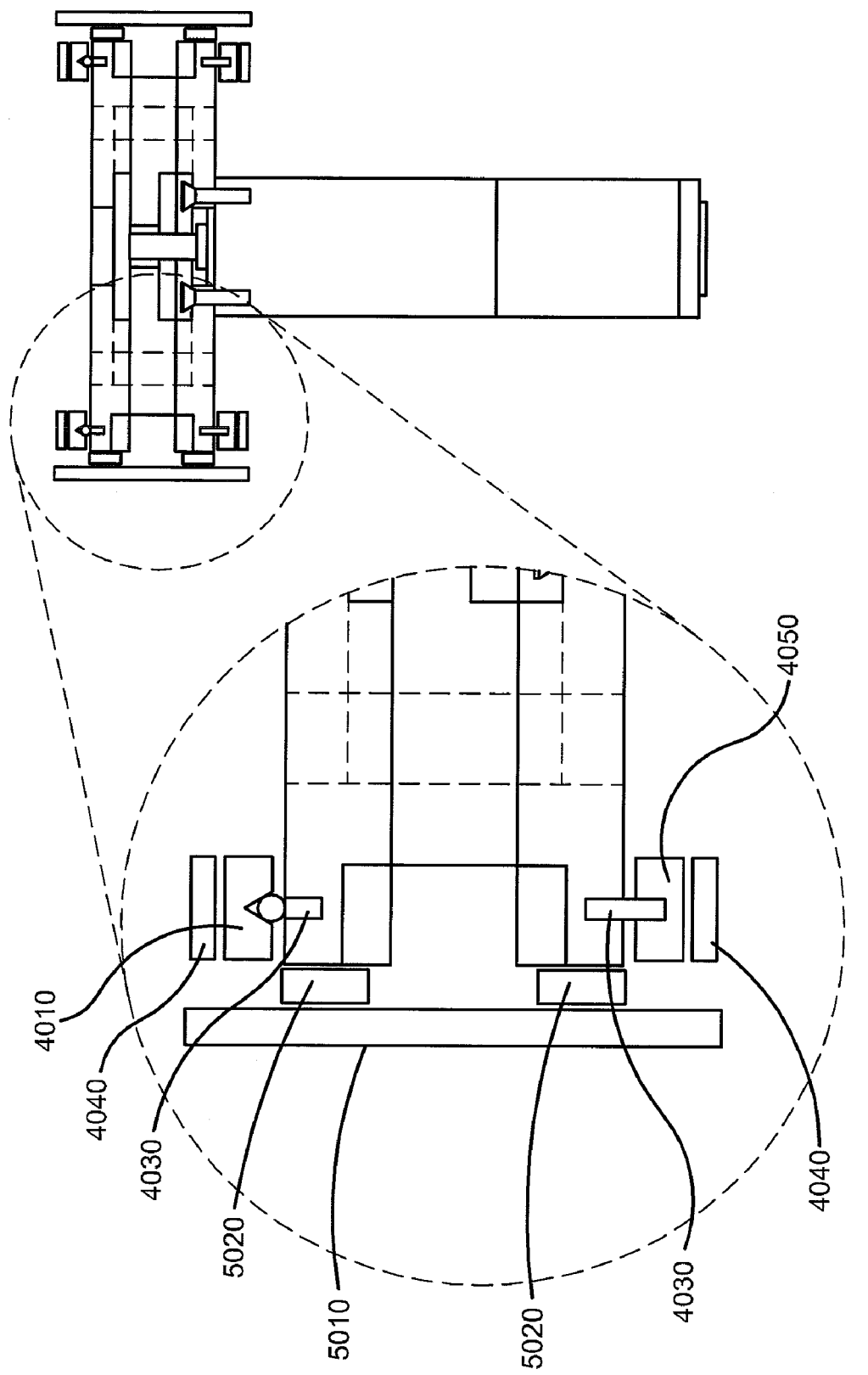
FIG. 21 illustrates an embodiment of an alignment and detent assembly.

FIG. 21 depicts a close-up side view of a alignment and detent assembly (10000) of a novel rotary valve assembly. Salient feature are as follows: (A) detent ring (4010) and mounting ring (4050) provide load support, (B) detent springs (4030) provide load, (C) collar maintains alignment (5010) and gasket (4040) and gaskets (5020) maintain contact.

Figure 22:
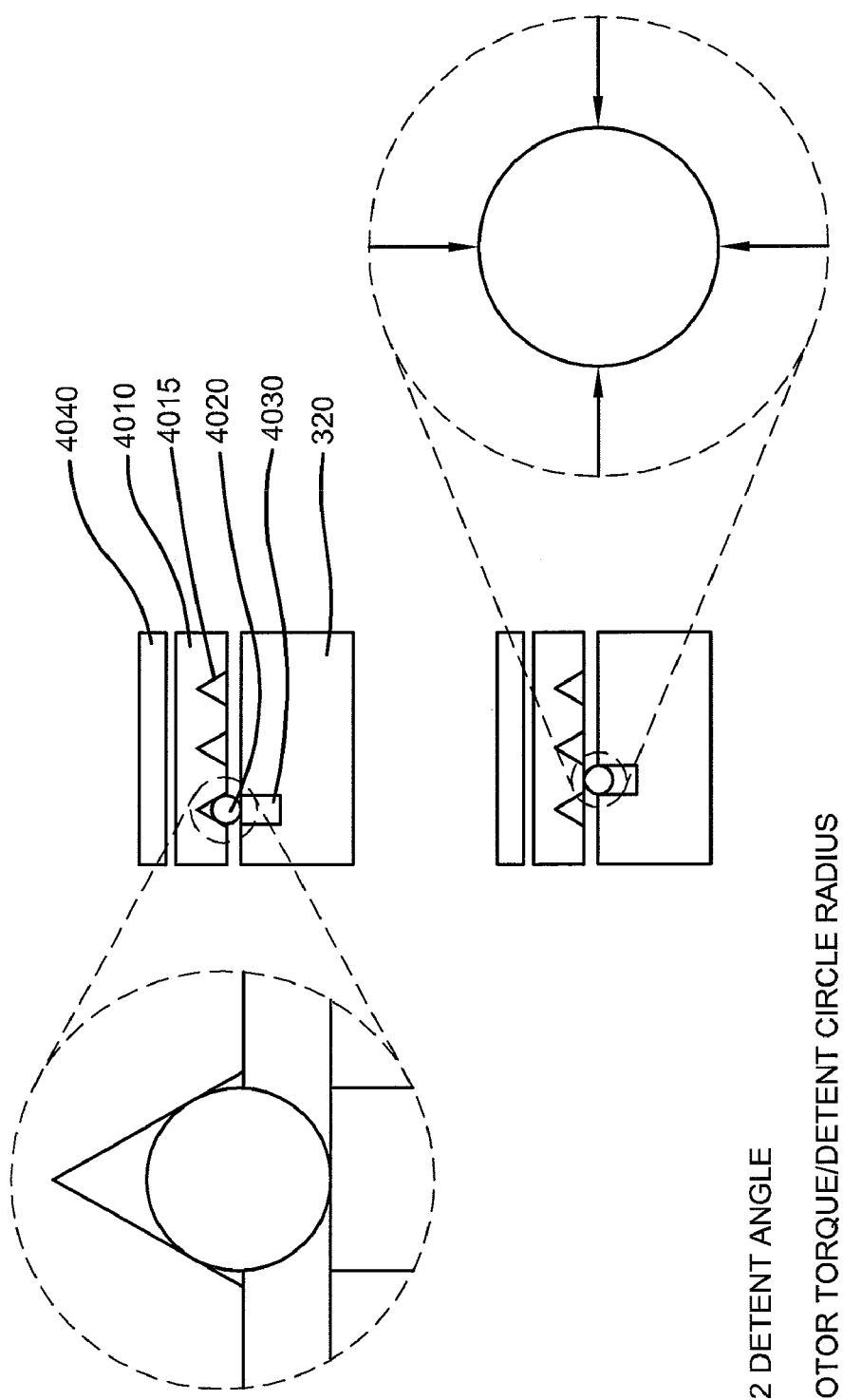
FIG. 22 shows an embodiment of a detent mechanism.

FIG. 22 depicts a close-up side view of a detent subassembly (4000) of a novel rotary valve assembly. Detent subassembly has a detent ring (4010) with a detent (4015), a detent ball (4020), a detent spring (4030), a gasket (4040) and second valve member (320). Motor torque determines the minimum detent spring (4030) force necessary to maintain detent ball (4020) engagement for given angle of detent (4015). Preferably the detent spring (4030) maintains the detent ball (4020) in a detent (4015) with a force sufficient to overcome frictional forces encountered by the second valve member (320) while easily adjustable.

FIG. 23 depicts a side view of a housing assembly (11000) and flow conduit assembly (12000) of a novel rotary valve assembly. Housing assembly alignment and detent assembly (10000) and (A) an housing subassembly (6000) and (B) a flow conduit subassembly (7000).

Figure 24:
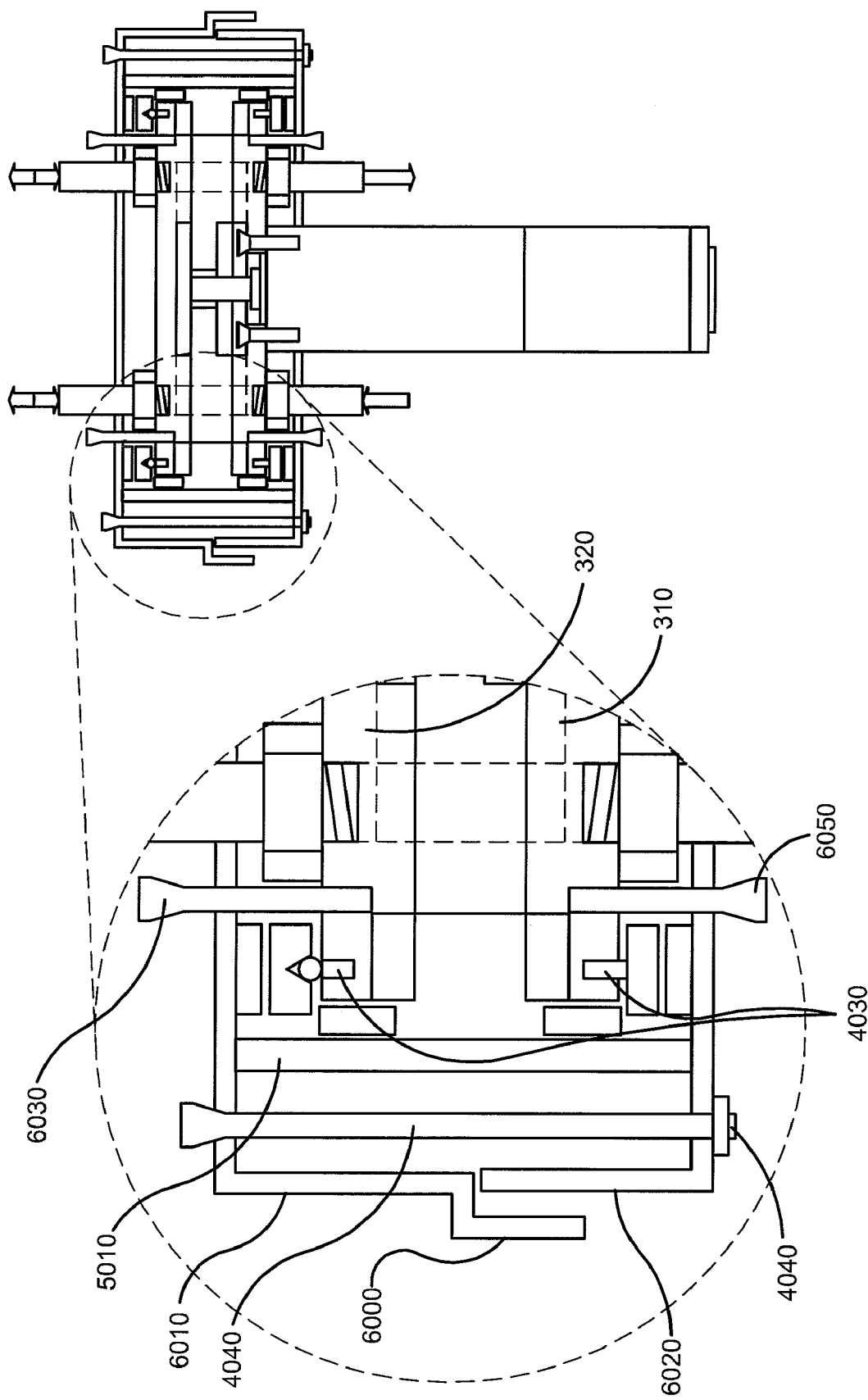
FIG. 24 is a view of an embodiment of a housing assembly.

FIG. 24 depicts a close-up side view of a flow conduit assembly (12000) of a novel rotary valve assembly. Salient feature are as follows: (A) anti-rotation pins (6050) in first valve member (310) and aperture position pins (6030) in second valve member (320) provide axial movement and radial stop against bottom housing (6020) and top housing (6010) respectively, (B) alignment collar (5010) limits spring (4030) load, (C) bolt (6040) and nut (6045) maintain spring (4030) load and (D) housing subassembly (6000) provides load support.

FIG. 25 depicts a side view of a flow conduit assembly (12000) and adjustment of a novel rotary valve assembly. (A) Removal of aperture position pins (6030) in second valve member (320) and adjustment by means of keyway (3205) and tools provide rotation of second valve member (320) through various detent stops. (B) 90° offset of first valve member (B) to second valve member (320) provides equal process step time. Note, detent mechanism provides convenience and ease of repeatability and is not fundamental to this device.

FIG. 26 depicts a side and top views of a novel rotary valve assembly with reference dimensions.

Figure 27:
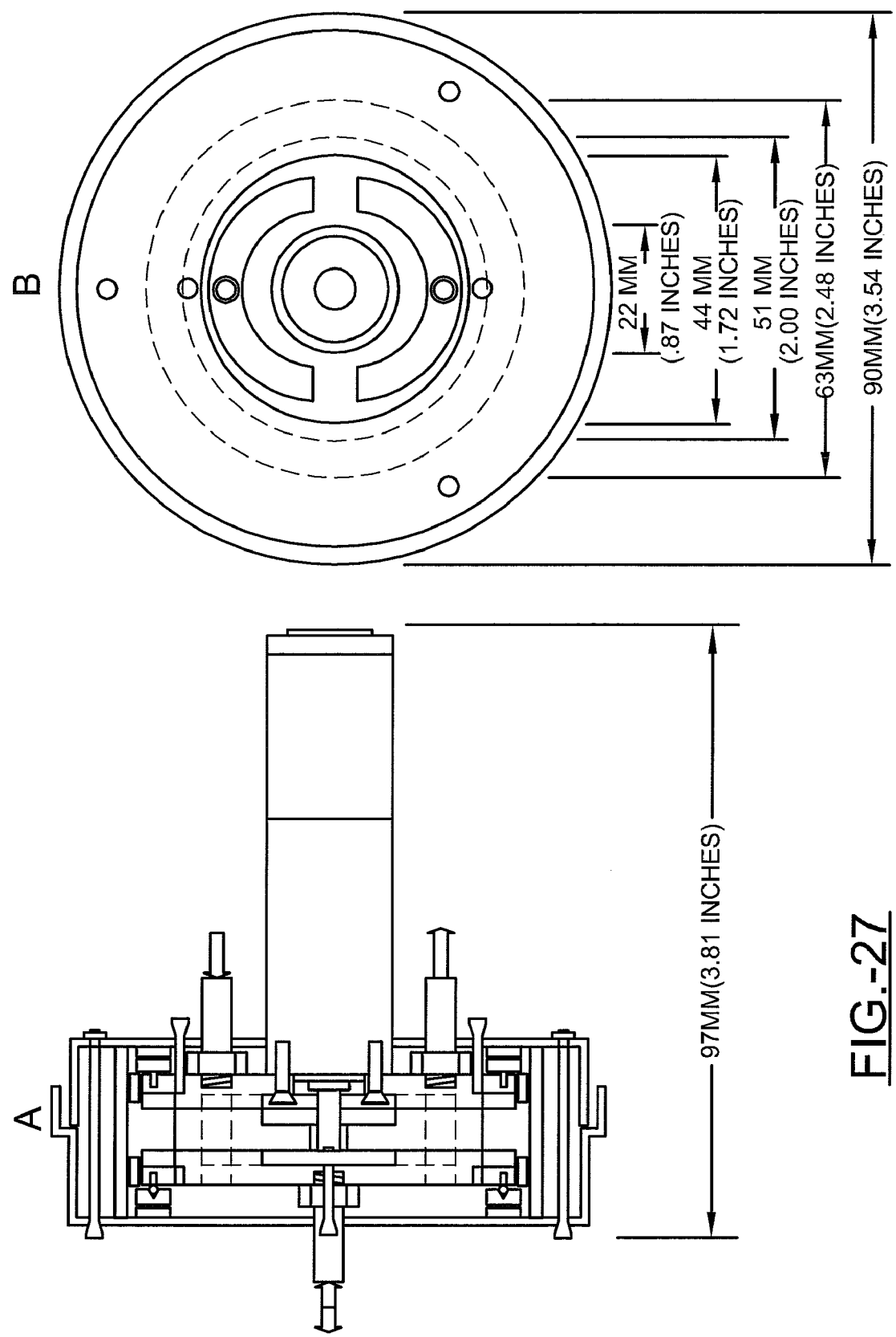
FIG. 27 shows another partially cutaway view and an end view of an embodiment of a rotary valve assembly

FIG. 27 depicts a side and bottom views of a novel rotary valve assembly with reference dimensions.

Humidity Control

The rotary valve assembly can optionally be provided to a humidity control apparatus for use in a humidity-control process selectively establishing process fluid flow and variable conduit interconnection. Process cycle time is variable by means of rotational speed of through aperture(s) formed in the third valve member and respective alignment with aperture(s) of a first valve member and aperture(s) of a second valve member. Process steps of desiccation, humidification, or any combination thereof vary by means of adjustable position and alignment of aperture(s) of a first valve member and aperture(s) of a second valve member. The novel rotary valve assembly provides means for gradual transition and flow passage between process steps. A valved system with a control environment in combination with desiccant(s), humidifier(s) compressor(s), blower(s), pump(s) and/or adsorption process provides means to control humidity therein. A valved system provides means to alternate individually between desiccant and/or humidifier with or without mechanical flow circulation. A valved system in combination with adsorption process further provides a regenerative means of controlling humidity.

Figure 28:
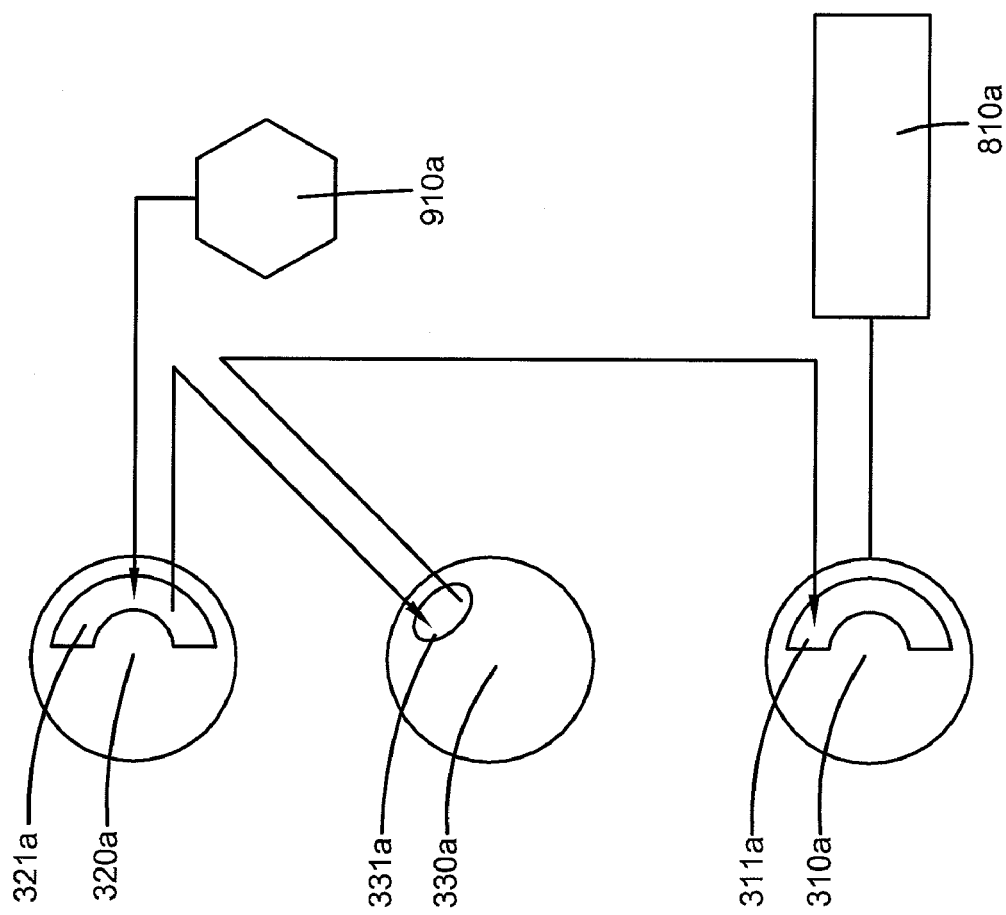
FIGS. 28-35 depict embodiments of a humidity control apparatus including a rotary valve assembly comprising a first valve member with an aperture, a second valve member with an aperture and a third valve member with a through aperture in communication with a dry sink or humid source.

FIG. 28 depicts a novel rotary valve assembly with a first valve member (310a) with first aperture (311a) in communication with a dry sink (810a), a second valve member (320a) in a first position with an aperture (321a) in communication with a control environment (910a), a third valve member (330a) in a first position with a through aperture (331a); communication of control environment (910a) with dry sink (810a) by means of interconnection of first aperture (311a) of first valve member (310a), aperture (321a) of second valve member (320a) and through aperture (331a) of third valve member (330a).

Figure 29:
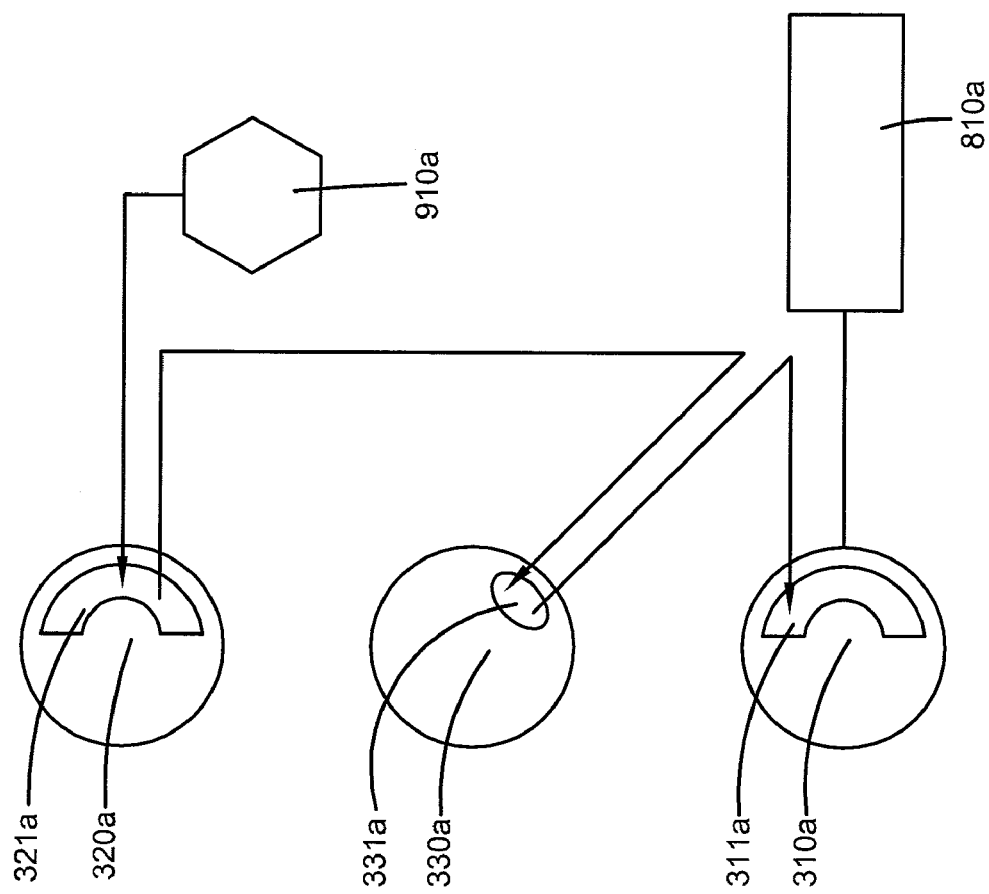

FIG. 29 depicts a novel rotary valve assembly with a first valve member (310a) with first aperture (311a) in communication with a dry sink (810a), a second valve member (320a) in a first position with an aperture (321a) in communication with a control environment (910a), a third valve member (330a) in a second position with a through aperture (331a); communication of control environment (910a) with dry sink (810a) by means of interconnection of first aperture (311a) of first valve member (310a), aperture (321a) of second valve member (320a) and through aperture (331a) of third valve member (330a).

Figure 30:
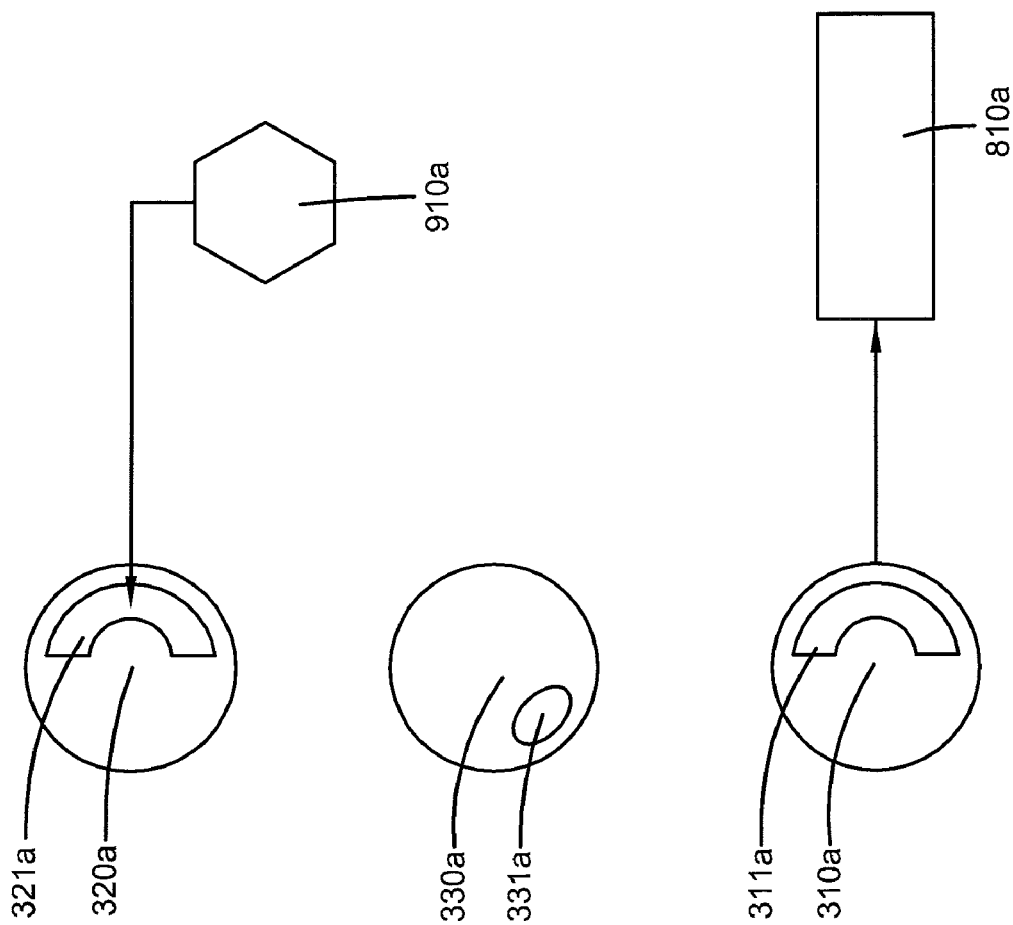

FIG. 30 depicts a novel rotary valve assembly with a first valve member (310a) with first aperture (311a) in communication with a dry sink (810a), a second valve member (320a) in a first position with an aperture (321a) in communication with a control environment (910a), a third valve member (330a) in a third position with a through aperture (33 la); no communication of control environment (910a) with dry sink (810a) by means of interconnection of first aperture (311a) of first valve member (310a), aperture (321a) of second valve member (320a) and through aperture (331a) of third valve member (330a).

Figure 31:
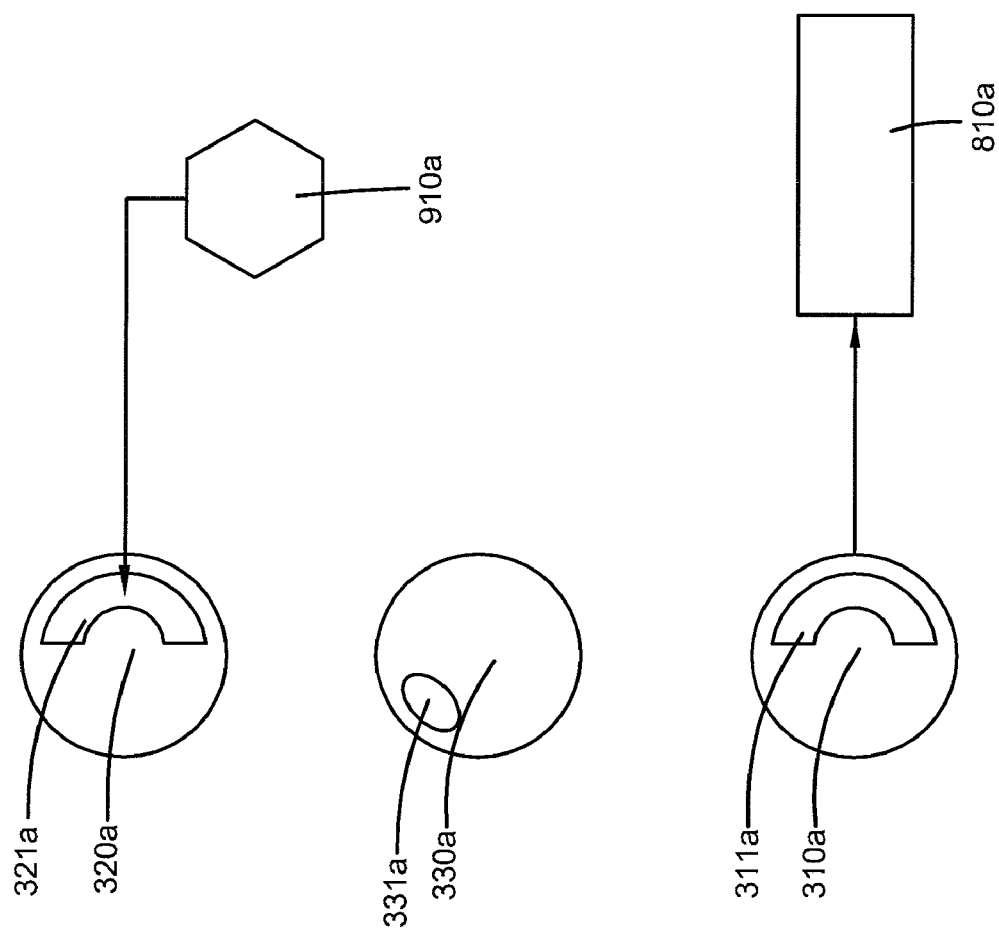

FIG. 31 depicts a novel rotary valve assembly with a first valve member (310a) with first aperture (311a) in communication with a dry sink (810a), a second valve member (320a) in a first position with an aperture (321a) in communication with a control environment (910a), a third valve member (330a) in a fourth position with a through aperture (331a); no communication of control environment (910a) with dry sink (810a) by means of interconnection of first aperture (311a) of first valve member (310a), aperture (321a) of second valve member (320a) and through aperture (331a) of third valve member (330a).

Figure 32:
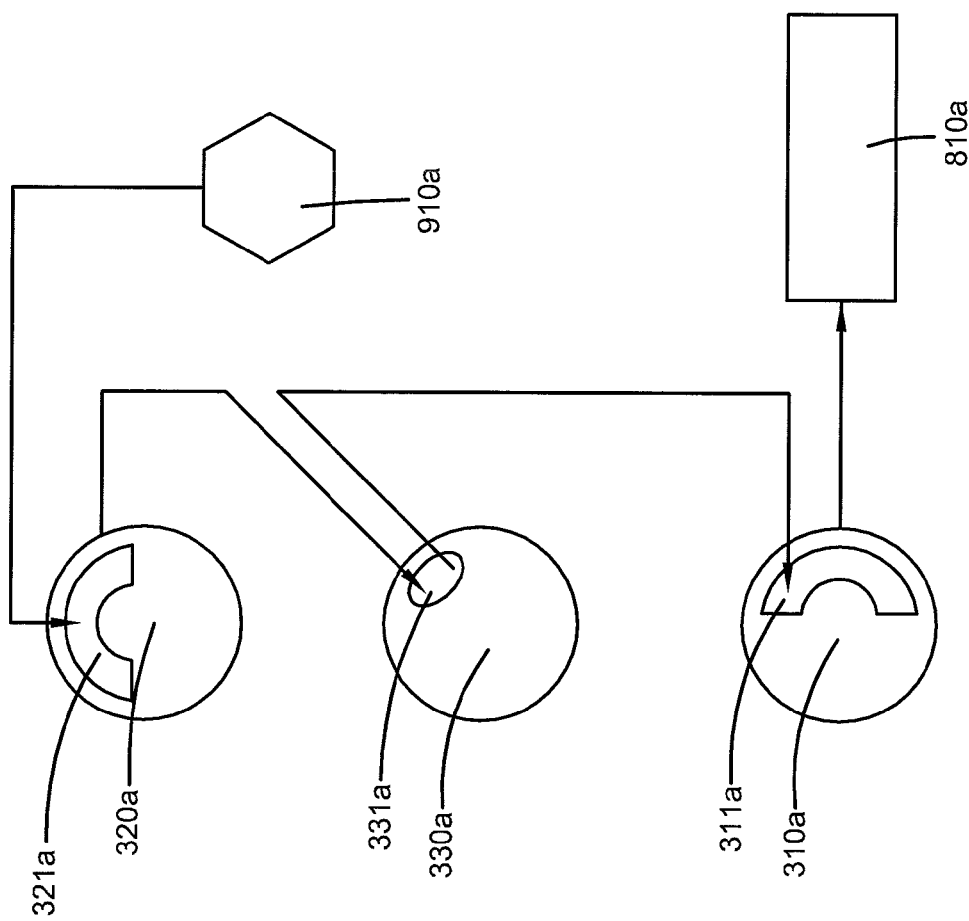

FIG. 32 depicts a novel rotary valve assembly with a first valve member (310a) with first aperture (311a) in communication with a dry sink (810a), a second valve member (320a) in a second position with an aperture (321a) in communication with a control environment (910a), a third valve member (330a) in a first position with a through aperture (331a); communication of control environment (910a) with dry sink (810a) by means of interconnection of first aperture (311a) of first valve member (310a), aperture (321a) of second valve member (320a) and through aperture (331a) of third valve member (330a).

Figure 33:
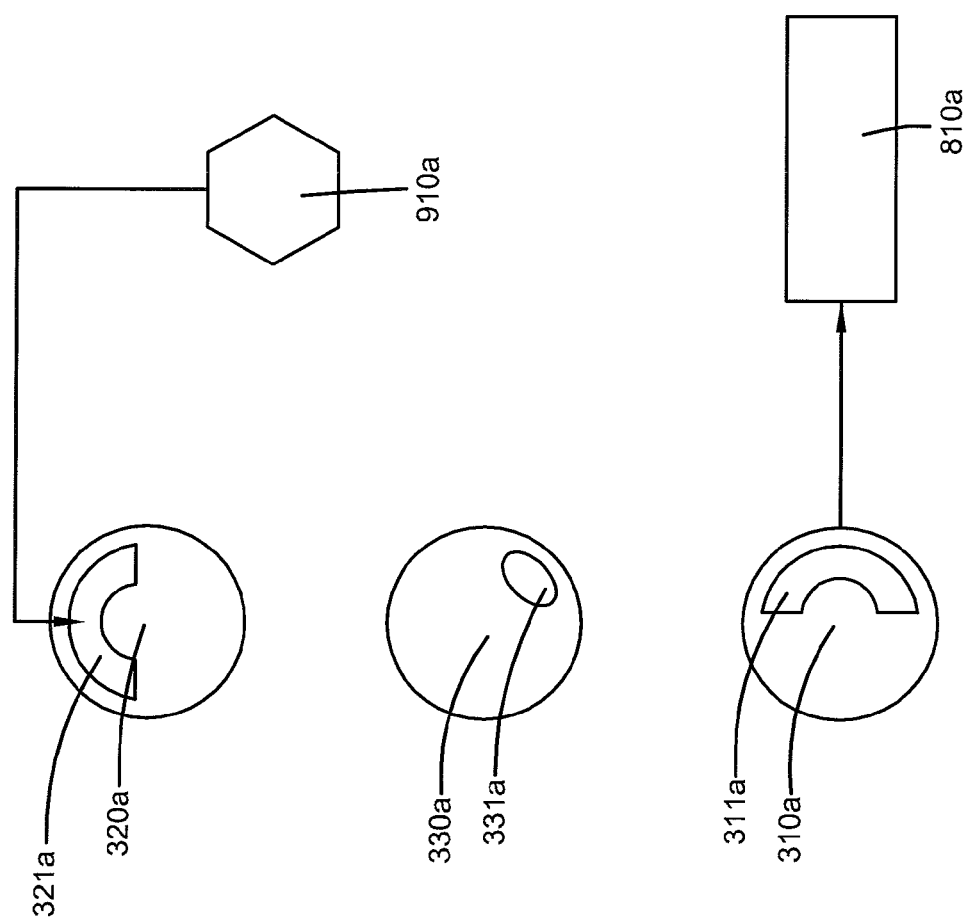

FIG. 33 depicts a novel rotary valve assembly with a first valve member (310a) with first aperture (311a) in communication with a dry sink (810a), a second valve member (320a) in a second position with an aperture (321a) in communication with a control environment (910a), a third valve member (330a) in a second position with a through aperture (331a); communication of control environment (910a) with dry sink (810a) by means of interconnection of first aperture (311a) of first valve member (310a), aperture (321a) of second valve member (320a) and through aperture (331a) of third valve member (330a).

Figure 34:
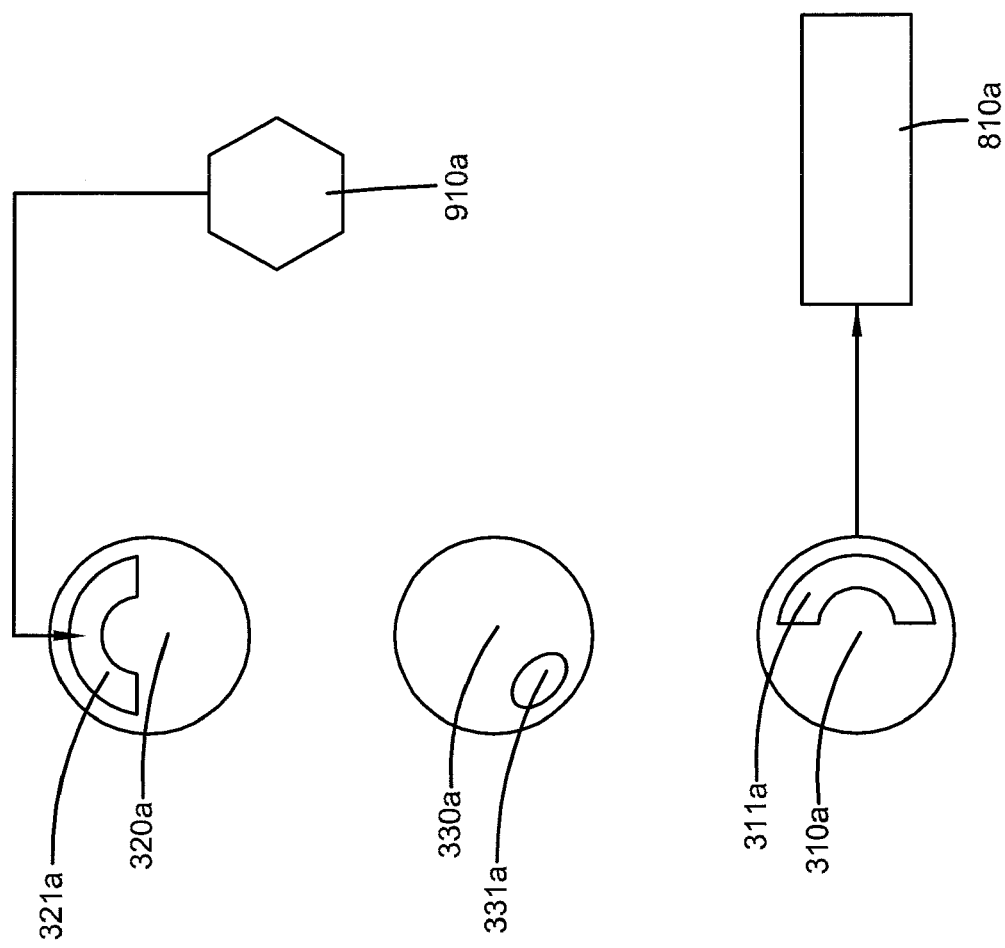

FIG. 34 depicts a novel rotary valve assembly with a first valve member (310a) with first aperture (311a) in communication with a dry sink (810a), a second valve member (320a) in a second position with an aperture (321a) in communication with a control environment (910a), a third valve member (330a) in a third position with a through aperture (331a); no communication of control environment (910a) with dry sink (810a) by means of interconnection of first aperture (311a) of first valve member (310a), aperture (321a) of second valve member (320a) and through aperture (331a) of third valve member (330a).

Figure 35:
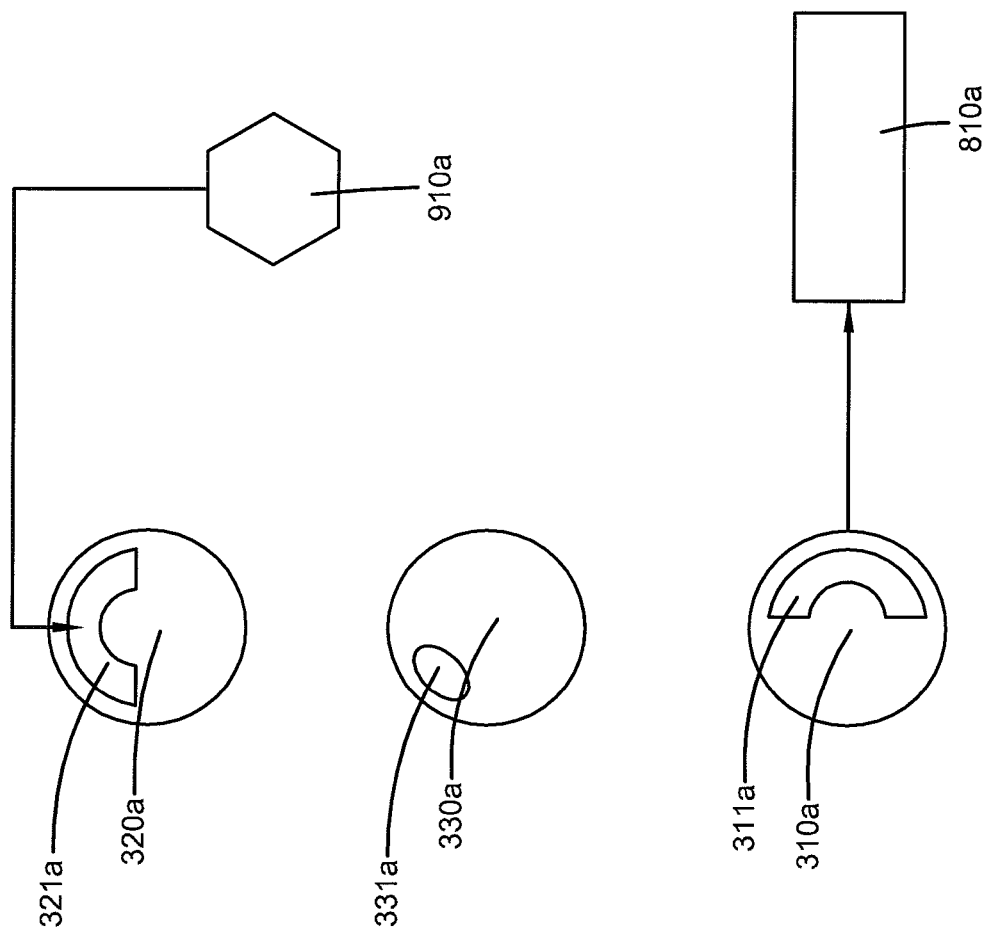

FIG. 35 depicts a novel rotary valve assembly with a first valve member (310a) with first aperture (311a) in communication with a dry sink (810a), a second valve member (320a) in a second position with an aperture (321a) in communication with a control environment (910a), a third valve member (330a) in a fourth position with a through aperture (331a); no communication of control environment (910a) with dry sink (810a) by means of interconnection of first aperture (311a) of first valve member (310a), aperture (321a) of second valve member (320a) and through aperture (331a) of third valve member (330a).

Figure 36:
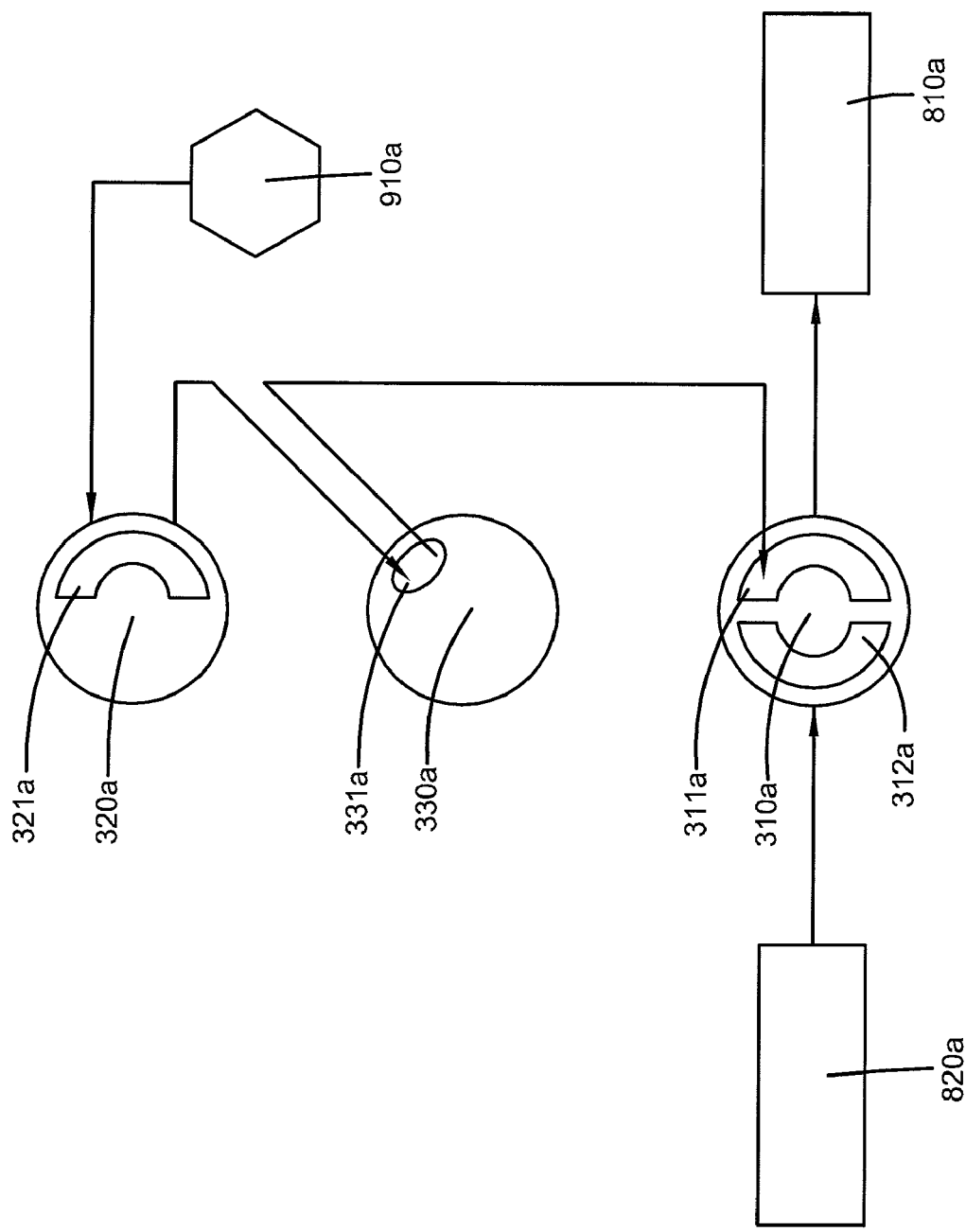
FIGS. 36-43 depict embodiments of a humidity control apparatus including a rotary valve assembly comprising a first valve member with a first and a second aperture, a second valve member with an aperture and a third valve member with a through aperture in communication with a dry sink and a humid source.

FIG. 36 depicts a novel rotary valve assembly with a first valve member (310a) with first aperture (311a) in communication with a dry sink (810a) and second aperture (312a) in communication with a humid source (820a), a second valve member (320a) in a first position with an aperture (321a) in communication with a control environment (910a), a third valve member (330a) in a first position with a through aperture (331a); communication of control environment (910a) with dry sink (810a) by means of interconnection of first aperture (311a) of first valve member (310a), aperture (321a) of second valve member (320a) and through aperture (331a) of third valve member (330a).

Figure 37:
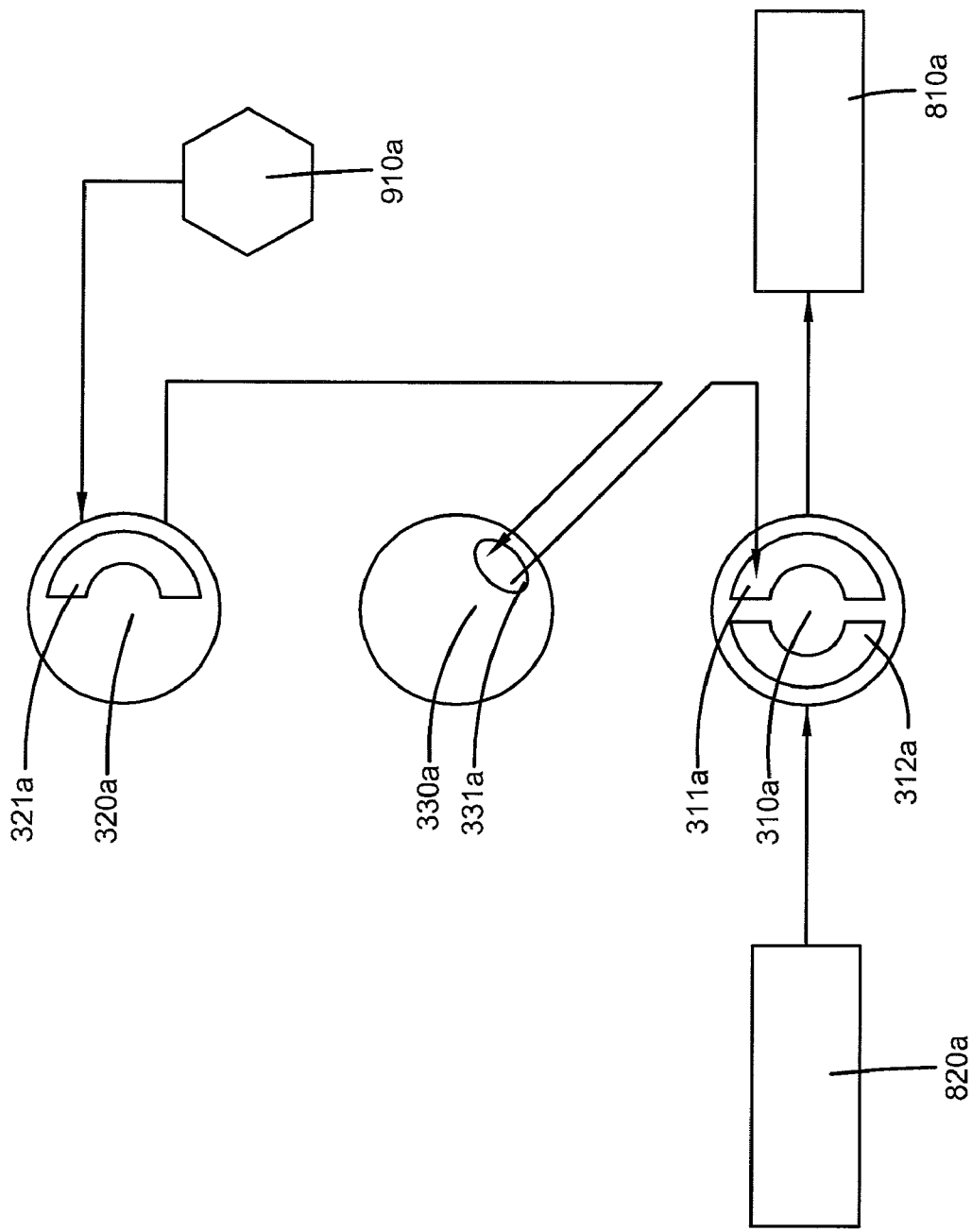

FIG. 37 depicts a novel rotary valve assembly with a first valve member (310a) with first aperture (311a) in communication with a dry sink (810a) and second aperture (312a) in communication with a humid source (820a), a second valve member (320a) in a first position with an aperture (321a) in communication with a control environment (910a), a third valve member (330a) in a second position with a through aperture (331a); communication of control environment (910a) with dry sink (810a) by means of interconnection of first aperture (311a) of first valve member (310a), aperture (321a) of second valve member (320a) and through aperture (331a) of third valve member (330a).

Figure 38:
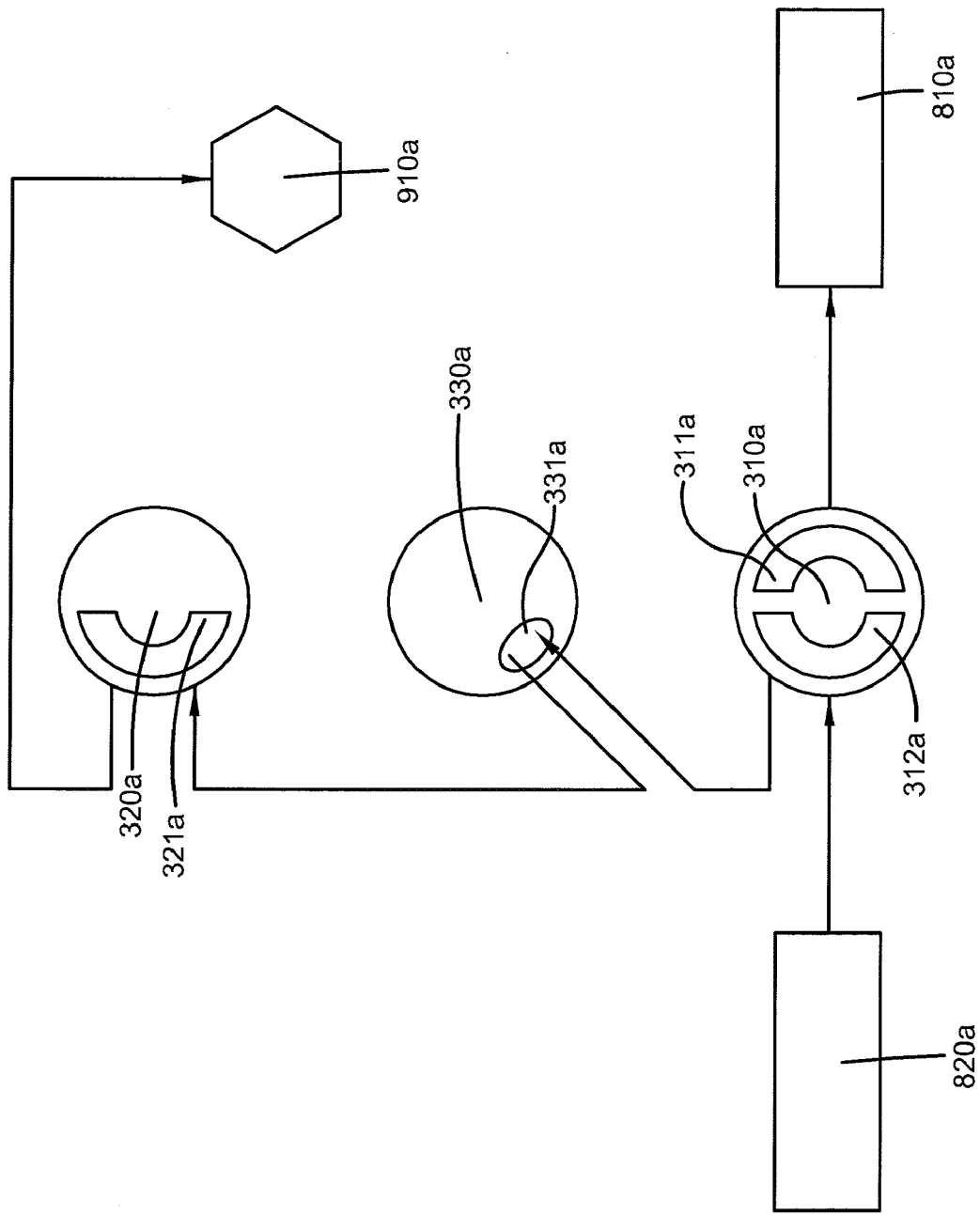

FIG. 38 depicts a novel rotary valve assembly with a first valve member (310a) with first aperture (311a) in communication with a dry sink (810a) and second aperture (312a) in communication with a humid source (820a), a second valve member (320a) in a second position with an aperture (321a) in communication with a control environment (910a), a third valve member (330a) in a third position with a through aperture (331a); communication of control environment (910a) with humid source (820a) by means of interconnection of second aperture (312a) of first valve member (310a), aperture (321a) of second valve member (320a) and through aperture (331a) of third valve member (330a).

Figure 39:
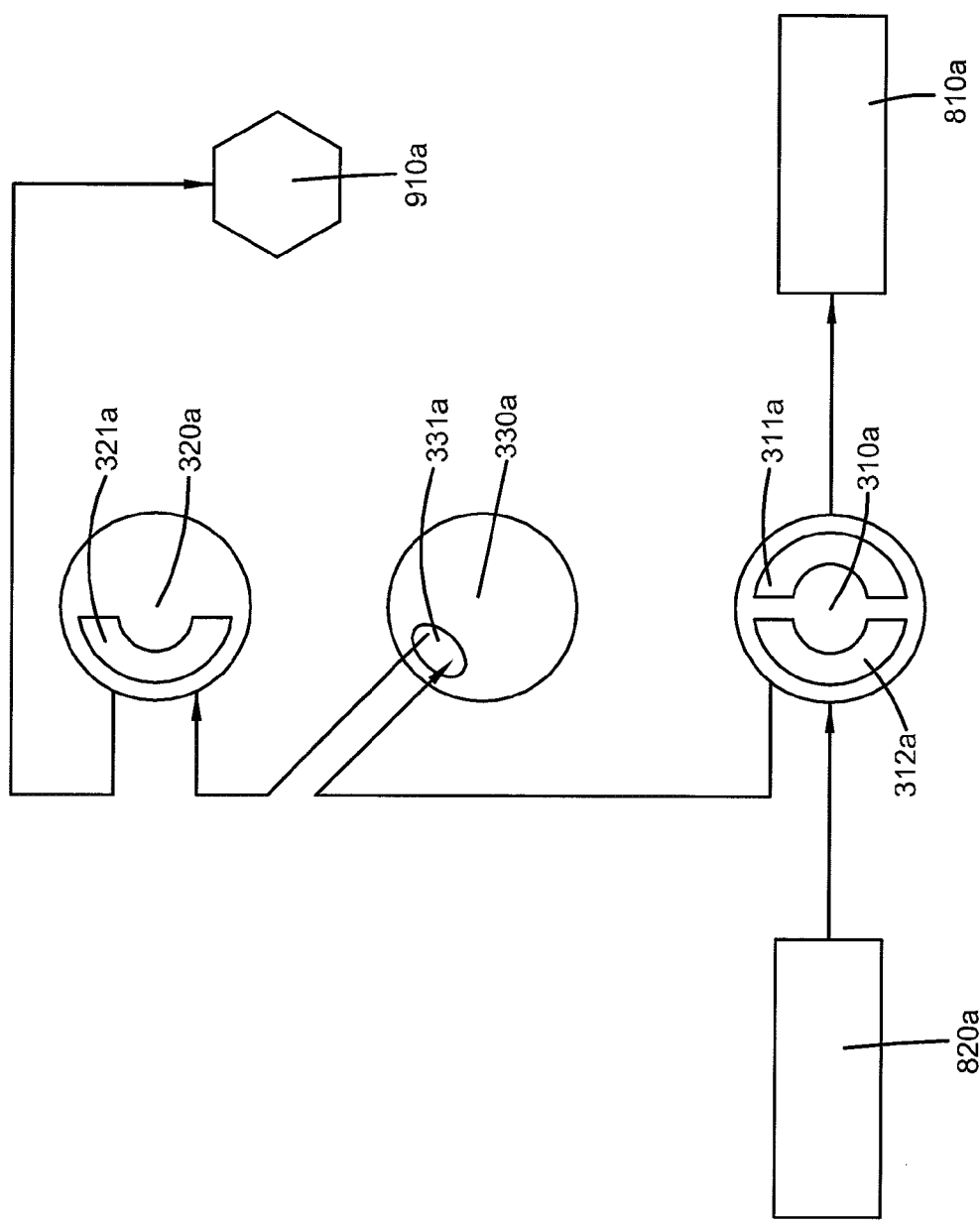

FIG. 39 depicts a novel rotary valve assembly with a first valve member (310a) with first aperture (311a) in communication with a dry sink (810a) and second aperture (312a) in communication with a humid source (820a), a second valve member (320a) in a second position with an aperture (321a) in communication with a control environment (910a), a third valve member (330a) in a fourth position with a through aperture (331a); communication of control environment (910a) with humid source (820a) by means of interconnection of second aperture (312a) of first valve member (310a), aperture (321a) of second valve member (320a) and through aperture (331a) of third valve member (330a).

Figure 40:
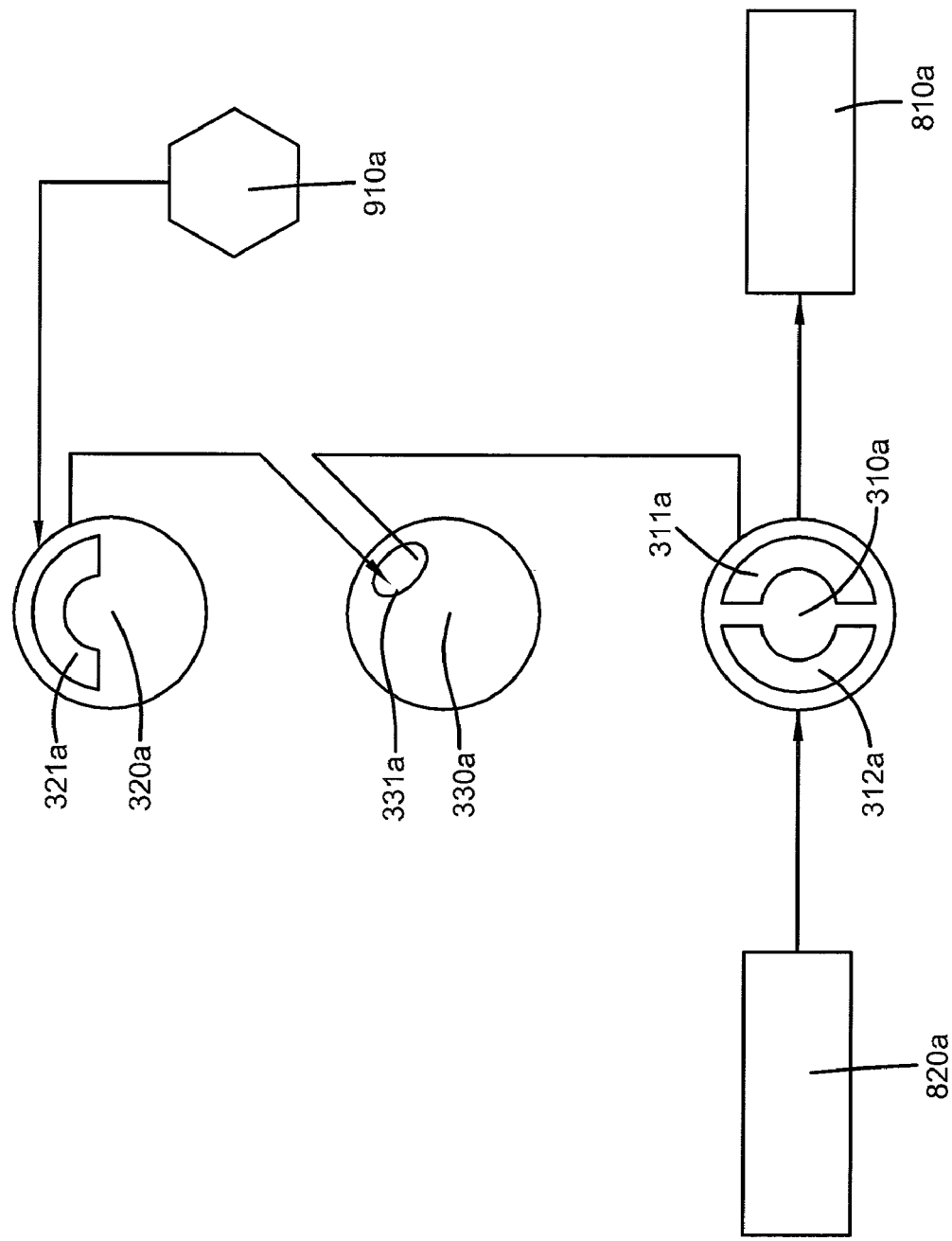

FIG. 40 depicts a novel rotary valve assembly with a first valve member (310a) with first aperture (311a) in communication with a dry sink (810a) and second aperture (312a) in communication with a humid source (820a), a second valve member (320a) in a second position with an aperture (321a) in communication with a control environment (910a), a third valve member (330a) in a first position with a through aperture (331a); communication of control environment (910a) with dry sink (810a) by means of interconnection of first aperture (311a) of first valve member (310a), aperture (321a) of second valve member (320a) and through aperture (331a) of third valve member (330a).

Figure 41:
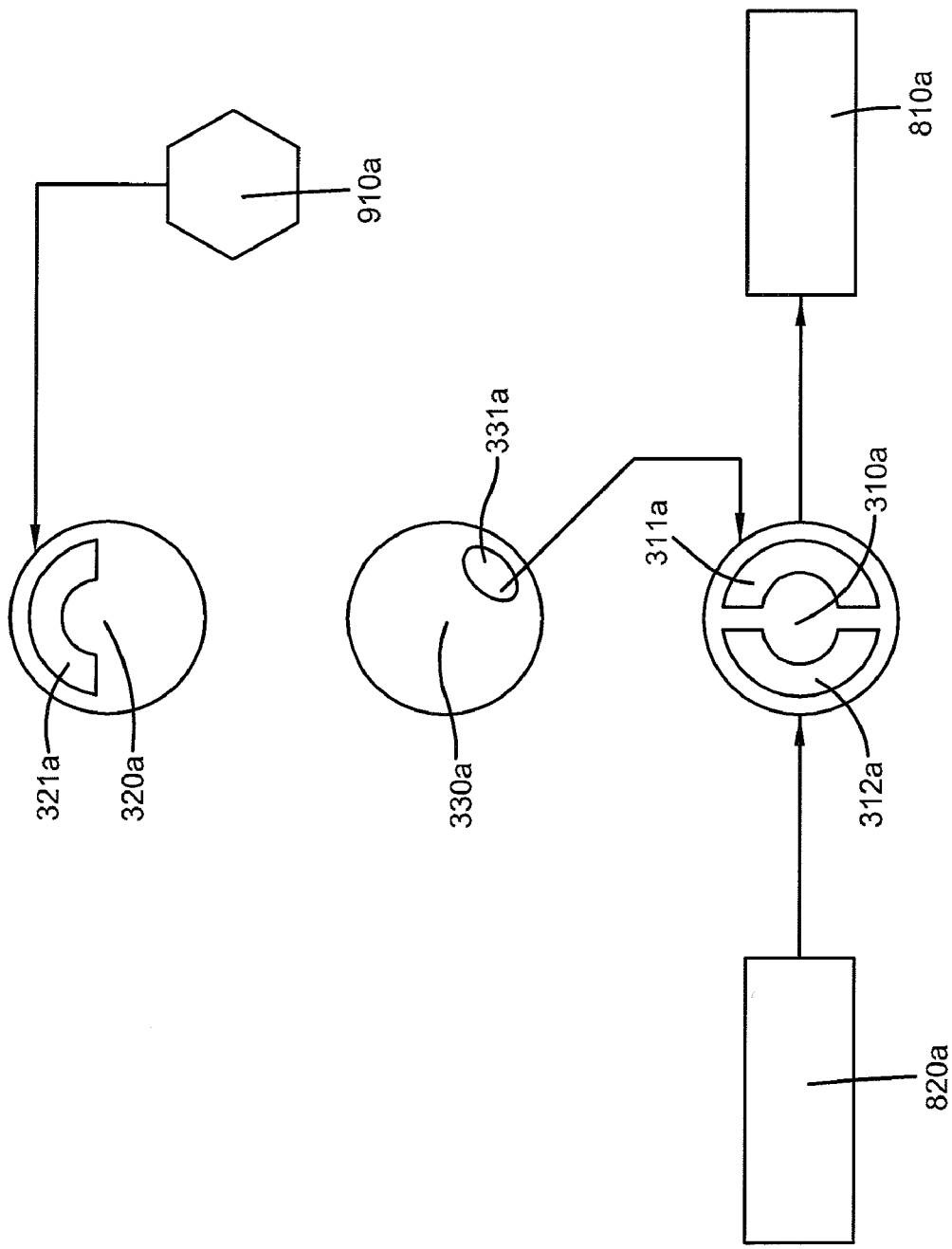

FIG. 41 depicts a novel rotary valve assembly with a first valve member (310a) with first aperture (311a) in communication with a dry sink (810a) and second aperture (312a) in communication with a humid source (820a), a second valve member (320a) in a second position with an aperture (321a) in communication with a control environment (910a), a third valve member (330a) in a second position with a through aperture (331a); no communication of control environment (910a) with dry sink (810a) by means of disconnection of first aperture (311a) of first valve member (310a), aperture (321a) of second valve member (320a) and through aperture (331a) of third valve member (330a).

Figure 42:
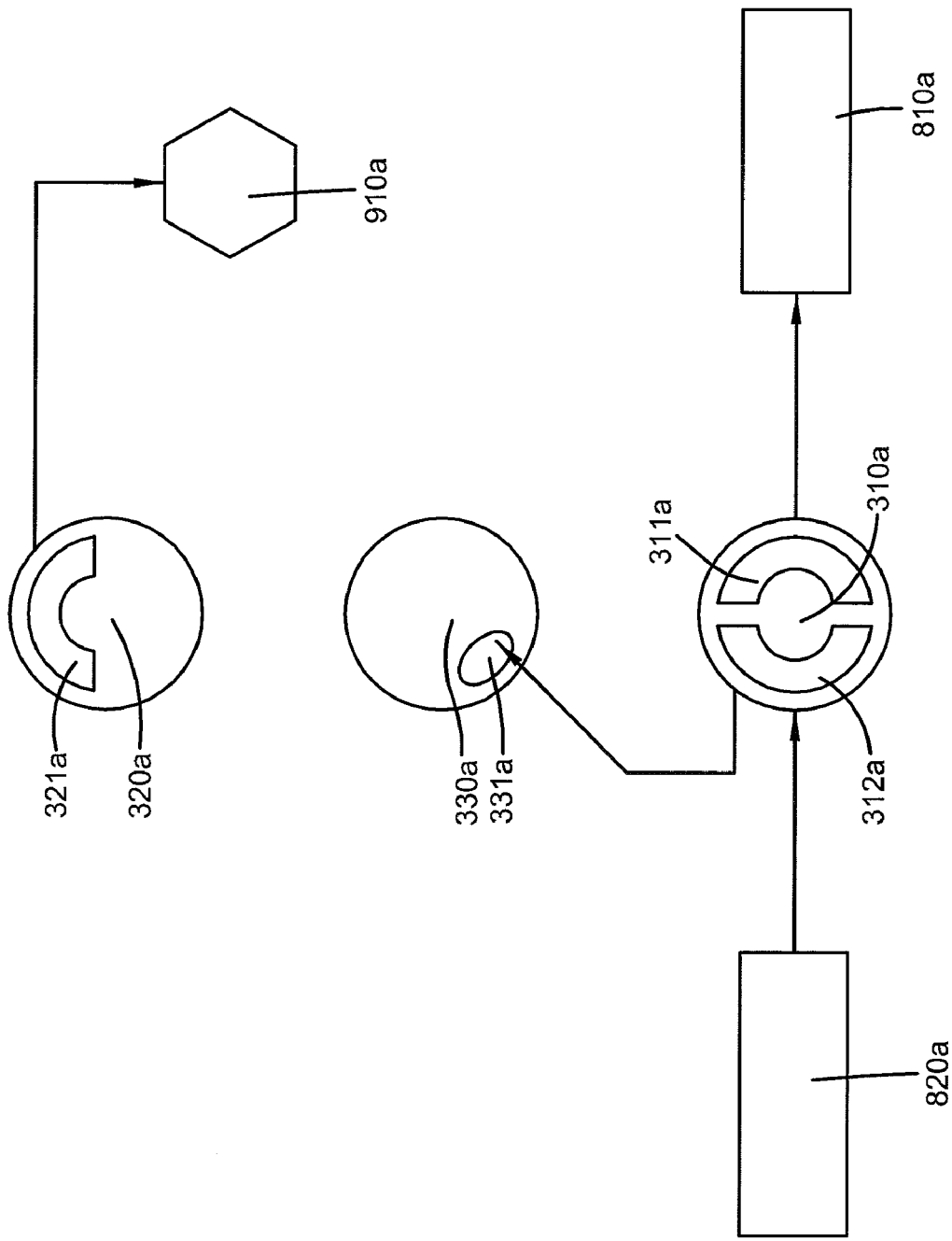

FIG. 42 depicts a novel rotary valve assembly with a first valve member (310a) with first aperture (311a) in communication with a dry sink (810a) and second aperture (312a) in communication with a humid source (820a), a second valve member (320a) in a second position with an aperture (321a) in communication with a control environment (910a), a third valve member (330a) in a third position with a through aperture (331a); no communication of control environment (910a) with humid source (820a) by means of disconnection of second aperture (312a) of first valve member (310a), aperture (321a) of second valve member (320a) and through aperture (331a) of third valve member (330a).

Figure 43:
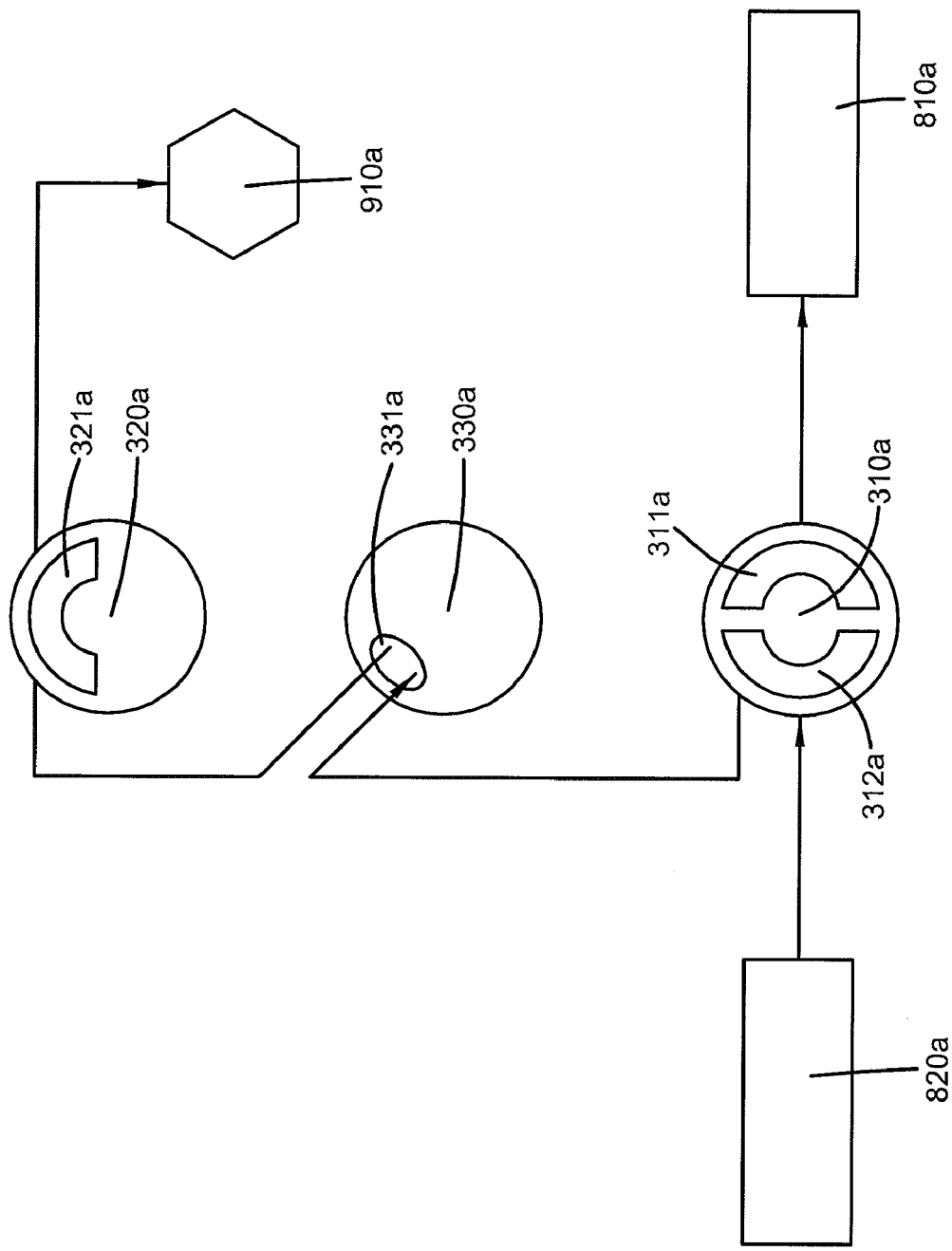

FIG. 43 depicts a novel rotary valve assembly with a first valve member (310a) with first aperture (311a) in communication with a dry sink (810a) and second aperture (312a) in communication with a humid source (820a), a second valve member (320a) in a second position with an aperture (321a) in communication with a control environment (910a), a third valve member (330a) in a fourth position with a through aperture (331a); communication of control environment (910a) with humid source (820a) by means of interconnection of second aperture (312a) of first valve member (310a), aperture (321a) of second valve member (320a) and through aperture (331a) of third valve member (330a).

Figure 44:
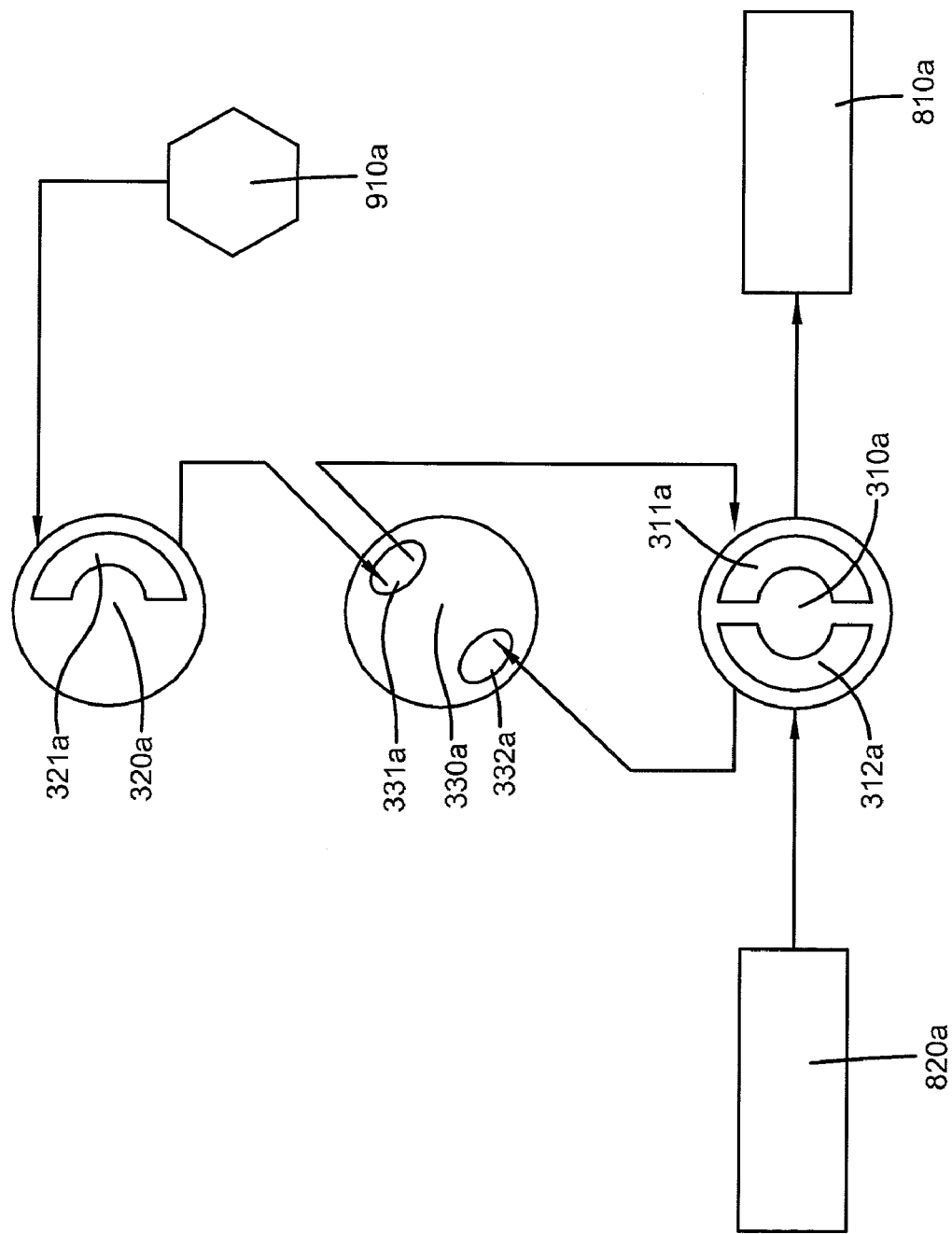
FIGS. 44-51 depict embodiments of a humidity control apparatus including a rotary valve assembly comprising a first valve member with a first and a second aperture, a second valve member with an aperture and a third valve member with a first through aperture and a second through aperture in communication with a dry sink and humid source.

FIG. 44 depicts a novel rotary valve assembly with a first valve member (310a) with first aperture (311a) in communication with a dry sink (810a) and second aperture (312a) in communication with a humid source (820a), a second valve member (320a) in a first position with an aperture (321a) in communication with a control environment (910a), a third valve member (330a) in a first position with a first through aperture (331a) and a second through aperture (332a); communication of control environment (910a) with dry sink (810a) by means of interconnection of first aperture (311a) of first valve member (310a), aperture (321a) of second valve member (320a) and first through aperture (331a) of third valve member (330a).

Figure 45:
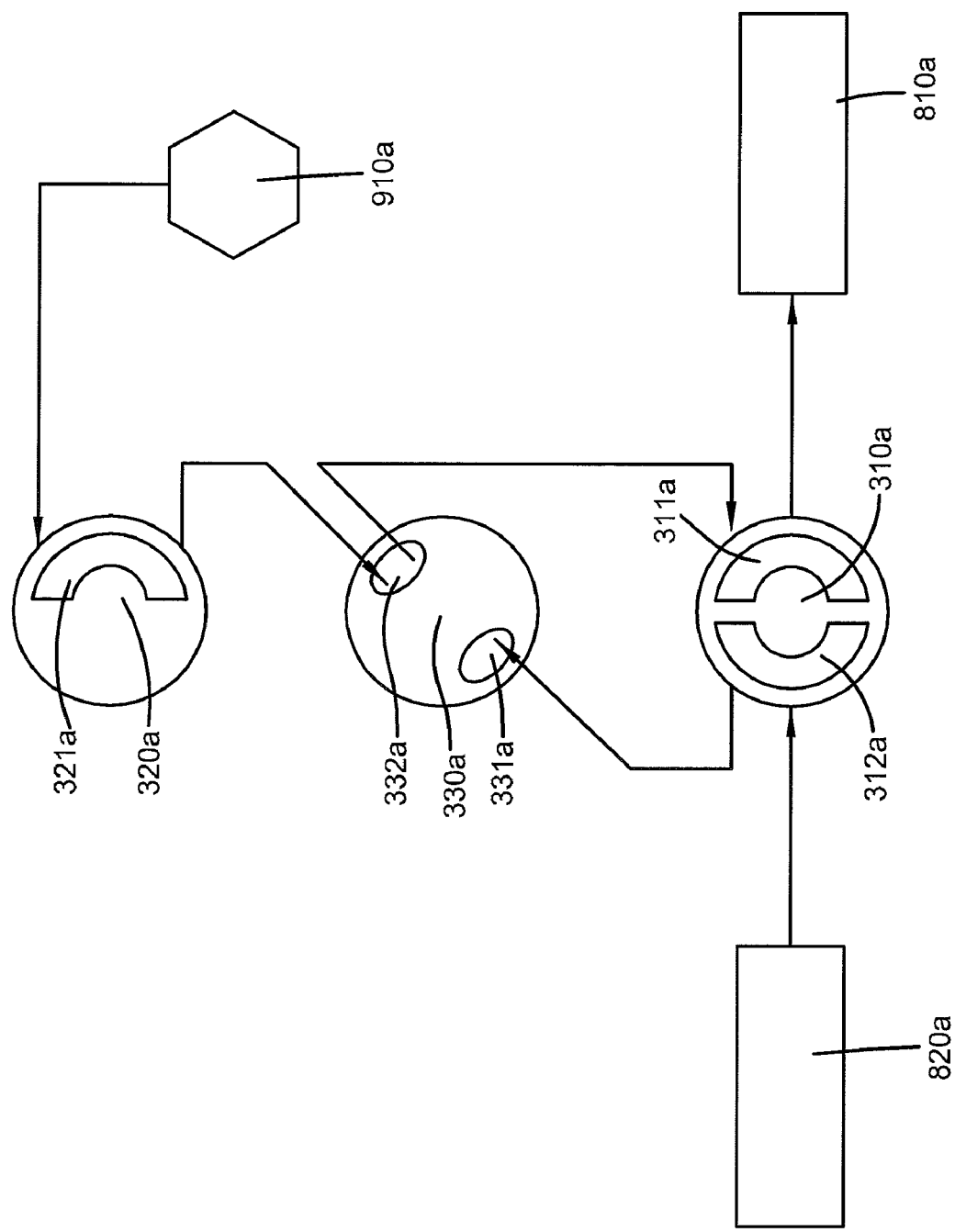

FIG. 45 depicts a novel rotary valve assembly with a first valve member (310a) with first aperture (311a) in communication with a dry sink (810a) and second aperture (312a) in communication with a humid source (820a), a second valve member (320a) in a first position with an aperture (321a) in communication with a control environment (910a), a third valve member (330a) in a second position with a first through aperture (331a) and a second through aperture (332a); communication of control environment (910a) with dry sink (810a) by means of interconnection of first aperture (311a) of first valve member (310a), aperture (321a) of second valve member (320a) and second through aperture (332a) of third valve member (330a).

Figure 46:
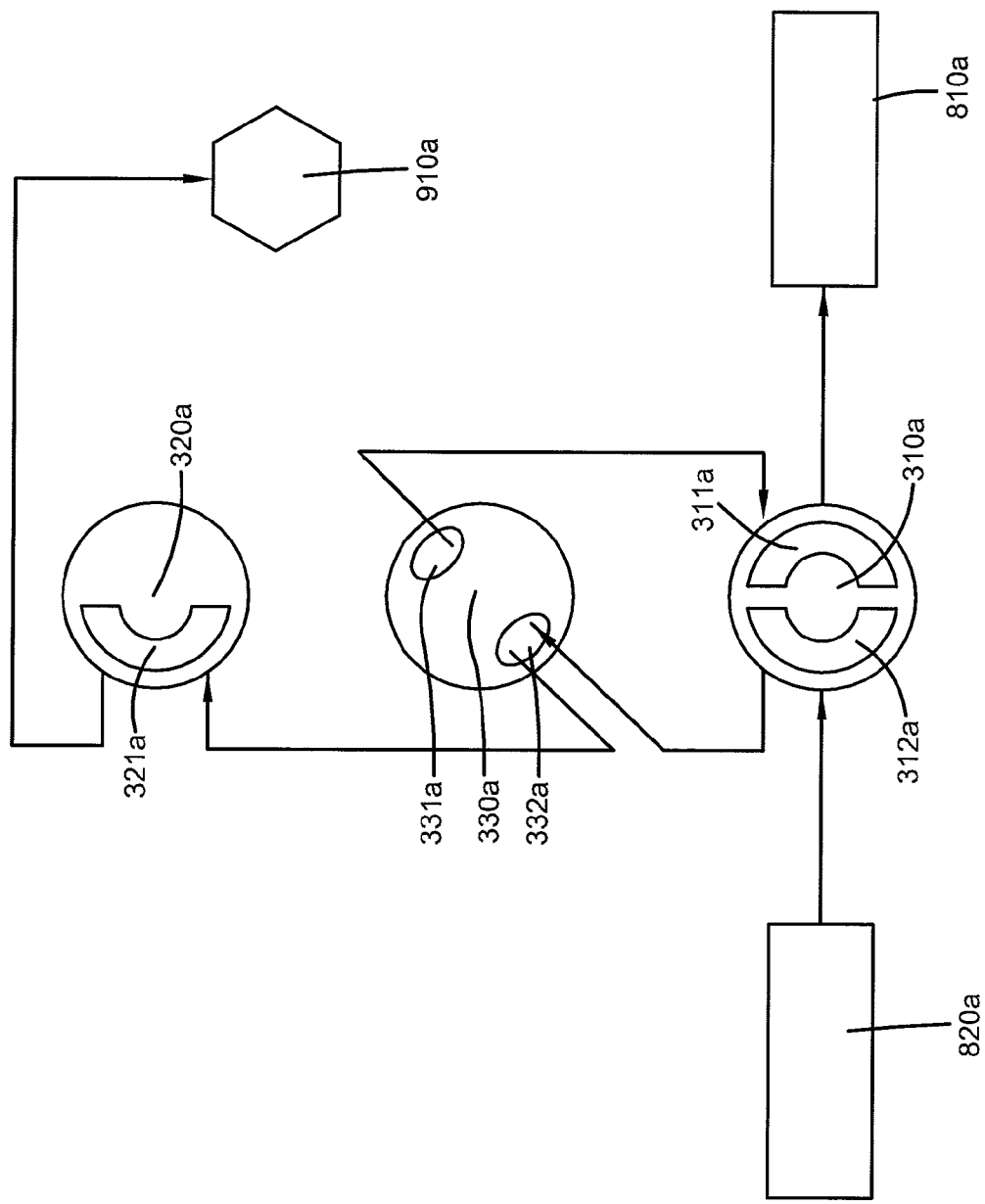

FIG. 46 depicts a novel rotary valve assembly with a first valve member (310a) with first aperture (311a) in communication with a dry sink (810a) and second aperture (312a) in communication with a humid source (820a), a second valve member (320a) in a second position with an aperture (321a) in communication with a control environment (910a), a third valve member (330a) in a first position with a first through aperture (331a) and a second through aperture (332a); communication of control environment (910a) with humid source (820a) by means of interconnection of second aperture (312a) of first valve member (310a), aperture (321a) of second valve member (320a) and second through aperture (332a) of third valve member (330a).

Figure 47:
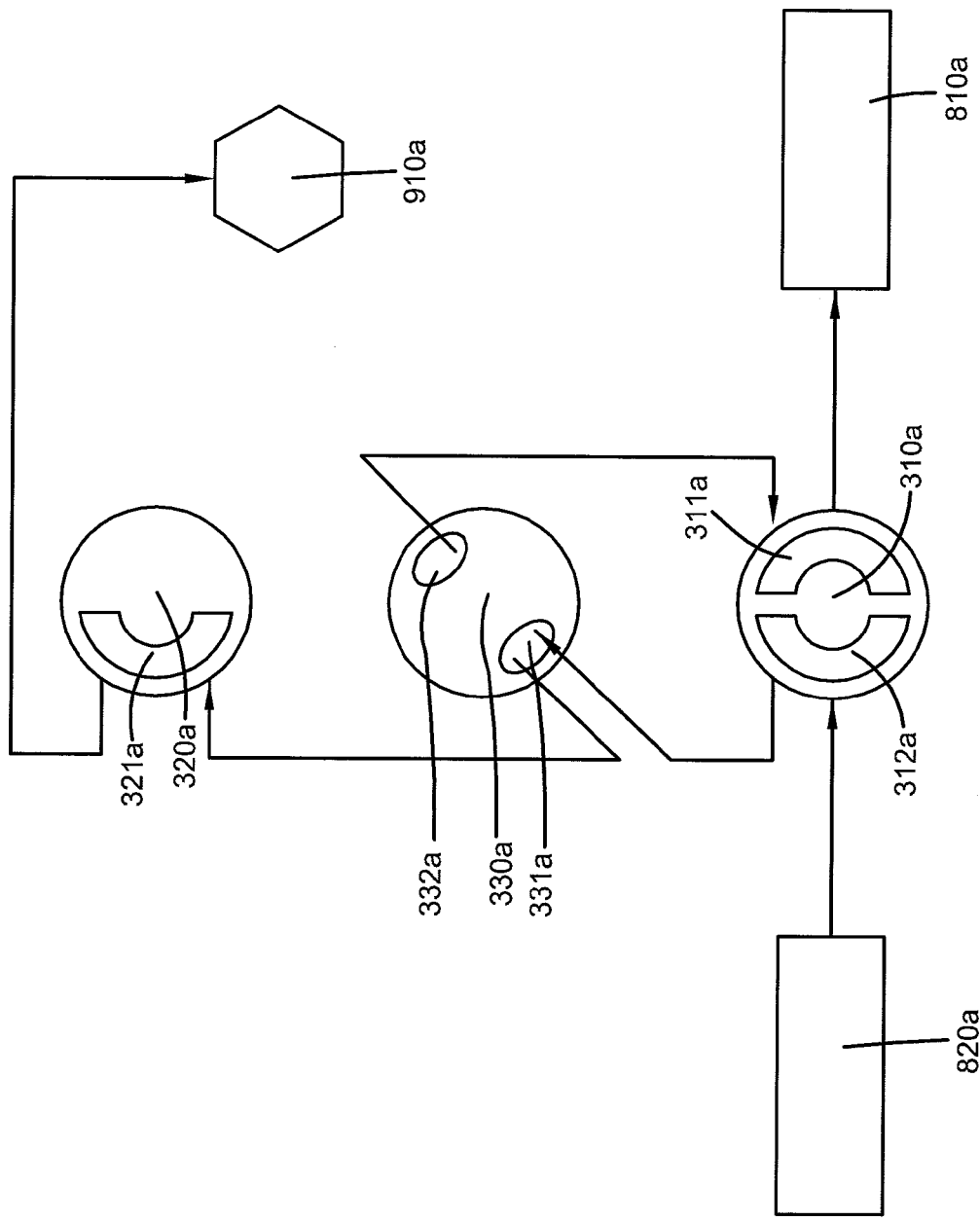

FIG. 47 depicts a novel rotary valve assembly with a first valve member (310a) with first aperture (311a) in communication with a dry sink (810a) and second aperture (312a) in communication with a humid source (820a), a second valve member (320a) in a second position with an aperture (321a) in communication with a control environment (910a), a third valve member (330a) in a second position with a first through aperture (331a) and a second through aperture (332a); communication of control environment (910a) with humid source (820a) by means of interconnection of second aperture (312a) of first valve member (310a), aperture (321a) of second valve member (320a) and first through aperture (331a) of third valve member (330a).

Figure 48:
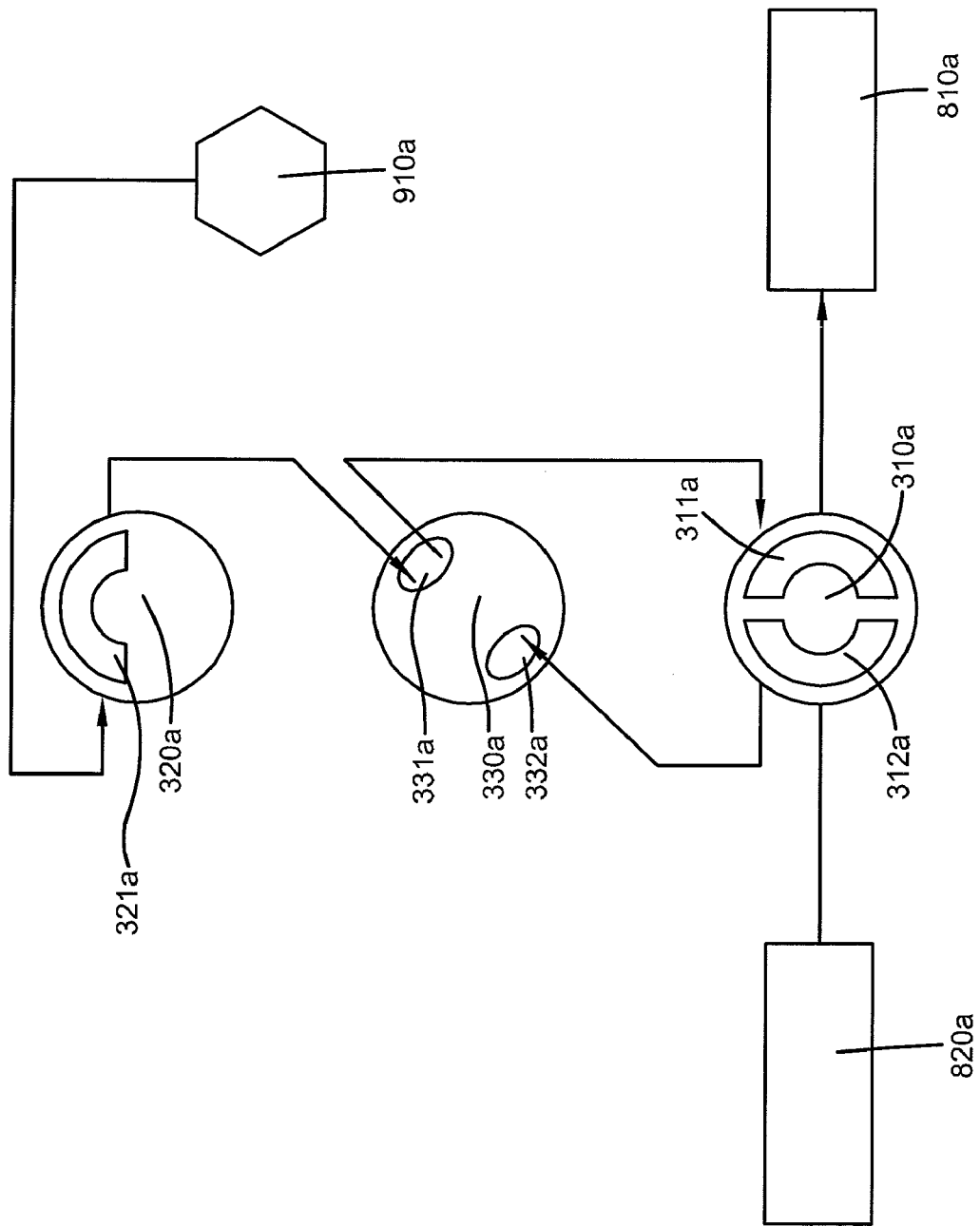

FIG. 48 depicts a novel rotary valve assembly with a first valve member (310a) with first aperture (311a) in communication with a dry sink (810a) and second aperture (312a) in communication with a humid source (820a), a second valve member (320a) in a third position with an aperture (321a) in communication with a control environment (910a), a third valve member (330a) with a first through aperture (331a) and a second through aperture (332a) in a first position; communication of control environment (910a) with dry sink (810a) by means of interconnection of first aperture (311a) of first valve member (310a), aperture (321a) of second valve member (320a) and first through aperture (331a) of third valve member (330a).

Figure 49:
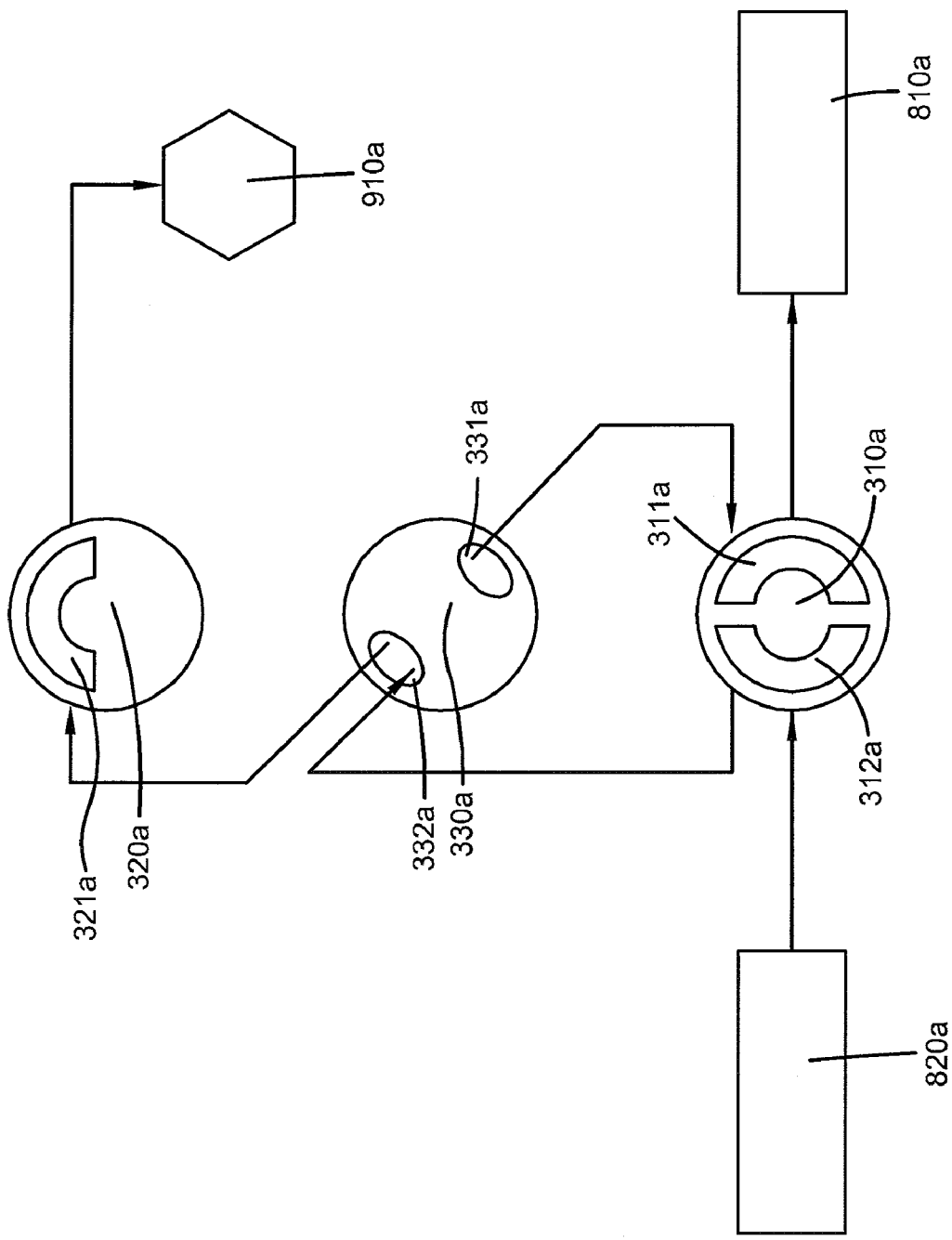

FIG. 49 depicts a novel rotary valve assembly with a first valve member (310a) with first aperture (311a) in communication with a dry sink (810a) and second aperture (312a) in communication with a humid source (820a), a second valve member (320a) in a third position with an aperture (321a) in communication with a control environment (910a), a third valve member (330a) in a second position with a first through aperture (331a) and a second through aperture (332a); communication of control environment (910a) with humid source (820a) by means of interconnection of second aperture (312a) of first valve member (310a), aperture (321a) of second valve member (320a) and second through aperture (332a) of third valve member (330a).

Figure 50:
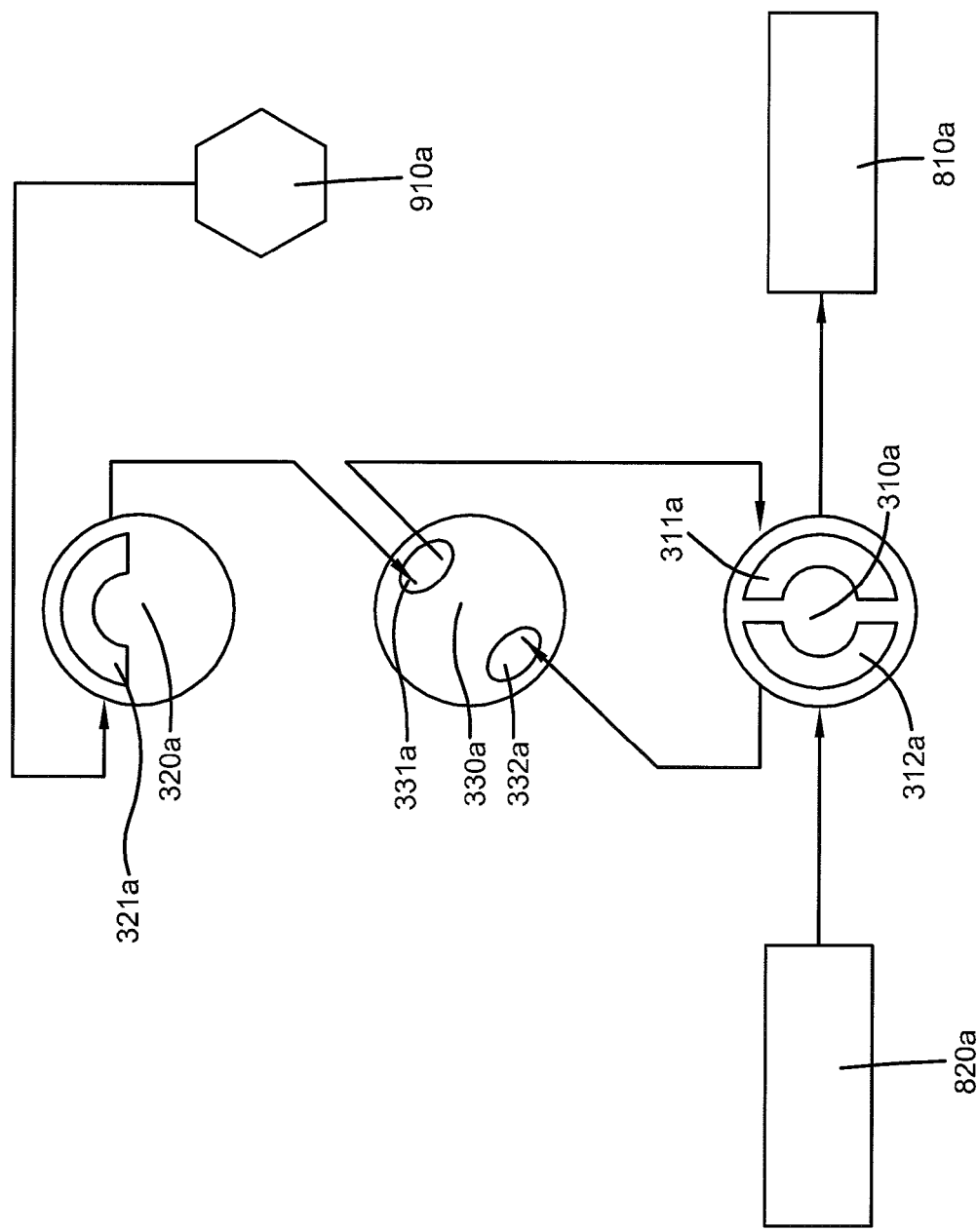

FIG. 50 depicts a novel rotary valve assembly with a first valve member (310a) with first aperture (311a) in communication with a dry sink (810a) and second aperture (312a) in communication with a humid source (820a), a second valve member (320a) in a third position with an aperture (321a) in communication with a control environment (910a), a third valve member (330a) with a first through aperture (331a) and a second through aperture (332a) in a third position; communication of control environment (910a) with dry sink (810a) by means of interconnection of first aperture (311a) of first valve member (310a), aperture (321a) of second valve member (320a) and second through aperture (332a) of third valve member (330a).

Figure 51:
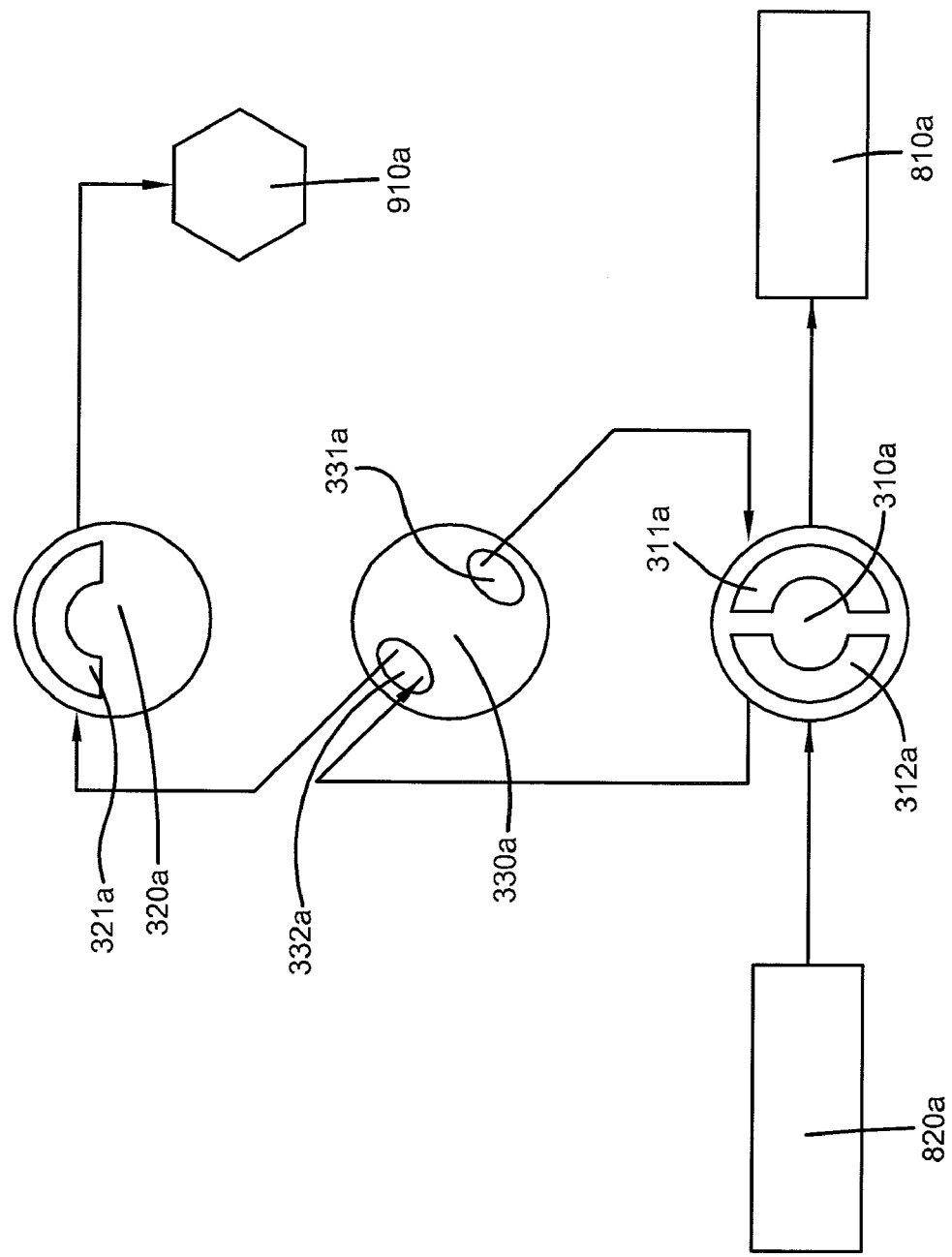

FIG. 51 depicts a novel rotary valve assembly with a first valve member (310a) with first aperture (311a) in communication with a dry sink (810a) and second aperture (312a) in communication with a humid source (820a), a second valve member (320a) in a third position with an aperture (321a) in communication with a control environment (910a), a third valve member (330a) in a fourth position with a first through aperture (331a) and a second through aperture (332a); communication of control environment (910a) with humid source (820a) by means of interconnection of second aperture (312a) of first valve member (310a), aperture (321a) of second valve member (320a) and first through aperture (331a) of third valve member (330a).

Figure 52:
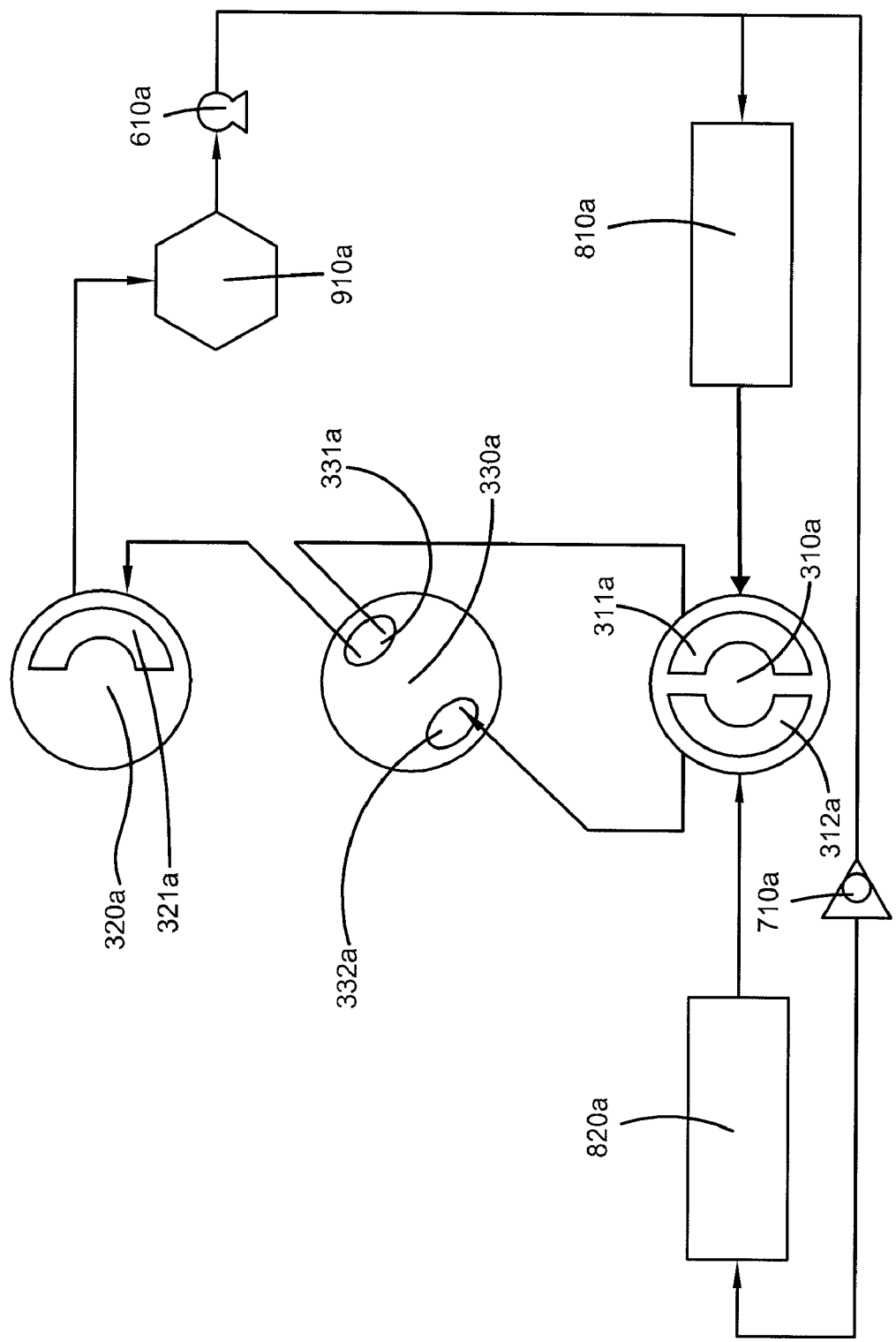
FIGS. 52-57 depict embodiments of a humidity control apparatus including a rotary valve assembly comprising a first valve member with a first and a second aperture, a second valve member with an aperture and a third valve member with a first through aperture and a second through aperture in communication with a dry sink and humid source by means of blower.

FIG. 52 depicts a novel rotary valve assembly with a first valve member (310a) with first aperture (311a) in communication with a dry sink (810a) and second aperture (312a) in communication with a humid source (820a), a second valve member (320a) in a first position with an aperture (321a) in communication with a control environment (910a), a third valve member (330a) with a first through aperture (331a) and a second through aperture (332a) in a first position; communication of control environment (910a) with dry sink (810a) by means of interconnection of first aperture (311a) of first valve member (310a), aperture (321a) of second valve member (320a), first through aperture (331a) of third valve member (330a) and blower (610a). Valve (710a) provides communication from humid source to dry sink by means of control environment (910a) alone.

Figure 53:
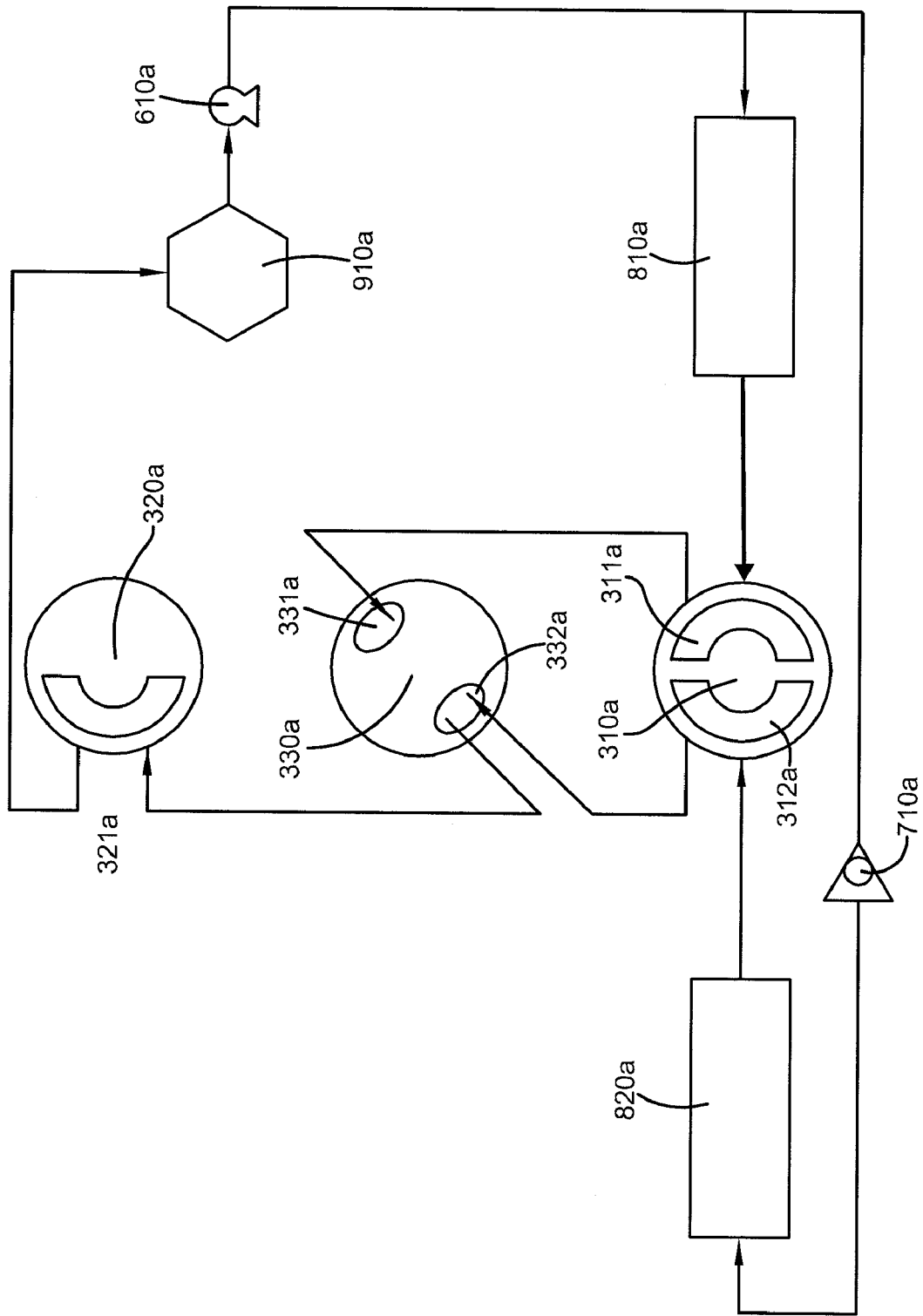

FIG. 53 depicts a novel rotary valve assembly with a first valve member (310a) with first aperture (311a) in communication with a dry sink (810a) and second aperture (312a) in communication with a humid source (820a), a second valve member (320a) in a second position with an aperture (321a) in communication with a control environment (910a), a third valve member (330a) in a second position with a first through aperture (331a) and a second through aperture (332a); communication of control environment (910a) with humid source (820a) by means of interconnection of second aperture (312a) of first valve member (310a), aperture (321a) of second valve member (320a) and first through aperture (331a) of third valve member (330a) and blower (610a). Valve (710a) provides communication from humid source to dry sink by means of control environment (910a) alone.

Figure 54:
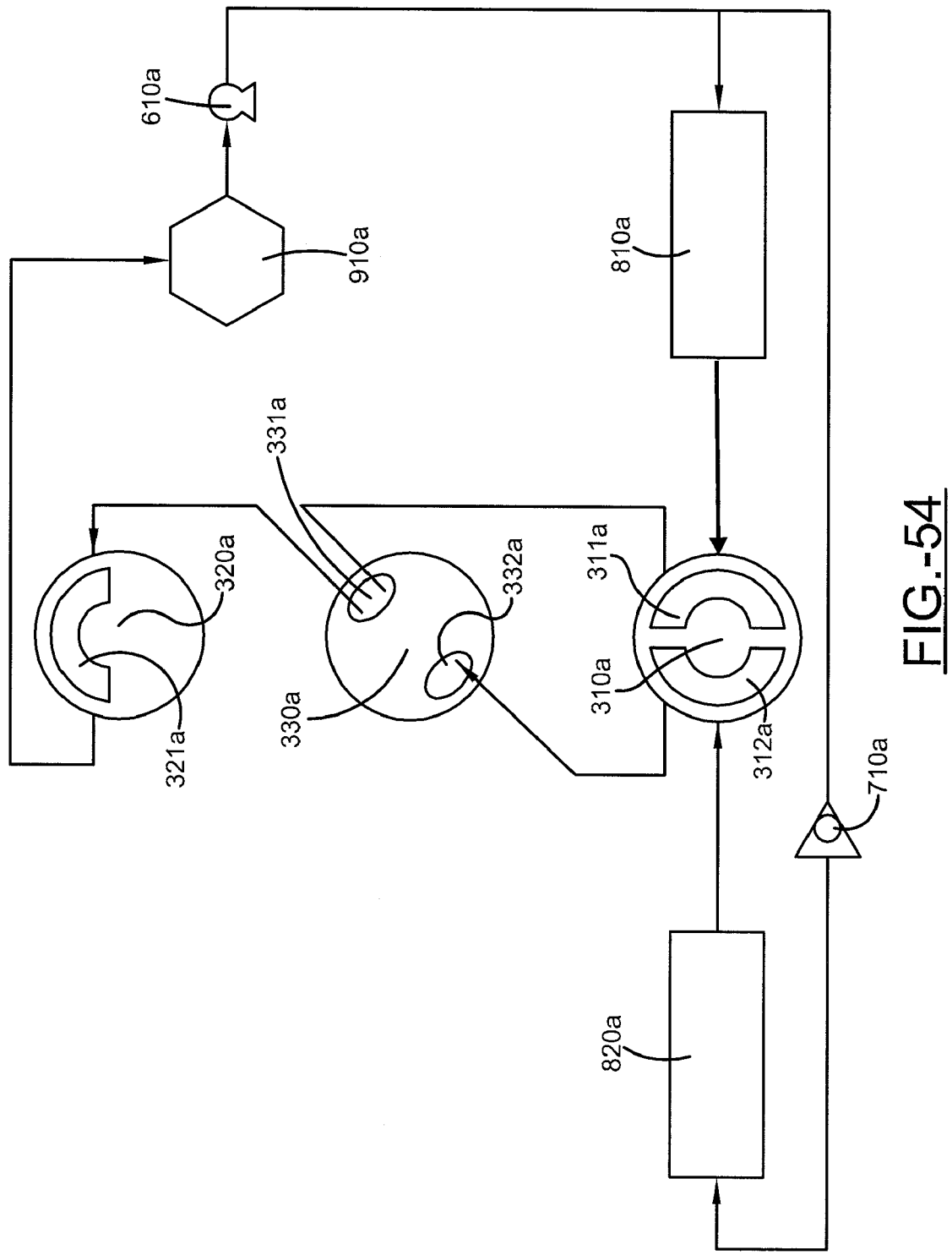

FIG. 54 depicts a novel rotary valve assembly with a first valve member (310a) with first aperture (311a) in communication with a dry sink (810a) and second aperture (312a) in communication with a humid source (820a), a second valve member (320a) in a third position with an aperture (321a) in communication with a control environment (910a), a third valve member (330a) in a first position with a first through aperture (331a) and a second through aperture (332a); communication of control environment (910a) with dry sink (810a) by means of interconnection of first aperture (311a) of first valve member (310a), aperture (321a) of second valve member (320a) and first through aperture (331a) of third valve member (330a) and blower (610a). Valve (710a) provides communication from humid source to dry sink by means of control environment (910a) alone.

Figure 55:
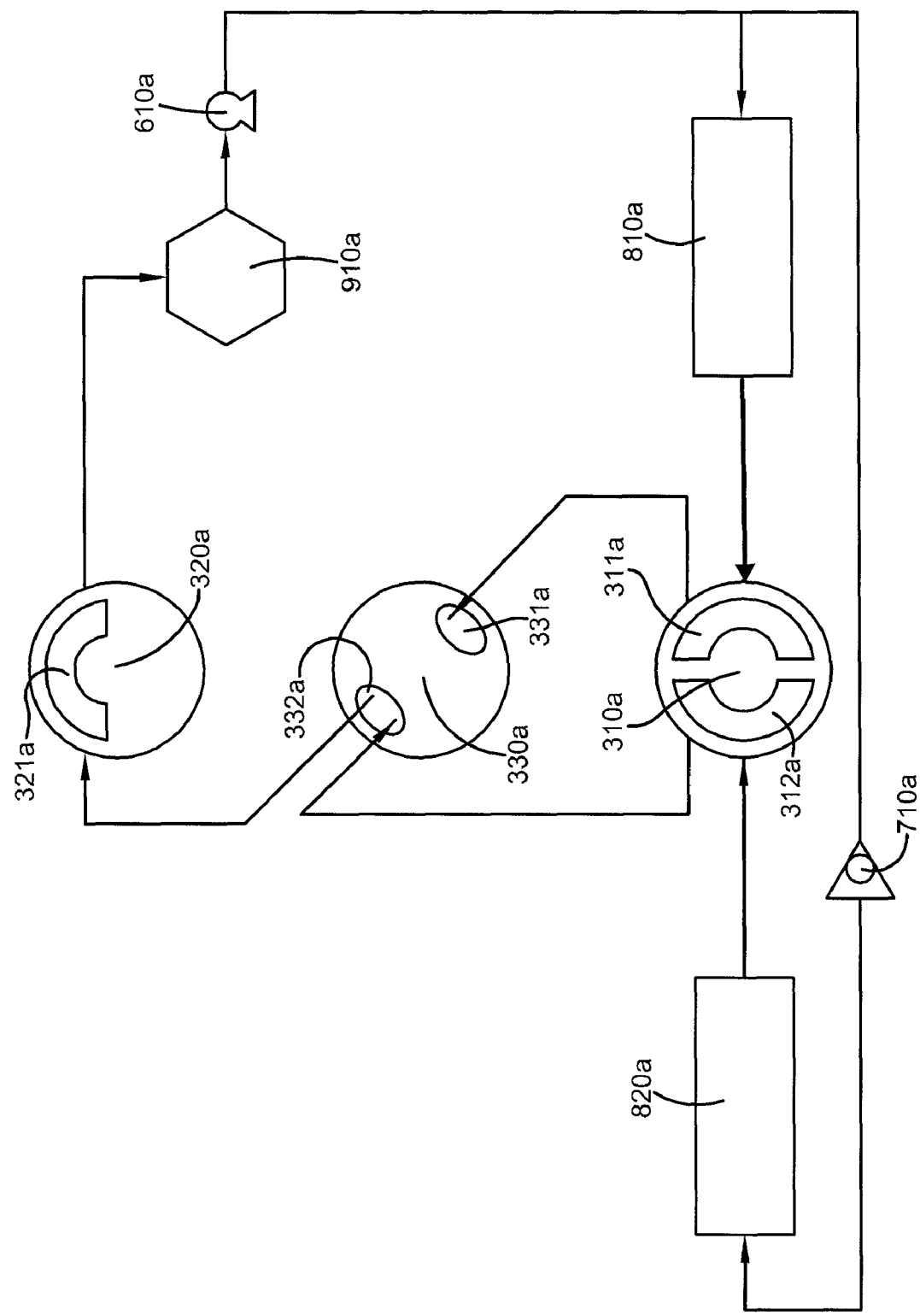

FIG. 55 depicts a novel rotary valve assembly with a first valve member (310a) with first aperture (311a) in communication with a dry sink (810a) and second aperture (312a) in communication with a humid source (820a), a second valve member (320a) in a third position with an aperture (321a) in communication with a control environment (910a), a third valve member (330a) in a second position with a first through aperture (331a) and a second through aperture (332a); communication of control environment (910a) with humid source (820a) by means of interconnection of second aperture (312a) of first valve member (310a), aperture (321a) of second valve member (320a) and second through aperture (332a) of third valve member (330a) and blower (610a). Valve (710a) provides communication from humid source to dry sink by means of control environment (910a) alone.

Figure 56:
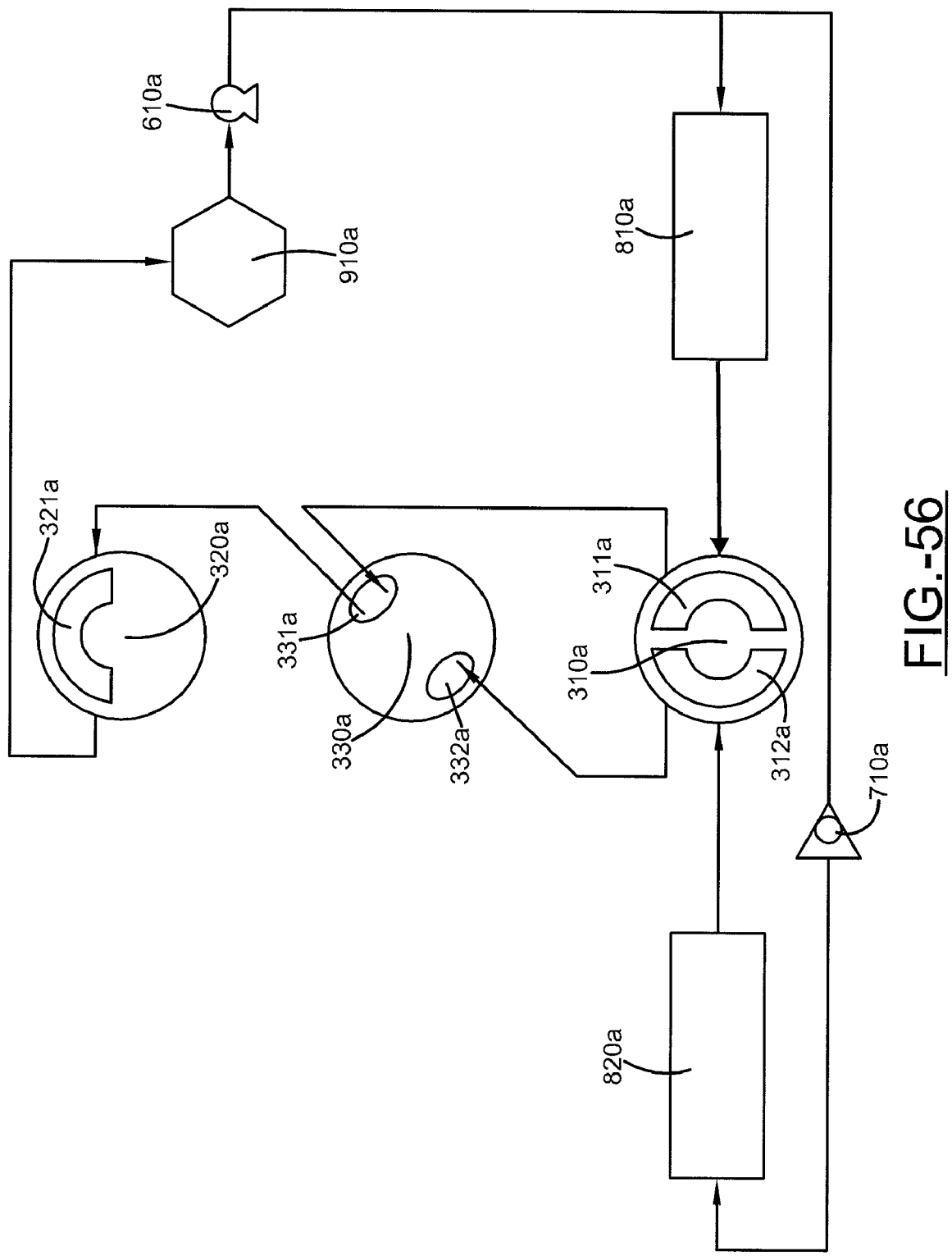

FIG. 56 depicts a novel rotary valve assembly with a first valve member (310a) with first aperture (311a) in communication with a dry sink (810a) and second aperture (312a) in communication with a humid source (820a), a second valve member (320a) in a third position with an aperture (321a) in communication with a control environment (910a), a third valve member (330a) in a third position with a first through aperture (331a) and a second through aperture (332a); communication of control environment (910a) with dry sink (810a) by means of interconnection of first aperture (311a) of first valve member (310a), aperture (321a) of second valve member (320a) and second through aperture (332a) of third valve member (330a) and blower (610a). Valve (710a) provides communication from humid source to dry sink by means of control environment (910a) alone.

Figure 57:
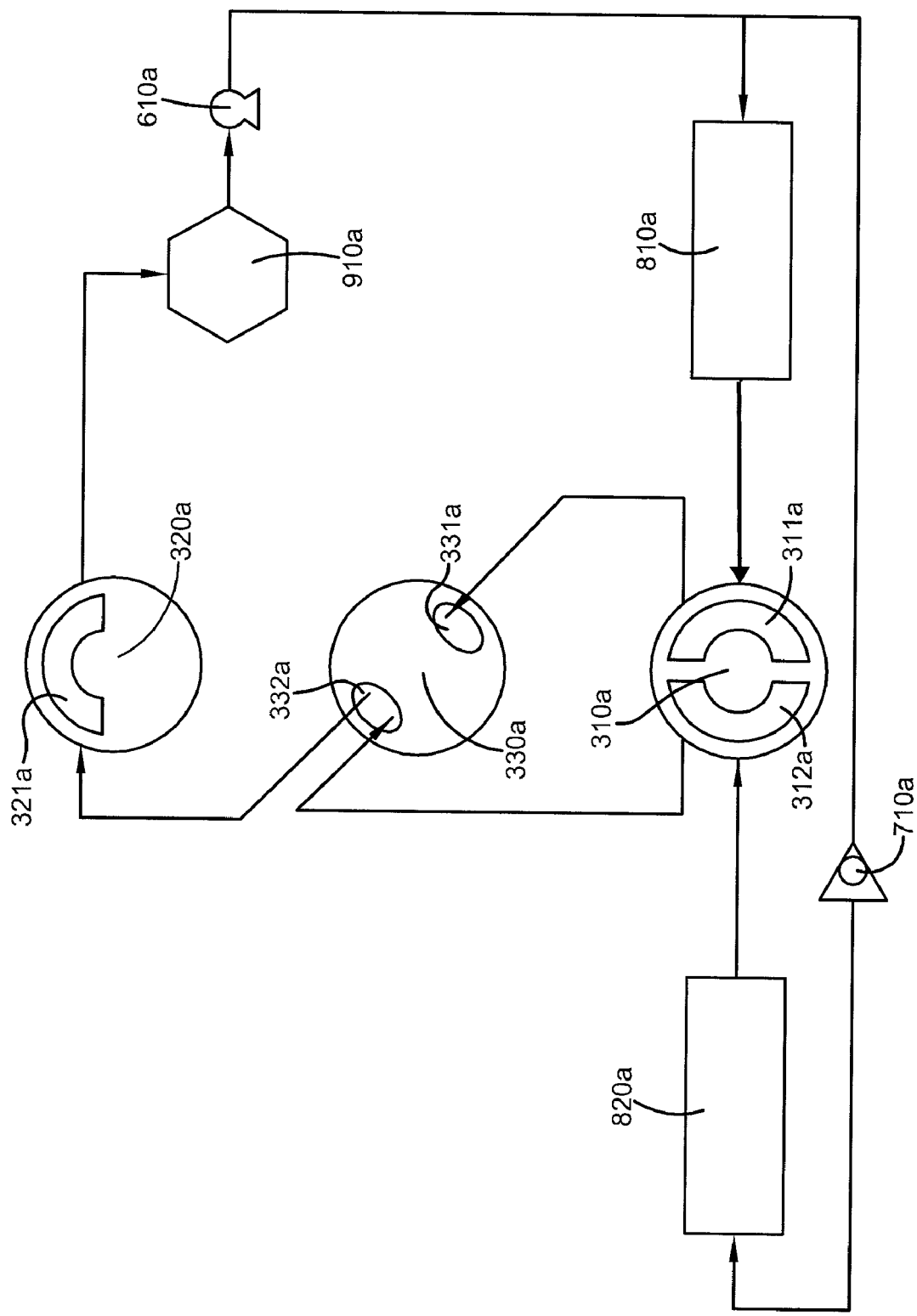

FIG. 57 depicts a novel rotary valve assembly with a first valve member (310a) with first aperture (311a) in communication with a dry sink (810a) and second aperture (312a) in communication with a humid source (820a), a second valve member (320a) in a third position with an aperture (321a) in communication with a control environment (910a), a third valve member (330a) in a fourth position with a first through aperture (331a) and a second through aperture (332a); communication of control environment (910a) with humid source (820a) by means of interconnection of second aperture (312a) of first valve member (310a), aperture (321a) of second valve member (320a) and first through aperture (331a) of third valve member (330a) and blower (610a). Valve (710a) provides communication from humid source to dry sink by means of control environment (910a) alone.

Figure 58:
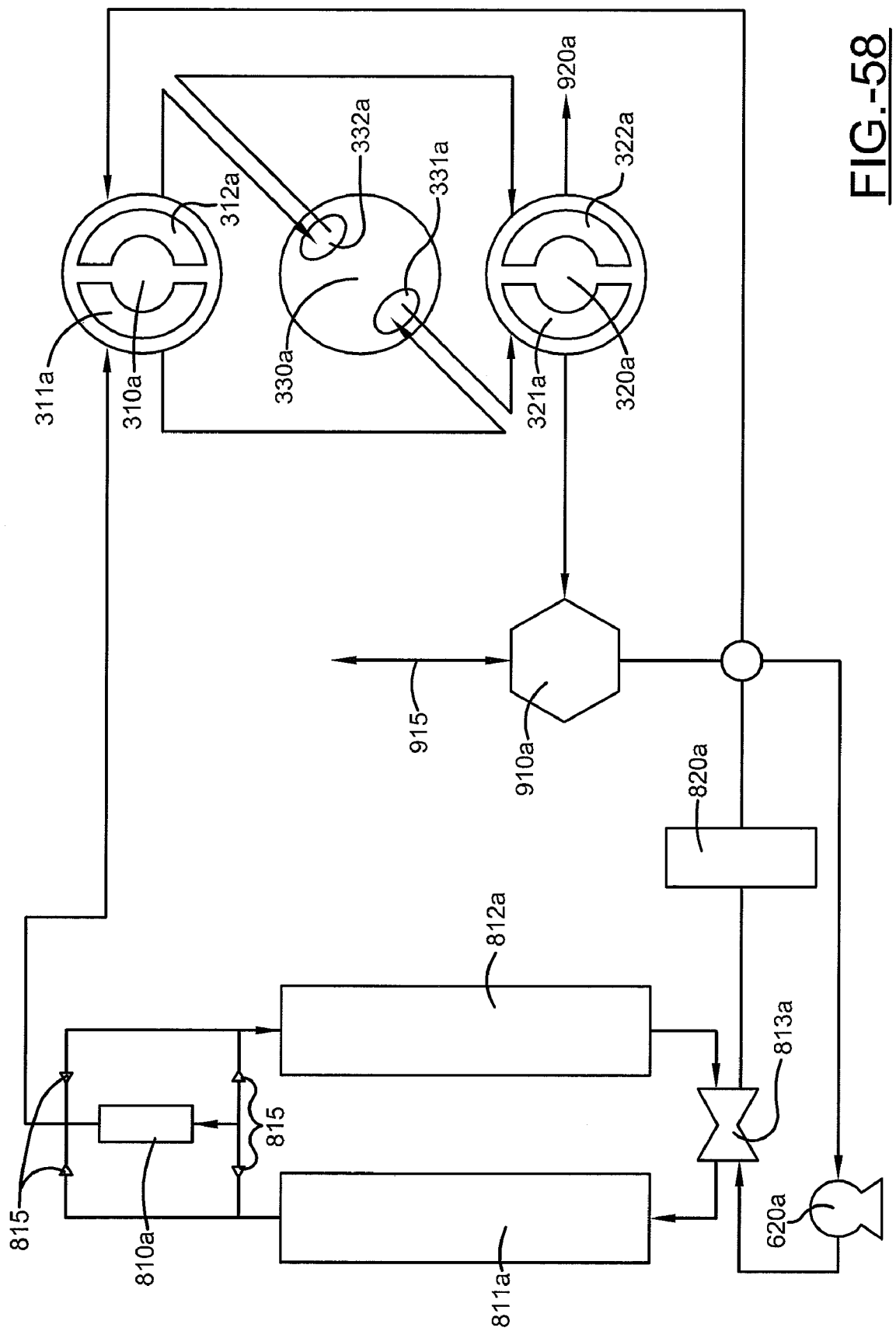
FIGS. 58-67 depict embodiments of a humidity control apparatus including a rotary valve assembly comprising a first valve member with a first aperture and a second aperture, a second valve member with a first aperture and a second aperture and a third valve member with a first through aperture in communication with humid source and a second through aperture in communication with a dry sink and wherein humid source and/or dry sink are outputs of a pressure swing adsorption system.

FIG. 58 depicts a novel rotary valve assembly with a first valve member (310a) with first aperture (311a) in communication with a dry source (810a) and second aperture (312a) in communication with a humid source (820a), a second valve member (320a) in a first position with a first aperture (321a) in communication with a control environment (910a) and a second aperture (322a) in communication with an ambient environment (920a), a third valve member (330a) in a first position with a first through aperture (331a) and a second through aperture (332a); communication of control environment (910a) with dry source (810a) by means of interconnection of first aperture (311a) of first valve member (310a), first aperture (321a) of second valve member (320a) and first through aperture (331a) of third valve member (330a); communication of ambient environment (920a) with humid source (820a) by means of interconnection of second aperture (312a) of first valve member (310a), second aperture (322a) of second valve member (320a) and second through aperture (332a) of third valve member (330a); wherein an adsorption system with a compressor (620a), a valve (813a), a first adsorption bed (811a) and second adsorption bed (812a), valve set (815a), an effluent as dry source (810a) and exhaust as humid source (820a). A vent (915a) to control environment provides for pressure equalization as necessary.

Figure 59:
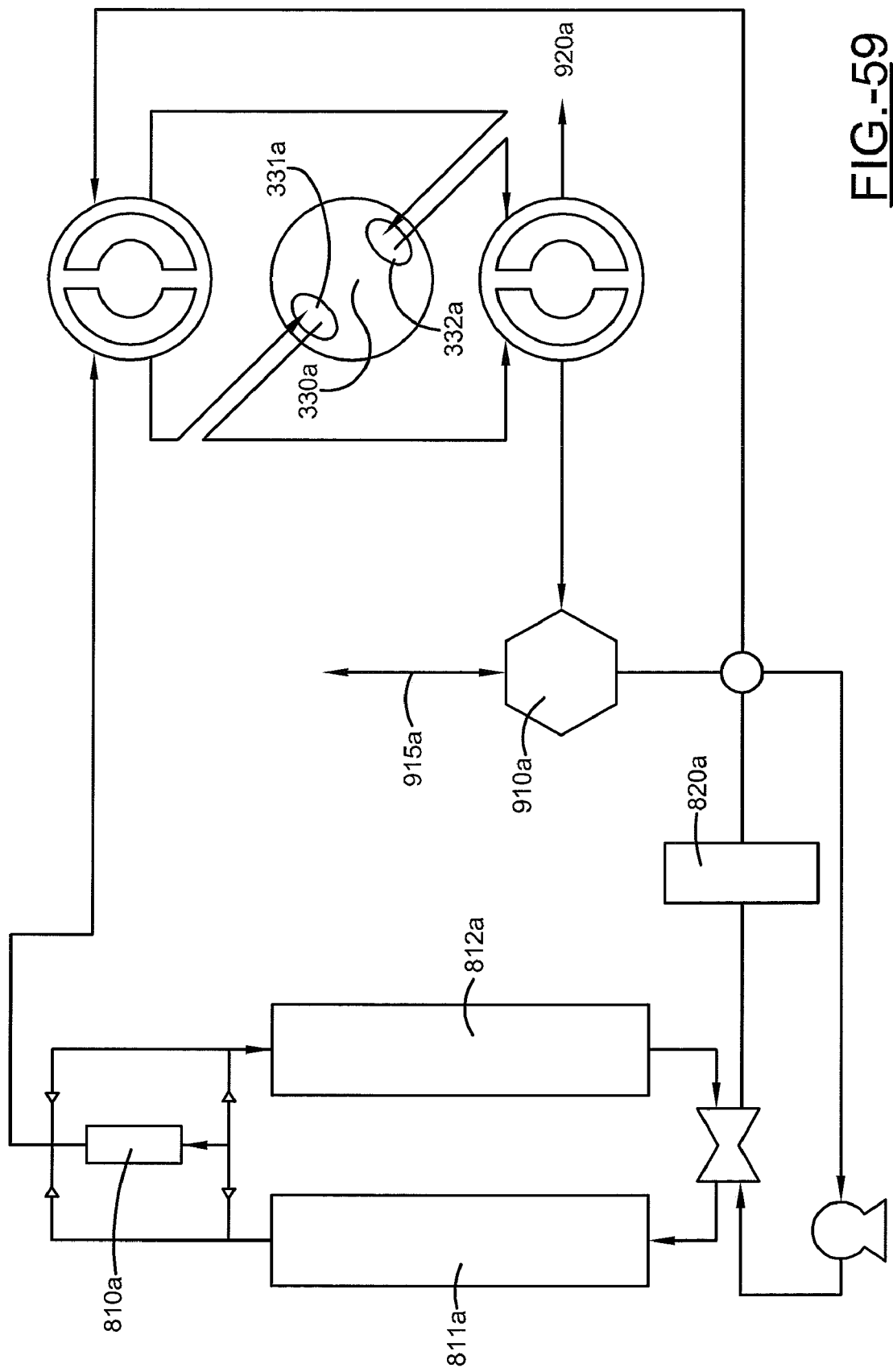

FIG. 59 depicts a novel rotary valve assembly with a first valve member (310a) with first aperture (311a) in communication with a dry source (810a) and second aperture (312a) in communication with a humid source (820a), a second valve member (320a) in a first position with a first aperture (321a) in communication with a control environment (910a) and a second aperture (322a) in communication with an ambient environment (920a), a third valve member (330a) in a second position with a first through aperture (331a) and a second through aperture (332a); communication of control environment (910a) with dry source (810a) by means of interconnection of first aperture (311a) of first valve member (310a), first aperture (321a) of second valve member (320a) and first through aperture (331a) of third valve member (330a); communication of ambient environment (920a) with humid source (820a) by means of interconnection of second aperture (312a) of first valve member (310a), second aperture (322a) of second valve member (320a) and second through aperture (332a) of third valve member (330a); wherein an adsorption system with a compressor (620a), a valve (813a), a first adsorption bed (811a) and second adsorption bed (812a), valve set (815a), an effluent as dry source (810a) and exhaust as humid source (820a). A vent (915a) to control environment provides for pressure equalization as necessary.

Figure 60:
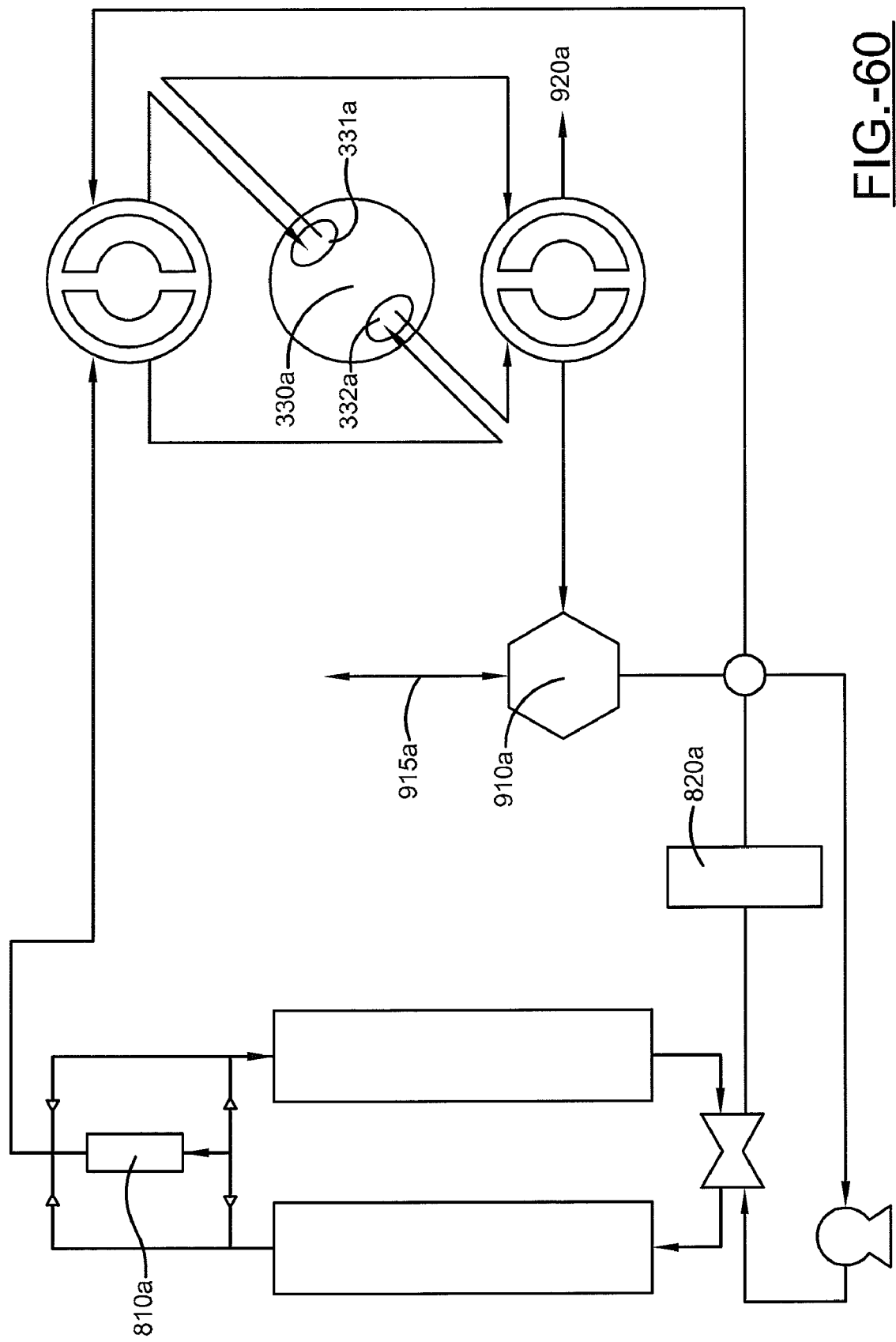

FIG. 60 depicts a novel rotary valve assembly with a first valve member (310a) with first aperture (311a) in communication with a dry source (810a) and second aperture (312a) in communication with a humid source (820a), a second valve member (320a) in a first position with a first aperture (321a) in communication with a control environment (910a) and a second aperture (322a) in communication with an ambient environment (920a), a third valve member (330a) in a third position with a first through aperture (331a) and a second through aperture (332a); communication of control environment (910a) with dry source (810a) by means of interconnection of first aperture (311a) of first valve member (310a), first aperture (321a) of second valve member (320a) and second through aperture (332a) of third valve member (330a); communication of ambient environment (920a) with humid source (820a) by means of interconnection of second aperture (312a) of first valve member (310a), second aperture (322a) of second valve member (320a) and first through aperture (331a) of third valve member (330a); wherein an adsorption system with a compressor (620a), a valve (813a), a first adsorption bed (811a) and second adsorption bed (812a), valve set (815a), an effluent as dry source (810a) and exhaust as humid source (820a). A vent (915a) to control environment provides for pressure equalization as necessary.

Figure 61:
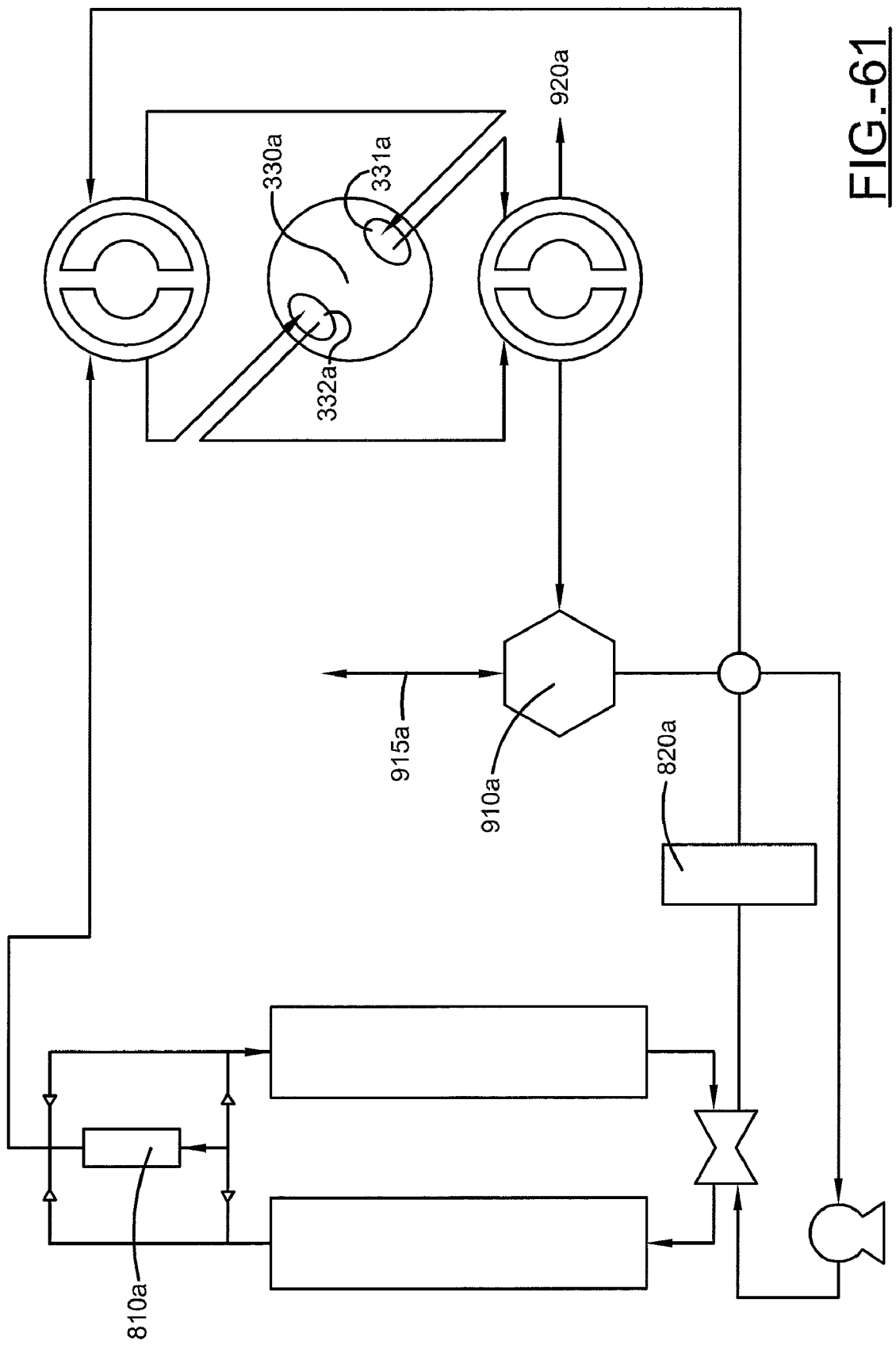

FIG. 61 depicts a novel rotary valve assembly with a first valve member (310a) with first aperture (311a) in communication with a dry source (810a) and second aperture (312a) in communication with a humid source (820a), a second valve member (320a) in a first position with a first aperture (321a) in communication with a control environment (910a) and a second aperture (322a) in communication with an ambient environment (920*a*), a third valve member (330*a*) in a fourth position with a first through aperture (331*a*) and a second through aperture (332*a*); communication of control environment (910*a*) with dry source (810*a*) by means of interconnection of first aperture (311*a*) of first valve member (310*a*), first aperture (321*a*) of second valve member (320*a*) and second through aperture (332*a*) of third valve member (330*a*); communication of ambient environment (920*a*) with humid source (820*a*) by means of interconnection of second aperture (312*a*) of first valve member (310*a*), second aperture (322*a*) of second valve member (320*a*) and first through aperture (331*a*) of third valve member (330*a*); wherein an adsorption system with a compressor (620*a*), a valve (813*a*), a first adsorption bed (811*a*) and second adsorption bed (812*a*), valve set (815*a*), an effluent as dry source (810*a*) and exhaust as humid source (820*a*). A vent (915*a*) to control environment provides for pressure equalization as necessary.

Figure 62:
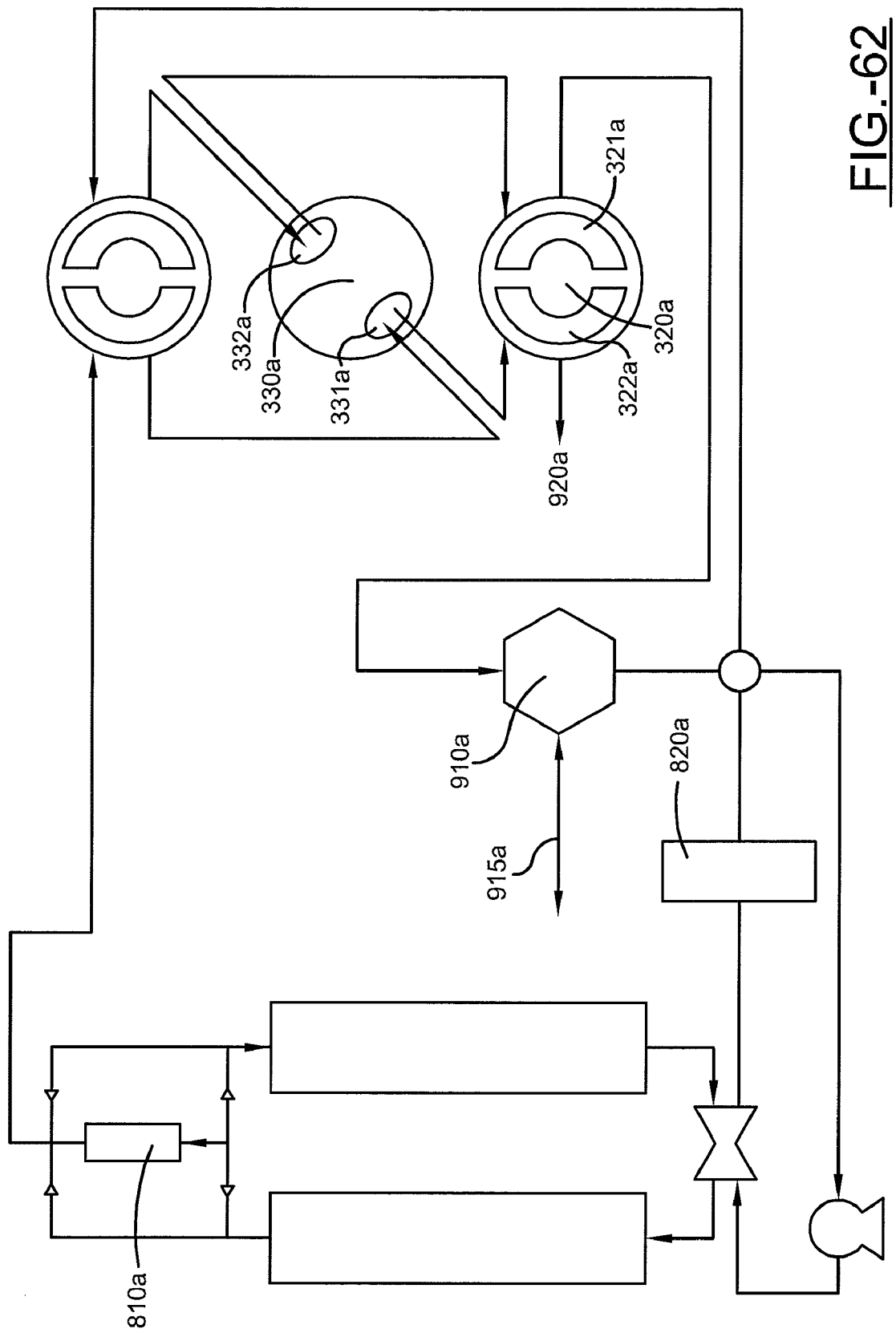

FIG. 62 depicts a novel rotary valve assembly with a first valve member (310*a*) with first aperture (311*a*) in communication with a dry source (810*a*) and second aperture (312*a*) in communication with a humid source (820*a*), a second valve member (320*a*) in a second position with a first aperture (321*a*) in communication with a control environment (910*a*) and a second aperture (322*a*) in communication with an ambient environment (920*a*), a third valve member (330*a*) in a first position with a first through aperture (331*a*) and a second through aperture (332*a*); communication of control environment (910*a*) with humid source (820*a*) by means of interconnection of second aperture (312*a*) of first valve member (310*a*), first aperture (321*a*) of second valve member (320*a*) and second through aperture (332*a*) of third valve member (330*a*); communication of ambient environment (920*a*) with dry source (810*a*) by means of interconnection of first aperture (311*a*) of first valve member (310*a*), second aperture (322*a*) of second valve member (320*a*) and first through aperture (331*a*) of third valve member (330*a*); wherein an adsorption system with a compressor (620*a*), a valve (813*a*), a first adsorption bed (811*a*) and second adsorption bed (812*a*), valve set (815*a*), an effluent as dry source (810*a*) and exhaust as humid source (820*a*). A vent (915*a*) to control environment provides for pressure equalization as necessary.

Figure 63:
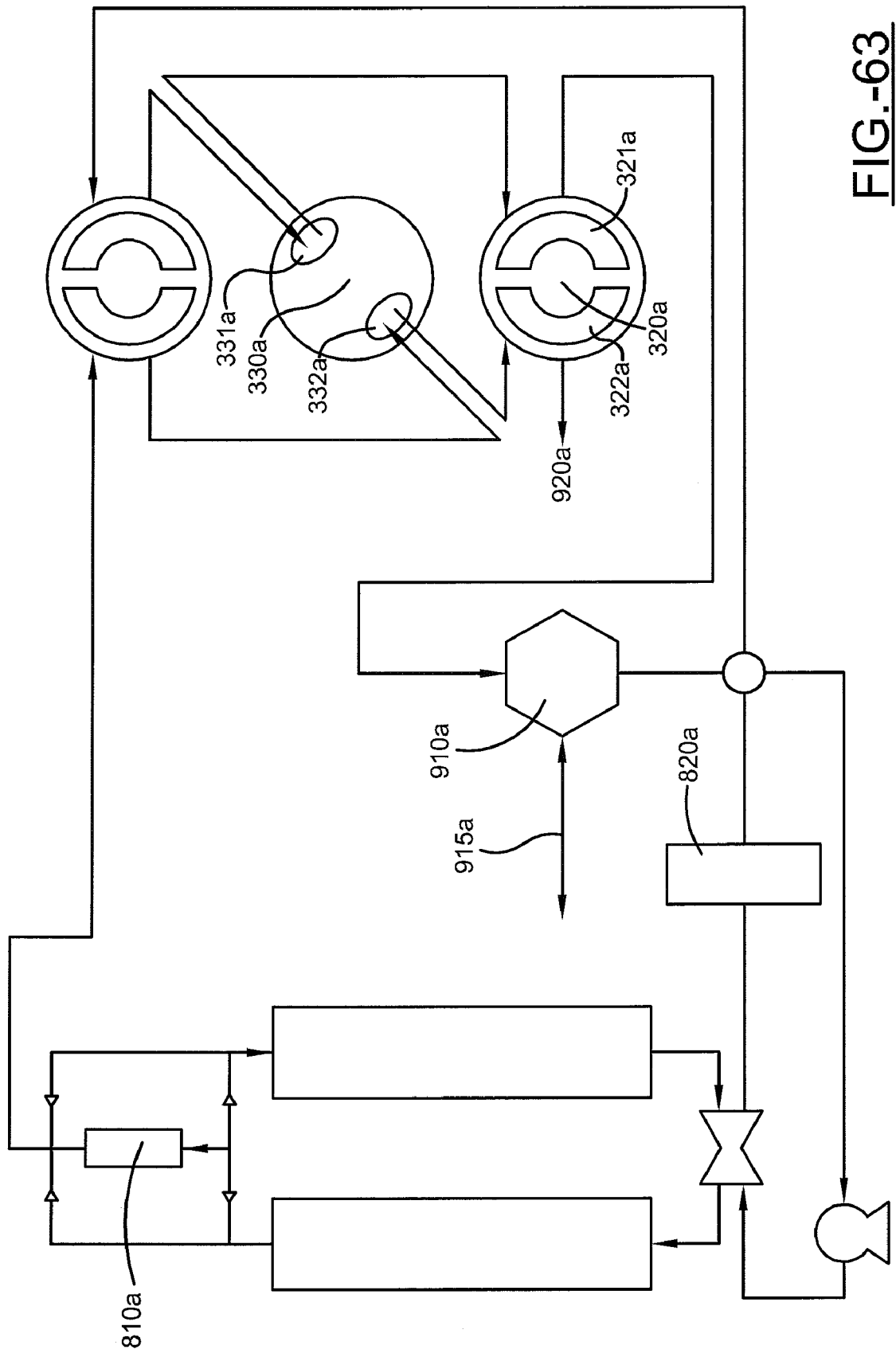

FIG. 63 depicts a novel rotary valve assembly with a first valve member (310*a*) with first aperture (311*a*) in communication with a dry source (810*a*) and second aperture (312*a*) in communication with a humid source (820*a*), a second valve member (320*a*) in a second position with a first aperture (321*a*) in communication with a control environment (910*a*) and a second aperture (322*a*) in communication with an ambient environment (920*a*), a third valve member (330*a*) in a second position with a first through aperture (331*a*) and a second through aperture (332*a*); communication of control environment (910*a*) with humid source (820*a*) by means of interconnection of second aperture (312*a*) of first valve member (310*a*), first aperture (321*a*) of second valve member (320*a*) and first through aperture (331*a*) of third valve member (330*a*); communication of ambient environment (920*a*) with dry source (810*a*) by means of interconnection of first aperture (311*a*) of first valve member (310*a*), second aperture (322*a*) of second valve member (320*a*) and second through aperture (332*a*) of third valve member (330*a*); wherein an adsorption system with a compressor (620*a*), a valve (813*a*), a first adsorption bed (811*a*) and second adsorption bed (812*a*), valve set (815*a*), an effluent as dry source (810*a*) and exhaust as humid source (820*a*). A vent (915*a*) to control environment provides for pressure equalization as necessary.

Figure 64:
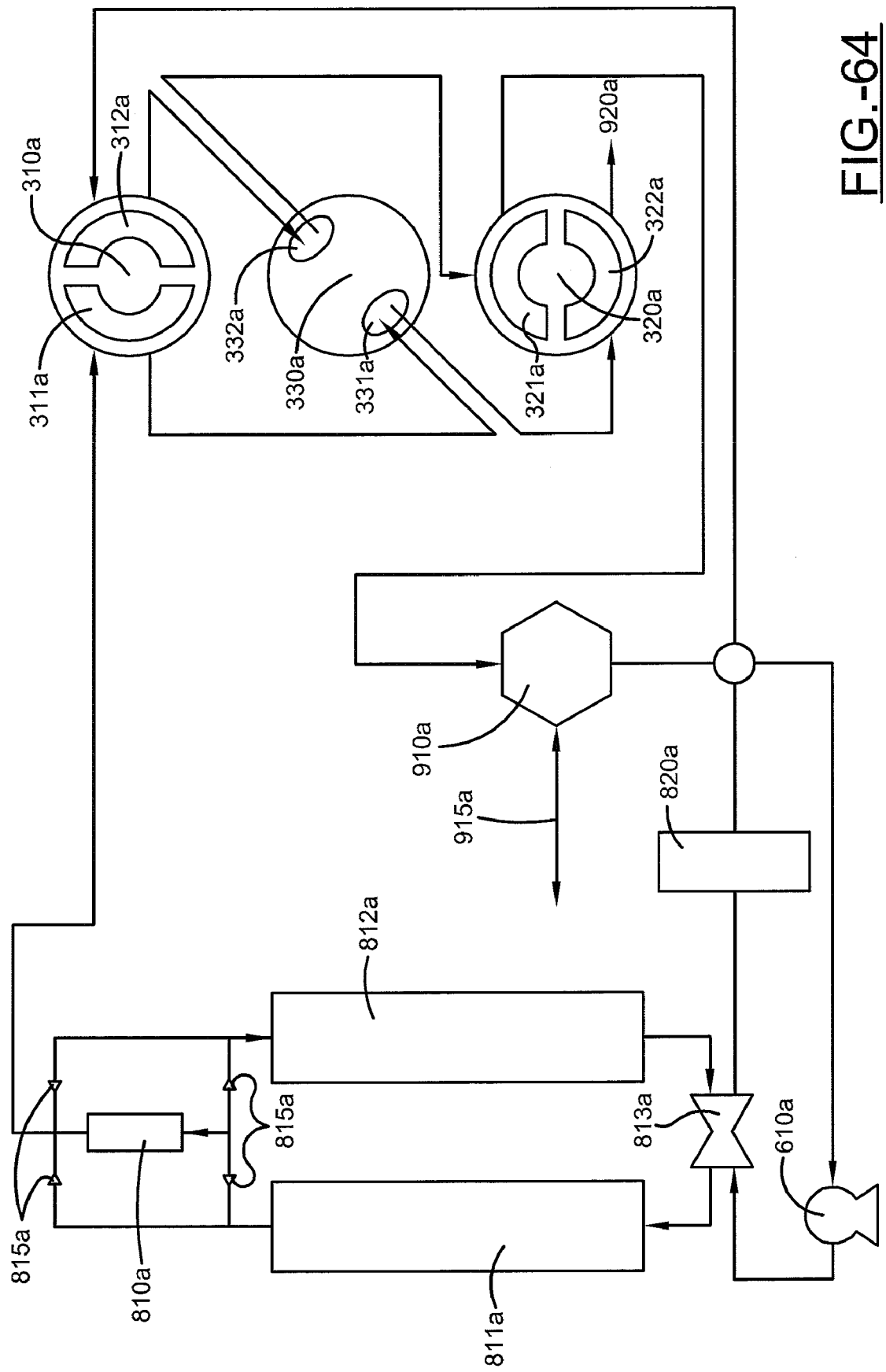

FIG. 64 depicts a novel rotary valve assembly with a first valve member (310*a*) with first aperture (311*a*) in communication with a dry source (810*a*) and second aperture (312*a*) in communication with a humid source (820*a*), a second valve member (320*a*) in a third position with a first aperture (321*a*) in communication with a control environment (910*a*) and a second aperture (322*a*) in communication with an ambient environment (920*a*), a third valve member (330*a*) in a first position with a first through aperture (331*a*) and a second through aperture (332*a*); communication of control environment (910*a*) with humid source (820*a*) by means of interconnection of second aperture (312*a*) of first valve member (310*a*), first aperture (321*a*) of second valve member (320*a*) and second through aperture (332*a*) of third valve member (330*a*); communication of ambient environment (920*a*) with dry source (810*a*) by means of interconnection of first aperture (311*a*) of first valve member (310*a*), second aperture (322*a*) of second valve member (320*a*) and first through aperture (331*a*) of third valve member (330*a*); wherein an adsorption system with a compressor (620*a*), a valve (813*a*), a first adsorption bed (811*a*) and second adsorption bed (812*a*), valve set (815*a*), an effluent as dry source (810*a*) and exhaust as humid source (820*a*). A vent (915*a*) to control environment provides for pressure equalization as necessary.

Figure 65:
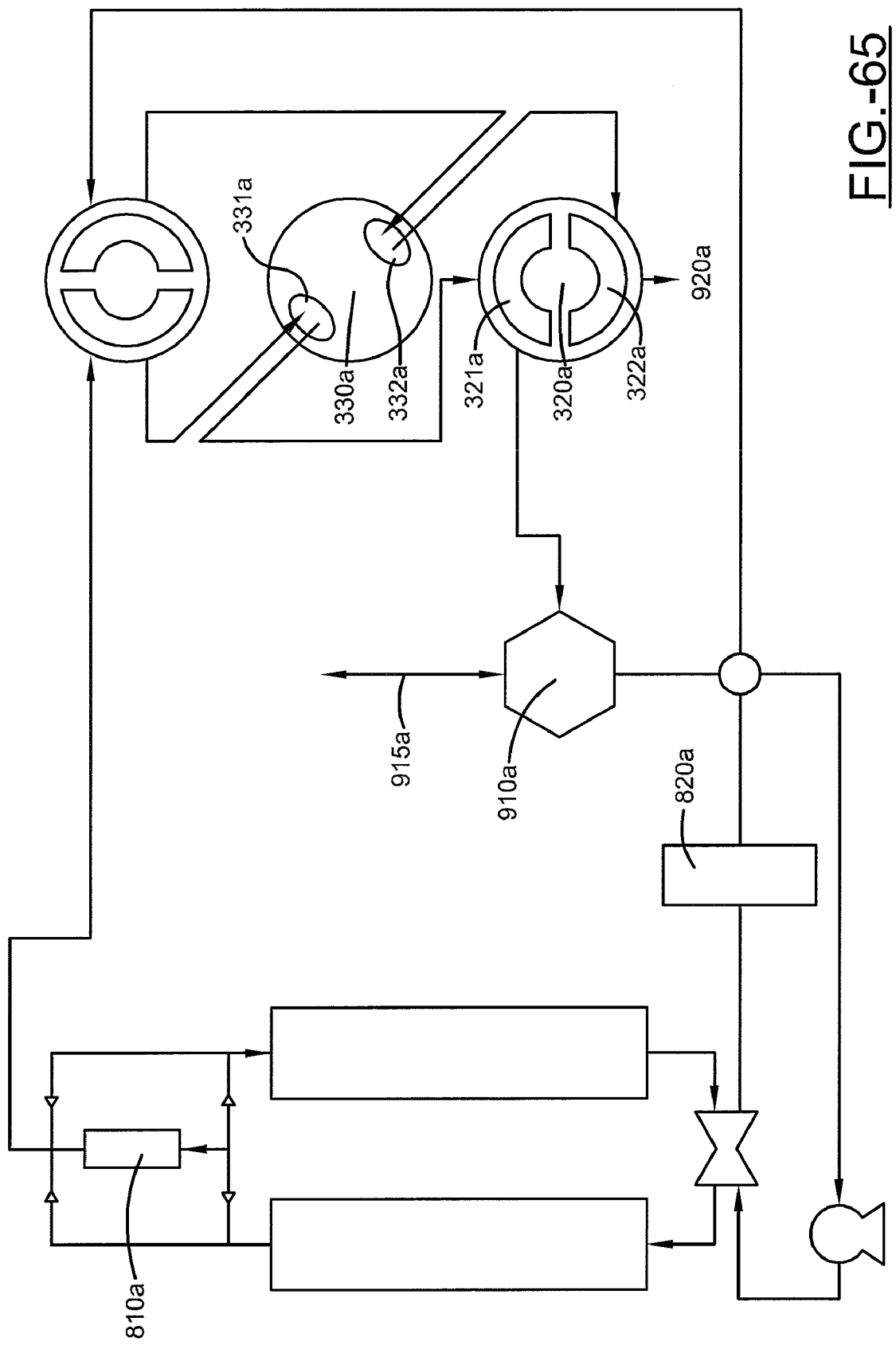

FIG. 65 depicts a novel rotary valve assembly with a first valve member (310*a*) with first aperture (311*a*) in communication with a dry source (810*a*) and second aperture (312*a*) in communication with a humid source (820*a*), a second valve member (320*a*) in a third position with a first aperture (321*a*) in communication with a control environment (910*a*) and a second aperture (322*a*) in communication with an ambient environment (920*a*), a third valve member (330*a*) in a second position with a first through aperture (331*a*) and a second through aperture (332*a*); communication of control environment (910*a*) with dry source (810*a*) by means of interconnection of first aperture (311*a*) of first valve member (310*a*), first aperture (321*a*) of second valve member (320*a*) and first through aperture (331*a*) of third valve member (330*a*); communication of ambient environment (920*a*) with humid source (820*a*) by means of interconnection of second aperture (312*a*) of first valve member (310*a*), second aperture (322*a*) of second valve member (320*a*) and first through aperture (331*a*) of third valve member (330*a*); wherein an adsorption system with a compressor (620*a*), a valve (813*a*), a first adsorption bed (811*a*) and second adsorption bed (812*a*), valve set (815*a*), an effluent as dry source (810*a*) and exhaust as humid source (820*a*). A vent (915*a*) to control environment provides for pressure equalization as necessary.

Figure 66:
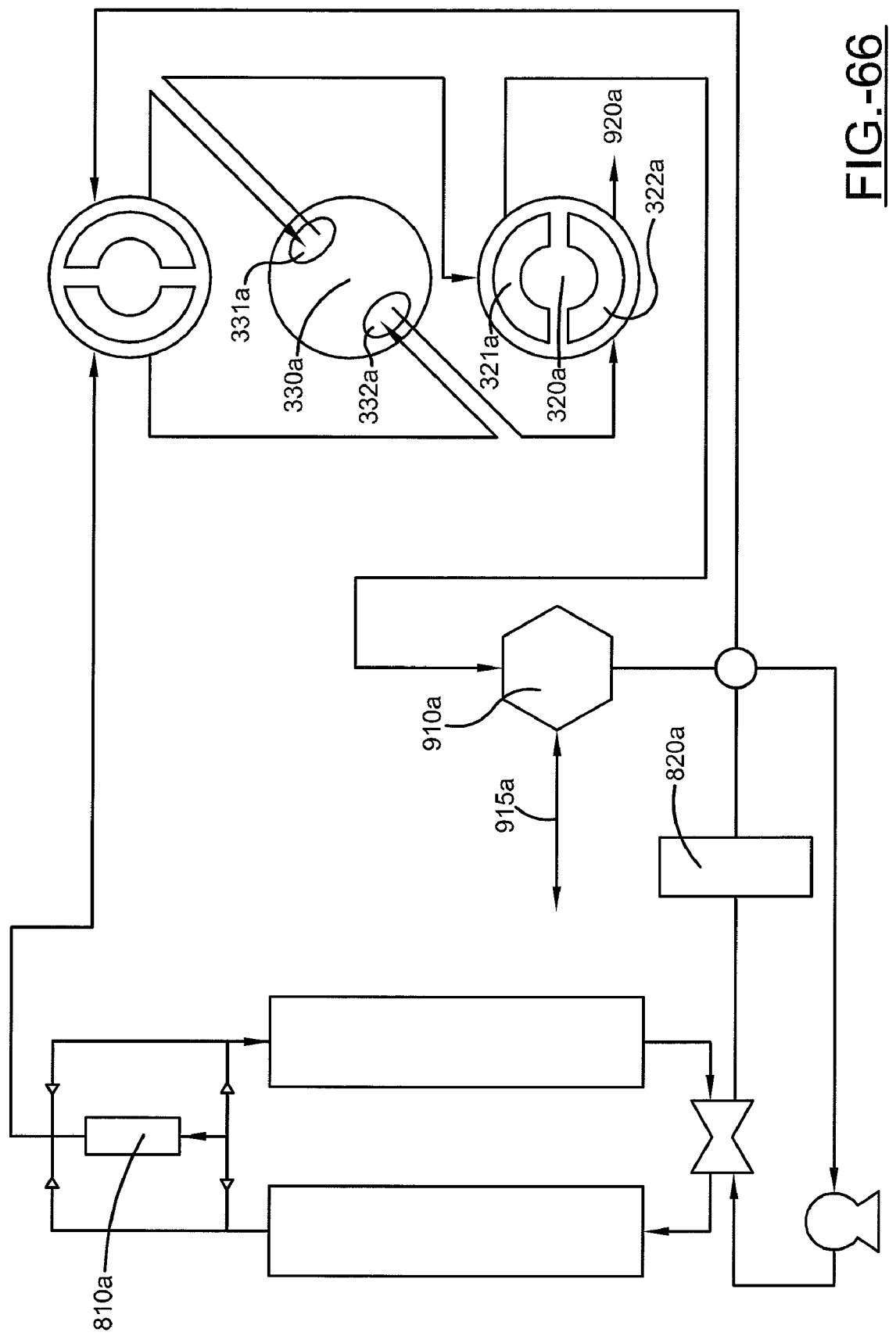

FIG. 66 depicts a novel rotary valve assembly with a first valve member (310*a*) with first aperture (311*a*) in communication with a dry source (810*a*) and second aperture (312*a*) in communication with a humid source (820*a*), a second valve member (320*a*) in a third position with a first aperture (321*a*) in communication with a control environment (910*a*) and a second aperture (322*a*) in communication with an ambient environment (920*a*), a third valve member (330*a*) in a third position with a first through aperture (331*a*) and a second through aperture (332*a*); communication of control environment (910*a*) with humid source (820*a*) by means of interconnection of second aperture (312*a*) of first valve member (310*a*), first aperture (321*a*) of second valve member (320*a*) and first through aperture (331*a*) of third valve member (330*a*); communication of ambient environment (920*a*) with dry source (810*a*) by means of interconnection of first aperture (311*a*) of first valve member (310*a*), second aperture (322*a*) of second valve member (320*a*) and second through aperture (332*a*) of third valve member (330*a*); wherein an adsorption system with a compressor (620a), a valve (813a), a first adsorption bed (811a) and second adsorption bed (812a), valve set (815a), an effluent as dry source (810a) and exhaust as humid source (820a). A vent (915a) to control environment provides for pressure equalization as necessary.

Figure 67:
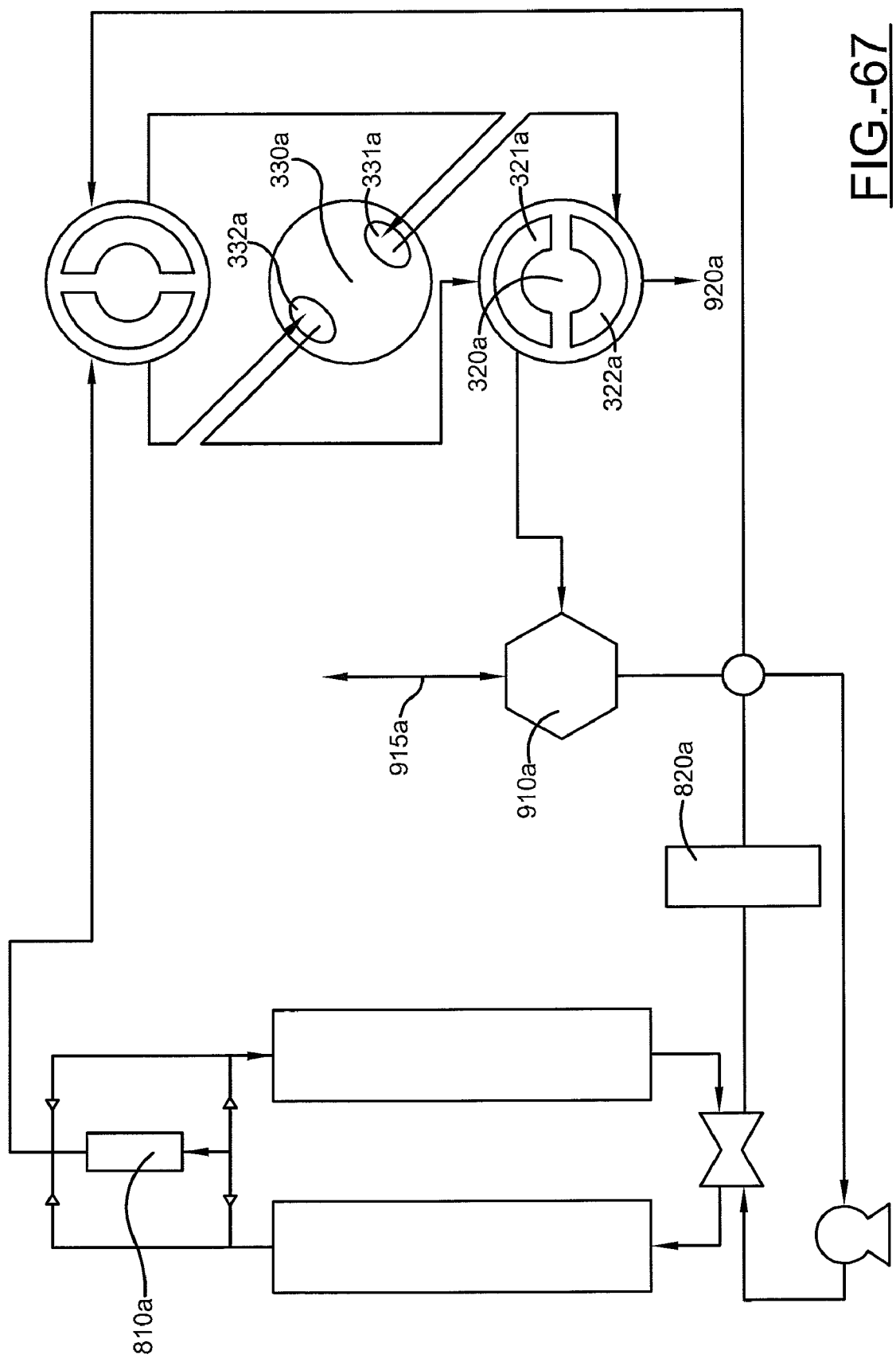

FIG. 67 depicts a novel rotary valve assembly with a first valve member (310a) with first aperture (311a) in communication with a dry source (810a) and second aperture (312a) in communication with a humid source (820a), a second valve member (320a) in a third position with a first aperture (321a) in communication with a control environment (910a) and a second aperture (322a) in communication with an ambient environment (920a), a third valve member (330a) in a fourth position with a first through aperture (331a) and a second through aperture (332a); communication of control environment (910a) with dry source (810a) by means of interconnection of first aperture (311a) of first valve member (310a), first aperture (321a) of second valve member (320a) and second through aperture (332a) of third valve member (330a); communication of ambient environment (920a) with humid source (820a) by means of interconnection of second aperture (312a) of first valve member (310a), second aperture (322a) of second valve member (320a) and second through aperture (332a) of third valve member (330a); wherein an adsorption system with a compressor (620a), a valve (813a), a first adsorption bed (811a) and second adsorption bed (812a), valve set (815a), an effluent as dry source (810a) and exhaust as humid source (820a). A vent (915a) to control environment provides for pressure equalization as necessary.

Oxygen Concentrator

The present invention further comprises the novel rotary valve included with a pressure swing adsorption system for gas separation and more particularly to air separation. For example, the rotary valve can be employed for use with a single adsorbent bed or two or more adsorbent beds in vacuum-pressure swing adsorption and pressure swing adsorption systems for the recovery of oxygen from air and use thereof in industry, healthcare, agriculture and aquaculture among others; use of nitrogen recovered from air for food preservation, explosion and fire retardancy among others; and moisture removal from natural gas or a control environment, separation of hydrogen from carbon dioxide in natural gas reformation and other applications.

The discussion herein will be generally directed toward air separation and oxygen concentration for the sake of brevity. However, those skilled in the art will readily appreciate technology described herein for other applications.

Air is a mixture of gases most generally described as nitrogen 78.084±0.004%, oxygen 20.946±0.002%, argon 0.934±0.001%, carbon dioxide 0.033±0.001% exclusive of water vapor. In general, an oxygen-argon mixture results from preferred selective removal of nitrogen, carbon dioxide and water vapor from air. Although air generally has nitrogen, oxygen, argon, carbon dioxide and water vapor as primary constituents, in a selective adsorption process air is a binary mixture of more absorbable components, i.e., nitrogen, carbon dioxide and water vapor and less absorbable components, i.e., oxygen-argon. As a result the oxygen-argon ratio changes after removal of nitrogen and other components from 20.946% and 0.934% to 95.731% and 4.269% respectively. The nitrogen rich gas is 99.958% pure and 100% inert. The oxygen-rich fraction varies with system design and performance optimization.

Although the discussion to follow is specific to oxygen separation from air for the sake of brevity, those skilled in the art will readily realize other applications for separations from liquid or gas such as industrial or agricultural oxygen, moisture removal from natural gas or hydrogen separation from reformed carbon dioxide.

The product gas generally considered as oxygen is actually a binary mixture of oxygen and argon with up to about 95% oxygen purity. The system has a product tank to store produced oxygen-argon mixture and generally deliver between 0 and 6 liters per minute for patient use. A gas pressure regulator maintains output of five pounds per square inch nominal pressure. The adsorbent bed and product tank pressure ranges between 10 and 22 pounds per square inch nominal with adsorbent bed pressurization time of 8 to 30 seconds. Adsorbent bed(s) vent to atmosphere and require(s) from approximately one-half to one pound of adsorbent, typically five angstrom (5 Å) zeolite per liter per minute oxygen at 95% purity. In general the adsorbent requirement decrease with number of adsorbent beds operating sequentially in parallel.

As an adsorbent bed depressurizes a portion of the product gas flows back and displaces residual nitrogen-rich gas by occupying void space within the adsorbent bed with the remaining product gas flowing to a patient. In the event that patient demand exceeds purge gas requirement, the patient receives preferred flow albeit at lower oxygen concentration. The purge gas requirement can vary from a fraction to a multiple of patient flowrate depending on system design.

Control is generally open-loop feedback, i.e., the output variable oxygen content is not generally the feedback parameter, but rather product tank or adsorbent bed pressure or pressurization time. A pressure based control system discharges the nitrogen rich gas at a fixed pressure, e.g., 20 to 22 pounds per square inch gauge pressure. The rate of pressure increase from a lower pressure to a higher pressure depends on patient flowrate, compressor output, filter occlusion, altitude, leaks among other factors. Electronic controls provide defaults to begin desorption of adsorbent beds in the event of failure to reach a pressure setpoint after a pre-determined time period. Such failures may result from excessive patient flowrate, reduced compressor output, filter occlusion, high altitude or system leaks among other causes. Pressure based design requires a pressure sensor, electronic circuitry and means to actuate a valve or valves.

Time based control systems alternate from pressurization to depressurization of bed(s) at a preset time regardless of product tank or adsorbent bed pressure, generally 8 to 30 seconds. Time based control although simpler does not account for variables affecting adsorbent bed pressurization rate, e.g., compressor output, filter occlusion, patient flowrate, altitude among other variables. As a result time based control systems may need extra capacity to anticipate such variables else oxygen content may decrease as a result. Insufficient adsorbent bed pressure may result in poor adsorbent regeneration and low oxygen concentration and excess pressurize may result in nitrogen break-through, i.e., nitrogen contamination of product oxygen and low oxygen concentration. Time based control may be mechanical by means of electric motor and gear reduction or electronically actuated valves. A disadvantage of mechanical control timing systems is an inability to compensate for differences in process step times, e.g., variation in individual adsorbent bed performance or unequal and variable pressurization and depressurization times.

A closed-loop feedback alternates pressurization and depressurization based upon oxygen concentration. One difficulty in a closed-loop feedback control is sensor lag time in determining oxygen purity. Closed-loop feed back control systems require sophisticated electronic circuitry.

Oxygen separation in VPSA and PSA systems is batchwise, i.e. adsorbent bed produces oxygen-rich gas and then goes offline for regeneration, i.e., does not produce oxygen during regeneration. In practice a VPSA and PSA system requires only one adsorbent bed. With a single bed a sufficient amount of air for maximum product flow must be compressed in one cycle resulting in a large compressor, high power consumption, saw-tooth variation in both product tank pressure and output flowrate. However, advantages of a single bed system are simple design and low component cost.

Two adsorbent beds operating in parallel have alternate pressure and discharge cycles and require compression of only one-half the total air requirement for maximum patient flow. As a result compressor load is half that of a single adsorbent bed system. A three adsorbent bed system would theoretically cut a compressor load by one third and so on. Whiles advantages of multi-adsorbent bed systems include smaller compressors, less power and generally less adsorbent media the disadvantages include cost and complexity of redundant components.

The multiple adsorbent bed system includes a plurality of parallel groupings of adsorbent beds sequentially processed to effect an almost continuous cycle of pressurization, pressure stabilization, depressurization and purge. Such systems provide flow of product gas with very little pressure fluctuation and can eliminate a need for output pressure regulation.

The PSA system, in general, requires three steps: (1) Charge: Compressed air is introduced into an adsorbent bed for nitrogen removal from the gas stream, (2) Discharge: The bed pressure is rapidly released and nitrogen breaks a weak bond with the adsorbent media and flows out of the system and (3) Purge: Product gas flow back into a discharging adsorbent bed and displaces nitrogen-rich void gas. Sudden pressure change governs efficiency of discharge, i.e., greater pressure change in shorter time breaks more weak bonds between nitrogen molecules and adsorbent media.

In the PSA system, depressurization and concurrent or concurrent purge flows are simultaneous with discharge to atmospheric pressure or some intermediate pressure. The vacuum swing adsorption ("VSA") system can operate entirely at subatmospheric pressure to reduce the amount of work required to compress air. In the VSA system a pump evacuates an adsorbent bed and low pressure purge gas and atmospheric pressure air recharges the adsorbent bed. A blower provides low pressure product gas for use downstream. The VPSA system provides pressurized air to the bed directly from atmosphere or a low pressure feed blower then vent to atmospheric pressure and evacuate to low pressure by vacuum pump. The vacuum-pressure swing adsorption ("VPSA") system operates at superatmosheric pressure, i.e., above atmospheric pressure and evacuate adsorbent bed with a vacuum pump or compressor inlet. Some embodiments of the VPSA system repressurize directly from a compressor air while others a initially repressurize with atmospheric pressure and follow with compressed air and thereby reduce compressor load. In descriptions provided herein, PSA and VSA systems are equivalent, the only difference being the absolute pressure relative to atmospheric.

According to the present invention, a unique rotary valve assembly is provided, combined with a nominal pressure fluid, a high pressure fluid and a low pressure fluid wherein adjustable valve members provide a means to vary process step times, i.e., pressurization and depressurization and a rotary member provides a means to vary overall process cycle time. The novel rotary valve assembly is versatile and applicable to VPSA, PSA or VSA systems with a single adsorbent bed or pair of adsorbent beds. Simple positional adjustment provides variable alignment of through apertures of a first valve member and a second valve member and thereby enable variable process step times as part of a process cycle. The overall cycle time is variable e by means of adjustable speed control of a third rotary valve member.

For example, in a single adsorbent bed system pressurization may require more time than depressurization as a result of compressor output, filter occlusion, altitude among other factors. Likewise in a paired adsorbent bed system variations in adsorbent bed performance may be offset by providing different pressurization times for each adsorbent bed. Such adjustment may be made manually as a factory setting, service center or field maintenance or in situ as part of a closed-loop feedback provides a variable process step time and means of process optimization. Moreover, process cycle time becomes adjustable by means of variable speed rotation of a rotary valve member. Either simple manual adjustment or sophisticated closed-loop feedback provides a variable process cycle time and means of process optimization.

The novel variable process step time provides for simple continuous forward rotary drive means and a factory preset process step time or periodic service center or field adjustment or a more sophisticated approach with continuous rotation of one valve member and intermittent adjustment by a second rotary valve member by means of a closed-loop feed back provides a means of production optimization for single or paired adsorbent bed PSA or VPSA systems. The novel rotary valve assembly is readily adaptable to variable process cycle time by means of variable speed valve member rotation and closed loop feedback of adsorbent bed pressure.

The communication time for each conduit, i.e., ambient air, higher pressure air, lower pressure air, and adsorbent bed(s) depends upon the angular distance of each through aperture in first valve member, second valve member and third valve member and the relative angular speed of the third valve member to the first valve member and second valve member. A preferred embodiment for an adsorptive separation process provides two equal size apertures in a first valve member and second valve member.

The through apertures of the third valve member equal in size and slightly greater in length than the distance between apertures in the first valve member and second valve member provide momentary interconnection of apertures of first valve member or apertures of second valve member. Momentary interconnection of apertures of a valve member avoids compressor outlet dead-head or compressor inlet starvation resulting from respective disconnection of an adsorbent bed or ambient air during transition from one through apertures to another and as a result partially unloads a compressor and reduces power consumption. Transition from first apertures to second apertures of first valve member and transition for first aperture to second aperture of second valve member by means of interconnection of first through aperture and second through aperture of third valve member is simultaneous but gradual and avoids detrimental effects of instantaneous pressure changes on system and component performance e.g. noise, vibration, component wear, system reliability and useful life.

Rotational speed of third valve member defines a process cycle time. Each aperture of first valve member interconnects with each aperture of second valve member by means of rotary through aperture of third valve member. Process cycle time is generally constant but may require adjustment from time to time to account from changes in compressor output. Factors affecting compressor output include seal wear, altitude, filter occlusion and valve friction. One advantage of a variable speed electric motor is an ability to easily adjust rotational speed. Speed variations arise from mechanical gear ratios or electric voltage, current and/or frequency. Alternate means of variable speed drives include pneumatic power among others.

Continuous constant speed rotary motion of third valve facilitates low cost electric motor operation with a time control. However, various through aperture size combinations along with variable and intermittent rotary speed may provide optimal performance in some configurations, conditions and/or control means. Rotation of the third valve member may be in forward or reverse direction, continuous or intermittent with constant or variable speed depending on the communication desired for each conduit.

The process cycle is independent of direction of rotation and as a result a third valve member may rotate clockwise or counterclockwise. Contrarily, process step time is dependent of direction of rotation for positional adjustment provided a 180° relative rotation limit. Interconnection time of through apertures of first valve member and second valve member depends on rotational speed of a third member.

A simple embodiment provides a low cost variable or constants speed electric motor and a drive mechanism for a third valve member to control process cycle time. Whereas a more sophisticated embodiment provides a feedback and varies rotational speed accordingly to optimize process cycle time.

Relative rotational position of first valve member to second valve member provide means to adjust process step time. A simple embodiment provides manual adjustment by means of mechanical fastener or detent mechanism and a more sophisticated embodiment provides automatic adjustment by means of a feedback and secondary drive mechanism to rotate first valve member relative to second valve member and optimize process step time.

Conduit attachments to a first valve member and a second valve member are by means of standard fluid fittings, connectors and seals. First valve member and second valve member are generally stationary with consideration of maximum 180° relative rotation of any combination of first valve member or second valve member or both as necessary for unique process step time adjustments. A preferred embodiment in a single adsorbent bed system provides relative rotation of a valve member with conduits to adsorbent bed and ambient air or individually to paired adsorbent beds and a stationary valve member with conduits to a compressor inlet and compressor outlet. Likewise another preferred embodiment for a paired adsorbent bed system is relative rotation of a valve member with conduits to adsorbent beds and a stationary valve member with conduits to a first compressor inlet and a second compressor outlet or a compressor outlet and ambient air.

A surge vessel provides both a buffer for sudden pressure changes and reservoir for low purity product gas used in purge. A purge vessel provides sufficient volume product purity gas for cleansing the void volume of the adsorbent bed. The product vessel maintains product purity gas for further use and check valve between product vessel and purge vessel reduces product gas loss during adsorbent bed evacuation.

In another embodiment the intake port connects to a conduit wherein a "T" fitting and two check valves provide preferential flow from a filter for feed air and exhaust muffler for discharge gas. These two elements are separate so that exhaust does not re-enter the feed stream and preferable in a single adsorbent bed VPSA system wherein a single aperture provides communication for both intake and exhaust. A single or paired adsorbent bed PSA and paired bed VPSA provide separate conduits for intake and exhaust and reduce potential for reintroduction of processed fluid.

A preferred embodiment of novel rotary valve assembly provides easy connection to compressor inlet and outlet, ambient air and adsorbent bed. First and second valve member are relatively stationary insofar as movement is limited to 0° to 180° angular degrees for unique adjustments to optimize performance. Communication to compressor, air and adsorbent bed is by means of standard fittings, tubing, connectors and the like. A rotary third valve member axially between first and second valve member provides interconnections between conduits of first valve member and conduits of second valve member.

In one embodiment of a single bed VPSA system a utility of this novel rotary valve assembly is an ability to alternate a simultaneous change of compressor inlet to compressor outlet and air intake to adsorbent bed exhaust by means of continuous forward rotation and provide gradual transition between process step of pressurization and depressurization while avoiding compressor output dead-head or inlet starvation.

In another embodiment of a single bed PSA system a utility of this novel rotary valve assembly is direction of a compressor outlet to adsorbent and compressor inlet to air intake during pressurization and alternately redirects compressor outlet to ambient air during depressurization and thereby unloads compressor and reduces power consumption.

In another embodiment of a pair bed VPSA system the novel rotary valve described herein combines with a twin-head Wobble Piston compressor to provide adjustment of pressurization time of each adsorbent bed to compensate for variable adsorbent bed performance and depressurizes to vacuum pressure. In such a configuration one compressor chamber as a compressive element and a second chamber as a vacuum element. Similarly, separate pressure and vacuums sources may connect to first valve member. The intake air and exhaust gas conduits remain constant and do not alternately switch as in a single bed system.

In yet another advantage of the novel rotary valve assembly in combination with a system is an ability to reduce power requirements. By flowing pressurized gas into a compressor inlet with compressor outlet at atmospheric pressure energy the system recovers energy from previous compressive work on the evacuation step. Likewise, flowing atmospheric pressure air into an evacuated adsorbent bed provides for expansion work and electric motor power reductions. Similarly in a twin cylinder embodiment both compressive and expansive energy recovery are simultaneous and work on the other cylinder, i.e., compressive work imparted to compressor and expansive work imparted to vacuum pump.

In another embodiment a paired bed PSA system the novel rotary valve described herein provides adjustment of pressurization time of each adsorbent bed to compensate for variable adsorbent bed performance and depressurizes to atmospheric pressure. This unique and novel rotary valve assembly described herein provides a means to adjust process step time between nearly 100% pressurization and nearly 0% depressurization to the converse of nearly 0% pressurization and nearly 100% depressurization without need for expensive electronic circuitry. In yet another embodiment of a novel rotary valve assembly described herein two adsorbent bed attach to second valve member. As such the fist valve member and second valve member may be offset by 90° angular degrees so that each adsorbent bed has equal pressurization and evacuation time or otherwise to compensate for individual performance of each bed. As in a single bed system, adjustment of the second valve member aperture offset may be accomplished manually at factory, service center or in field or automatically with closed loop feed back of product gas concentration.

The novel rotary valve system described herein provides use void space gas for initial pressurization of adsorbent bed(s) and thereby increases the overall adsorption efficiency and decreases the size of a system by means of a purge vessel and a surge vessel(s). Surge vessels provide additional system volume for (1) a filter to capture particulates from air source that tend to occlude flow and damage valve components, (2) a sound muffler wherein a sudden changes form a small volume to a large volume dampens sound pressure energy waves, and (3) a heat exchanger wherein additional surface area expels heat of compression in pressurized gas.

Strategic placement of surge vessel includes surrounding rotary valve assembly, i.e., filter vessel for incoming feed fluid between fluid source and valve assembly, between compressor inlet and valve assembly, between compressor outlet and valve assembly and between adsorbent bed and valve assembly.

The novel rotary valve described herein combines a need for variable process cycle time and variable process step time in an integral assembly for use with PSA or VPSA systems of single or paired adsorbent beds and thereby provides a means for process optimization of any such system.

Yet another advantage of the novel rotary valve assembly in combination with such a system is the ability to reduce power requirements compared to existing technology. By flowing pressurized gas into a compressor inlet with compressor outlet at atmospheric pressure energy the system recovers energy from previous compressive work on the evacuation step. Likewise, flowing atmospheric pressure air into an evacuated adsorbent bed provides for expansion work and electric motor power reductions. Similarly in a twin cylinder embodiment both compressive and expansive energy recovery are simultaneous and work on the other cylinder, i.e., compressive work imparted to compressor and expansive work imparted to vacuum pump.

FIG. 68 depicts an explode schematic view of a novel rotary valve assembly with a single bed vacuum-pressure swing adsorption system.

Figure 68B:
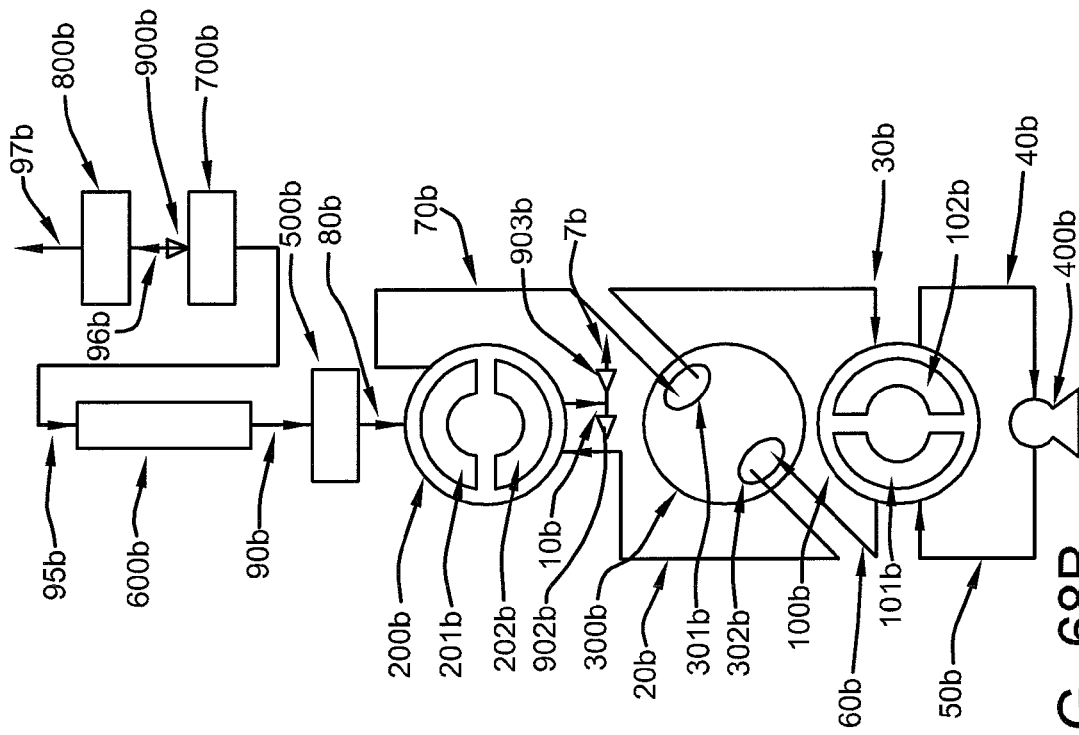
FIG. 68B is an exploded view of an embodiment of a single adsorbent bed vacuum-pressure swing adsorption system for oxygen concentration with a depressurization process step and a rotary valve adjusted for equal pressurization and depressurization steps.
Figure 68A:
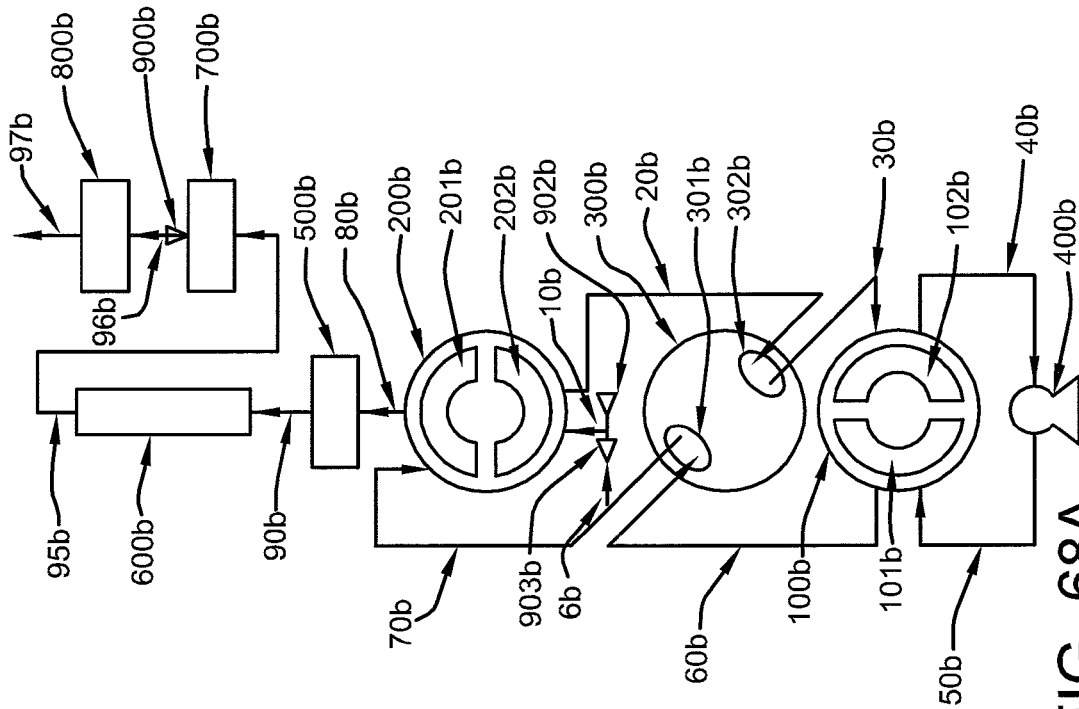
FIG. 68A is an exploded view of an embodiment of a single adsorbent bed vacuum-pressure swing adsorption system for oxygen concentration with a pressurization process step and a rotary valve adjusted for equal pressurization and depressurization steps.

FIG. 68A depicts a single bed vacuum-pressure swing adsorption process in a pressurization process step as follows: a first valve member (100*b*) with a first through aperture (101*b*) and a second through aperture (102*b*), a second valve member (200*b*) with a first through aperture (201*b*) and a second through aperture (202*b*), and a third valve member (300*b*) with a first through aperture (301) and a second through aperture (302*b*); a first flow passage interconnection (60*b*) between first through aperture (101*b*) of first valve member (100*b*) and first through aperture (301*b*) of third valve member (300*b*), a second flow passage interconnection (70*b*) between first through aperture (301*b*) of third valve member (300*b*) and first through aperture (201*b*) of second valve member (200*b*), a third flow passage interconnection (20*b*), between second through aperture (202*b*) of second valve member (200*b*) and second through aperture (302*b*) of third valve member (302*b*) and a fourth flow passage interconnection (30*b*) between second through aperture (302*b*) of third valve member (300*b*) and second through aperture (102*b*) of first valve member (100*b*); a nominal pressure fluid source, e.g., ambient air, a means to alter the pressure of the fluid (400*b*), e.g., compressor with an inlet and outlet wherein inlet maintains a pressure lower than nominal source fluid pressure and outlet maintains a pressure higher than inlet pressure, a conduit (6*b*) acting as an intake, a check valve (902*b*) and a conduit (10*b*) connecting first aperture (201*b*) of second valve member (200*b*) with a nominal pressure fluid source, a conduit (40*b*) connecting second through aperture (102*b*) of first valve member (100*b*) to compressor inlet, a conduit (50*b*) connecting first through aperture (10*b*) of first valve member (100*b*) to compressor outlet, a surge vessel (500*b*), a conduit (80*b*) connecting first through aperture (201*b*) of second valve member (200*b*) to a surge vessel (500*b*), an adsorbent bed (600*b*) with an inlet and an outlet including an adsorbent media capable of selectively adsorbing components of a fluid mixture, a conduit (90*b*) connection surge vessel (500*b*) to adsorbent bed (600*b*) inlet, a product vessel (800*b*) with capable of storing product with an inlet and outlet, a conduit (95*b*) connecting said outlet of adsorbent bed (600*b*) to inlet of purge vessel (700*b*), a one-way flow valve (900*b*), a conduit (96) with one-way flow valve (900*b*) connecting purge vessel (700*b*) to a product vessel (800*b*) and a conduit (97*b*) connecting a outlet of product vessel (700*b*) to intended use of product.

FIG. 68B depicts a single bed vacuum-pressure swing adsorption process in a depressurization process step as follows: a first valve member (100*b*) with a first through aperture (101*b*) and a second through aperture (102*b*), a second valve member (200*b*) with a first through aperture (201*b*) and a second through aperture (202*b*), and a third valve member (300*b*) with a first through aperture (301*b*) and a second through aperture (302*b*); a first flow passage interconnection (60*b*) between first through aperture (101*b*) of first valve member (100*b*) and second through aperture (302*b*) of third valve member (300*b*), a second flow passage interconnection (20*b*) between second through aperture (302*b*) of third valve member (300*b*) and second through aperture (202*b*) of second valve member (200*b*), a third flow passage interconnection (70*b*), between first through aperture (201*b*) of second valve member (200*b*) and first through aperture of third valve member (301*b*) and a fourth flow passage interconnection (30*b*) between first through aperture (301*b*) of third valve member (300*b*) and second through aperture (102*b*) of first valve member (10*b*); a nominal pressure fluid source, e.g., ambient air, a means to alter the pressure of the fluid (400*b*), e.g., compressor with an inlet and outlet wherein inlet maintains a pressure lower than nominal source fluid pressure and outlet maintains a pressure higher than inlet pressure, a conduit (7*b*) acting as an exhaust, a check valve (903*b*) and a conduit (10*b*) connecting second aperture (201*b*) of second valve member (200*b*) to a nominal pressure fluid source, a conduit (40*b*) connecting second through aperture (102*b*) of first valve member (100*b*) to compressor inlet, a conduit (50*b*) connecting first through aperture (101*b*) of first valve member (100*b*) to compressor outlet, a surge vessel (500*b*), a conduit (80*b*) connecting first through aperture (201*b*) of second valve member (200*b*) to a surge vessel (500*b*), an adsorbent bed (600*b*) with an inlet and an outlet including an adsorbent media capable of selectively adsorbing components of a fluid mixture, a conduit (90*b*) connection surge vessel (500*b*) to adsorbent bed (600*b*) inlet, a product vessel (800*b*) with capable of storing product with an inlet and outlet, a conduit (95*b*) connecting said outlet of adsorbent bed (600*b*) to inlet of purge vessel (700*b*), a one-way flow valve (900*b*), a conduit (96*b*) with one-way flow valve (900*b*) connecting purge vessel (700*b*) to a product vessel (800*b*) and a conduit (97) connecting a outlet of product vessel (700*b*) to intended use of product.

FIG. 69 depicts an explode schematic view of a novel rotary valve assembly with a single bed pressure swing adsorption system.

FIG. 69A depicts an explode schematic view of a novel rotary valve assembly with a single bed pressure swing adsorption system is a pressurization process step as follows: a first valve member (100b) with a first through aperture (101b) and a second through aperture (102b), a second valve member (200b) with a first through aperture (201b) and a second through aperture (202b), and a third valve member (300b) with a first through aperture (301b) and a second through aperture (302b); a first flow passage interconnection (60b) between first through aperture (10b) of first valve member (100b) and first through aperture (301b) of third valve member (300b), a second flow passage interconnection (70b) between first through aperture (301b) of third valve member (300b) and first through aperture (201b) of second valve member (200b); a nominal pressure fluid source, e.g., ambient air, a means to alter the pressure of the fluid (400b), e.g., compressor with an inlet and outlet wherein inlet maintains a pressure lower than nominal source fluid pressure and outlet maintains a pressure higher than inlet pressure, a conduit (40b) acting a as a intake and connecting first aperture (101b) of first valve member (100b) to nominal pressure fluid source to compressor inlet, a second (50b) connecting first through aperture (101b) of first valve member (100b) to compressor inlet, a surge vessel (500b), a conduit (80b) connecting first through aperture (201b) of second valve member (200b) to a surge vessel (500b), an adsorbent bed (600b) with an inlet and an outlet including an adsorbent media capable of selectively adsorbing components of a fluid mixture, a conduit (90b) connection surge vessel (500b) to adsorbent bed (600b) inlet, a product vessel (800b) with capable of storing product with an inlet and outlet, a conduit (95b) connecting said outlet of adsorbent bed (600b) to inlet of purge vessel (700b), a one-way flow valve (900b), a conduit (96b) with one-way flow valve (900b) connecting purge vessel (700b) to a product vessel (800b) and a conduit (97) connecting a outlet of product vessel (700b) to intended use of product.

FIG. 69B depicts a single bed pressure swing adsorption process in a depressurization process step as follows: a first valve member (100b) with a first through aperture (101b) and a second through aperture (102b), a second valve member (200b) with a first through aperture (201b) and a second through aperture (202b), and a third valve member (300b) with a first through aperture (301b) and a second through aperture (302b); a first flow passage interconnection (60b) between first through aperture (101b) of first valve member (100b) and second through aperture (302b) of third valve member (300b), a second flow passage interconnection (70b) between second through aperture (302b) of third valve member (300b) and second through aperture (202b) of second valve member (200b), a third flow passage interconnection (20b), between first through aperture (201b) of second valve member (200b) and first through aperture (301b) of third valve member (300b) and a fourth flow passage interconnection (30b) between first through aperture (301b) of third valve member (300b) and second through aperture (102b) of first valve member (100b); a nominal pressure fluid source, e.g., ambient air, a means to alter the pressure of the fluid (400b), e.g., compressor with an inlet and outlet wherein inlet maintains a pressure lower than nominal source fluid pressure and outlet maintains a pressure higher than inlet pressure, a conduit (10b) acting as an exhaust and connecting second through aperture (201b) of second valve member (200b) to nominal pressure fluid, a conduit (40b) connecting compressor inlet to nominal pressure fluid, a surge vessel (500b), a conduit (80b) connecting first through aperture (201b) of second valve member (200b) to a surge vessel (500b), an adsorbent bed (600b) with an inlet and an outlet including an adsorbent media capable of selectively adsorbing components of a fluid mixture, a conduit (90b) connection surge vessel (500b) to adsorbent bed (600b) inlet, a product vessel (800b) with capable of storing product with an inlet and outlet, a conduit (95b) connecting said outlet of adsorbent bed (600b) to inlet of purge vessel (700b), a one-way flow valve (900b), a conduit (96b) with one-way flow valve (900b) connecting purge vessel (700b) to a product vessel (800b) and a conduit (97b) connecting a outlet of product vessel (700b) to intended use of product.

FIG. 70 depicts an explode schematic view of a novel rotary valve assembly with a paired bed vacuum-pressure swing adsorption system.

FIG. 70A depicts an explode schematic view of a novel rotary valve assembly with a paired bed vacuum-pressure swing adsorption system with a first adsorbent bed in a pressurization process step and a second adsorbent bed in a depressurization process step as follows: a first valve member (100b) with a first through aperture (101b) and a second through aperture (102b), a second valve member (200b) with a first through aperture (201b) and a second through aperture (202b), and a third valve member (300b) with a first through aperture (301b) and a second through aperture (302b); a first flow passage interconnection (60b) between first through aperture (101b) of first valve member (100b) and first through aperture (301b) of third valve member (300b), a second flow passage interconnection (70b) between first through aperture (301b) of third valve member (300b) and first through aperture (201b) of second valve member (200b), a third flow passage interconnection (20b), between second through aperture (202b) of second valve member (200b) and second through aperture (302b) of third valve member (300b) and a fourth flow passage interconnection (30b) between second through aperture (302b) of third valve member (300b) and second through aperture (102b) of first valve member (100b); a nominal pressure fluid source, e.g., ambient air, a first means to alter the pressure of the fluid (400b), e.g., compressor with an inlet and outlet wherein inlet maintains a pressure lower than nominal source fluid pressure and outlet maintains a pressure higher than inlet pressure, a second means to alter the pressure of the fluid (401b), e.g., compressor with an inlet and outlet wherein inlet maintains a pressure lower than nominal source fluid pressure and outlet maintains a pressure higher than inlet pressure, a shaft (402b) connecting first compressor (400b) with second compressor (401b), a conduit (41b) acting as an intake and connecting a first compressor (400b) inlet with a nominal pressure fluid source, a conduit (42b) acting as and exhaust and connecting a second compressor (401b) outlet to nominal pressure fluid, a conduit (50b) connecting first through aperture (101b) of first valve member (100b) to first compressor (400b) outlet, a conduit (40b) connecting second through aperture (102b) of first valve member (100b) to second compressor (401b) inlet, a conduit (80b) connecting first through aperture (201b) of second valve member (200b) to an inlet of a first surge vessel (501b), a first adsorbent bed (600b) with an inlet and an outlet and including an adsorbent media capable of selectively adsorbing components of a fluid mixture, a conduit (90b) connecting first surge vessel (501b) with inlet of adsorbent bed (600b), a first purge vessel (701b), a product vessel (800b) with capable of storing product with an inlet and outlet, a conduit (95b) connecting said outlet of first adsorbent bed (600b) to inlet of first purge vessel (701b), a first one-way flow valve (901b), a conduit (94b) with a first one-way flow valve (901b) connecting first purge vessel (701b) to a product vessel (800b), a conduit (97b) connecting a outlet of product vessel (800b) to intended use of product, a conduit (10b) connecting a second surge vessel (500b) with second through aperture (202b) of second valve member (200b), a second adsorbent bed (601b) with an inlet and an outlet and including an adsorbent media capable of selectively adsorbing components of a fluid mixture, a conduit (91b) connecting a second surge vessel (500b) with a second adsorbent bed (601b), a second purge vessel (700b), a conduit (98b) connecting second adsorbent bed (601b) outlet with a second purge vessel (700b), a second one-way valve (900b), a conduit (96b) with second one-way valve (900b) connecting second purge vessel (700b) with product tank (800b).

FIG. 70B depicts an explode schematic view of a novel rotary valve assembly with a paired bed vacuum-pressure swing adsorption system with a first adsorbent bed in a depressurization process step and a second adsorbent bed in a pressurization process step as follows: a first valve member (100b) with a first through aperture (101b) and a second through aperture (102b), a second valve member (200b) with a first through aperture (201b) and a second through aperture (202b), and a third valve member (300b) with a first through aperture (301b) and a second through aperture (302b); a first flow passage interconnection (60b) between first through aperture (101b) of first valve member (100b) and second through aperture (302b) of third valve member (300b), a second flow passage interconnection (20b) between second through aperture (302b) of third valve member (300b) and second through aperture (202b) of second valve member (200b), a third flow passage interconnection (70b), between first through aperture (201b) of second valve member (200b) and first through aperture (301b) of third valve member (300b) and a fourth flow passage interconnection (30b) between first through aperture (301b) of third valve member (300b) and second through aperture (102b) of first valve member (100b); a nominal pressure fluid source, e.g., ambient air, a first means to alter the pressure of the fluid (400b), e.g., compressor with an inlet and outlet wherein inlet maintains a pressure lower than nominal source fluid pressure and outlet maintains a pressure higher than inlet pressure, a second means to alter the pressure of the fluid (401b), e.g., compressor with an inlet and outlet wherein inlet maintains a pressure lower than nominal source fluid pressure and outlet maintains a pressure higher than inlet pressure, a shaft (402b) connecting first compressor (400b) with second compressor (401b), a conduit (41b) acting as an intake and connecting a first compressor (400b) inlet with a nominal pressure fluid source, a conduit (42b) acting as and exhaust and connecting a second compressor (401b) outlet to nominal pressure fluid, a conduit (50b) connecting first through aperture (101b) of first valve member (100b) to first compressor (400b) outlet, a conduit (40b) connecting second through aperture (102b) of first valve member (100b) to second compressor (401b) inlet, a conduit (10b) connecting second through aperture (202b) of second valve member (200b) to an inlet of a first surge vessel (501b), a first adsorbent bed (600b) with an inlet and an outlet and including an adsorbent media capable of selectively adsorbing components of a fluid mixture, a conduit (90b) connecting first surge vessel (501b) with inlet of adsorbent bed (600b), a first purge vessel (701b), a product vessel (800b) with capable of storing product with an inlet and outlet, a conduit (95b) connecting said outlet of first adsorbent bed (600b) to inlet of first purge vessel (701b), a first one-way flow valve (901b), a conduit (94b) with a first one-way flow valve (901b) connecting first purge vessel (701b) to a product vessel (800b), a conduit (97b) connecting a outlet of product vessel (800b) to intended use of product, a conduit (80b) connecting a second surge vessel (500b) with first through aperture (201b) of second valve member (200b), a second adsorbent bed (601b) with an inlet and an outlet and including an adsorbent media capable of selectively adsorbing components of a fluid mixture, a conduit (91b) connecting a second surge vessel (500b) with a second adsorbent bed (601b), a second purge vessel (700b), a conduit (98b) connecting second adsorbent bed (601b) outlet with a second purge vessel (700b), a second one-way valve (900b), a conduit (96b) with second one-way valve (900b) connecting second purge vessel (700b) with product tank (800b).

FIG. 71 depicts an explode schematic view of a novel rotary valve assembly with a paired bed pressure swing adsorption system.

FIG. 71A depicts an explode schematic view of a novel rotary valve assembly with a paired bed pressure swing adsorption system with a first adsorbent bed in a pressurization process step and a second adsorbent bed in a depressurization process step as follows: a first valve member (10b) with a first through aperture (101b) and a second through aperture (102b), a second valve member (200b) with a first through aperture (201b) and a second through aperture (202b), and a third valve member (300b) with a first through aperture (301b) and a second through aperture (302b); a first flow passage interconnection (60b) between first through aperture (101b) of first valve member (100b) and first through aperture (301b) of third valve member (300b), a second flow passage interconnection (70b) between first through aperture (301b) of third valve member (300b) and first through aperture (201b) of second valve member (200b), a third flow passage interconnection (20b), between second through aperture (202b) of second valve member (200b) and second through aperture (302b) of third valve member (300b) and a fourth flow passage interconnection (30b) between second through aperture (302b) of third valve member (300b) and second through aperture (102b) of first valve member (100b); a nominal pressure fluid source, e.g., ambient air, a means to alter the pressure of the fluid (400b), e.g., compressor with an inlet and outlet wherein inlet maintains a pressure lower than nominal source fluid pressure and outlet maintains a pressure higher than inlet pressure, a conduit (40b) acting as an intake and connecting compressor (400b) inlet with a nominal pressure fluid source, a conduit (50b) connecting first through aperture (101b) of first valve member (100b) to compressor (400b) outlet, a conduit (80b) connecting first through aperture (201b) of second valve member (200b) to an inlet of a first surge vessel (501b), a first adsorbent bed (600b) with an inlet and an outlet and including an adsorbent media capable of selectively adsorbing components of a fluid mixture, a conduit (90b) connecting first surge vessel (501b) with inlet of adsorbent bed (600b), a first purge vessel (701b), a product vessel (800b) with capable of storing product with an inlet and outlet, a conduit (95b) connecting said outlet of first adsorbent bed (600b) to inlet of first purge vessel (701b), a first one-way flow valve (901b), a conduit (94b) with a first one-way flow valve (901b) connecting first purge vessel (701b) to a product vessel (800b), a conduit (97b) connecting a outlet of product vessel (800b) to intended use of product, a conduit (10b) connecting a second surge vessel (500b) with second through aperture (202b) of second valve member (200b), a second adsorbent bed (601b) with an inlet and an outlet and including an adsorbent media capable of selectively adsorbing components of a fluid mixture, a conduit (911b) connecting a second surge vessel (500b) with a second adsorbent bed (601b), a second purge vessel (700b), a conduit (98b) connecting second adsorbent bed (601b) outlet with a second purge vessel (700b), a second one-way valve (900b), a conduit (96b) with second one-way valve (900b) connecting second purge vessel (700b) with product tank (800b).

FIG. 71B depicts an explode schematic view of a novel rotary valve assembly with a paired bed pressure swing adsorption system with a first adsorbent bed in a pressurization process step and a second adsorbent bed in a depressurization process step as follows: a first valve member (100b) with a first through aperture (101b) and a second through aperture (102b), a second valve member (200b) with a first through aperture (201b) and a second through aperture (202b), and a third valve member (300b) with a first through aperture (301b) and a second through aperture (302b); a first flow passage interconnection (60b) between first through aperture (101b) of first valve member (100b) and first through aperture (301b) of third valve member (300b), a second flow passage interconnection (20b) between second through aperture (302b) of third valve member (300b) and second through aperture (202b) of second valve member (200b), a third flow passage interconnection (70b) between first through aperture (201b) of second valve member (200b) and first through aperture (301b) of third valve member (300b) and a fourth flow passage interconnection (30b) between second through aperture (302b) of third valve member (300b) and second through aperture (102b) of first valve member (100b); a nominal pressure fluid source, e.g., ambient air, a means to alter the pressure of the fluid (400b), e.g., a compressor with an inlet and outlet wherein inlet maintains a pressure lower than nominal source fluid pressure and outlet maintains a pressure higher than inlet pressure, a conduit (40b) acting as an intake and connecting compressor (400b) inlet with a nominal pressure fluid source, a conduit (50b) connecting first through aperture (101b) of first valve member (100b) to compressor (400b) outlet, a conduit (10b) connecting second through aperture (202b) of second valve member (200b) to an inlet of a first surge vessel (501b), a first adsorbent bed (600b) with an inlet and an outlet and including an adsorbent media capable of selectively adsorbing components of a fluid mixture, a conduit (90b) connecting first surge vessel (501b) with inlet of adsorbent bed (600b), a first purge vessel (701b), a product vessel (800b) with capable of storing product with an inlet and outlet, a conduit (95b) connecting said outlet of first adsorbent bed (600b) to inlet of first purge vessel (701b), a first one-way flow valve (901b), a conduit (94b) with a first one-way flow valve (901b) connecting first purge vessel (701b) to a product vessel (800b), a conduit (97b) connecting a outlet of product vessel (800b) to intended use of product, a conduit (80b) connecting a second surge vessel (500b) with first through aperture (201b) of second valve member (200b), a second adsorbent bed (601b) with an inlet and an outlet and including an adsorbent media capable of selectively adsorbing components of a fluid mixture, a conduit (91b) connecting a second surge vessel (500b) with a second adsorbent bed (601b), a second purge vessel (700b), a conduit (98b) connecting second adsorbent bed (601b) outlet with a second purge vessel (700b), a second one-way valve (900b), a conduit (96b) with second one-way valve (900b) connecting second purge vessel (700b) with product tank (800b).

FIG. 72 depicts a representative schematic with additions as follows: (j) a purge vessel between adsorbent bed and product vessel, (k) a valve between product vessel and purge vessel to prevent flow from product vessel to purge vessel, (l) a surge vessel between novel rotary valve and adsorbent vessel inlet, (m) a surge vessel between compressor outlet and rotary valve inlet, (n) a surge vessel between novel rotary valve and compressor inlet, (o) a surge vessel between nominal pressure fluid and novel rotary valve. Further alteration to surge vessels provide a means of air filtration, sound dampening, heat exchange in addition to purge gas storage. A detailed description of additional vessels is a following description of only one preferred embodiment. Those skilled in the art will readily understand the application of additional vessels in alternate embodiments.

FIG. 72A depicts a portion of a single bed vacuum-pressure swing adsorption process in a pressurization process step as follows: a first valve member (100b) with a first through aperture (101b) and a second through aperture (102b), a second valve member (200b) with a first through aperture (201b) and a second through aperture (202b), and a third valve member (300b) with a first through aperture (301b) and a second through aperture (302b); a first flow passage interconnection (60b) between first through aperture (101b) of first valve member (100b) and first through aperture (301b) of third valve member (300b), a second flow passage interconnection (70b) between first through aperture (301b) of third valve member (300b) and first through aperture (201b) of second valve member (200b), a third flow passage interconnection (20b), between second through aperture (202b) of second valve member (200b) and second through aperture (302b) of third valve member (302b) and a fourth flow passage interconnection (30b) between second through aperture (302b) of third valve member (300b) and second through aperture (102b) of first valve member (100b); a nominal pressure fluid source, e.g., ambient air, a means to alter the pressure of the fluid (400b), e.g., compressor with an inlet and outlet wherein inlet maintains a pressure lower than nominal source fluid pressure and outlet maintains a pressure higher than inlet pressure, a conduit (40b) connecting second through aperture (102b) of first valve member (100b) to compressor inlet, a first surge vessel (502b), a conduit (50b) connecting first surge vessel (502b) to compressor (400b) outlet, a conduit (55b) connecting first surge vessel (502b) with first through aperture (10b) of first valve member (100b), a second surge vessel (500b), a conduit (80b) connecting first through aperture (201b) of second valve member (200b) to second surge vessel (500b), a conduit (90b) connecting second surge vessel (500b) to further process elements down stream, a third surge vessel (503b), a conduit (10b) acting as an intake connecting third surge vessel with nominal pressure fluid, e.g., air, a conduit (11b) connecting third surge vessel with second through aperture (202b) of second valve member (200b).

FIG. 72B depicts a single bed vacuum-pressure swing adsorption process in a depressurization process step as follows: a first valve member (100b) with a first through aperture (101b) and a second through aperture (102b), a second valve member (200b) with a first through aperture (201b) and a second through aperture (202b), and a third valve member (300b) with a first through aperture (301b) and a second through aperture (302b); a first flow passage interconnection (60b) between first through aperture (101b) of first valve member (100b) and second through aperture (302b) of third valve member (300b), a second flow passage interconnection (20b) between second through aperture (302b) of third valve member (300b) and second through aperture (202b) of second valve member (200b), a third flow passage interconnection (70b), between first through aperture (201b) of second valve member (200b) and first through aperture of third valve member (301b) and a fourth flow passage interconnection (30b) between first through aperture (301b) of third valve member (300b) and second through aperture (102b) of first valve member (100b); a nominal pressure fluid source, e.g., ambient air, a means to alter the pressure of the fluid (400b), e.g., compressor with an inlet and outlet wherein inlet maintains a pressure lower than nominal source fluid pressure and outlet maintains a pressure higher than inlet pressure, a conduit (40b) connecting second through aperture (102b) of first valve member (100b) to compressor inlet, a first surge vessel (502b), a conduit (50b) connecting first surge vessel (502b) to compressor (400b) outlet, a conduit (55b) connecting first surge vessel (502b) with first through aperture (101b) of first valve member (100b), a second surge vessel (500b), a conduit (80b) connecting first through aperture (201b) of second valve member (200b) to second surge vessel (500b), a conduit (90b) connecting second surge vessel (500b) to further process elements down stream, a third surge vessel (503b), a conduit (10b) acting as an exhaust connecting third surge vessel with nominal pressure fluid, e.g., air, a conduit (11b) connecting third surge vessel with second through aperture (202b) of second valve member (200b).

Example 1

Single adsorbent bed vacuum-pressure swing adsorption process, from a starting position a compressor inlet communicates with ambient air by means of (1) a first aperture of a first valve member, (2) a first aperture of a second valve member and (3) a first through aperture of a third valve member and thereby provides a source of feed gas to the system; and a compressor outlet communicates with an adsorbent bed by means of (1) a second aperture of first valve member, (2) a second aperture of second valve member and (3) a second through aperture of third valve member and thereby provides pressurized air to adsorbent bed.

Upon relative rotation of third valve member to first valve member and second valve member wherein positional coincidence of apertures of first valve member and second valve member are greater than 0° and less than 180° angular degrees, interconnection and communication simultaneously changes and compressor inlet communicates with adsorbent bed by means of (1) second aperture of first valve member, (2) first aperture of second valve member, and (3) first through aperture of third valve member thereby evacuates oxygen depleted gas from adsorbent bed; and compressor outlet communicates with ambient air by means of (1) first aperture of first valve member, (2) second aperture of second valve member and (3) second through aperture of third valve member and thereby provides pressurized oxygen depleted gas to ambient air.

The cycle repeats upon further rotation of third valve member and compressor inlet communicates with ambient air by means of (1) a first aperture of a first valve member, (2) a first aperture of a second valve member and (3) a second aperture of third valve member and thereby provides a source of feed gas; and a compressor outlet communicates with adsorbent bed by means of (1) second aperture of first valve member, (2) and second aperture of second valve member and (3) first through aperture of third valve member and thereby provides pressurized air to an adsorbent bed once again.

A further description provides through apertures of a first valve member and through apertures of second valve member at 45° angular degrees from coincidence of adsorbent bed and compressor outlet interconnection and ambient air compressor inlet interconnection whereby the adsorbent bed aperture of first valve member predominately coincides with the compressor outlet through aperture of the second valve member. Rotation of the of third valve member provides coincidence of 135° angular degrees for pressurization by means of interconnection of first through aperture of third valve member with ambient air and compressor inlet and interconnection of second through aperture of third valve member with adsorbent bed and compressor outlet followed by 45° angular degrees for depressurization wherein first through aperture of third valve member interconnects compressor inlet with adsorbent bed and compressor outlet with ambient air. As a result of adjustable position first valve member and second valve member preference is to the pressurization process step with 75% pressurization and 25% depressurization of a process cycle time respectively. The cycle then repeats as the second through aperture of third valve member interconnects the compressor outlet with the adsorbent bed and first through aperture of third valve member interconnects compressor inlet with ambient air.

Another description provides through apertures of a first valve member and through apertures of second valve member at 90° angular degrees from coincidence of adsorbent bed and compressor outlet interconnection and ambient air compressor inlet interconnection whereby the adsorbent bed aperture of first valve member equally coincides with the compressor outlet through aperture of the second valve member. Rotation of the of third valve member provides coincidence of 90° angular degrees for pressurization by means of interconnection of first through aperture of third valve member with ambient air and compressor inlet and interconnection of second through aperture of third valve member with adsorbent bed and compressor outlet followed by 90° angular degrees for depressurization wherein first through aperture of third valve member interconnects compressor inlet with adsorbent bed and compressor outlet with ambient air. As a result of adjustable position first valve member and second valve member no preference is to the pressurization process step with 50% pressurization and 50% depressurization of a process cycle time respectively. The cycle then repeats as the second through aperture of third valve member interconnects the compressor outlet with the adsorbent bed and first through aperture of third valve member interconnects compressor inlet with ambient air.

Another further description provides through apertures of a first valve member and through apertures of second valve member at 135° angular degrees from coincidence of adsorbent bed and compressor outlet interconnection and ambient air compressor inlet interconnection whereby the adsorbent bed aperture of first valve member predominately coincides with the ambient air through aperture of the second valve member. Rotation of the of third valve member provides coincidence of 45° angular degrees for pressurization by means of interconnection of first through aperture of third valve member with ambient air and compressor inlet and interconnection of second through aperture of third valve member with adsorbent bed and compressor outlet followed by 135° angular degrees for depressurization wherein first through aperture of third valve member interconnects compressor inlet with adsorbent bed and compressor outlet with ambient air. As a result of adjustable position first valve member and second valve member preference is to the depressurization process step with 25% pressurization and 75% depressurization of a process cycle time respectively. The cycle then repeats as the second through aperture of third valve member interconnects the compressor outlet with the adsorbent bed and first through aperture of third valve member interconnects compressor inlet with ambient air.

Example 2

Single adsorbent bed pressure swing adsorption process, from a starting position a compressor inlet communicates with ambient air and a compressor outlet communicates with adsorbent bed by means of (1) a first aperture of first valve member, (2) a first aperture of second valve member and (3) a first through aperture of third valve member and thereby provides pressurized air to an adsorbent bed; and ambient air communicates with ambient air by means of (1) a second aperture of first valve member, (2) a second aperture of second valve member and (3) a second through aperture of third valve member and thereby provides an idle position.

Upon relative rotation of third valve member to first valve member and second valve member wherein positional coincidence of through apertures of first valve member and second valve member are greater than 0° and less than 180° angular degrees, interconnection and communication simultaneously changes and compressor outlet communicates with ambient air by means of (1) first aperture of first valve member, (2) second aperture of second valve member and (3) first through aperture of third valve member and thereby unloads compressor; and adsorbent bed communicates with ambient air by means of (1) second aperture of first valve member, (2) first aperture of second valve member and (3) second through aperture of third valve member thereby discharges pressurized oxygen deplete gas from adsorbent bed.

The cycle repeats upon further rotation of third valve member and compressor outlet communicates with adsorbent bed by means of (1) a first aperture of first valve member, (2) a first aperture of second valve member and (3) second through aperture of third valve member and thereby provides pressurized air to an adsorbent bed once again; and ambient air communicates with ambient air by means of (1) second aperture of first valve member, (2) second aperture of second valve member and (3) first through aperture of third valve member and thereby provides an idle position.

A further description provides through apertures of a first valve member and through apertures of second valve member at 45° angular degrees from coincidence of adsorbent bed and compressor outlet interconnection and ambient air and ambient air interconnection whereby the adsorbent bed aperture of first valve member predominately coincides with the compressor outlet through aperture of the second valve member. Rotation of the of third valve member provides coincidence of 135° angular degrees for pressurization by means of interconnection of first through aperture of third valve member with adsorbent bed and compressor outlet and interconnection of second through aperture of third valve member with ambient air and ambient air followed by 45° angular degrees for depressurization wherein first through aperture of third valve member interconnects ambient air with adsorbent bed and compressor outlet with ambient air. As a result of adjustable position first valve member and second valve member preference is to the pressurization process step with 75% pressurization and 25% depressurization of a process cycle time respectively. The cycle then repeats as the second through aperture of third valve member interconnects the compressor outlet with the adsorbent bed and first through aperture of third valve member interconnects ambient air with ambient air.

Another further description provides through apertures of a first valve member and through apertures of second valve member at 90° angular degrees from coincidence of adsorbent bed and compressor outlet interconnection and ambient air and ambient air interconnection whereby the adsorbent bed aperture of first valve member equally coincides with the compressor outlet through aperture of the second valve member. Rotation of the of third valve member provides coincidence of 90° angular degrees for pressurization by means of interconnection of first through aperture of third valve member with adsorbent bed and compressor outlet and interconnection of second through aperture of third valve member with ambient air and ambient air followed by 90° angular degrees for depressurization wherein first through aperture of third valve member interconnects ambient air with adsorbent bed and compressor outlet with ambient air. As a result of adjustable position first valve member and second valve member no preference is to the pressurization process step with 50% pressurization and 50% depressurization of a process cycle time respectively. The cycle then repeats as the second through aperture of third valve member interconnects the compressor outlet with the adsorbent bed and first through aperture of third valve member interconnects ambient air with ambient air.

Another further description provides through apertures of a first valve member and through apertures of second valve member at 135° angular degrees from coincidence of adsorbent bed and compressor outlet interconnection and ambient air and ambient air interconnection whereby the adsorbent bed aperture of first valve member predominately coincides with the ambient through aperture of the second valve member. Rotation of the of third valve member provides coincidence of 45° angular degrees for pressurization by means of interconnection of first through aperture of third valve member with adsorbent bed and compressor outlet and interconnection of second through aperture of third valve member with ambient air and ambient air followed by 135° angular degrees for depressurization wherein first through aperture of third valve member interconnects ambient air with adsorbent bed and compressor outlet with ambient air. As a result of adjustable position first valve member and second valve member preference is to the depressurization process step with 25% pressurization and 75% depressurization of a process cycle time respectively. The cycle then repeats as the second through aperture of third valve member interconnects the compressor outlet with the adsorbent bed and first through aperture of third valve member interconnects ambient air with ambient air.

Example 3

Paired adsorbent bed vacuum-pressure swing adsorption process, from a starting position a first compressor inlet communicates with ambient air, a first compressor outlet communicates with a first adsorbent bed by means of (1) a first aperture of a first valve member, (2) a first aperture of a second valve member and (3) a first aperture of a third valve member and thereby provides pressurized air to a first adsorbent bed; a second compressor inlet communicates with a second adsorbent bed by means of (1) a second aperture of first valve member, (2) a second aperture of second valve member, and (3) a second through aperture of third valve member and thereby evacuates oxygen deplete gas from a second adsorbent bed, and a second compressor outlet provides pressurized oxygen deplete gas from second adsorbent bed to ambient air.

Upon relative rotation of third valve member to first valve member and second valve member wherein positional coincidence of through apertures of first valve member and second valve member are greater than 0° and less than 180° angular degrees, interconnection and communication simultaneously changes and first compressor outlet communicates with second adsorbent bed by means of (1) a first aperture of a first valve member, (2) a second aperture of a second valve member, and (3) a first aperture of a third valve member and thereby provides pressurized air to second adsorbent bed; a second compressor inlet communicates with first adsorbent bed by means of (1) a second aperture of first valve member, (2) a first aperture of second valve member, and (3) a second through aperture of third valve member and thereby evacuates oxygen deplete gas from first adsorbent bed; and second compressor outlet provides pressurized oxygen deplete gas from first adsorbent bed to ambient air.

The cycle repeats upon further rotation of third valve member and first compressor inlet communicates with ambient air, a first compressor outlet communicates with a first adsorbent bed by means of (1) a first aperture of a first valve member, (2) a first aperture of a second valve member, and (3) a second aperture of a third valve member and thereby provides pressurized air to a first adsorbent bed once again; a second compressor inlet communicates with a second adsorbent bed by means of (1) a second aperture of first valve member, (2) a second aperture of second valve member, and (3) a first through aperture of third valve member and thereby evacuates oxygen deplete gas from a second adsorbent bed once again; and a second compressor outlet provides pressurized oxygen deplete gas from second adsorbent bed to ambient air once again.

A further description provides through apertures of a first valve member and through apertures of second valve member at 45° angular degrees from coincidence of first adsorbent bed and first compressor outlet interconnection and second adsorbent bed and second compressor inlet interconnection whereby the first adsorbent bed aperture of first valve member predominately coincides with first compressor outlet through aperture of the second valve member. Rotation of the of third valve member provides coincidence of 135° angular degrees for pressurization of first adsorbent bed by means of interconnection of first through aperture of third valve member with first adsorbent bed and first compressor outlet and interconnection of second through aperture of third valve member with second adsorbent bed and second compressor inlet followed by 45° angular degrees for first adsorbent bed depressurization wherein first through aperture of third valve member interconnects first adsorbent bed with second compressor inlet and second through aperture of third valve member interconnects second adsorbent bed with first compressor outlet. As a result of adjustable position first valve member and second valve member preference is to a first adsorbent bed pressurization process step with 75% pressurization and 25% depressurization and a second adsorbent bed pressurization process step with 25% pressurization and 75% depressurization of a process cycle time respectively. The cycle then repeats as the second through aperture of third valve member interconnects the first compressor outlet with first adsorbent bed and first through aperture of third valve member interconnects second compressor inlet with second adsorbent bed.

Another further description provides through apertures of a first valve member and through apertures of second valve member at 90° angular degrees from coincidence of first adsorbent bed and first compressor outlet interconnection and second adsorbent bed and second compressor inlet interconnection whereby the first adsorbent bed aperture of first valve member equally coincides with first compressor outlet through aperture of the second valve member. Rotation of the of third valve member provides coincidence of 90° angular degrees for pressurization of first adsorbent bed by means of interconnection of first through aperture of third valve member with first adsorbent bed and first compressor outlet and interconnection of second through aperture of third valve member with second adsorbent bed and second compressor inlet followed by 90° angular degrees for first adsorbent bed depressurization wherein first through aperture of third valve member interconnects first adsorbent bed with second compressor inlet and second through aperture of third valve member interconnects second adsorbent bed with first compressor outlet. As a result of adjustable position first valve member and second valve member no preference is to a first adsorbent bed pressurization process step with 50% pressurization and 50% depressurization or a second adsorbent bed pressurization process step with 50% pressurization and 50% depressurization of a process cycle time respectively. The cycle then repeats as the second through aperture of third valve member interconnects the first compressor outlet with first adsorbent bed and first through aperture of third valve member interconnects second compressor inlet with second adsorbent bed.

Another further description provides through apertures of a first valve member and through apertures of second valve member at 135° angular degrees from coincidence of first adsorbent bed and first compressor outlet interconnection and second adsorbent bed and second compressor inlet interconnection whereby the first adsorbent bed aperture of first valve member predominately coincides with second compressor inlet through aperture of the second valve member. Rotation of the of third valve member provides coincidence of 45° angular degrees for pressurization of first adsorbent bed by means of interconnection of first through aperture of third valve member with first adsorbent bed and first compressor outlet and interconnection of second through aperture of third valve member with second adsorbent bed and second compressor inlet followed by 135° angular degrees for first adsorbent bed depressurization wherein first through aperture of third valve member interconnects first adsorbent bed with second compressor inlet and second through aperture of third valve member interconnects second adsorbent bed with first compressor outlet. As a result of adjustable position first valve member and second valve member preference is to a first adsorbent bed depressurization process step with 25% pressurization and 75% depressurization and a second adsorbent bed pressurization process step with 75% pressurization and 25% depressurization of a process cycle time respectively. The cycle then repeats as the second through aperture of third valve member interconnects the first compressor outlet with first adsorbent bed and first through aperture of third valve member interconnects second compressor inlet with second adsorbent bed.

Example 4

Paired adsorbent bed pressure swing adsorption process, from a starting position a compressor inlet communicates with ambient air and a compressor outlet communicates with a first adsorbent bed by means of (1) a first aperture of first valve member, (2) a first aperture of second valve member and (3) a first through aperture of third valve member and thereby provides pressurized air to first adsorbent bed; and ambient air communicates with a second adsorbent bed by means of (1) a second aperture of first valve member, (2) a second aperture of second valve member, and (3) a second through aperture of third valve member and thereby provides a means to discharge oxygen deplete gas from second adsorbent bed.

Upon relative rotation of third valve member to first valve member and second valve member wherein positional coincidence of through apertures of first valve member and second valve member are greater than 0° and less than 180° angular degrees, interconnection and communication simultaneously changes and compressor outlet communicates with second adsorbent bed by means of (1) first aperture of first valve member, (2) second aperture of second valve member, and (3) first through aperture of third valve member and thereby pressurizes second adsorbent bed; and first adsorbent bed communicates with ambient air by means of (1) second aperture of first valve member, (2) first aperture of second valve member, and (3) second through aperture of third valve member and thereby discharges pressurized oxygen deplete gas from first adsorbent bed.

The cycle repeats upon further rotation of third valve member and compressor outlet communicates with first adsorbent bed by means of (1) a first aperture of first valve member, (2) a first aperture of second valve member and (3) second through aperture of third valve member and thereby provides pressurized air to first adsorbent bed once again; and ambient air communicates with second adsorbent bed by means of (1) second aperture of first valve member, (2) second aperture of second valve member, and (3) first through aperture of third valve member and thereby discharges oxygen deplete gas to ambient air.

A further description provides through apertures of a first valve member and through apertures of second valve member at 45° angular degrees from coincidence of first adsorbent bed and compressor outlet interconnection and second adsorbent bed and ambient air interconnection whereby the first adsorbent bed aperture of first valve member predominately coincides with compressor outlet through aperture of the second valve member. Rotation of the of third valve member provides coincidence of 135° angular degrees for pressurization of first adsorbent bed by means of interconnection of first through aperture of third valve member with first adsorbent bed and compressor outlet and interconnection of second through aperture of third valve member with second adsorbent bed and ambient air followed by 45° angular degrees for first adsorbent bed depressurization wherein first through aperture of third valve member interconnects first adsorbent bed with ambient air and second through aperture of third valve member interconnects second adsorbent bed with compressor outlet. As a result of adjustable position first valve member and second valve member preference is to a first adsorbent bed pressurization process step with 75% pressurization and 25% depressurization and a second adsorbent bed pressurization process step with 25% pressurization and 75% depressurization of a process cycle time respectively. The cycle then repeats as the second through aperture of third valve member interconnects compressor outlet with first adsorbent bed and first through aperture of third valve member interconnects ambient air with second adsorbent bed.

A further description provides through apertures of a first valve member and through apertures of second valve member at 90° angular degrees from coincidence of first adsorbent bed and compressor outlet interconnection and second adsorbent bed and ambient air interconnection whereby the first adsorbent bed aperture of first valve member equally coincides with compressor outlet through aperture of the second valve member. Rotation of the of third valve member provides coincidence of 90° angular degrees for pressurization of first adsorbent bed by means of interconnection of first through aperture of third valve member with first adsorbent bed and compressor outlet and interconnection of second through aperture of third valve member with second adsorbent bed and ambient air followed by 90° angular degrees for first adsorbent bed depressurization wherein first through aperture of third valve member interconnects first adsorbent bed with ambient air and second through aperture of third valve member interconnects second adsorbent bed with compressor outlet. As a result of adjustable position first valve member and second valve member no preference is to a first adsorbent bed pressurization process step with 50% pressurization and 50% depressurization or a second adsorbent bed pressurization process step with 50% pressurization and 50% depressurization of a process cycle time respectively. The cycle then repeats as the second through aperture of third valve member interconnects compressor outlet with first adsorbent bed and first through aperture of third valve member interconnects ambient air with second adsorbent bed.

A further description provides through apertures of a first valve member and through apertures of second valve member at 135° angular degrees from coincidence of first adsorbent bed and compressor outlet interconnection and second adsorbent bed and ambient air interconnection whereby the first adsorbent bed aperture of first valve member predominately coincides with ambient air through aperture of the second valve member. Rotation of the of third valve member provides coincidence of 45° angular degrees for pressurization of first adsorbent bed by means of interconnection of first through aperture of third valve member with first adsorbent bed and compressor outlet and interconnection of second through aperture of third valve member with second adsorbent bed and compressor outlet followed by 135° angular degrees for first adsorbent bed depressurization wherein first through aperture of third valve member interconnects first adsorbent bed with ambient air and second through aperture of third valve member interconnects second adsorbent bed with compressor outlet. As a result of adjustable position first valve member and second valve member preference is to a first adsorbent bed depressurization process step with 25% pressurization and 75% depressurization and a second adsorbent bed pressurization process step with 75% pressurization and 25% depressurization of a process cycle time respectively. The cycle then repeats as the second through aperture of third valve member interconnects compressor outlet with first adsorbent bed and first through aperture of third valve member interconnects ambient air with second adsorbent bed.

Water Purifier

Although various fluids may be suitable for operation of this device, for the purposes of this discussion water shall be the thermodynamic fluid and air the working fluid and zeolite the adsorbent.

Zeolite and water undergo a chemical reaction as follows:
$Na_xAl_x(SiO^2)z + nH_2O \rightarrow Na_xAl_x(SiO_2)z \cdot nH_2O$;

$\Delta H = -1800$ kilojoule per pound zeolite at room temperature; and $\Delta G = \Delta H - T \Delta S$
$\Delta H = \Delta(T)$
$K = -nRT \ln[\Delta G]$
$K = [\text{Activity } Na_xAl_x(SiO_2)z \cdot nH_2O]/([\text{Activity } Na_xAl_x(SiO_2)z] \cdot [\text{Pressure } H_2O]n$
and,
work $= -RT \ln ([P_1H_2O]/[P_2H_2O])$; where,
R = Gas Constant
T = Temperature
$P_1H_2O$ = Initial water vapour pressure
$P_2H_2O$ = Final water vapour pressure.
$\Delta H = cp \, \Delta T$
where,
$\Delta H$ = change in enthalpy,
cp = heat capacity at constant pressure,
and
$\Delta T$ = change in temperature.

Heat requirement to bring zeolite to a temperature where the reaction equilibrium favours formation of water vapour from hydrated zeolite. At such temperature chemical reaction requires addition heat for transformation from hydrate to vapour phase $T\Delta S$.

Therefore, through experimentation the equilibrium water vapour pressure and the temperature at which the reaction is no longer spontaneous. Assuming the change in enthalpy is not a strong function of temperature provides a constant value for $\Delta H$ of (−1800) kJ per kilogram zeolite for an exothermic reaction between zeolite and water.

Exposing a water source to dry zeolite by means of an evaporator results in energy flow from the surroundings to the system and cooling of the surroundings. When the system reaches equilibrium, the zeolite is saturated and the reaction is complete, thereby stopping evaporation. The zeolite material can be reversibly dried by supplied enough heat to raise the temperature and change the equilibrium of reaction to zeolite and water vapour. The equilibrium temperature depends upon the desired moisture content of the dry zeolite. Elevation of temperature raises the system pressure and enables heat expulsion by means of condensation. Collection of condensate enables use of purified liquid.

Use of the heat of reaction ΔH to support drying of zeolite significantly reduces the total energy requirement. Even if there were no heat losses to the surroundings the ΔH is not enough to complete the reaction as free energy to do work is defined by Gibbs as ΔG=ΔH−TΔS, where ΔH is the sensible irreversible heat of reaction and TΔS the reversible heat of formation of a product species. The entropy of reaction TΔS must also be supplied to the system to complete a reverse or drying reaction. Therefore the thermal inefficiency plus a latent heat are necessary to reverse the reaction. The amount of total heat required to the amount of purified liquid derived is known as the overall efficiency.

The working fluid circulates and facilitates heat transfer but does not enter into the reaction. The evaporative fluid changes state between liquid and vapour in the working fluid and these spontaneous changes result in purification.

Figure 73:
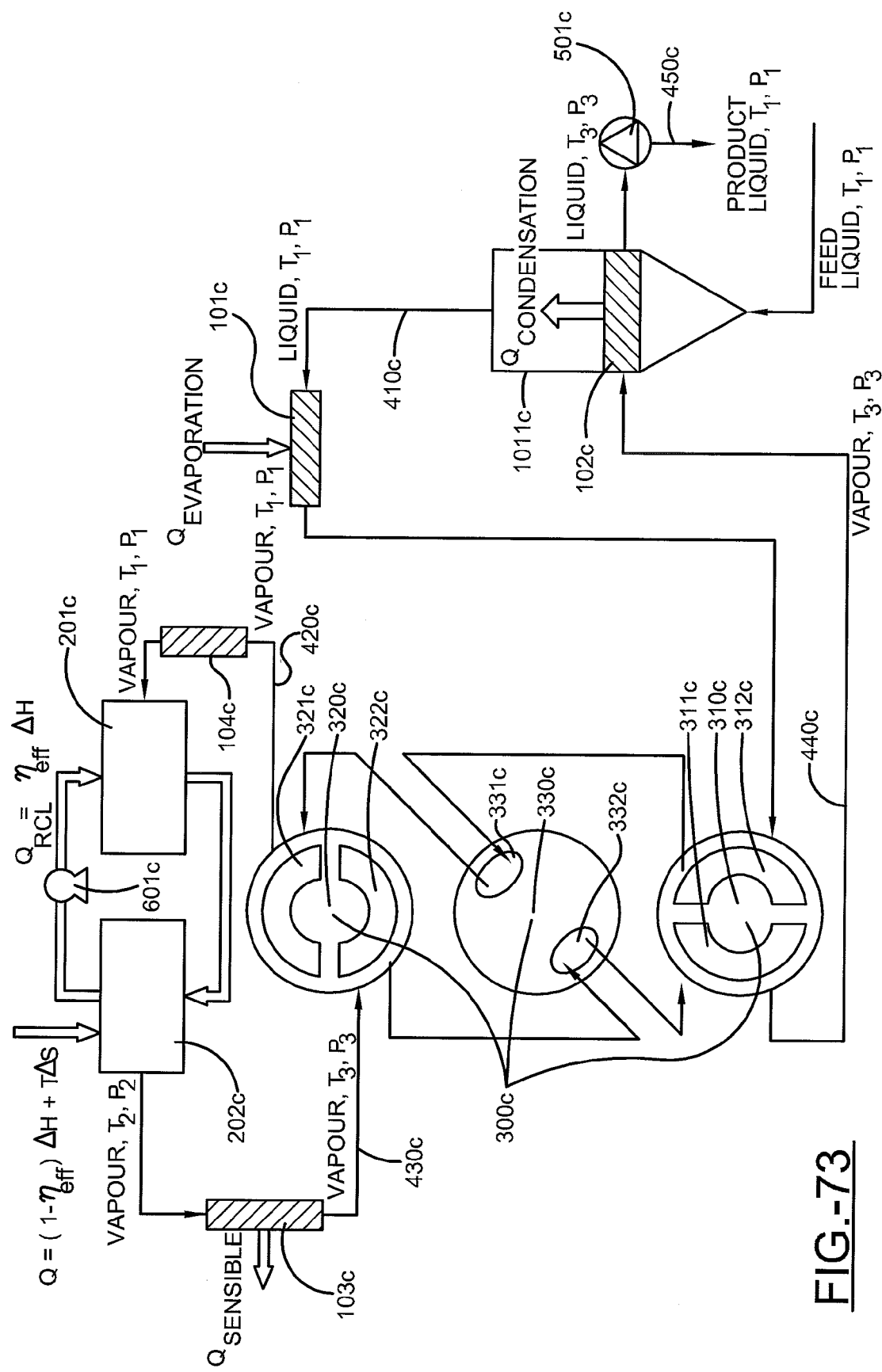
FIGS. 73-76 illustrate embodiments of a thermal wave water-purification system in a closed configuration, which, for purposes of this disclosure, signifies adsorbate from one adsorbent bed does not flow directly into a second adsorbent bed.

FIG. 73 shows a Thermal Wave Adsorption System with novel rotary valve assembly (300c) in a first position and a third valve member (330c) with a first through aperture (331c) and second through aperture (332c) in a first position, first regenerative adsorption bed (201c) and second regenerative adsorption bed (202c), a blower (601c), heat exchanger (103c), condenser (102c), expansion valve (501c), feed reservoir (1011c) and evaporator (101c) with said first adsorption bed (201c) in adsorption and said second adsorption bed (202c) in desorption.

Said first adsorbent bed (201c) communicates with said feed reservoir (1011c) by means of an evaporator (101c), a first conduit (410c), a novel rotary valve assembly (300c) with a first valve member (310c) and a first aperture (311c) and second aperture (312c) with a rotational angle to a second valve member (320c) with a first aperture (321c) and second aperture (322c) to provide a variable and adjustable process cycle time, a third rotary valve (330c) member with first through aperture (331c) interconnection of said first aperture (311c) of said first valve member (310c), first aperture (321c) of second valve member (320c) and a second conduit (420c).

A second adsorbent bed (202c) communicates to feed reservoir (1011c) by means of a condenser (102c), heat exchanger (103c), a third conduit (430c), a first rotary valve member (310c), a second rotary valve member (320c), a third rotary valve (330c) member, a fourth conduit (440c) and interconnection of said second aperture (312c) of said first valve member (310c), second aperture (322c) of second valve member (320c), second through aperture (332c) of third valve member (330c), a fourth conduit (440c), an expansion valve (501c) with product discharge by means of fifth conduit (450c).

Heat recycles through the system by means of a blower (601c) of in communication with said first adsorbent bed (201c) and second adsorbent bed (202c) and condenser (102c) in communication with feed reservoir (1011c). The thermal efficiency of this system defined as the amount of heat retention from exothermic reaction or ηΔH, where η is thermal efficiency and ΔH the enthalpy of reaction. The heat addition to the system is the reversible heat of chemical reaction TΔS, where T is the temperature of reaction and ΔS the entropy change of reaction, the work of compression of adsorbate vapour and make-up for thermal inefficiency (1−η)ΔH, i.e., $Q=(1-\eta)\Delta H+T\Delta S+RT \ln([P_2H_2O]/[P_1H_2O])$. The Coefficient of Performance ("COP") is the cooling or heating power to the input power, $Q_{condensation}/Q$ or $Q_{evaporation}/Q$.

Figure 74:
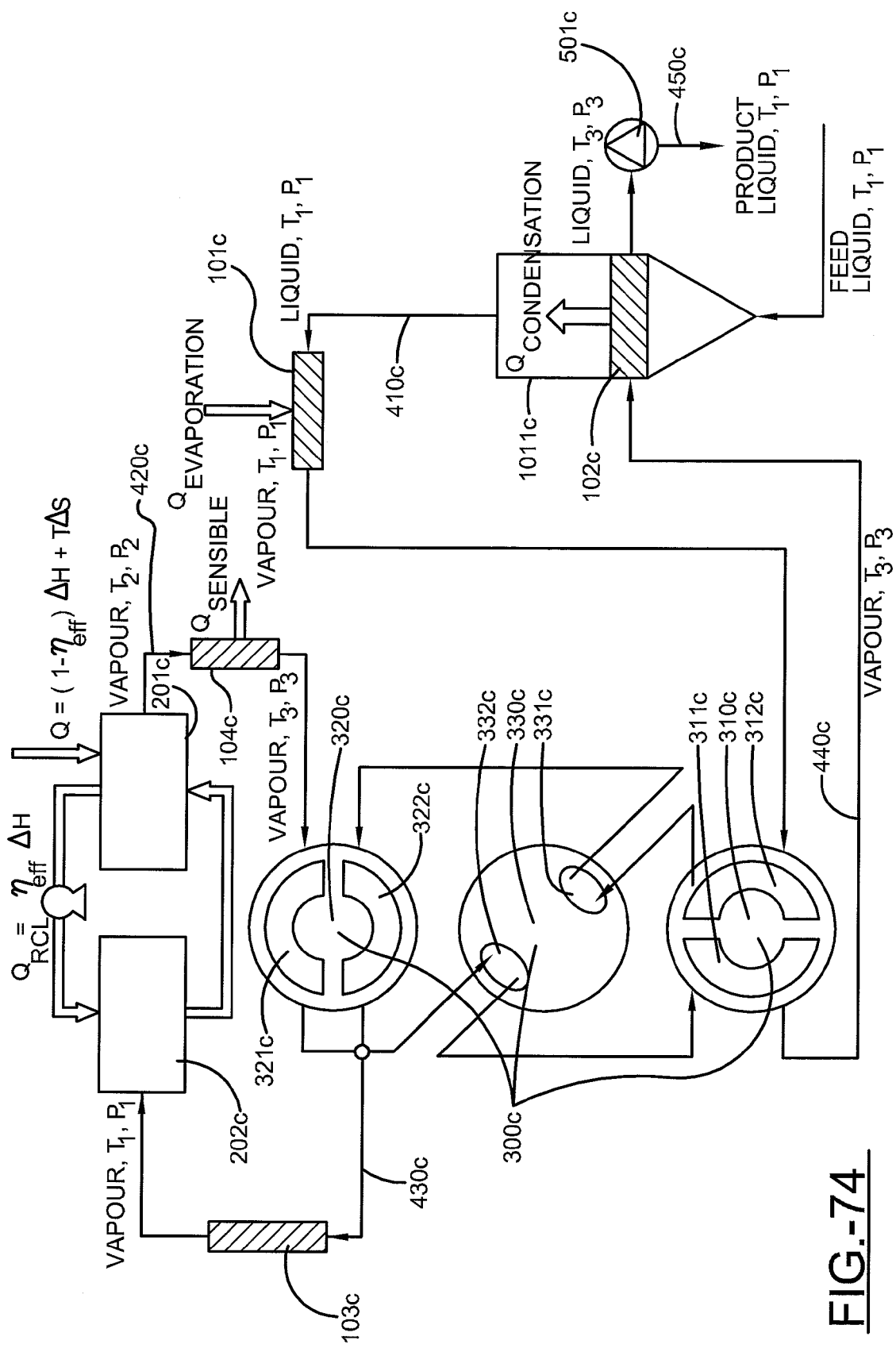

FIG. 74 illustrates said process flow diagram of a thermal wave heat pump of FIG. 73 with novel rotary valve assembly (300c) in a first position and said third valve member (330c) with said first through aperture (331c) and second through aperture (332c) in a second position, a heat exchanger (104c) and said first adsorption bed (201c) in desorption and said second adsorption bed (202c) in adsorption.

Said second adsorbent bed (202c) communicates with said feed reservoir (1011c) by means of an evaporator (101c), a first conduit (410c), a novel rotary valve assembly (300c) with a first valve member (310c) and a first aperture (311c) and second aperture (312c) with a rotational angle to a second valve member (320c) with a first aperture (321c) and second aperture (322c) to provide a variable and adjustable process cycle time, a third rotary valve (330c) member with first through aperture (331c) interconnection of said first aperture (311c) of said first valve member (310c), second aperture (322c) of second valve member (320c) and a third conduit (430c).

A first adsorbent bed (201c) communicates to feed reservoir (1011c) by means of a condenser (102c), heat exchanger (104c), a second conduit (420c), a first rotary valve member (310c), a second rotary valve member (320c), a third rotary valve (330c) member, a fourth conduit (440c) and interconnection of said second aperture (312c) of said first valve member (310c), first aperture (321c) of second valve member (320c), second through aperture (332c) of third valve member (330c), a fourth conduit (440c), an expansion valve (501c) with product discharge by means of fifth conduit (450c).

Heat recycles through the system by means of a blower (601c) of in communication with said first adsorbent bed (201c) and second adsorbent bed (202c) and condenser (102c) in communication with feed reservoir (1011c). The thermal efficiency of this system defined as the amount of heat retention from exothermic reaction or ηΔH, where η is thermal efficiency and ΔH the enthalpy of reaction. The heat addition to the system is the reversible heat of chemical reaction TΔS, where T is the temperature of reaction and ΔS the entropy change of reaction, the work of compression of adsorbate vapour and make-up for thermal inefficiency (1−η)ΔH, i.e., $Q=(1-\eta)\Delta H+T\Delta S+RT \ln([P_2H_2O]/[P_1H_2O])$. The Coefficient of Performance ("COP") is the cooling or heating power to the input power, $Q_{condensation}/Q$ or $Q_{evaporation}/Q$.

Figure 75:
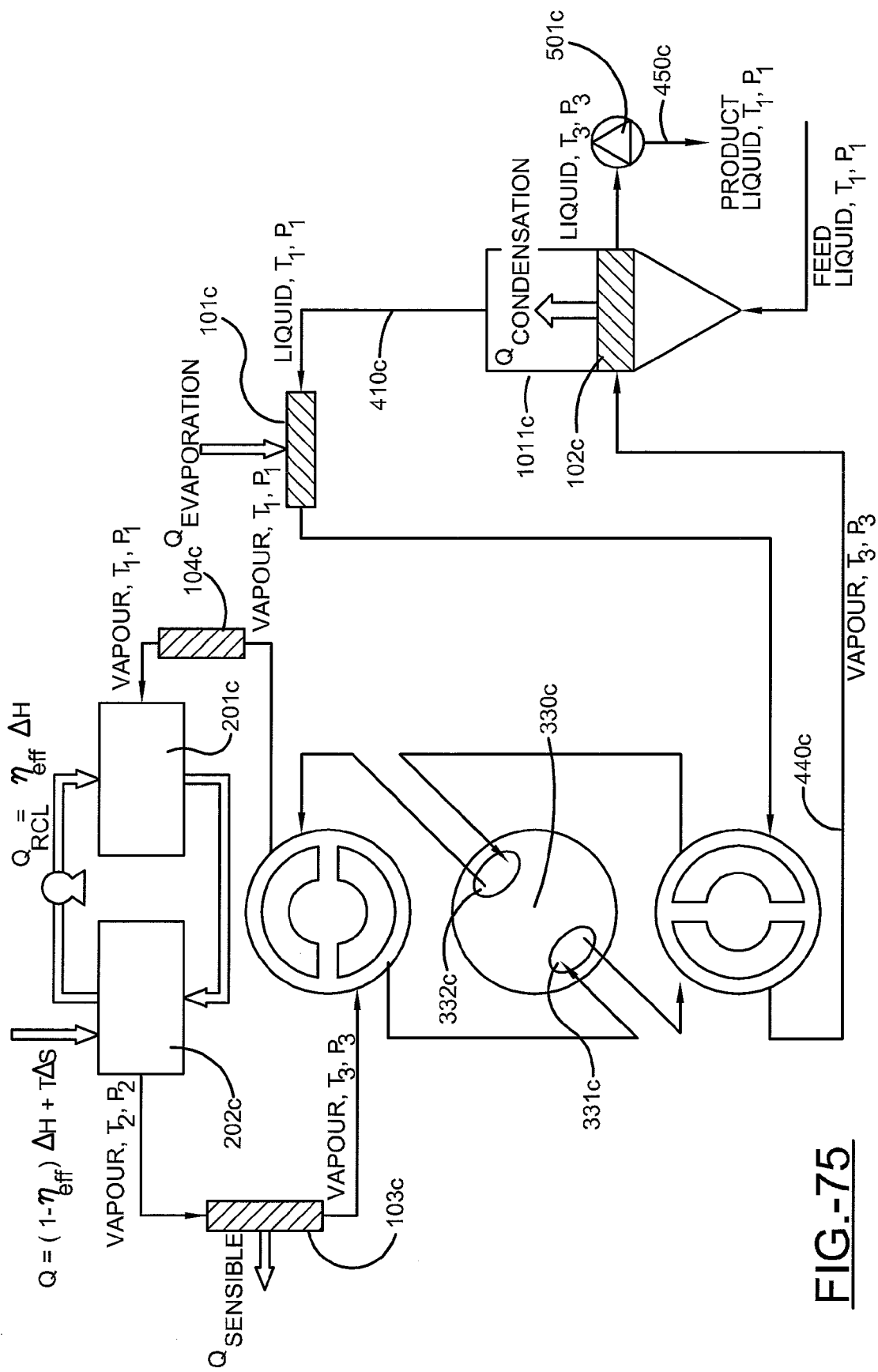

FIG. 75 said process flow diagram of a thermal wave heat pump of FIG. 73 with novel rotary valve assembly (300c) in said first position and said third valve member (330c) with said first through aperture (331c) and second through aperture (332c) in a third position, said heat exchanger (103c) and said first adsorption bed (201c) in adsorption and said second adsorption bed (202c) in desorption.

Figure 76:
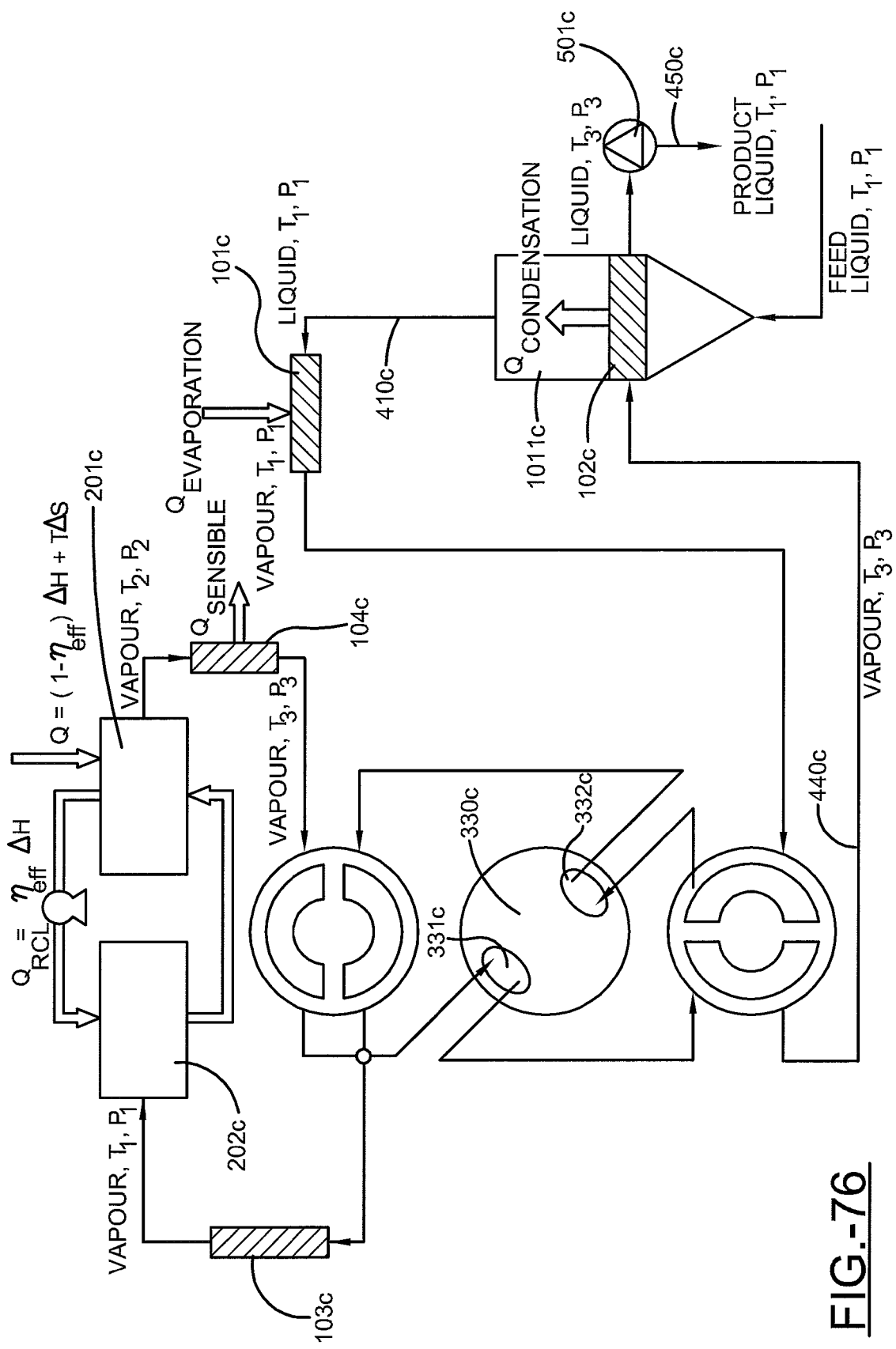

FIG. 76 illustrates said process flow diagram of a thermal wave heat pump of FIG. 74 with novel rotary valve assembly (300c) in said first position and said third valve member (330c) with said first through aperture (331c) and second through aperture (332c) in a fourth position, said heat exchanger (104c) and said first adsorption bed (201c) in adsorption and said second adsorption bed (202c) in desorption.

Figure 77:
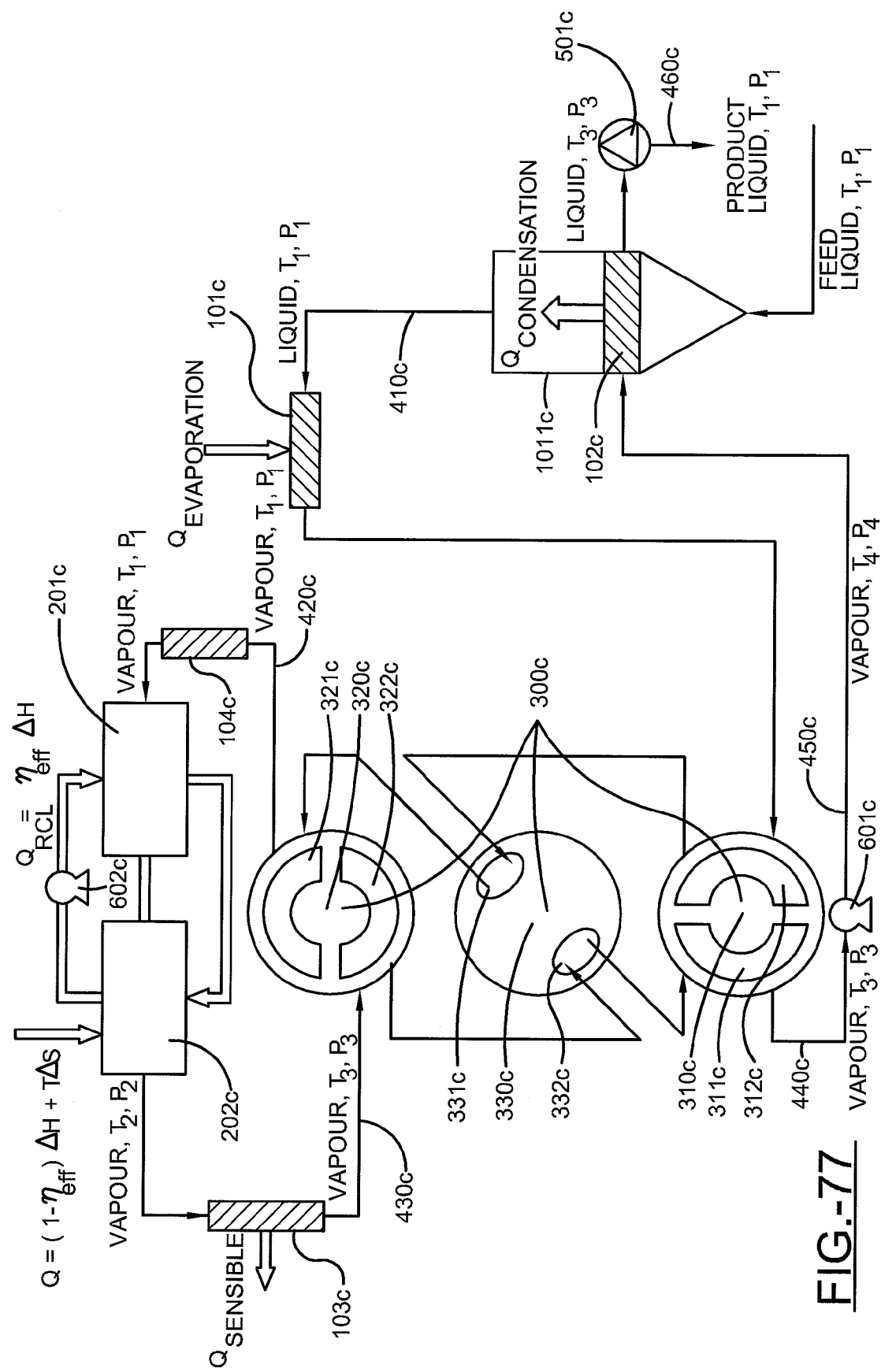
FIG. 77-80 illustrate embodiments of a thermal wave water-purification system in an open configuration, which, for purposes of this disclosure signifies adsorbate flow from a first adsorbent bed to a second adsorbent bed.

FIG. 77 shows a Thermal Wave Adsorption System with a novel rotary valve assembly (300c) in a first position with its third valve member (330c) with a first through aperture (331c) and second through aperture (332c) in a first position, first regenerative adsorption bed (201c) and second regenerative adsorption bed (202c), a first blower (601c) and a second blower (602c), an evaporator (101c), a condenser (102c), an expansion valve (501c), feed reservoir (1011c) and a first heat exchanger (103c) with said first adsorption bed (201c) in adsorption and said second adsorption bed (202c) in desorption.

Said first adsorbent bed (201c) communicates with said feed reservoir (1011c) by means of an evaporator (101c), a first conduit (410c), a novel rotary valve assembly (300c) with a first valve member (310c) and a first aperture (311c) and second aperture (312c) with a rotational angle to a second valve member (320c) with a first aperture (321c) and second aperture (322c) to provide a variable and adjustable process cycle time, a third rotary valve (330c) member with first through aperture (331c) interconnection of said first aperture (311c) of said first valve member (310c), first aperture (321c) of second valve member (320c) and a second conduit (420c).

A second adsorbent bed (202c) communicates to feed reservoir (1011c) by means of a condenser (102c), heat exchanger (103c), a third conduit (430c), a first rotary valve member (310c), a second rotary valve member (320c), a third rotary valve (330c) member, a fourth conduit (440c) and interconnection of said second aperture (312c) of said first valve member (310c), second aperture (322c) of second valve member (320c), second through aperture (332c) of third valve member (330c), a fourth conduit (440c), a first blower (601c), a fifth conduit (450c), an expansion valve (501c) with product discharge by means of a sixth conduit (460c).

Heat recycle and cooling of the system by means of a first blower (601c) of in communication with said first adsorbent bed (201c) or second adsorbent bed (202c) to assist mass diffusion mechanically. Heat transfer increases by means of direct flow from adsorbing bed to desorbing bed.

The thermal efficiency of this system defined as the amount of heat retention from exothermic reaction or $\eta \Delta H$, where $\eta$ is thermal efficiency and $\Delta H$ the enthalpy of reaction. The heat addition to the system is the reversible heat of chemical reaction $T\Delta S$, where T is the temperature of reaction and $\Delta S$ the entropy change of reaction, the work of compression of adsorbate vapour and make-up for thermal inefficiency $(1-\eta) \Delta H$, i.e., $Q=(1-\eta)\Delta H+T\Delta S+RT \ln([P_2H_2O]/[P_1H_2O])$. The Coefficient of Performance ("COP") is the cooling or heating power to the input power, $Q_{condensation}/Q$ or $Q_{evaporation}/Q$.

Figure 78:
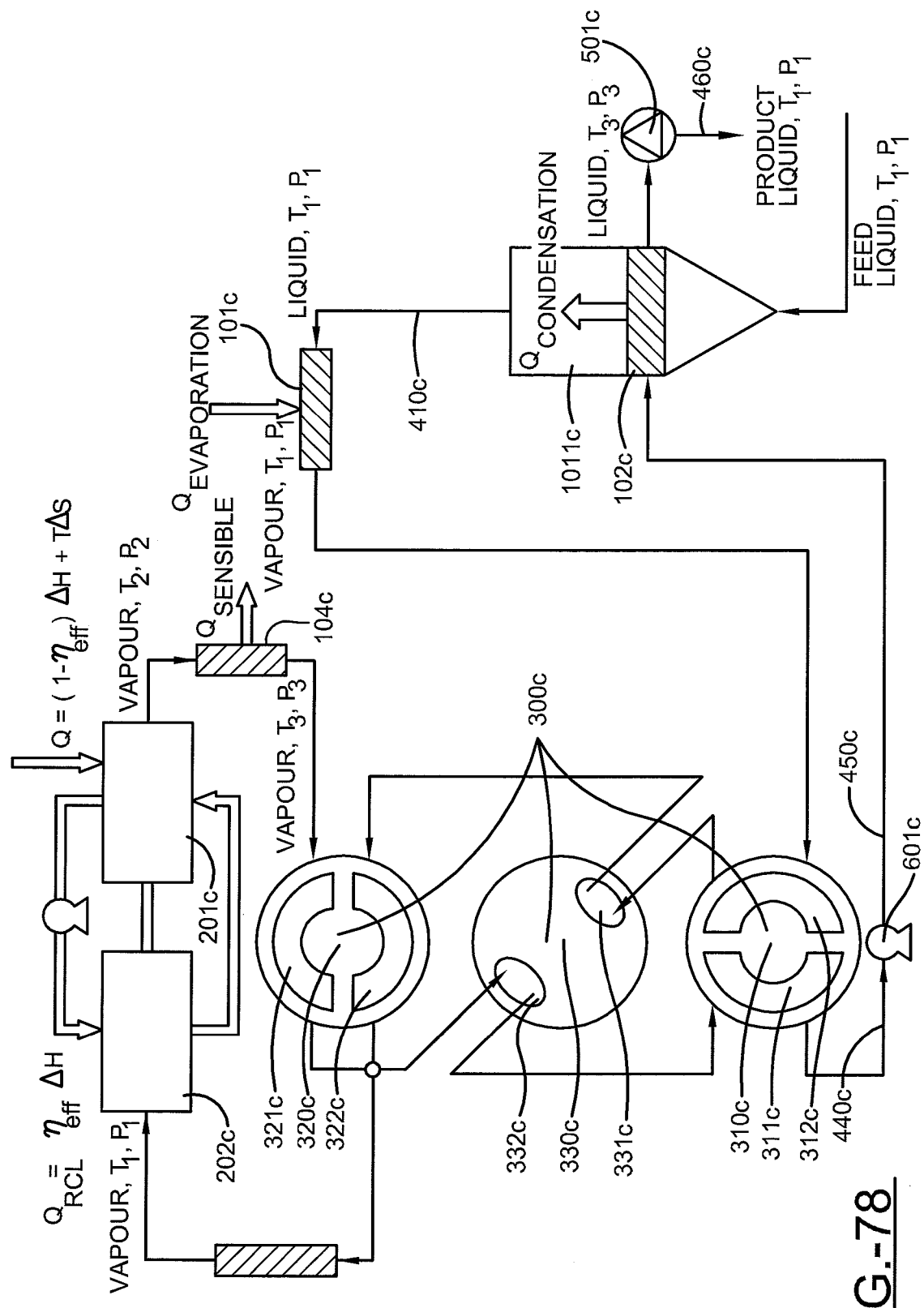

FIG. 78 illustrates said process flow diagram of a thermal wave heat pump of FIG. 77 with a novel rotary valve assembly (300c) and its third valve member (330c) with a first through aperture (331c) and second through aperture (332c) in a second position, a heat exchanger (104c) and with said first adsorption bed (201c) in desorption and said second adsorption bed (202c) in adsorption.

Said second adsorbent bed (202c) communicates with said feed reservoir (1011c) by means of an evaporator (101c), a first conduit (410c), a novel rotary valve assembly (300c) with a first valve member (310c) and a first aperture (311c) and second aperture (312c) with a rotational angle to a second valve member (320c) with a first aperture (321c) and second aperture (322c) to provide a variable and adjustable process cycle time, a third rotary valve (330c) member with first through aperture (331c) interconnection of said first aperture (311c) of said first valve member (310c), second aperture (322c) of second valve member (320c) and a third conduit (430c).

A first adsorbent bed (201c) communicates to feed reservoir (1011c) by means of a condenser (102c), heat exchanger (103c), a second conduit (420c), a first rotary valve member (310c), a second rotary valve member (320c), a third rotary valve (330c) member, a fourth conduit (440c) and interconnection of said second aperture (312c) of said first valve member (310c), first aperture (321c) of second valve member (320c), second through aperture (332c) of third valve member (330c), a fourth conduit (440c), a first blower (601c), a fifth conduit (450c), an expansion valve (501c) with product discharge by means of a sixth conduit (460c).

Heat recycle and cooling of the system by means of a first blower (601c) of in communication with said first adsorbent bed (201c) or second adsorbent bed (202c) to assist mass diffusion mechanically. Heat transfer increases by means of direct flow from adsorbing bed to desorbing bed.

The thermal efficiency of this system defined as the amount of heat retention from exothermic reaction or $\eta \Delta H$, where $\eta$ is thermal efficiency and $\Delta H$ the enthalpy of reaction. The heat addition to the system is the reversible heat of chemical reaction $T\Delta S$, where T is the temperature of reaction and $\Delta S$ the entropy change of reaction, the work of compression of adsorbate vapour and make-up for thermal inefficiency $(1-\eta)\Delta H$, i.e., $Q=(1-\eta)\Delta H+T\Delta S+RT \ln([P_2H_2O]/[P_1H_2O])$. The Coefficient of Performance (COP) is the cooling or heating power to the input power, $Q_{condensation}/Q$ or $Q_{evaporation}/Q$.

Figure 79:
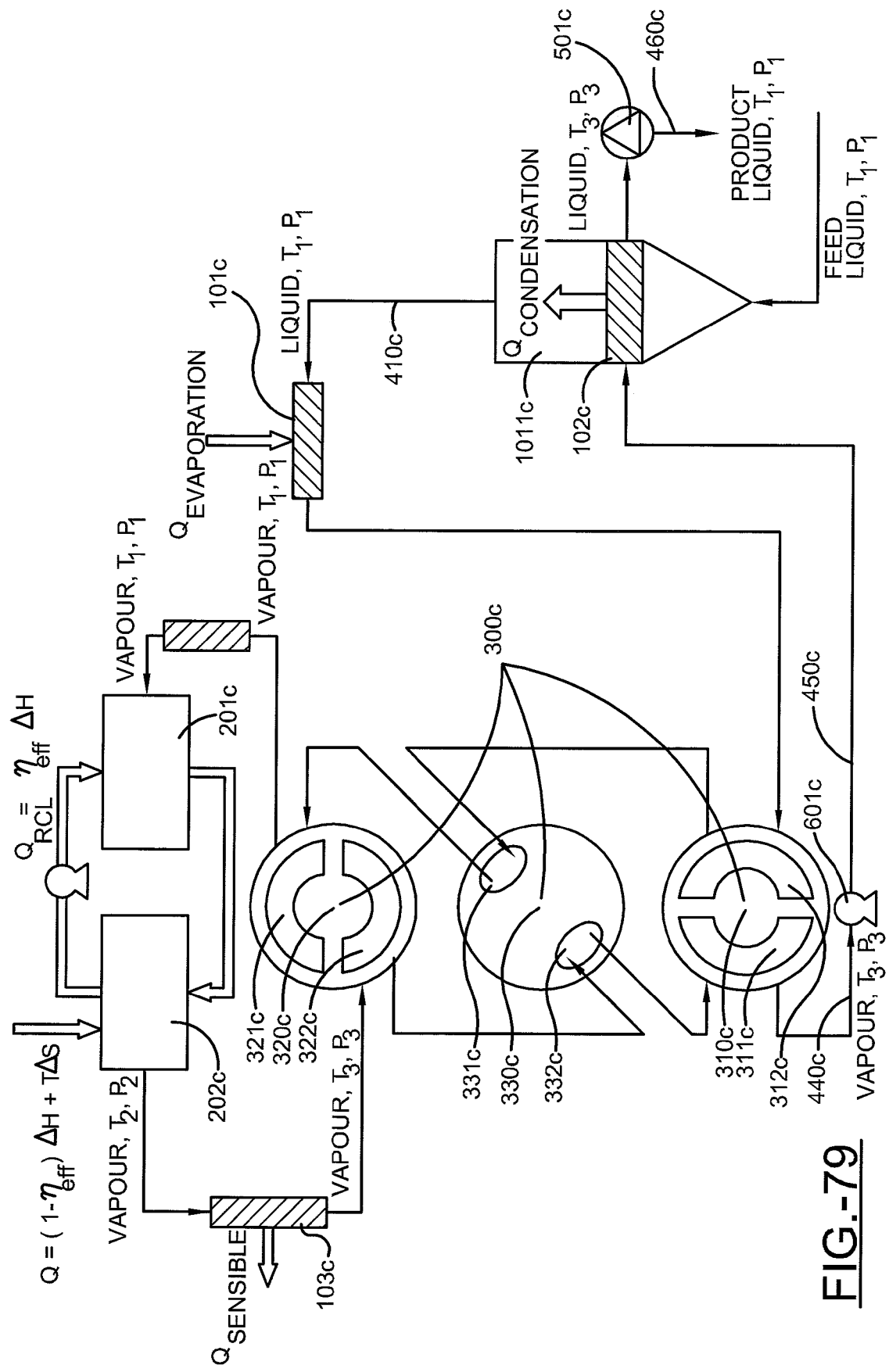

FIG. 79 illustrates said process flow diagram of a thermal wave heat pump of FIG. 77 with a novel rotary valve assembly (300c) and its third valve member (330c) with a first through aperture (331c) and second through aperture (332c) in a third position, a heat exchanger (103c) and with said first adsorption bed (201c) in adsorption and said second adsorption bed (202c) in desorption.

Figure 80:
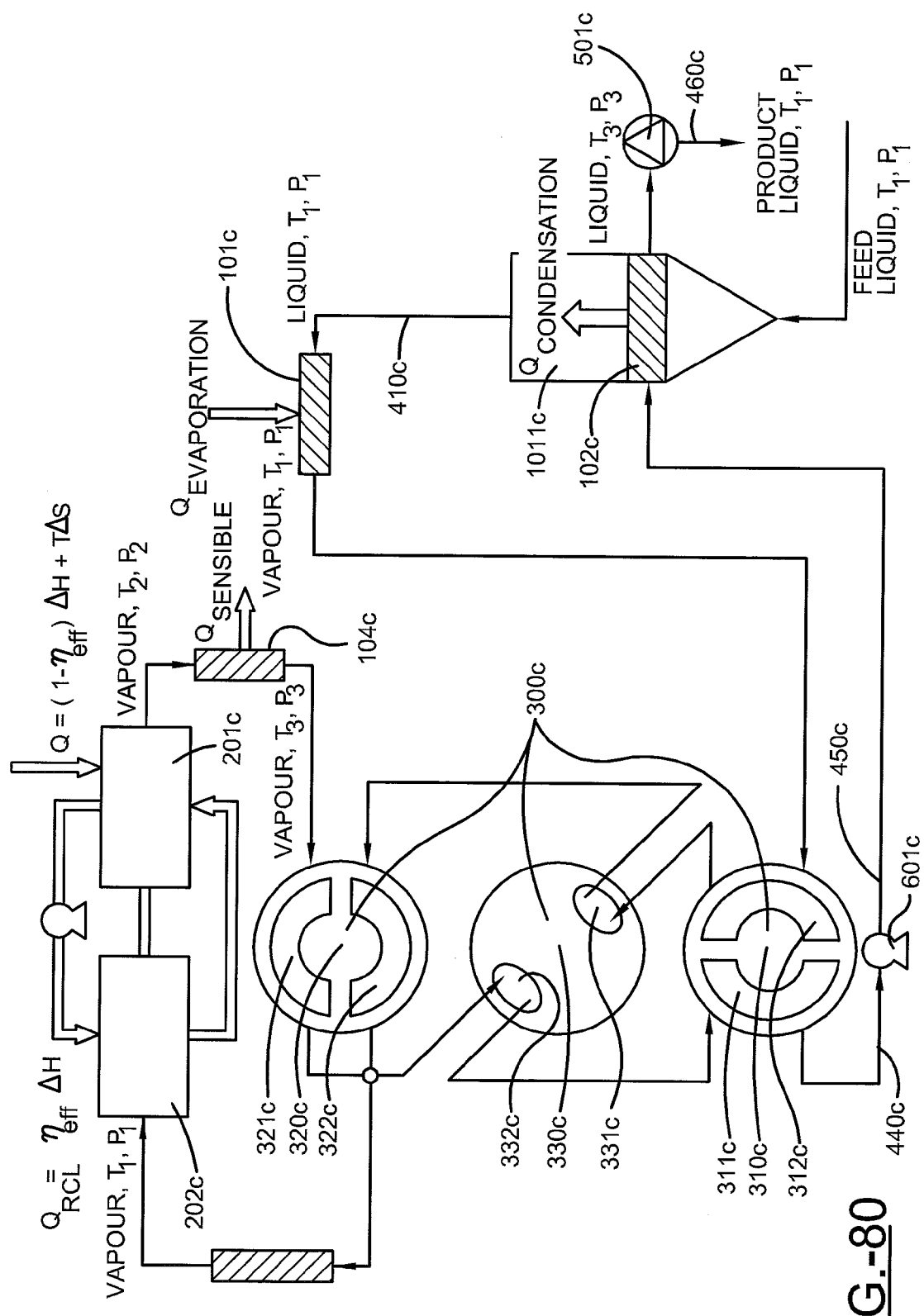

FIG. 80 illustrates said process flow diagram of a thermal wave heat pump of FIG. 78 with a novel rotary valve assembly (300c) and its third valve member (330c) with a first through aperture (331c) and second through aperture (332c) in a fourth position, a heat exchanger (103c) and with said first adsorption bed (201c) in desorption and said second adsorption bed (202c) in adsorption.

Heat Pump

FIGS. 81-84 illustrate a Thermal Wave Heat Pump in a closed system configuration wherein a novel rotary valve assembly enables alternating flow passage to an evaporator and condenser. A closed system for purposes of this discussion signifies adsorbate from one adsorbent bed does not flow directly into a second adsorbent bed.

FIGS. 85-88 illustrate a Thermal Wave Heat Pump in a closed system configuration wherein a first novel rotary valve assembly enables alternating flow passage to a second novel rotary valve assembly that alternates flow passage to evaporator and condenser. A closed system for purposes of this discussion signifies adsorbate from one adsorbent bed does not flow directly into a second adsorbent bed.

FIGS. 89-92 illustrate a Thermal Wave Heat Pump in an open system configuration wherein a novel rotary valve assembly enables alternating flow passage to an evaporator and condenser. An open system configuration for purposes of this discussion signifies direct adsorbate flow from a first adsorbent bed to a second adsorbent bed.

FIGS. 93-104 illustrate a Thermal Wave Heat Pump in an open system configuration a first novel rotary valve assembly enables alternating flow passage to a second novel rotary valve assembly that alternates flow passage to evaporator and condenser. An open system configuration for purposes of this discussion signifies direct adsorbate flow from a first adsorbent bed to a second adsorbent bed.

Figure 81:
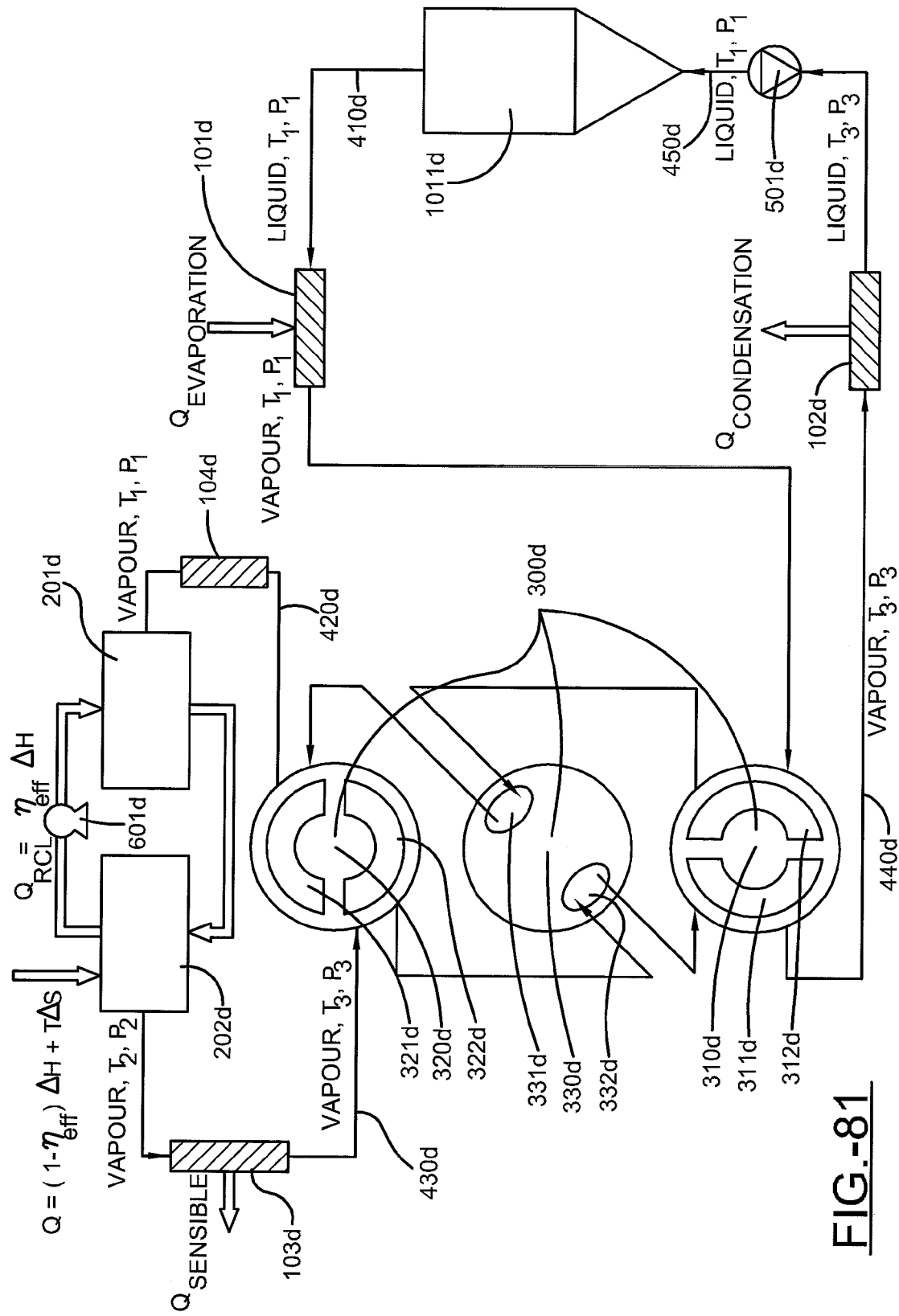
FIG. 81 shows a thermal wave adsorption system including a rotary valve assembly in a first position, first and second regenerative adsorption beds, a blower, heat exchanger, condenser, expansion valve, condensate reservoir and evaporator with said first bed in adsorption and said second bed in desorption.

FIG. 81 shows a Thermal Wave Adsorption System with novel rotary valve assembly (300d) in a first position and a third valve member (330d) with a first through aperture (331d) and second through aperture (332d) in a first position, first regenerative adsorption bed (201d) and second regenerative adsorption bed (202d), a blower (601d), heat exchanger (103d), condenser (102d), expansion valve (501d), condensate reservoir (1011d) and evaporator (101d) with said first adsorption bed (201d) in adsorption and said second adsorption bed (202d) in desorption.

Said first adsorbent bed (201d) communicates with said condensate reservoir (1011d) by means of an evaporator (101d), a first conduit (410d), a novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with first through aperture (331d) interconnection of said first aperture (311d) of said first valve member (310d), first aperture (321d) of second valve member (320d) and a second conduit (420d).

A second adsorbent bed (202d) communicates to condensate reservoir (1011d) by means of a condenser (102d), heat exchanger (103d), a third conduit (430d), a first rotary valve member (310d), a second rotary valve member (320d), a third rotary valve (330d) member, a fourth conduit (440d) and interconnection of said second aperture (312d) of said first valve member (310d), second aperture (322d) of second valve member (320d), second through aperture (332d) of third valve member (330d), a fourth conduit (440d), an expansion valve (501d) and fifth conduit (450d).

Heat recycles through the system by means of a blower (601d) of in communication with said first adsorbent bed (201d) and second adsorbent bed (202d). The thermal efficiency of this system defined as the amount of heat retention from exothermic reaction or $\eta\Delta H$, where $\eta$ is thermal efficiency and $\Delta H$ the enthalpy of reaction. The heat addition to the system is the reversible heat of chemical reaction $T\Delta S$, where $T$ is the temperature of reaction and $\Delta S$ the entropy change of reaction, the work of compression of adsorbate vapour and make-up for thermal inefficiency $(1-\eta)\Delta H$, i.e., $Q=(1-\eta)\Delta H + T\Delta S + RT \ln([P_2H_2O]/[P_1H_2O])$. The Coefficient of Performance ("COP") is the cooling or heating power to the input power, $Q_{condensation}/Q$ or $Q_{evaporation}/Q$.

Figure 82:
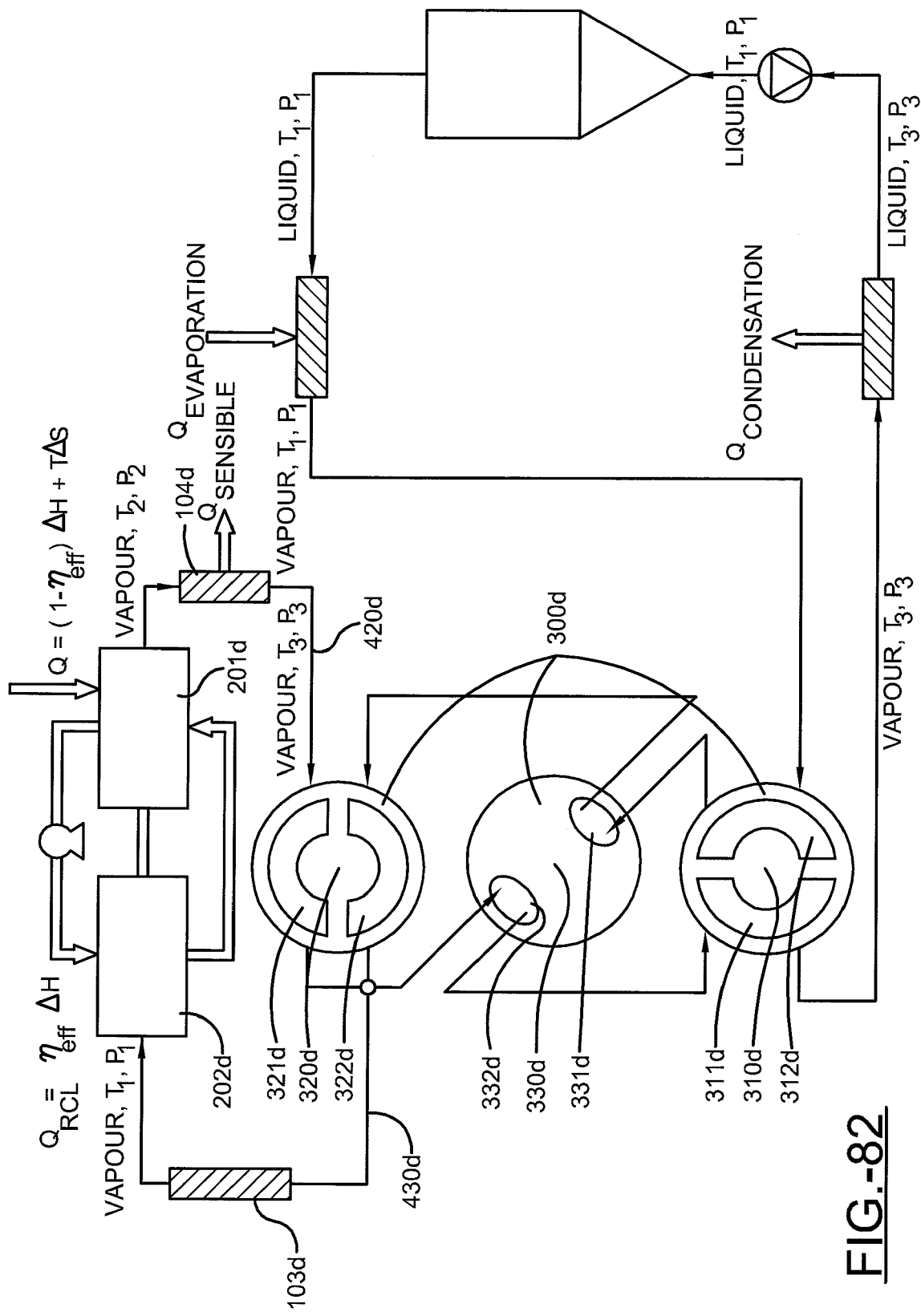
FIG. 82 shows a thermal wave adsorption system including a rotary valve assembly in a second position, first and second regenerative adsorption beds, a blower, heat exchanger, condenser, expansion valve, condensate reservoir and evaporator with said first bed in desorption and said second bed in adsorption.

FIG. 82 illustrates said process flow diagram of a thermal wave heat pump of FIG. 81 with novel rotary valve assembly (300d) in a first position and said third valve member (330d) with said first through aperture (331d) and second through aperture (332d) in a second position, a heat exchanger (104d) and said first adsorption bed (201d) in desorption and said second adsorption bed (202d) in adsorption.

Said second adsorbent bed (202d) communicates with said condensate reservoir (1011d) by means of an evaporator (101d), a third conduit (430d), a novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with first through aperture (331d) interconnection of said first aperture (311d) of said first valve member (310d), second aperture (322d) of second valve member (320d) and a first conduit (410d).

A first adsorbent bed (201d) communicates to condensate reservoir (1011d) by means of a condenser (102d), heat exchanger (104d), a second conduit (420d), a first rotary valve member (310d), a second rotary valve member (320d), a third rotary valve (330d) member, a fourth conduit (440d) and interconnection of said second aperture (312d) of said first valve member (310d), first aperture (321d) of second valve member (320d), second through aperture (332d) of third valve member (330d), a fourth conduit (440d), an expansion valve (501d) and fifth conduit (450d).

Figure 83:
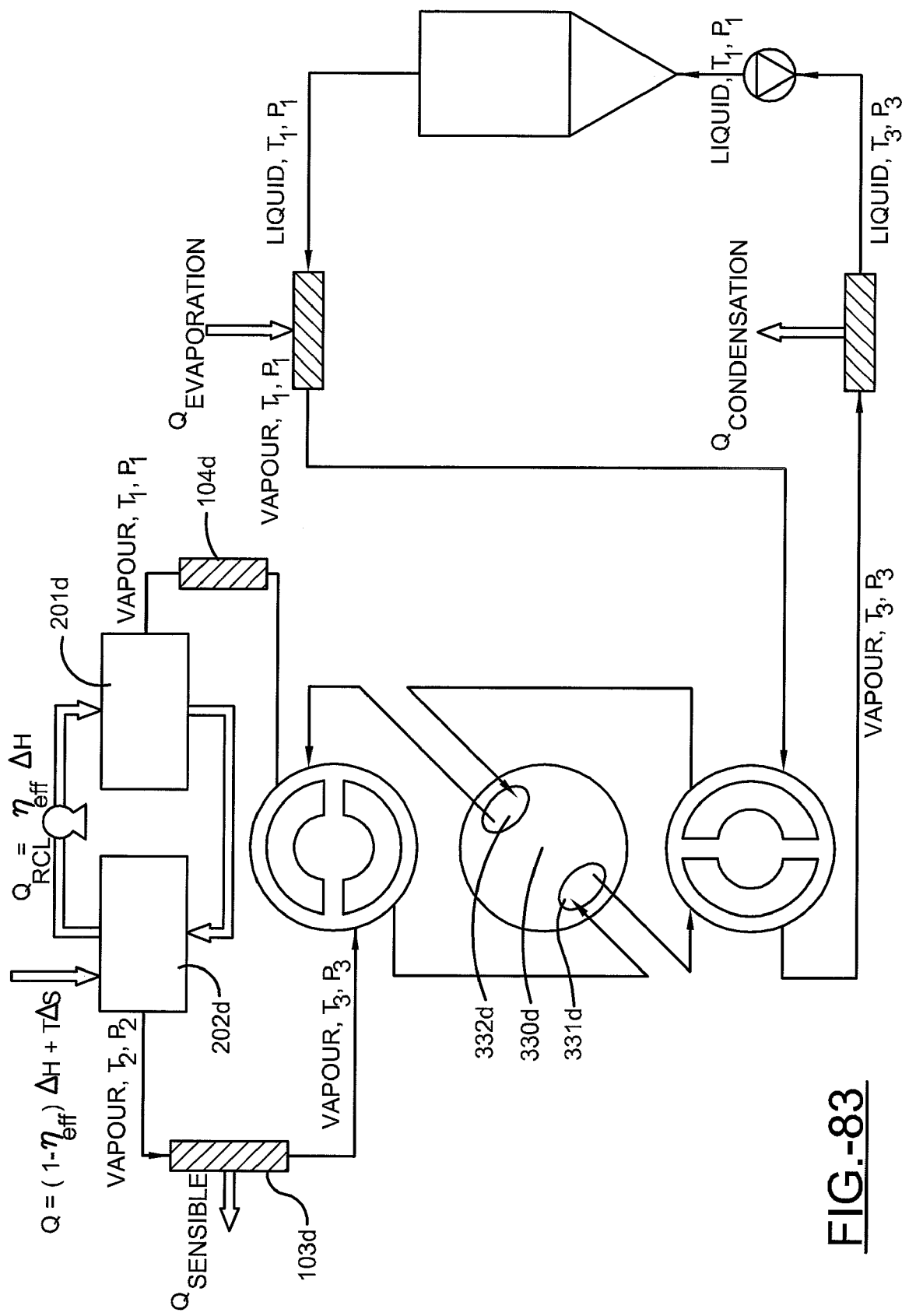
FIG. 83 shows a thermal wave adsorption system including a rotary valve assembly in a third position, first and second regenerative adsorption beds, a blower, heat exchanger, condenser, expansion valve, condensate reservoir and evaporator with said first bed in adsorption and said second bed in desorption.

FIG. 83 said process flow diagram of a thermal wave heat pump of FIG. 81 with novel rotary valve assembly (300d) in said first position and said third valve member (330d) with said first through aperture (331d) and second through aperture (332d) in a third position, said heat exchanger (103d) and said first adsorption bed (201d) in adsorption and said second adsorption bed (202d) in desorption.

Figure 84:
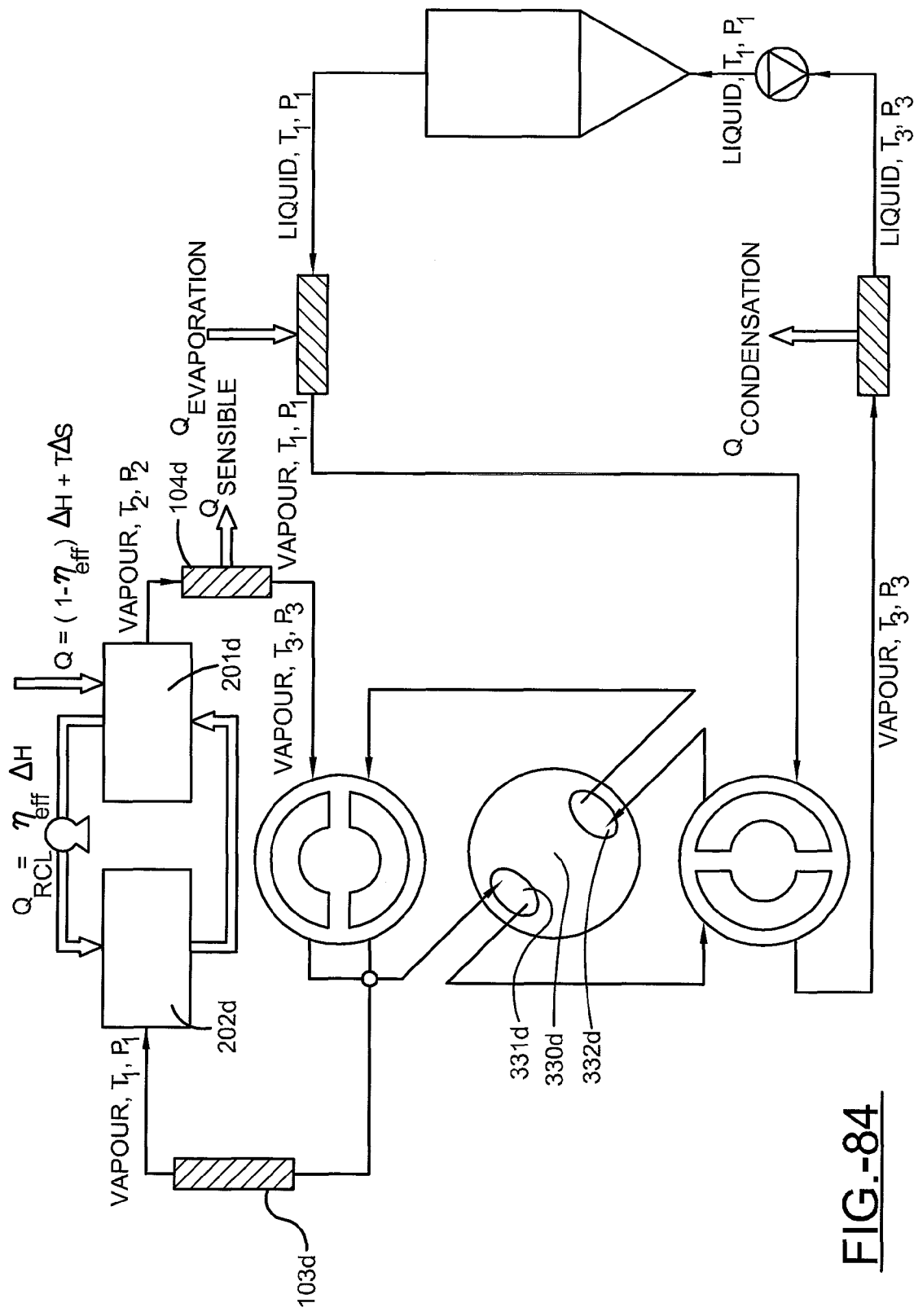
FIG. 84 shows a thermal wave adsorption system including a rotary valve assembly in a fourth position, first and second regenerative adsorption beds, a blower, heat exchanger, condenser, expansion valve, condensate reservoir and evaporator with said first bed in desorption and said second bed in adsorption.

FIG. 84 illustrates said process flow diagram of a thermal wave heat pump of FIG. 82 with novel rotary valve assembly (300d) in said first position and said third valve member (330d) with said first through aperture (331d) and second through aperture (332d) in a fourth position, said heat exchanger (104d) and said first adsorption bed (201d) in adsorption and said second adsorption bed (202d) in desorption.

Figure 85:
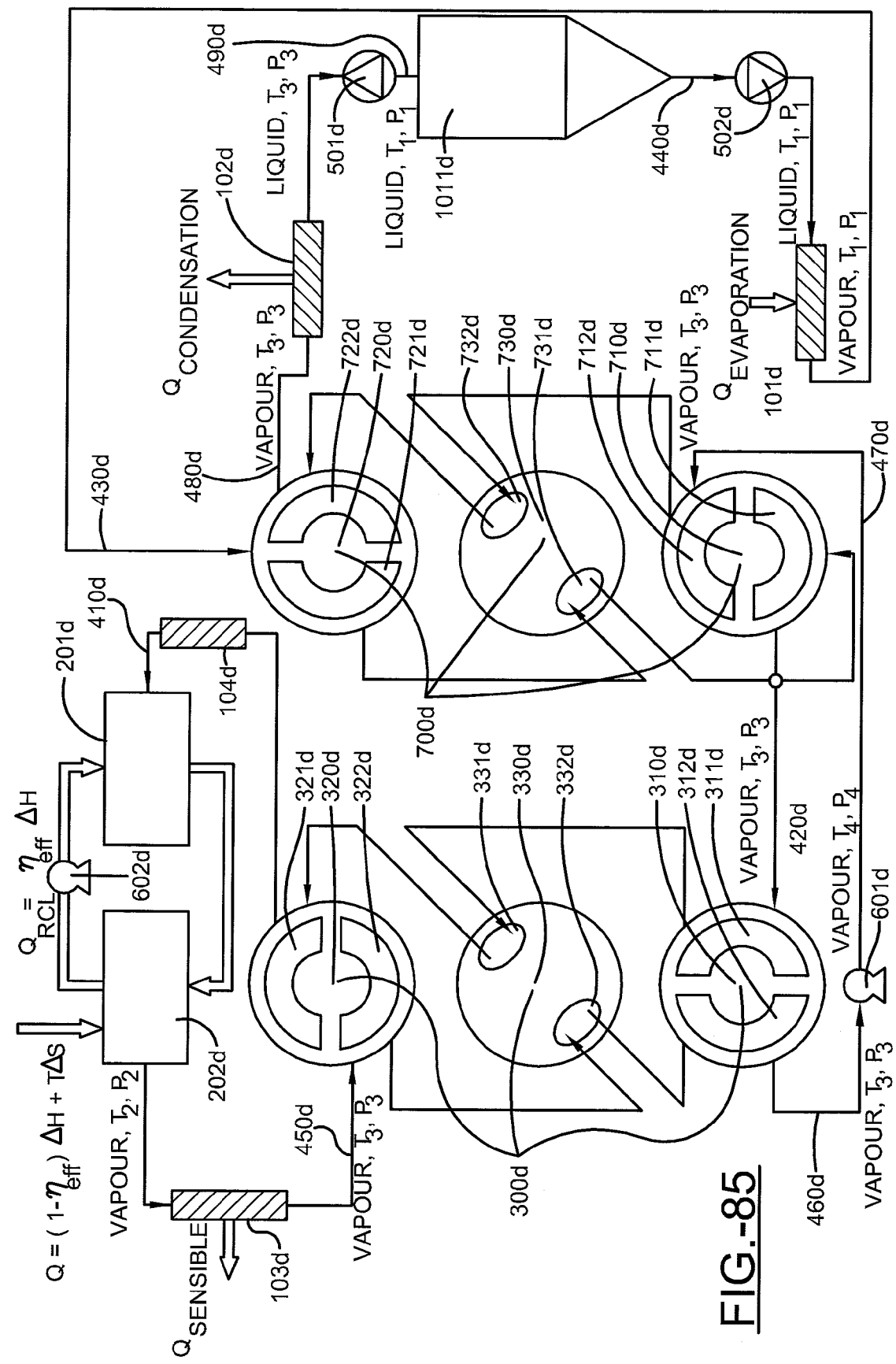
FIG. 85 shows a Thermal Wave Adsorption System including a first rotary valve assembly in a first position, a second rotary valve assembly in a first position, first and second regenerative adsorption beds, a first heat exchanger, a second heat exchanger and a third heat exchanger, a first blower and a second blower, a first expansion valve and a second expansion valve, condensate reservoir with said first heat exchanger as evaporator and said second heat exchanger as condenser, first bed in adsorption and said second bed in desorption.

FIG. 85 shows a Thermal Wave Adsorption System with a first novel rotary valve assembly (300d) in a first position and a third valve member (330d) with a first through aperture (331d) and second through aperture (332d) in a first position, a second novel rotary valve assembly (700d) in a first position and a third valve member (730d) with a first through aperture (731d) and second through aperture (732d) in a first position, first regenerative adsorption bed (201d) and second regenerative adsorption bed (202d), a first blower (601d), a first heat exchanger (101d) acting as evaporator, second heat exchanger (102d) acting as condenser and third heat exchanger (103d), a first expansion valve (501d) and second expansion valve (502d), condensate reservoir (1011d) and with said first adsorption bed (201d) in adsorption and said second adsorption bed (202d) in desorption.

Said first adsorbent bed (201d) communicates with said condensate reservoir (1011d) by means of a first conduit (410d), a first novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with first through aperture (331d) interconnection of said first aperture (311d) of said first valve member (310d), first aperture (321d) of second valve member (320d), a second conduit (420d), a second novel rotary valve assembly (700d) with a first valve member (710d) and a first aperture (711d) and second aperture (712d) with a rotational angle to a second valve member (720d) with a first aperture (721d) and second aperture (722d) to provide a second variable and adjustable process cycle time, a third rotary valve (730d) member with first through aperture (731d) interconnection of said first aperture (711d) of said first valve member (710d), first aperture (721d) of second valve member (720d), a third conduit (430d), a first heat exchanger (101d) acting as an evaporator and a fourth conduit (440d).

Said second adsorbent bed (202d) communicates with said condensate reservoir (1011d) by means of a fifth conduit (450d), a heat exchanger (103d), a first novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d)

member with second through aperture (332d) interconnection of said second aperture (312d) of said first valve member (310d), second aperture (322d) of second valve member (320d), a sixth conduit (460d), a first blower (601d), a seventh conduit (470d), a second novel rotary valve assembly (700d) with a first valve member (710d) and a first aperture (711d) and second aperture (712d) with a rotational angle to a second valve member (720d) with a first aperture (721d) and second aperture (722d) to provide a second variable and adjustable process cycle time, a third rotary valve (730d) member with second through aperture (732d) interconnection of said second aperture (712d) of said first valve member (710d), second aperture (722d) of second valve member (720d), a eighth conduit (480d), a heat exchanger (102d) acting as a condenser, an expansion valve (501d) and a ninth conduit (490d).

Said first novel rotary valve (300d) communicates with adsorbent beds (201d) and (202d) and provides means to reverse flow as necessary for periodic regeneration of a saturated bed. Said second novel rotary valve (700d) communicates with said heat exchanger (101d) and heat exchanger (102d) and provides a variable and adjustable means to alternate heat exchanger function from evaporator to condenser. Such alternation of function provides effective means to create a hot or cold space, frost-free evaporator operation and maintain optimal COP.

Process cycle time decreases by means of a first blower (601d) in communication with first adsorbent bed (201d) or second adsorbent bed (202d) to assist mass diffusion mechanically. Heat recycle and cooling of the system by means of a second blower (602d) in communication with said first adsorbent bed (201d) and second adsorbent bed (202d). The thermal efficiency of this system defined as the amount of heat retention from exothermic reaction or $\eta \Delta H$, where $\eta$ is thermal efficiency and $\Delta H$ the enthalpy of reaction. The heat addition to the system is the reversible heat of chemical reaction $T \Delta S$, where T is the temperature of reaction and $\Delta S$ the entropy change of reaction, the work of compression of adsorbate vapour and make-up for thermal inefficiency $(1-\eta)\Delta H$, i.e., $Q=(1-\eta)\Delta H+T\Delta S+RT \ln([P_2H_2O]/[P_1H_2O])$. The Coefficient of Performance (COP) is the cooling or heating power to the input power, $Q_{condensation}/Q$ or $Q_{evaporation}/Q$.

Figure 86:
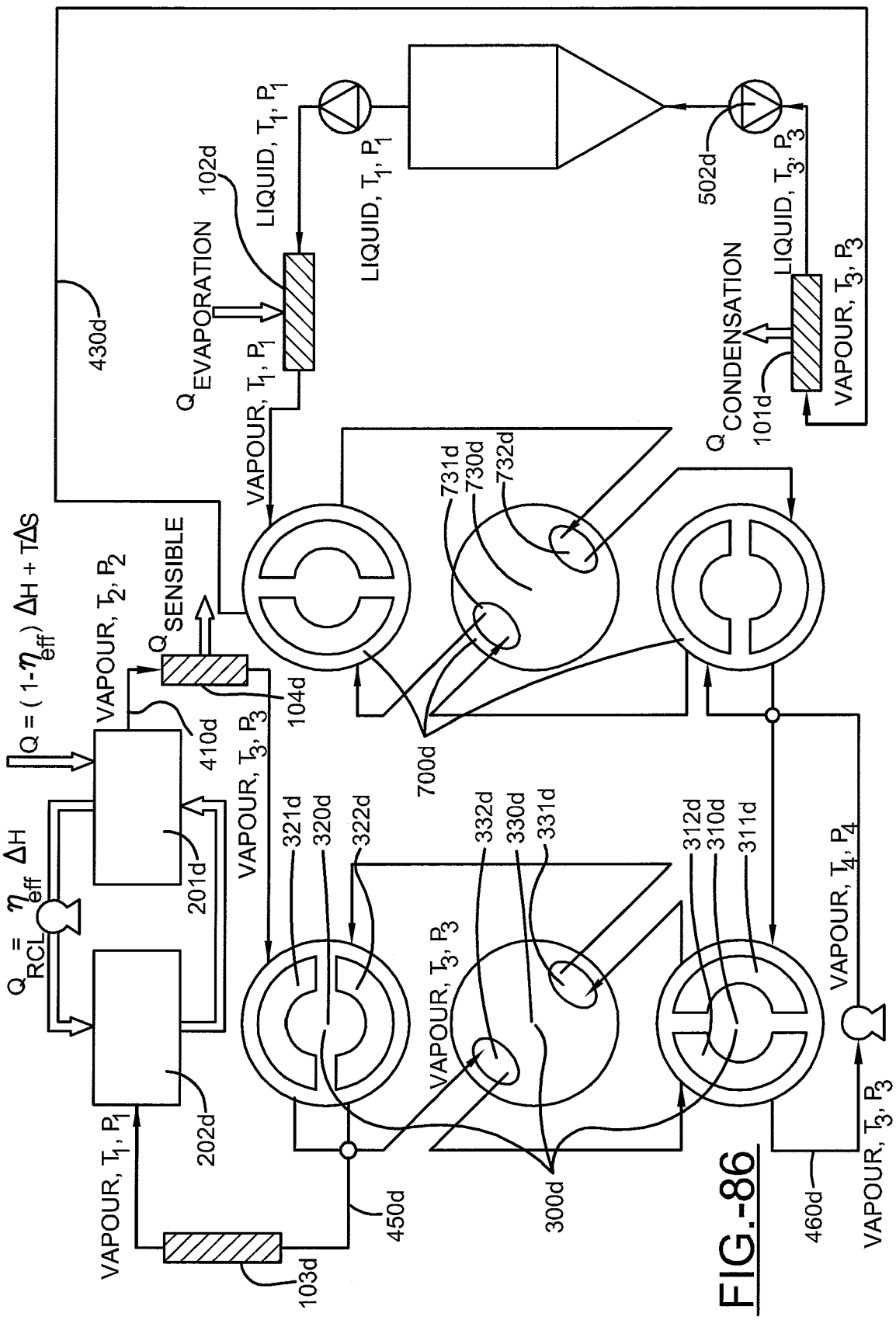
FIG. 86 shows a Thermal Wave Adsorption System including a first rotary valve assembly in a second position, a second rotary valve assembly in a second position, first and second regenerative adsorption beds, a first heat exchanger, a second heat exchanger and a third heat exchanger, a first blower and a second blower, a first expansion valve and a second expansion valve, condensate reservoir and with said first heat exchanger as condenser and said second heat exchanger as evaporator, said first bed in desorption and said second bed in adsorption.

FIG. 86 illustrates said process flow diagram of a thermal wave heat pump of FIG. 85 with a first novel rotary valve assembly (300d) and its third valve member (330d) with a first through aperture (331d) and second through aperture (332d) in a second position, a second novel rotary valve assembly (700d) and its third valve member (730d) with a first through aperture (731d) and second through aperture (732d) in a second position with said first heat exchanger (101d) as condenser, said second heat exchanger (102d) as evaporator and a third heat exchanger (104d), an expansion valve (502d), with said first adsorption bed (201d) in desorption and said second adsorption bed (202d) in adsorption, Said second adsorbent bed (202d) communicates with condensate reservoir (1011d) by means of a fifth conduit (450d), a first novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with first through aperture (331d) interconnection of said first aperture (311d) of said first valve member (310d), second aperture (322d) of second valve member (320d), a third conduit (430d), a second novel rotary valve assembly (700d) with a first valve member (710d) and a first aperture (711d) and second aperture (712d) with a rotational angle to a second valve member (720d) with a first aperture (721d) and second aperture (722d) to provide a second variable and adjustable process cycle time, a third rotary valve (730d) member with first through aperture (731d) interconnection of said first aperture (711d) of said first valve member (710d), first aperture (721d) of second valve member (720d), a third conduit (430d), a first heat exchanger (101d) acting as an evaporator and a fourth conduit (440d).

Said first adsorbent bed (201d) communicates with said condensate reservoir (1011d) by means of a first conduit (410d), a heat exchanger (103d), a first novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with second through aperture (332d) interconnection of said second aperture (312d) of said first valve member (310d), first aperture (321d) of second valve member (320d), a sixth conduit (460d), a first blower (601d), a seventh conduit (470d), a second novel rotary valve assembly (700d) with a first valve member (710d) and a first aperture (711d) and second aperture (712d) with a rotational angle to a second valve member (720d) with a first aperture (721d) and second aperture (722d) to provide a second variable and adjustable process cycle time, a third rotary valve (730d) member with second through aperture (732d) interconnection of said second aperture (712d) of said first valve member (710d), second aperture (722d) of second valve member (720d), a eighth conduit (480d), a heat exchanger (102d) acting as a condenser, an expansion valve (501d) and a ninth conduit (490d).

Figure 87:
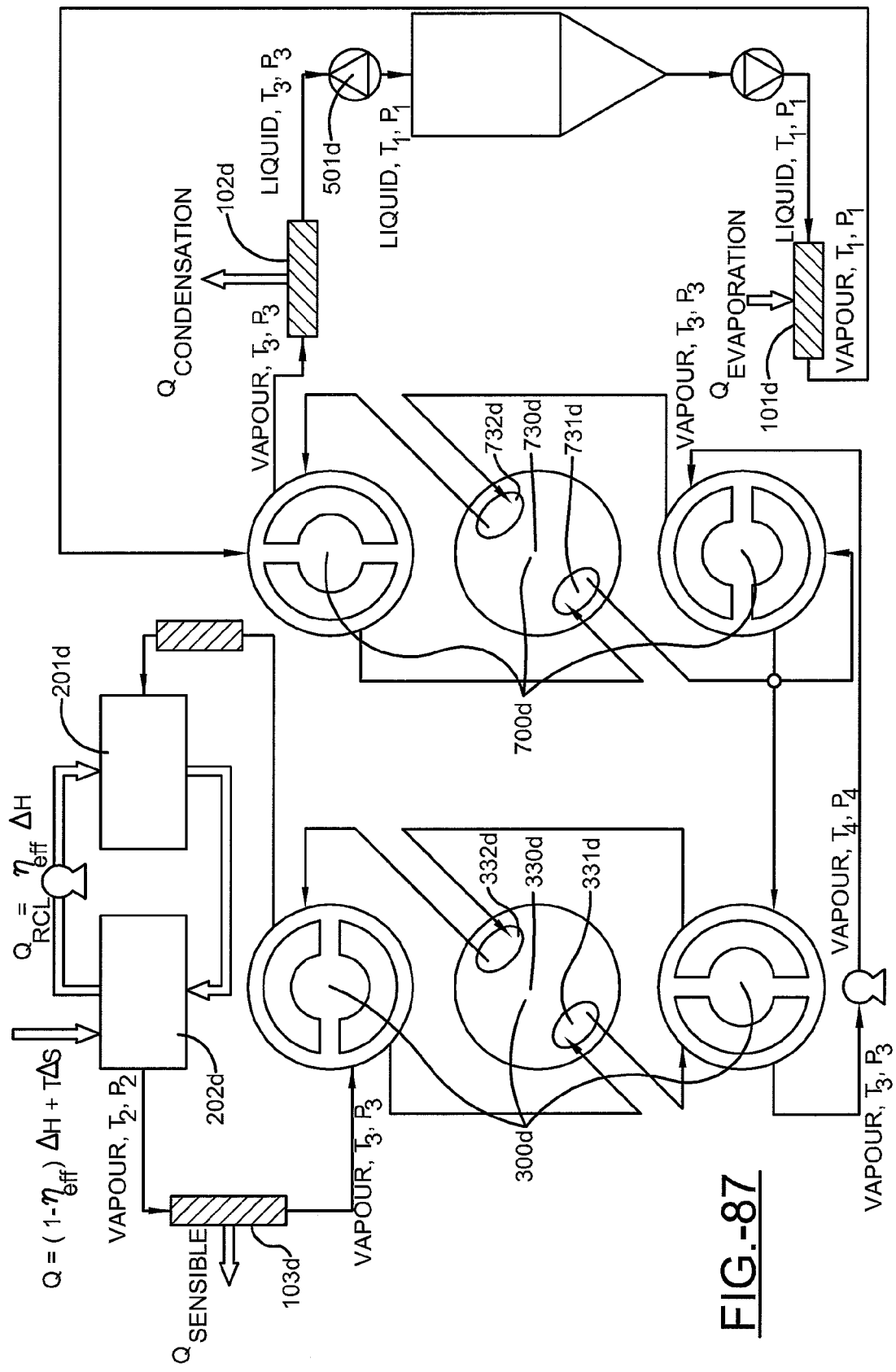
FIG. 87 shows a Thermal Wave Adsorption System including a first rotary valve assembly in a third position, a second rotary valve assembly in a third position, first and second regenerative adsorption beds, a first heat exchanger, a second heat exchanger and a third heat exchanger, a first blower and a second blower, a first expansion valve and a second expansion valve, condensate reservoir and with said first heat exchanger as evaporator and said second heat exchanger as condenser, said first bed in adsorption and said second bed in desorption.

FIG. 87 illustrates said process flow diagram of a thermal wave heat pump of FIG. 85 with a first novel rotary valve assembly (300d) and its third valve member (330d) with a first through aperture (331d) and second through aperture (332d) in a third position, a second novel rotary valve assembly (700d) and its third valve member (730d) with a first through aperture (731d) and second through aperture (732d) in a third position with said first heat exchanger (101d) as evaporator, said second heat exchanger (102d) as condenser and third heat exchanger (103d), an expansion valve (501d), with said first adsorption bed (201d) in adsorption and said second adsorption bed (202d) in desorption.

Figure 88:
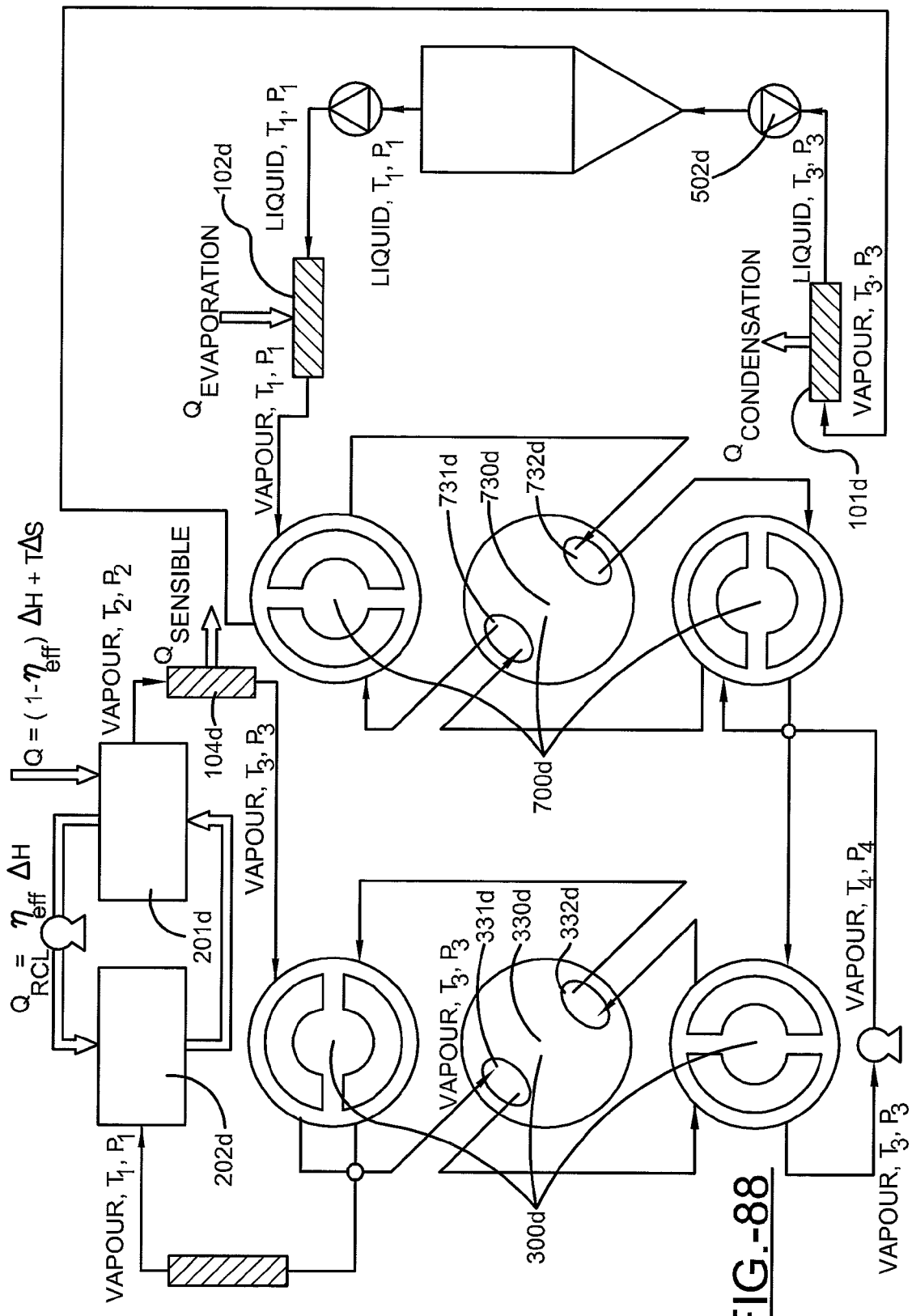
FIG. 88 shows a Thermal Wave Adsorption System including a first rotary valve assembly in a fourth position, a second rotary valve assembly in a fourth position, first and second regenerative adsorption beds, a first heat exchanger, a second heat exchanger and a third heat exchanger, a first blower and a second blower, a first expansion valve and a second expansion valve, condensate reservoir and with said first heat exchanger as condenser and said second heat exchanger as evaporator, said first bed in desorption and said second bed in adsorption.

FIG. 88 illustrates said process flow diagram of a thermal wave heat pump of FIG. 86 with a first novel rotary valve assembly (300d) and its third valve member (330d) with a first through aperture (331d) and second through aperture (332d) in a fourth position, a second novel rotary valve assembly (700d) and its third valve member (730d) with a first through aperture (731d) and second through aperture (732d) in a fourth position with said first heat exchanger (101d) as condenser, said second heat exchanger (102d) as evaporator and third heat exchanger (104d), an expansion valve (502d), with said first adsorption bed (201d) in desorption and said second adsorption bed (202d) in adsorption.

Figure 89:
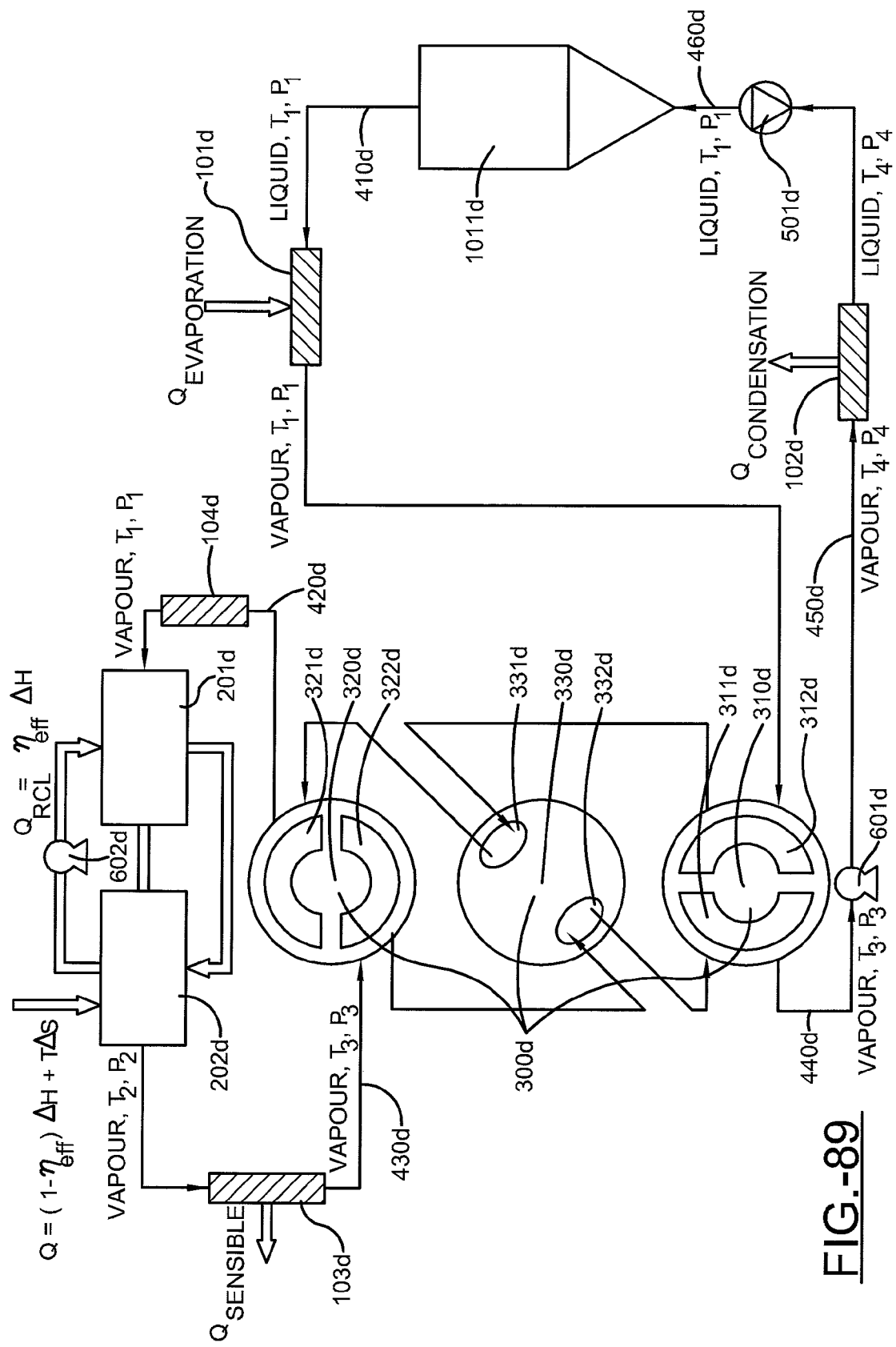
FIG. 89 shows a Thermal Wave Adsorption System including a rotary valve assembly in a first position, first and second regenerative adsorption beds, heat exchanger, a first blower and a second blower, condenser, a first expansion valve and a second expansion valve, condensate reservoir and evaporator with said first bed in adsorption and said second bed in desorption.

FIG. 89 shows a Thermal Wave Adsorption System with a novel rotary valve assembly (300d) in a first position with its third valve member (330d) with a first through aperture (331d) and second through aperture (332d) in a first position, first regenerative adsorption bed (201d) and second regenerative adsorption bed (202d), a first blower (601d) and a second blower (602d), an evaporator (101d), a condenser (102d), an expansion valve (501d), condensate reservoir (101d) and a first heat exchanger (103d) with said first adsorption bed (201d) in adsorption and said second adsorption bed (202d) in desorption.

Said first adsorbent bed (201d) communicates with said condensate reservoir (1011d) by means of an evaporator (101d), a first conduit (410d), a novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with first through aperture (331d) interconnection of said first aperture (311d) of said first valve member (310d), first aperture (321d) of second valve member (320d) and a second conduit (420d).

A second adsorbent bed (202d) communicates to condensate reservoir (1011d) by means of a condenser (102d), heat exchanger (103d), a third conduit (430d), a first rotary valve member (310d), a second rotary valve member (320d), a third rotary valve (330d) member, a fourth conduit (440d) and interconnection of said second aperture (312d) of said first valve member (310d), second aperture (322d) of second valve member (320d), second through aperture (332d) of third valve member (330d), a fourth conduit (440d), a first blower (601d), a fifth conduit (450d), an expansion valve (501d) and a sixth conduit (460d).

Heat recycle and cooling of the system by means of a first blower (601d) of in communication with said first adsorbent bed (201d) or second adsorbent bed (202d) to assist mass diffusion mechanically. Heat transfer increases by means of direct flow from adsorbing bed to desorbing bed.

The thermal efficiency of this system defined as the amount of heat retention from exothermic reaction or $\eta\Delta H$, where $\eta$ is thermal efficiency and $\Delta H$ the enthalpy of reaction. The heat addition to the system is the reversible heat of chemical reaction $T\Delta S$, where T is the temperature of reaction and $\Delta S$ the entropy change of reaction, the work of compression of adsorbate vapour and make-up for thermal inefficiency $(1-\eta)\Delta H$, i.e., $Q=(1-\eta)\Delta H+T\Delta S+RT \ln ([P_2H_2O]/[P_1H_2O])$. The Coefficient of Performance (COP) is the cooling or heating power to the input power, $Q_{condensation}/Q$ or $Q_{evaporation}/Q$.

Figure 90:
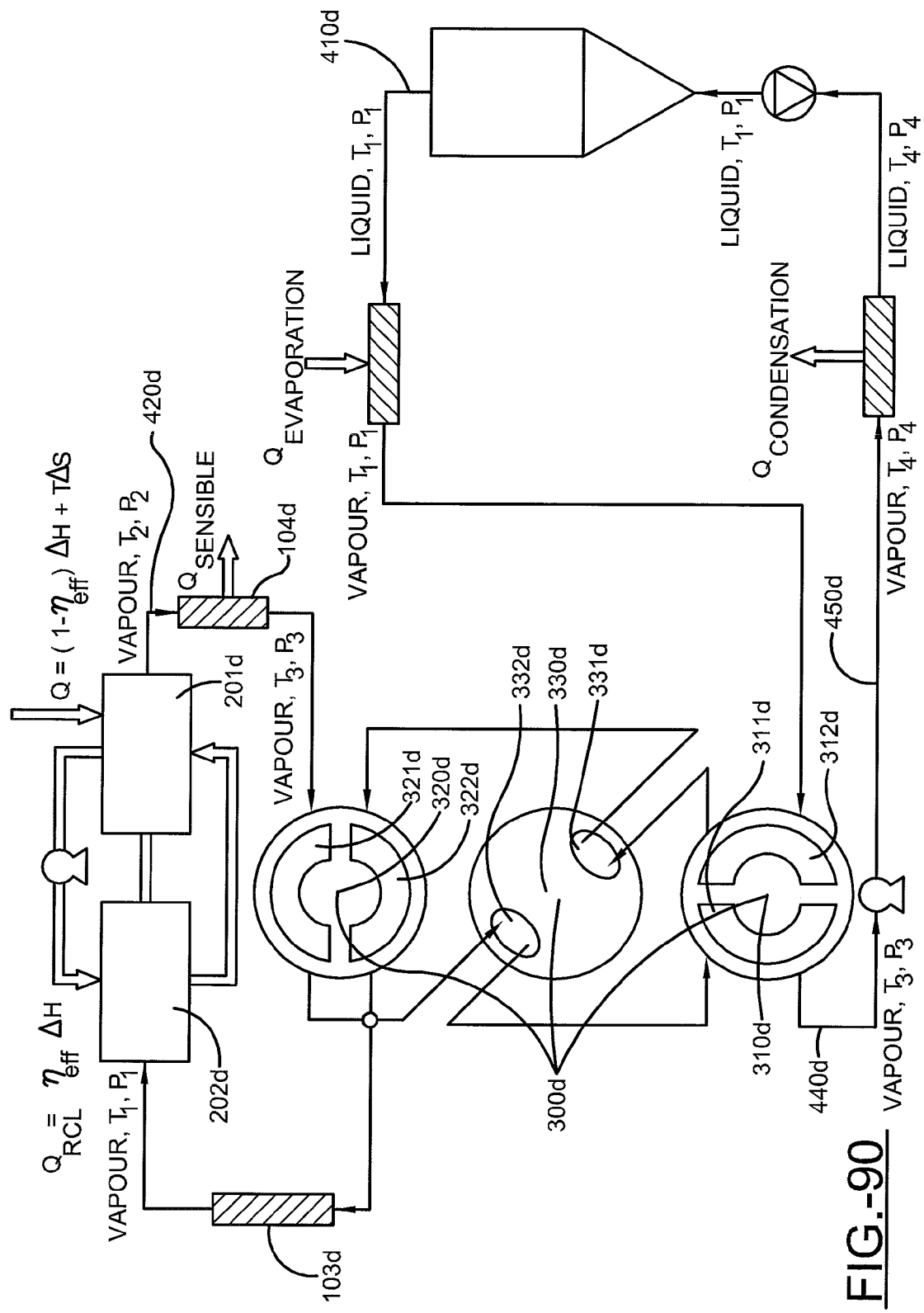
FIG. 90 shows a Thermal Wave Adsorption System including a rotary valve assembly in a second position, first and second regenerative adsorption beds, heat exchanger, a first blower and a second blower, condenser, a first expansion valve and a second expansion valve, condensate reservoir and evaporator with said first bed in desorption and said second bed in adsorption.

FIG. 90 illustrates said process flow diagram of a thermal wave heat pump of FIG. 89 with a novel rotary valve assembly (300d) and its third valve member (330d) with a first through aperture (331d) and second through aperture (332d) in a second position, a heat exchanger (104d) and with said first adsorption bed (201d) in desorption and said second adsorption bed (202d) in adsorption, Said second adsorbent bed (202d) communicates with said condensate reservoir (1011d) by means of an evaporator (101d), a third conduit (430d), a novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with first through aperture (331d) interconnection of said first aperture (311d) of said first valve member (310d), second aperture (322d) of second valve member (320d) and a first conduit (410d).

A first adsorbent bed (201d) communicates to condensate reservoir (1011d) by means of a condenser (102d), heat exchanger (103d), a second conduit (420d), a first rotary valve member (310d), a second rotary valve member (320d), a third rotary valve (330d) member, a fourth conduit (440d) and interconnection of said second aperture (312d) of said first valve member (310d), first aperture (321d) of second valve member (320d), second through aperture (332d) of third valve member (330d), a fourth conduit (440d), a first blower (601d), a fifth conduit (450d), an expansion valve (501d) and a sixth conduit (460d).

Figure 91:
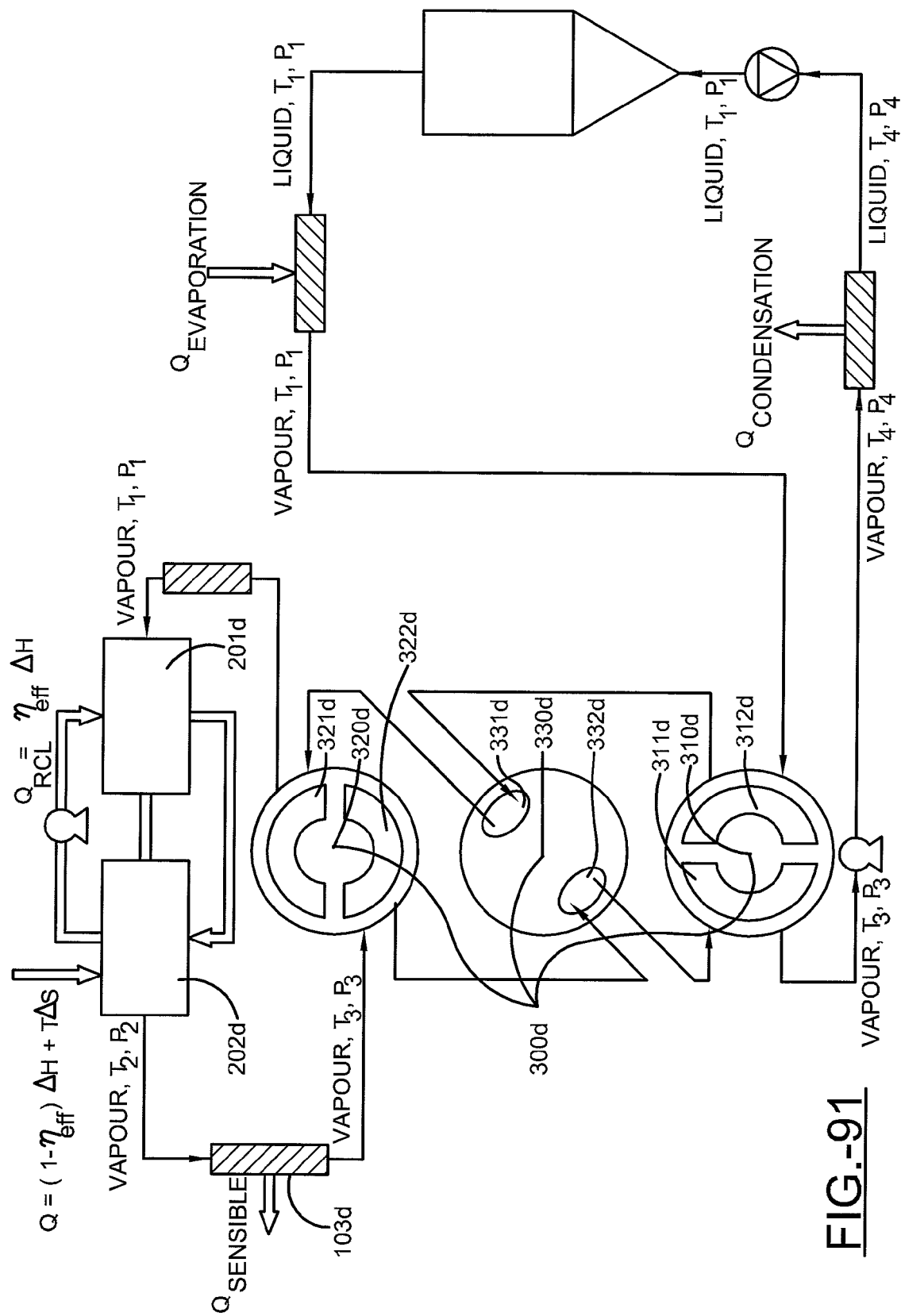
FIG. 91 shows a Thermal Wave Adsorption System including a rotary valve assembly in a third position, first and second regenerative adsorption beds, heat exchanger, a first blower and a second blower, condenser, a first expansion valve and a second expansion valve, condensate reservoir and evaporator with said first bed in adsorption and said second bed in desorption.

FIG. 91 illustrates said process flow diagram of a thermal wave heat pump of FIG. 89 with a novel rotary valve assembly (300d) and its third valve member (330d) with a first through aperture (331d) and second through aperture (332d) in a third position, a heat exchanger (103d) and with said first adsorption bed (201d) in adsorption and said second adsorption bed (202d) in desorption.

Figure 92:
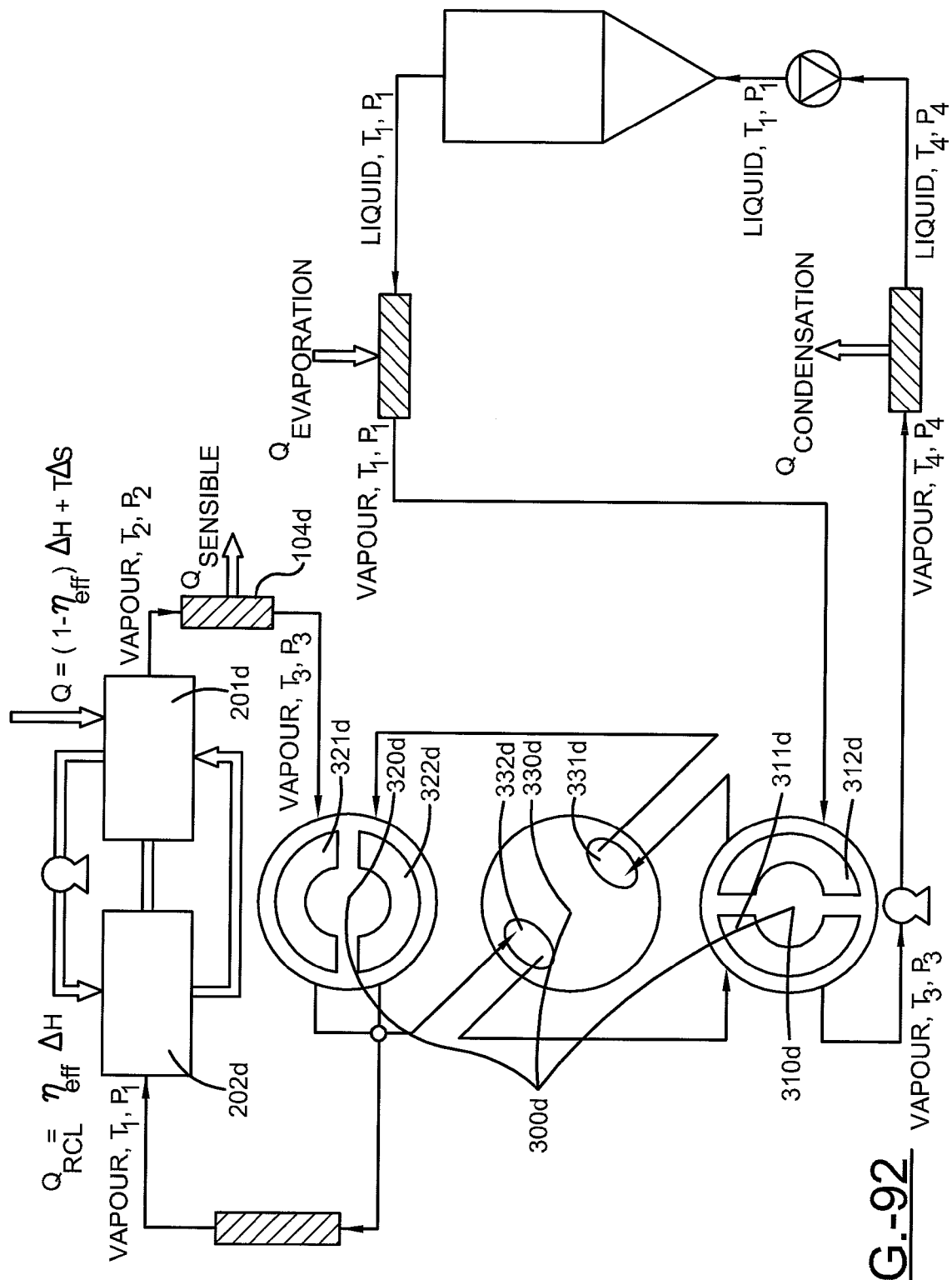
FIG. 92 shows a Thermal Wave Adsorption System including a rotary valve assembly in a fourth position, first and second regenerative adsorption beds, heat exchanger, a first blower and a second blower, condenser, a first expansion valve and a second expansion valve, condensate reservoir and evaporator with said first bed in desorption and said second bed in adsorption.

FIG. 92 illustrates said process flow diagram of a thermal wave heat pump of FIG. 90 with a novel rotary valve assembly (300d) and its third valve member (330d) with a first through aperture (331d) and second through aperture (332d) in a fourth position, a heat exchanger (103d) and with said first adsorption bed (201d) in desorption and said second adsorption bed (202d) in adsorption.

Figure 93:
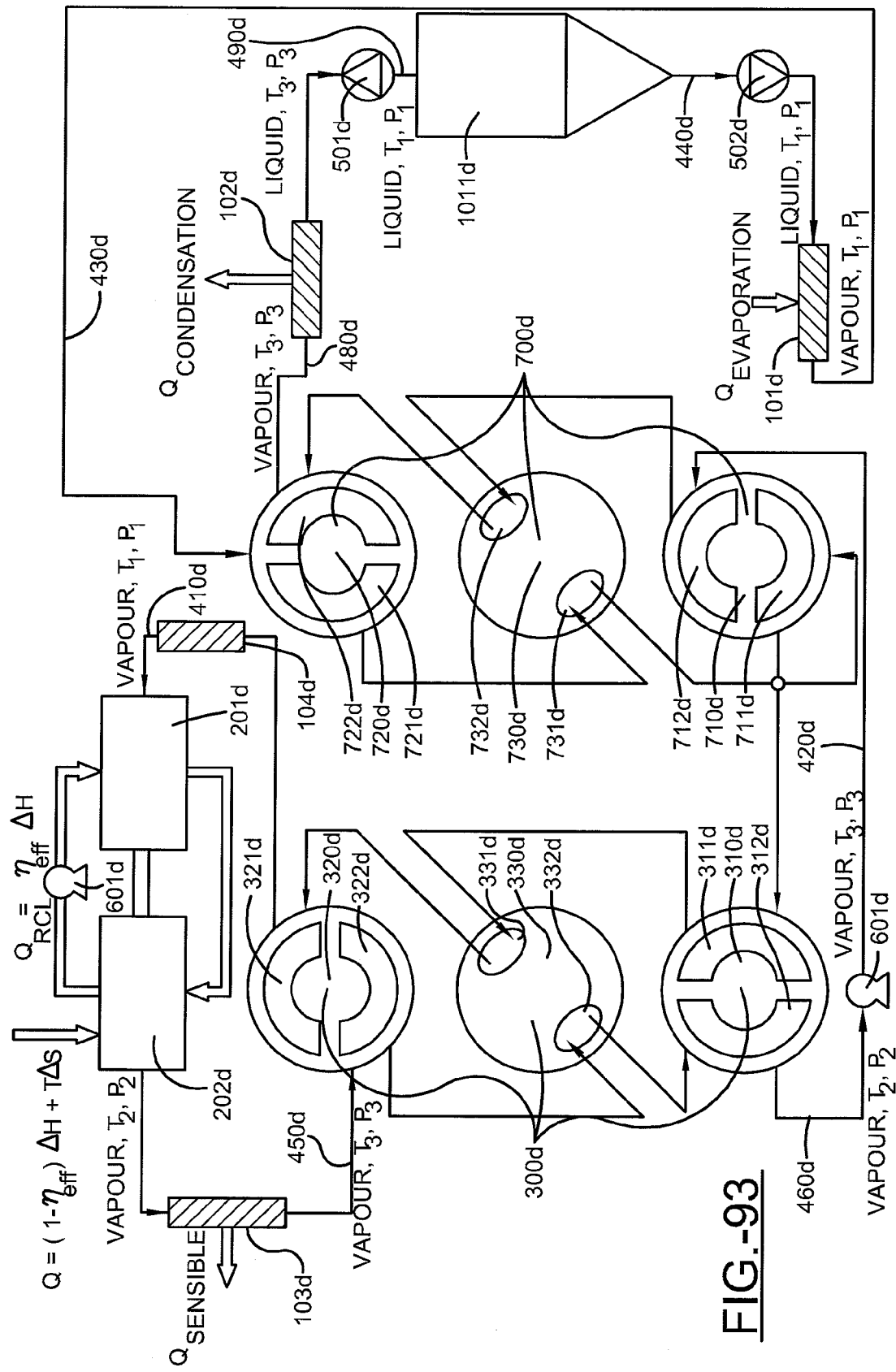
FIG. 93 shows a Thermal Wave Adsorption System including a first rotary valve assembly in a first position, a second rotary valve assembly in a first position, first and second regenerative adsorption beds, first heat exchanger, a second heat exchanger and a third heat exchanger, a first blower and a second blower, condenser, a first expansion valve and a second expansion valve, condensate reservoir and evaporator with said first bed in adsorption and said second bed in desorption, said first heat exchange as condenser and said second heat exchanger as evaporator.

FIG. 93 shows a Thermal Wave Adsorption System with a first novel rotary valve assembly (300d) in a first position and a third valve member (330d) with a first through aperture (331d) and second through aperture (332d) in a first position, a second novel rotary valve assembly (700d) in a first position and a third valve member (730d) with a first through aperture (731d) and second through aperture (732d) in a first position, first regenerative adsorption bed (201d) and second regenerative adsorption bed (202d), a first blower (601d), a first heat exchanger (101d) acting as evaporator, second heat exchanger (102d) acting as condenser and third heat exchanger (103d), a first expansion valve (501d) and second expansion valve (502d), condensate reservoir (1011d) and with said first adsorption bed (201d) in adsorption and said second adsorption bed (202d) in desorption.

Said first adsorbent bed (201d) communicates with said condensate reservoir (1011d) by means of a first conduit (410d), a first novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with first through aperture (331d) interconnection of said first aperture (311d) of said first valve member (310d), first aperture (321d) of second valve member (320d), a second conduit (420d), a second novel rotary valve assembly (700d) with a first valve member (710d) and a first aperture (711d) and second aperture (712d) with a rotational angle to a second valve member (720d) with a first aperture (721d) and second aperture (722d) to provide a second variable and adjustable process cycle time, a third rotary valve (730d) member with first through aperture (731d) interconnection of said first aperture (711d) of said first valve member (710d), first aperture (721d) of second valve member (720d), a third conduit (430d), a heat exchanger (101d) acting as and evaporator and a fourth conduit (440d).

Said second adsorbent bed (202d) communicates with said condensate reservoir (1011d) by means of a fifth conduit (450d), a heat exchanger (103d), a first novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with second through aperture (332d) interconnection of said second aperture (312d) of said first valve member (310d), second aperture (322d) of second valve member (320d), a sixth conduit (460d), a first blower (601d); a seventh conduit (470d), a second novel rotary valve assembly (700d) with a first valve member (710d) and a first aperture (711d)

and second aperture (712d) with a rotational angle to a second valve member (720d) with a first aperture (721d) and second aperture (722d) to provide a second variable and adjustable process cycle time, a third rotary valve (730d) member with second through aperture (732d) interconnection of said second aperture (712d) of said first valve member (710d), second aperture (722d) of second valve member (720d), a eighth conduit (480d), a second heat exchanger (102d) acting as a condenser, a expansion valve (501d) and a ninth conduit (490d).

Said first novel rotary valve (300d) communicates with adsorbent beds (201d) and (202d) and provides means to reverse flow as necessary for periodic regeneration of a saturated bed. Said second novel rotary valve (700d) communicates with said heat exchanger (101d) and heat exchanger (102d) and provides a variable and adjustable means to alternate heat exchanger function from evaporator to condenser. Such alternation of function provides effective means to create a hot or cold space, frost-free evaporator operation and maintain optimal COP.

Heat recycle and cooling of the system by means of a first blower (601d) of in communication with said first adsorbent bed (201d) or second adsorbent bed (202d) to assist mass diffusion mechanically. Heat transfer increases by means of direct flow from adsorbing bed to desorbing bed.

The thermal efficiency of this system defined as the amount of heat retention from exothermic reaction or $\eta\Delta H$, where $\eta$ is thermal efficiency and $\Delta H$ the enthalpy of reaction. The heat addition to the system is the reversible heat of chemical reaction $T\Delta S$, where T is the temperature of reaction and $\Delta S$ the entropy change of reaction, the work of compression of adsorbate vapour and make-up for thermal inefficiency $(1-\eta)\Delta H$, i.e., $Q=(1-\eta)\Delta H+T\Delta S+RT \ln ([P_2H_2O]/[P_1H_2O])$. The Coefficient of Performance (COP) is the cooling or heating power to the input power, $Q_{condensation}/Q$ or $Q_{evaporation}/Q$.

Figure 94:
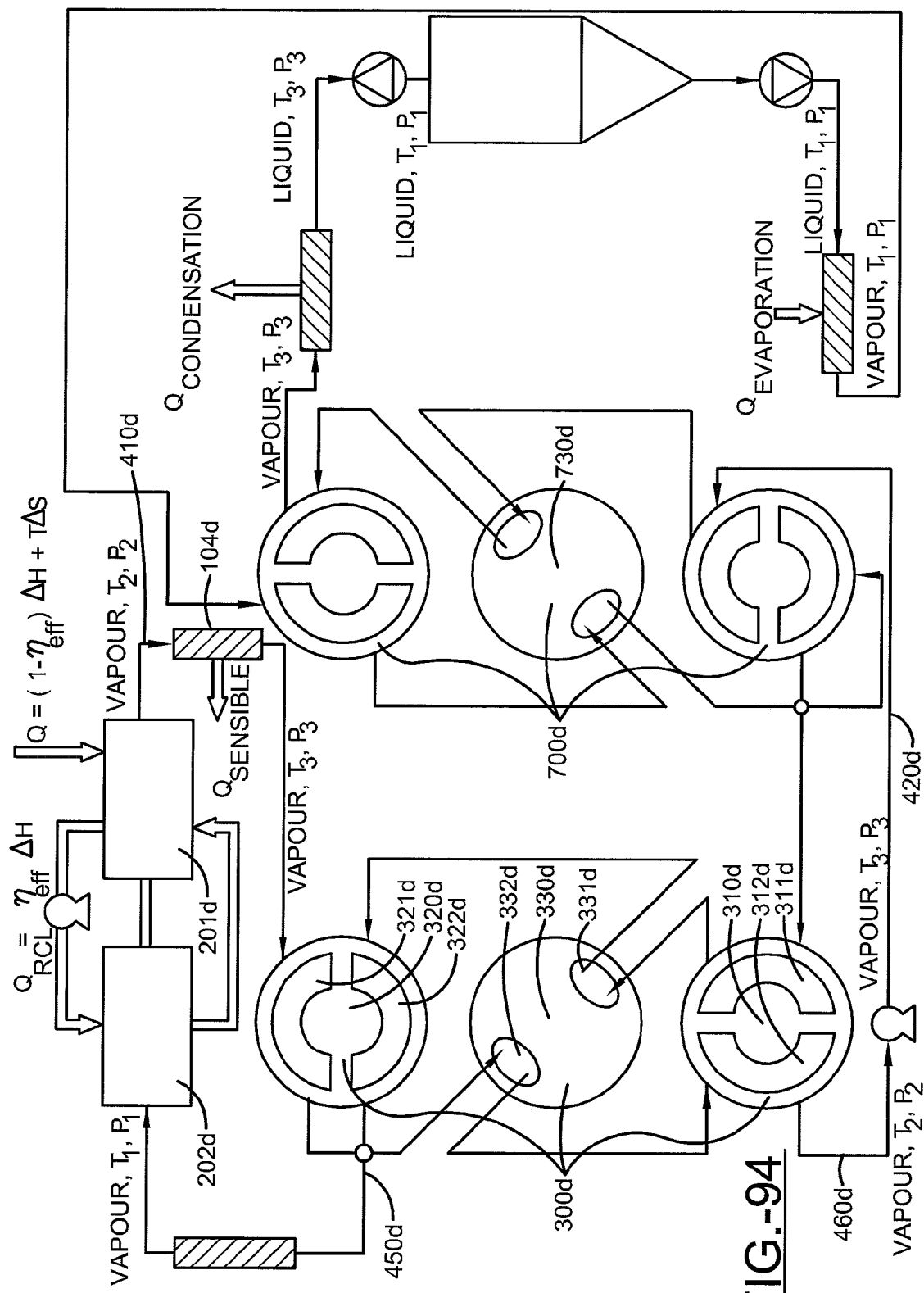
FIG. 94 shows a Thermal Wave Adsorption System including a first rotary valve assembly in a second position, a second rotary valve assembly in a first position, first and second regenerative adsorption beds, first heat exchanger, a second heat exchanger and a third heat exchanger, a first blower and a second blower, condenser, a first expansion valve and a second expansion valve, condensate reservoir and evaporator with said first bed in desorption and said second bed in adsorption, said first heat exchange as condenser and said second heat exchanger as evaporator.

FIG. 94 illustrates said process flow diagram of a thermal wave heat pump of FIG. 93 with a first novel rotary valve assembly (300d) and its third valve member (330d) with a first through aperture (331d) and second through aperture (332d) in a second position, a second novel rotary valve assembly (700d) and its third valve member (730d) in a first position, a heat exchanger (104d) and with said first adsorption bed (201d) in desorption and said second adsorption bed (202d) in adsorption.

Said second adsorbent bed (202d) communicates with said condensate reservoir (1011d) by means of a fifth conduit (450d), a first novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with first through aperture (331d) interconnection of said first aperture (311d) of said first valve member (310d), second aperture (322d) of second valve member (320d), a second conduit (420d), a second novel rotary valve assembly (700d) with a first valve member (710d) and a first aperture (711d) and second aperture (712d) with a rotational angle to a second valve member (720d) with a first aperture (721d) and second aperture (722d) to provide a second variable and adjustable process cycle time, a third rotary valve (730d) member with first through aperture (731d) interconnection of said first aperture (711d) of said first valve member (710d), first aperture (721d) of second valve member (720d), a third conduit (430d), a heat exchanger (101d) acting as and evaporator and a fourth conduit (440d).

Said first adsorbent bed (201d) communicates with said condensate reservoir (1011d) by means of a first conduit (410d), a heat exchanger (103d), a first novel rotary valve assembly (300d) with a first valve member (310d) and a first aperture (311d) and second aperture (312d) with a rotational angle to a second valve member (320d) with a first aperture (321d) and second aperture (322d) to provide a variable and adjustable process cycle time, a third rotary valve (330d) member with second through aperture (332d) interconnection of said second aperture (312d) of said first valve member (310d), first aperture (321d) of second valve member (320), a sixth conduit (460d), a first blower (601d), a seventh conduit (470d), a second novel rotary valve assembly (700d) with a first valve member (710d) and a first aperture (711d) and second aperture (712d) with a rotational angle to a second valve member (720d) with a first aperture (721d) and second aperture (722d) to provide a second variable and adjustable process cycle time, a third rotary valve (730d) member with second through aperture (732d) interconnection of said second aperture (712d) of said first valve member (710d), second aperture (722d) of second valve member (720d), a eighth conduit (480d), a second heat exchanger (102d) acting as a condenser, a expansion valve (501d) and a ninth conduit (490d).

Figure 95:
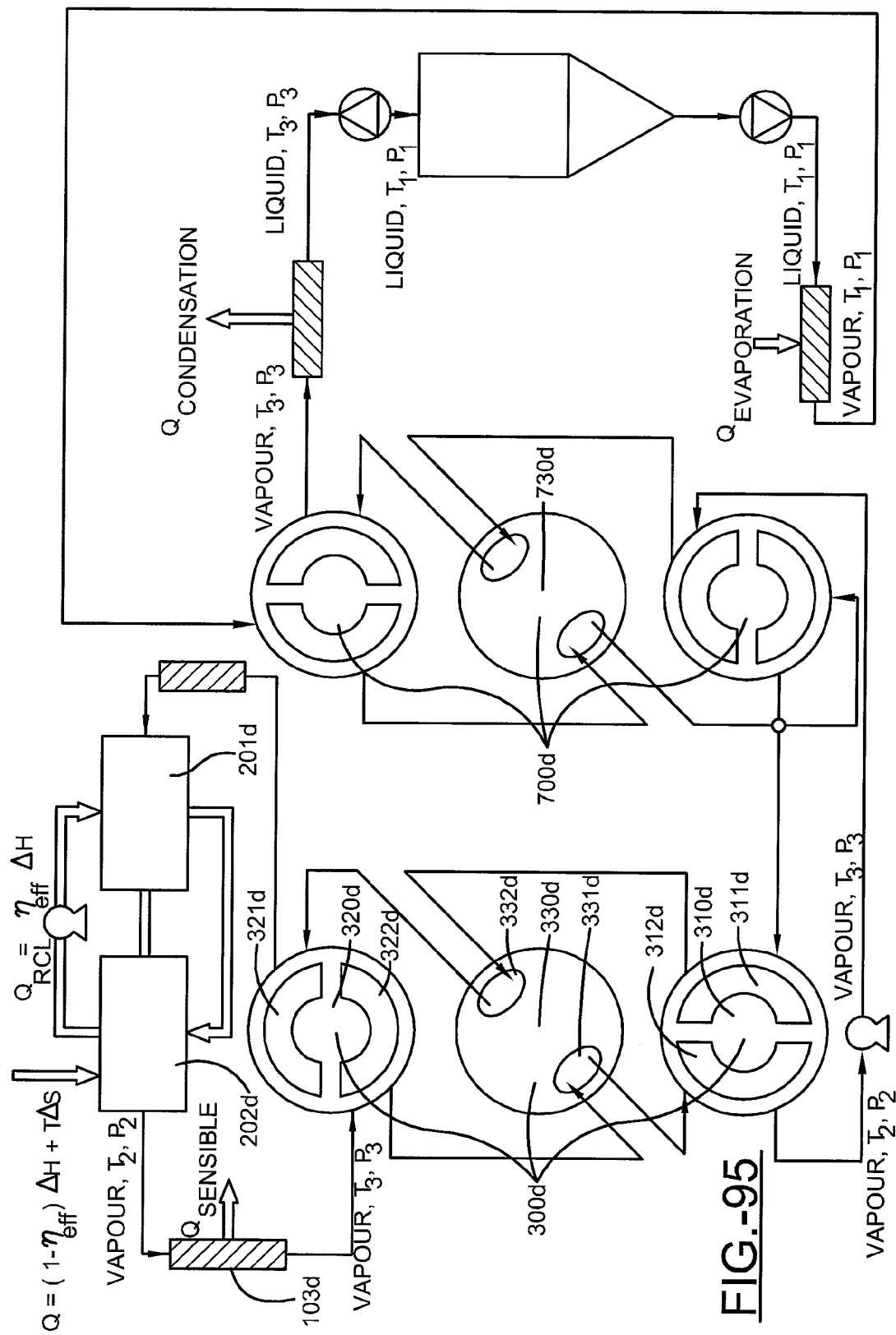
FIG. 95 shows a Thermal Wave Adsorption System including a first rotary valve assembly in a third position, a second rotary valve assembly in a first position, first and second regenerative adsorption beds, first heat exchanger, a second heat exchanger and a third heat exchanger, a first blower and a second blower, condenser, a first expansion valve and a second expansion valve, condensate reservoir and evaporator with said first bed in adsorption and said second bed in desorption, said first heat exchange as condenser and said second heat exchanger as evaporator.

FIG. 95 illustrates said process flow diagram of a thermal wave heat pump of FIG. 93 with a first novel rotary valve assembly (300d) and its third valve member (330d) with a first through aperture (331d) and second through aperture (332d) in a third position, a second novel rotary valve assembly (700d) and its third valve member (730d) in a first position, a heat exchanger (103d) and with said first adsorption bed (201d) in adsorption and said second adsorption bed (202d) in desorption.

Figure 96:
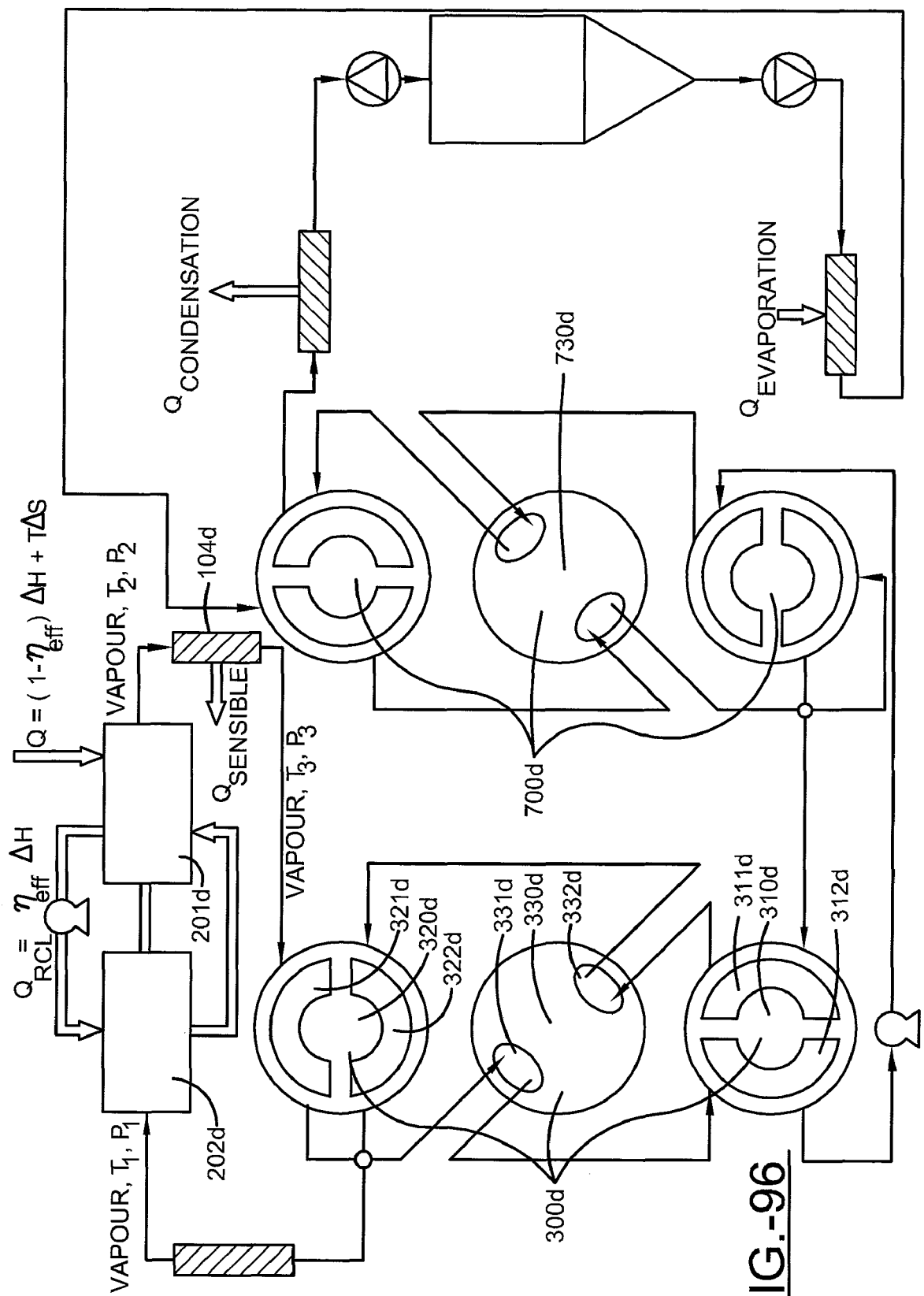
FIG. 96 shows a Thermal Wave Adsorption System including a first rotary valve assembly in a fourth position, a second rotary valve assembly in a first position, first and second regenerative adsorption beds, first heat exchanger, a second heat exchanger and a third heat exchanger, a first blower and a second blower, condenser, a first expansion valve and a second expansion valve, condensate reservoir and evaporator with said first bed in desorption and said second bed in adsorption, said first heat exchange as condenser and said second heat exchanger as evaporator.

FIG. 96 illustrates said process flow diagram of a thermal wave heat pump of FIG. 94 with a first novel rotary valve assembly (300d) and its third valve member (330d) with a first through aperture (331d) and second through aperture (332d) in a fourth position, a second novel rotary valve assembly (700d) and its third valve member (730d) in a first position, a heat exchanger (104d) and with said first adsorption bed (201d) in desorption and said second adsorption bed (202d) in adsorption.

Figure 97:
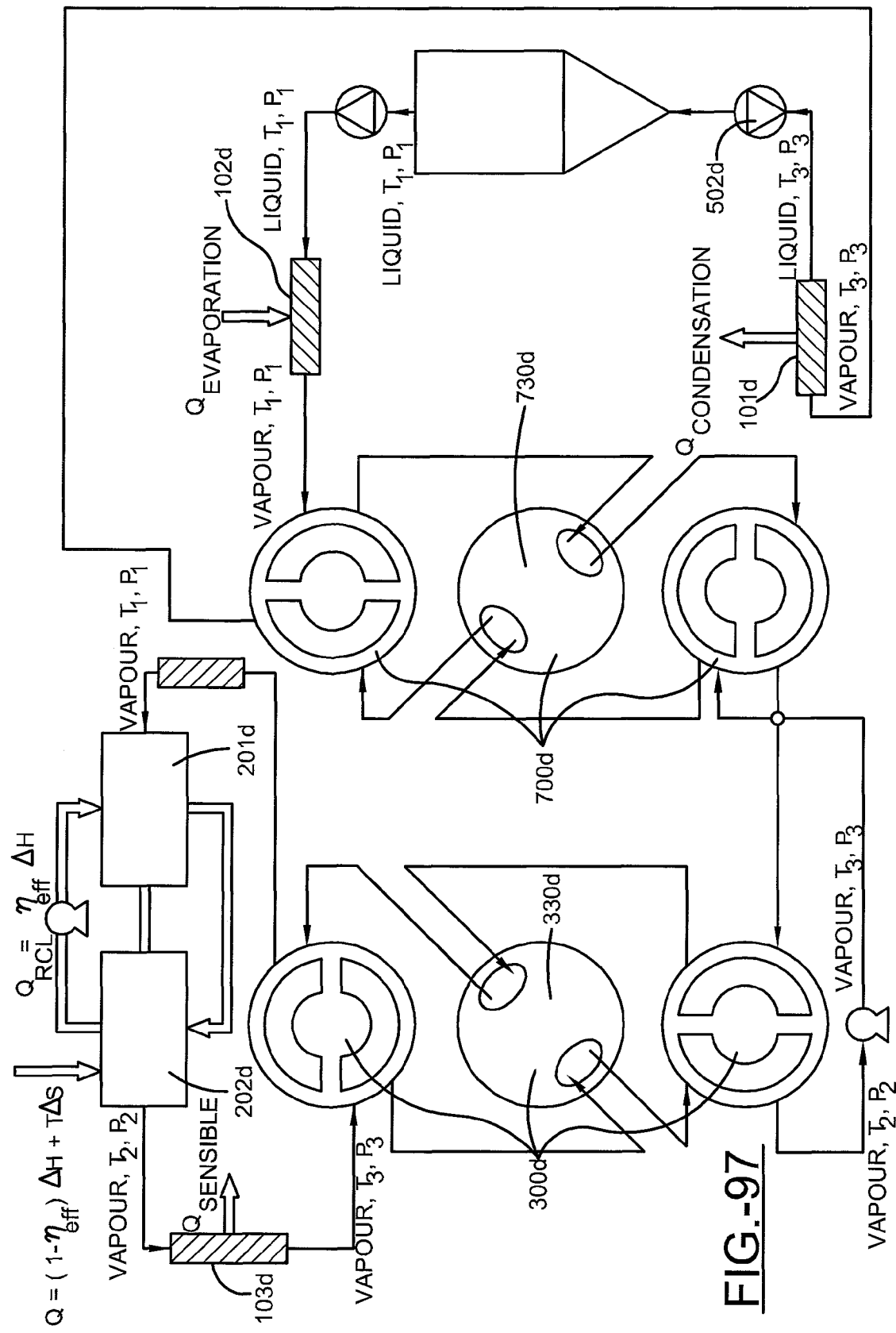
FIG. 97 shows a Thermal Wave Adsorption System including a first rotary valve assembly in a first position, a second rotary valve assembly in a second position, first and second regenerative adsorption beds, a first blower and a second blower, a first heat exchanger, second heat exchanger and third heat exchanger, a first expansion valve and a second expansion valve, condensate reservoir with said first bed in desorption and said second bed in adsorption and said first heat exchanger as evaporator and said second heat exchanger as condenser.

FIG. 97 illustrates said process flow diagram of a thermal wave heat pump of FIG. 93 with a first novel rotary valve assembly (300d) and its third valve member (330d) with a first through aperture (331d) and second through aperture (332d) in a first position, a second novel rotary valve assembly (700d) and its third valve member (730d) in a second position with said first heat exchanger (101d) as condenser and said second heat exchanger (102d) as evaporator an expansion valve (502d) and with said first adsorption bed (201d) in adsorption and said second adsorption bed (202d) in desorption.

Figure 98:
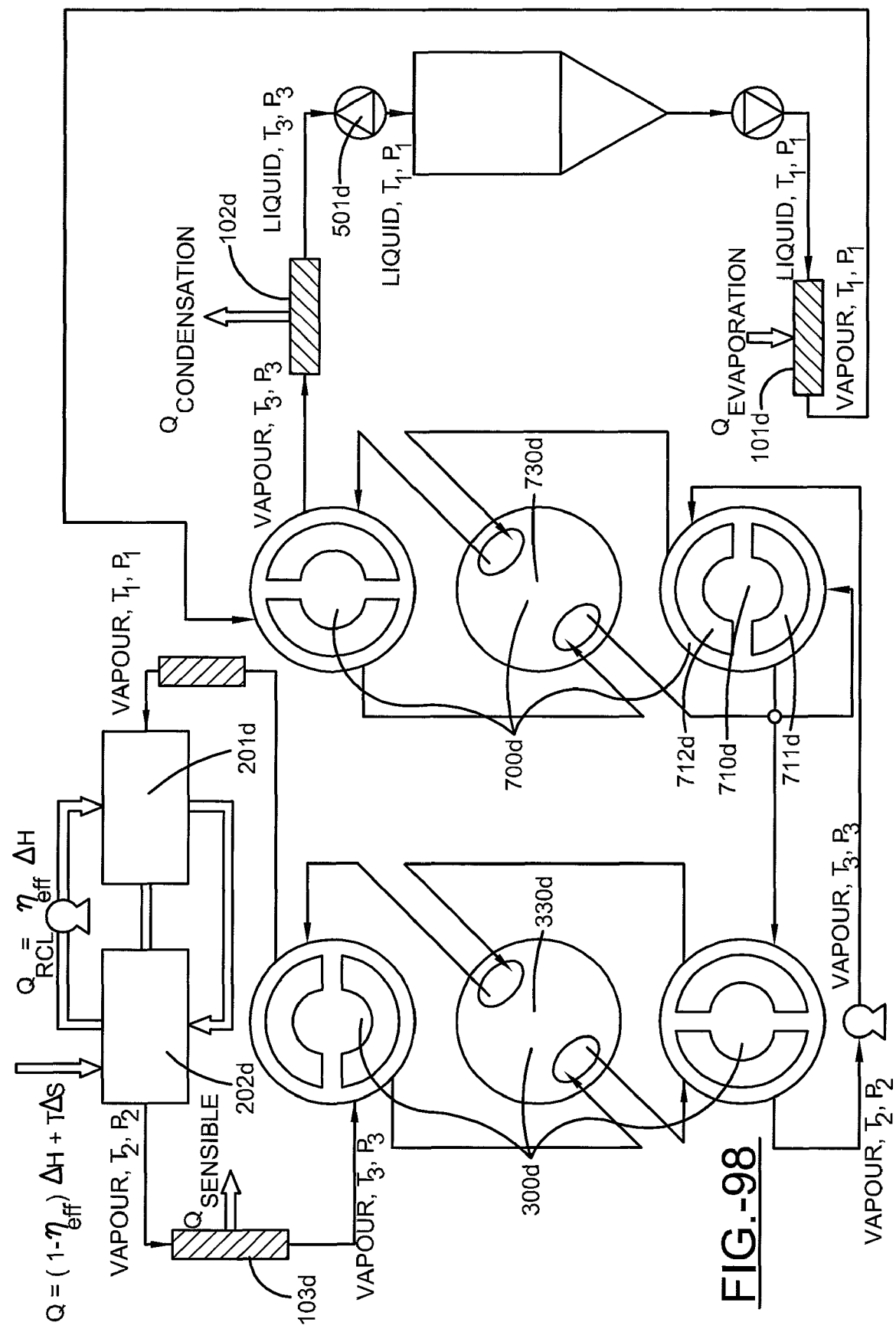
FIG. 98 shows a Thermal Wave Adsorption System including a first rotary valve assembly in a first position, a second rotary valve assembly in a third position, first and second regenerative adsorption beds, a first blower and a second blower, a first heat exchanger, second heat exchanger and third heat exchanger, a first expansion valve and a second expansion valve, condensate reservoir with said first bed in adsorption and said second bed in desorption and said first heat exchanger an condenser and said second heat exchanger as evaporator.

FIG. 98 illustrates said process flow diagram of a thermal wave heat pump of FIG. 93 with a first novel rotary valve assembly (300d) and its third valve member (330d) with a first through aperture (331d) and second through aperture (332d) in a first position, a second novel rotary valve assembly (700d) and its third valve member (730d) in a third position with said first heat exchanger (101d) as evaporator and said second heat exchanger (102d) as condenser, an expansion valve (501d) with said first adsorption bed (201d) in adsorption and said second adsorption bed (202d) in desorption.

Figure 99:
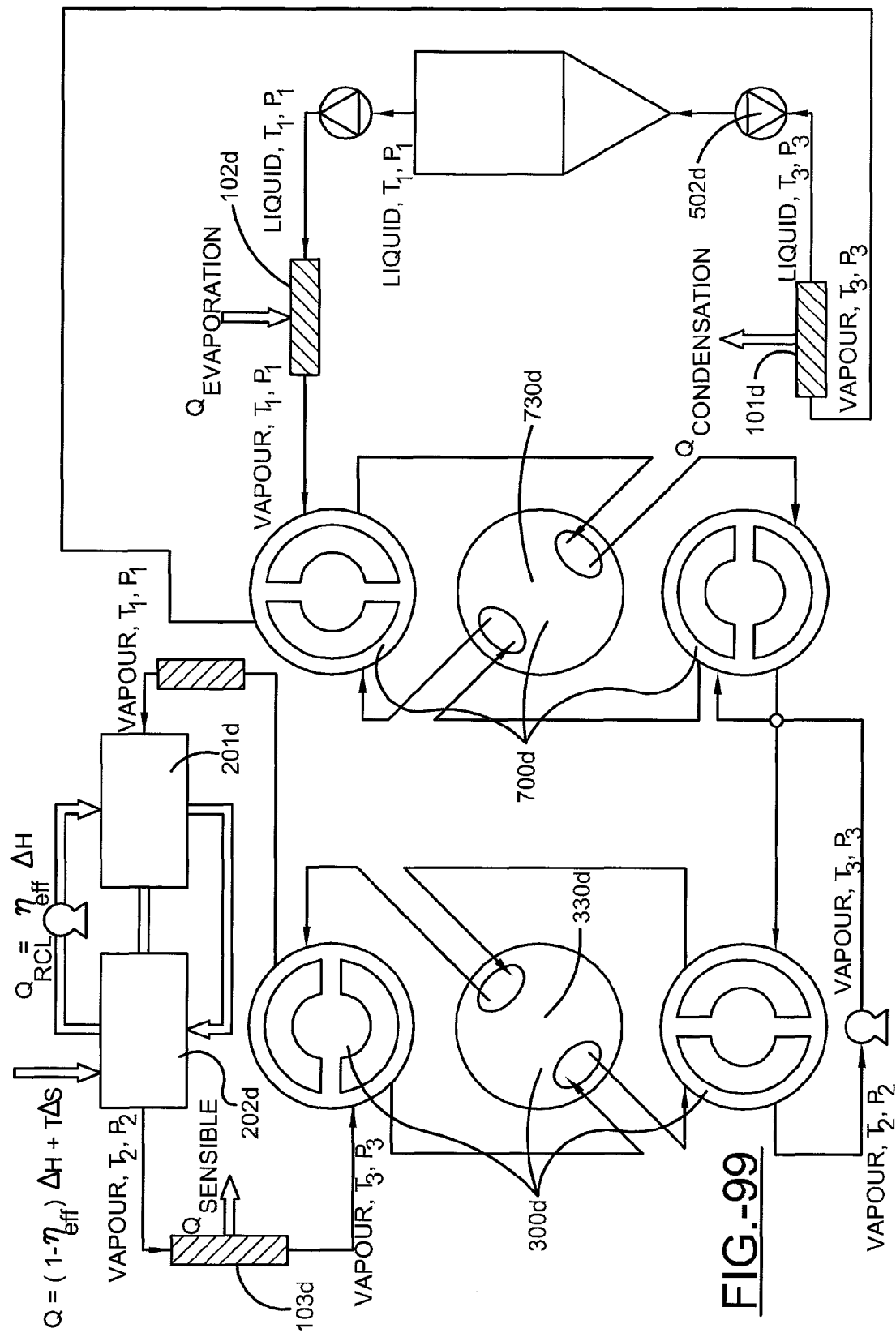
FIG. 99 shows a Thermal Wave Adsorption System including a first rotary valve assembly in a first position, a second rotary valve assembly in a fourth position, first and second regenerative adsorption beds, a first blower and a second blower, a first heat exchanger, second heat exchanger and third heat exchanger a first expansion valve and a second expansion valve, condensate reservoir with said first bed in desorption and said second bed in adsorption and said first heat exchanger an evaporator and said second heat exchanger as condenser.

FIG. 99 illustrates said process flow diagram of a thermal wave heat pump of FIG. 93 with a first novel rotary valve assembly (300d) and its third valve member (330d) with a first through aperture (331d) and second through aperture (332d) in a first position, a second novel rotary valve assembly (700d) and its third valve member (730d) in a fourth position with said first heat exchanger (101d) as condenser and said second heat exchanger (102d) as evaporator, an expansion valve (502d) and with said first adsorption bed (201d) in adsorption and said second adsorption bed (202d) in desorption.

Figure 100:
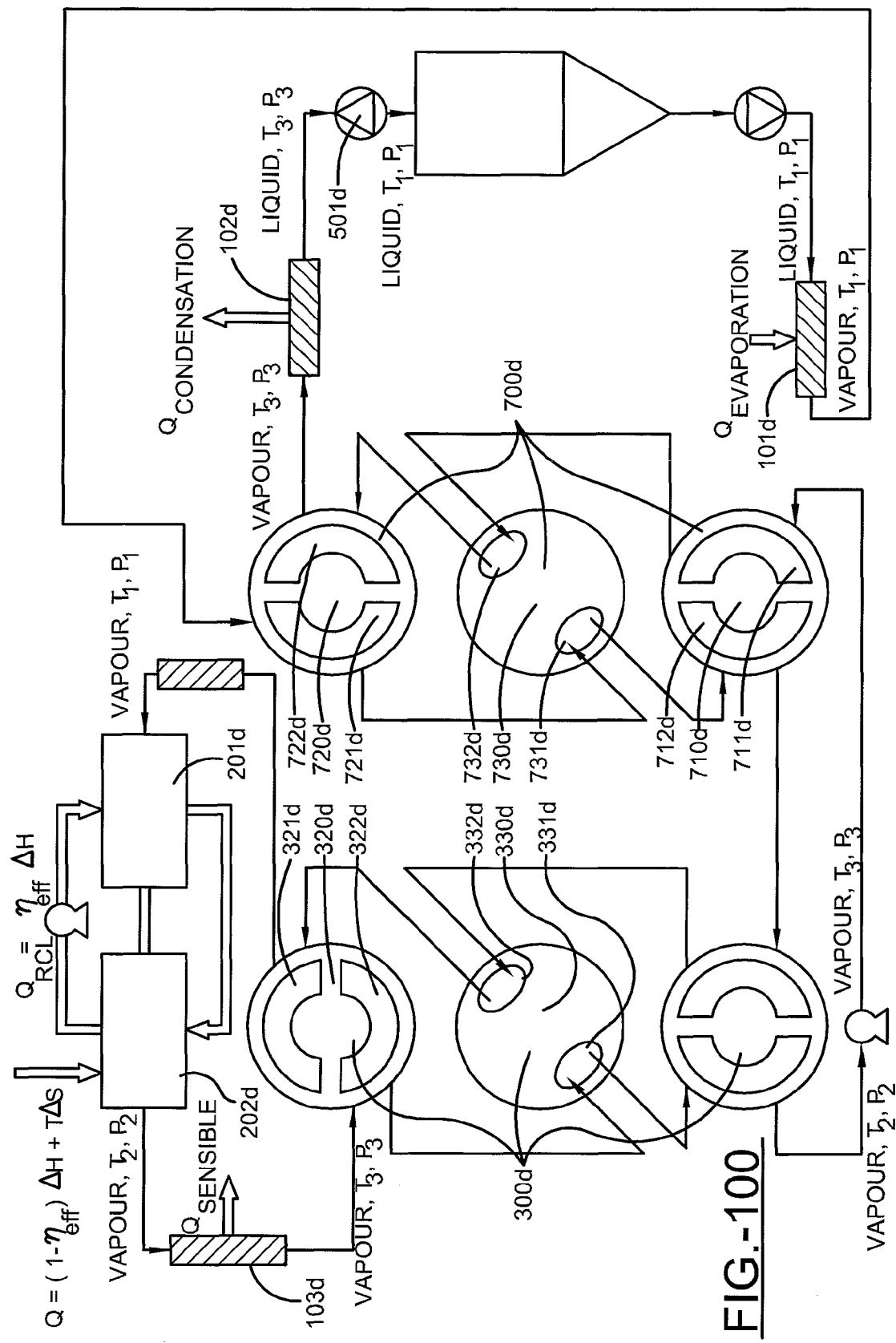
FIG. 100 shows a Thermal Wave Adsorption System including a first rotary valve assembly in a first position, a second rotary valve assembly in an adjusted first position, first and second regenerative adsorption beds, a first blower and a second blower, a first heat exchanger, second heat exchanger and third heat exchanger, a first expansion valve and a second expansion valve, condensate reservoir with said first bed in desorption and said second bed in adsorption and said first heat exchanger an condenser and said second heat exchanger as evaporator.

FIG. 100 illustrates said process flow diagram of a thermal wave heat pump of FIG. 93 with a first novel rotary valve assembly (300d) and its third valve member (330d) with a first through aperture (331d) and second through aperture (332d) in a first position, a second novel rotary valve assembly (700d) and its third valve member (730d) in a fourth position with said first heat exchanger (101d) as condenser and said second heat exchanger (102d) as evaporator, said first adsorption bed (201d) in adsorption and said second adsorption bed (202d) in desorption.

FIG. 100 illustrates said process flow diagram of a thermal wave heat pump of FIG. 93 with a first novel rotary valve assembly (300d) and its third valve member (330d) with a first through aperture (331d) and second through aperture (332d) in a first position, a second novel rotary valve assembly (700d) with a first valve member (710d) and a first aperture (711d) and second aperture (712d) without a rotational angle to a second valve member (720d) with a first aperture (721d) and second aperture (722d) to provide a constant process cycle and a third valve member (730d) with first through aperture (731d) and second through aperture (732d) in a first position, with said first heat exchanger (101d) as evaporator and said second heat exchanger (102d) as condenser, an expansion valve (501d) and with said first adsorption bed (201d) in adsorption and said second adsorption bed (202d) in desorption.

Figure 101:
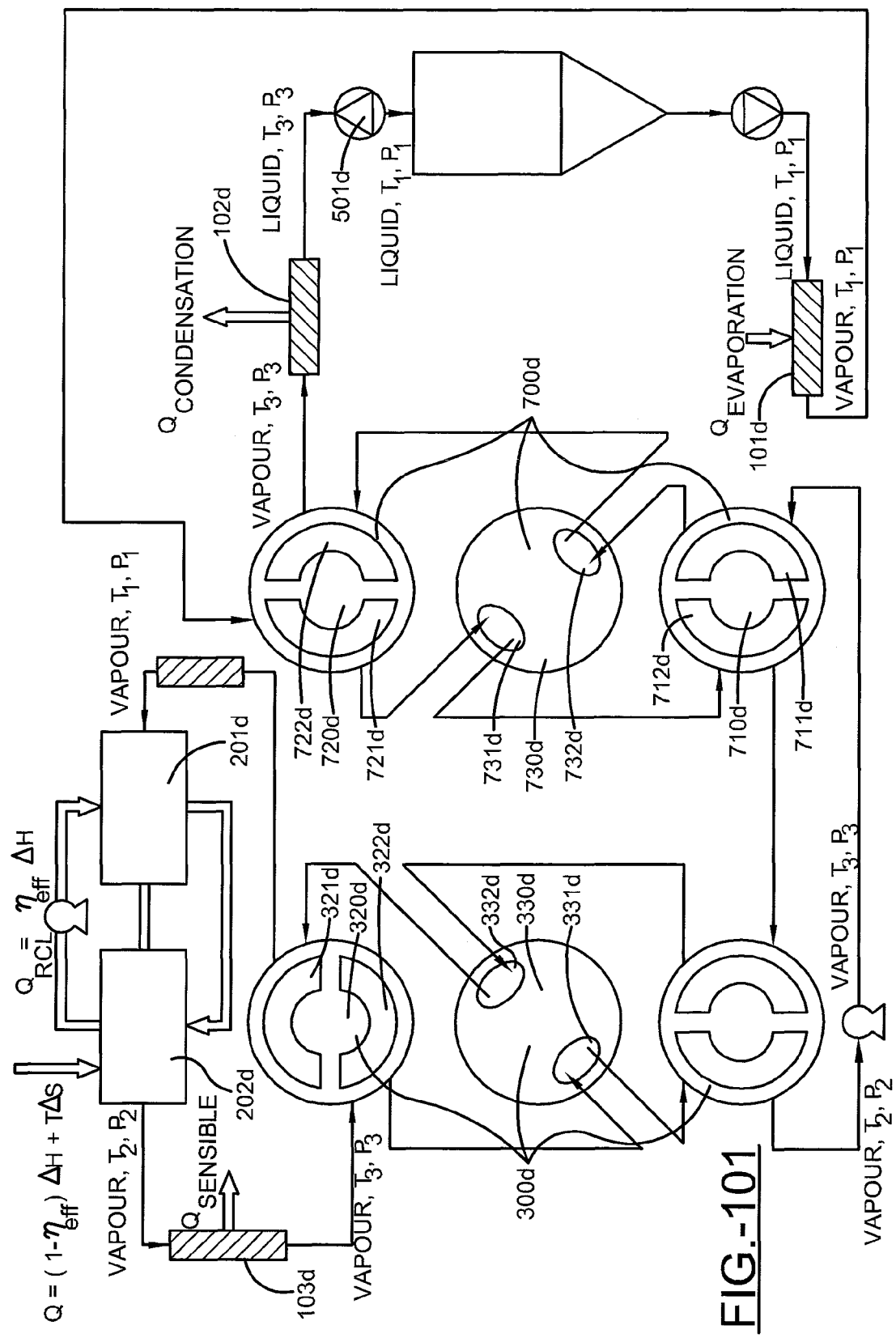
FIG. 101 shows a Thermal Wave Adsorption System including a first rotary valve assembly in a first position, a second rotary valve assembly in an adjusted second position, first and second regenerative adsorption beds, a first blower and a second blower, a first heat exchanger, second heat exchanger and third heat exchanger a first expansion valve and a second expansion valve, condensate reservoir with said first bed in adsorption and said second bed in desorption and said first heat exchanger an condenser and said second heat exchanger as evaporator.

FIG. 101 illustrates said process flow diagram of a thermal wave heat pump of FIG. 93 with a first novel rotary valve assembly (300d) and its third valve member (330d) with a first through aperture (331d) and second through aperture (332d) in a first position, a second novel rotary valve assembly (700d) with a first valve member (710d) and a first aperture (711d) and second aperture (712d) without a rotational angle to a second valve member (720d) with a first aperture (721d) and second aperture (722d) to provide a constant process cycle and a third valve member (730d) with first through aperture (731d) and second through aperture (732d) in a second position, with said first heat exchanger (101d) as evaporator and said second heat exchanger (102d) as condenser, an expansion valve (501d) and with said first adsorption bed (201d) in adsorption and said second adsorption bed (202d) in desorption.

Figure 102:
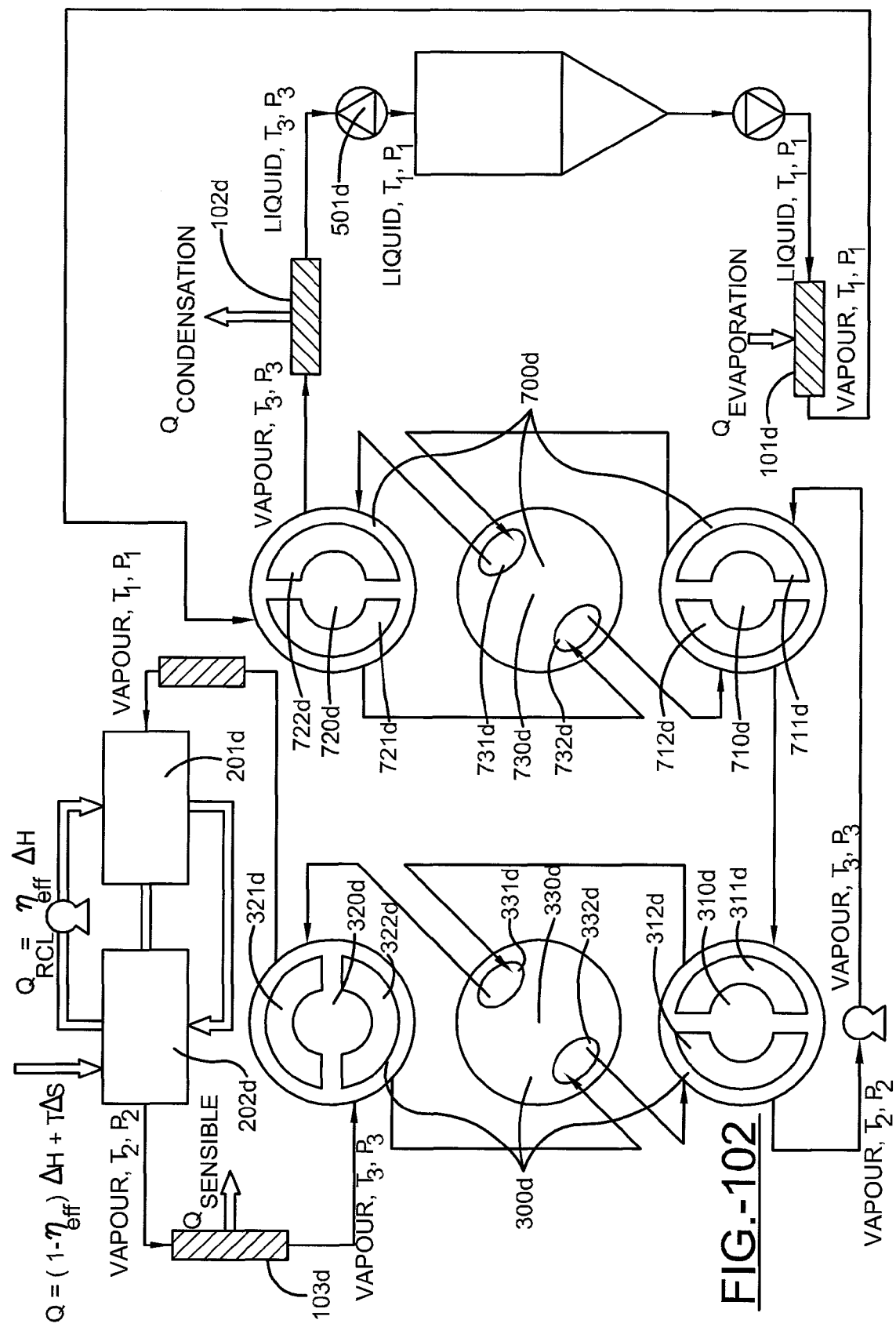
FIG. 102 shows a Thermal Wave Adsorption System including a first rotary valve assembly in a first position, a second rotary valve assembly in an adjusted third position, first and second regenerative adsorption beds, a first blower and a second blower, a first heat exchanger, second heat exchanger and third heat exchanger, a first expansion valve and a second expansion valve, condensate reservoir with said first bed in desorption and said second bed in adsorption and said first heat exchanger an condenser and said second heat exchanger as evaporator.

FIG. 102 illustrates said process flow diagram of a thermal wave heat pump of FIG. 93 with a first novel rotary valve assembly (300d) and its third valve member (330d) with a first through aperture (331d) and second through aperture (332d) in a first position, a second novel rotary valve assembly (700d) with a first valve member (710d) and a first aperture (711d) and second aperture (712d) without a rotational angle to a second valve member (720d) with a first aperture (721d) and second aperture (722d) to provide a constant process cycle and a third valve member (730d) with first through aperture (731d) and second through aperture (732d) in a third position, with said first heat exchanger (101d) as evaporator and said second heat exchanger (102d) as condenser, an expansion valve (501d) and with said first adsorption bed (201d) in adsorption and said second adsorption bed (202d) in desorption.

Figure 103:
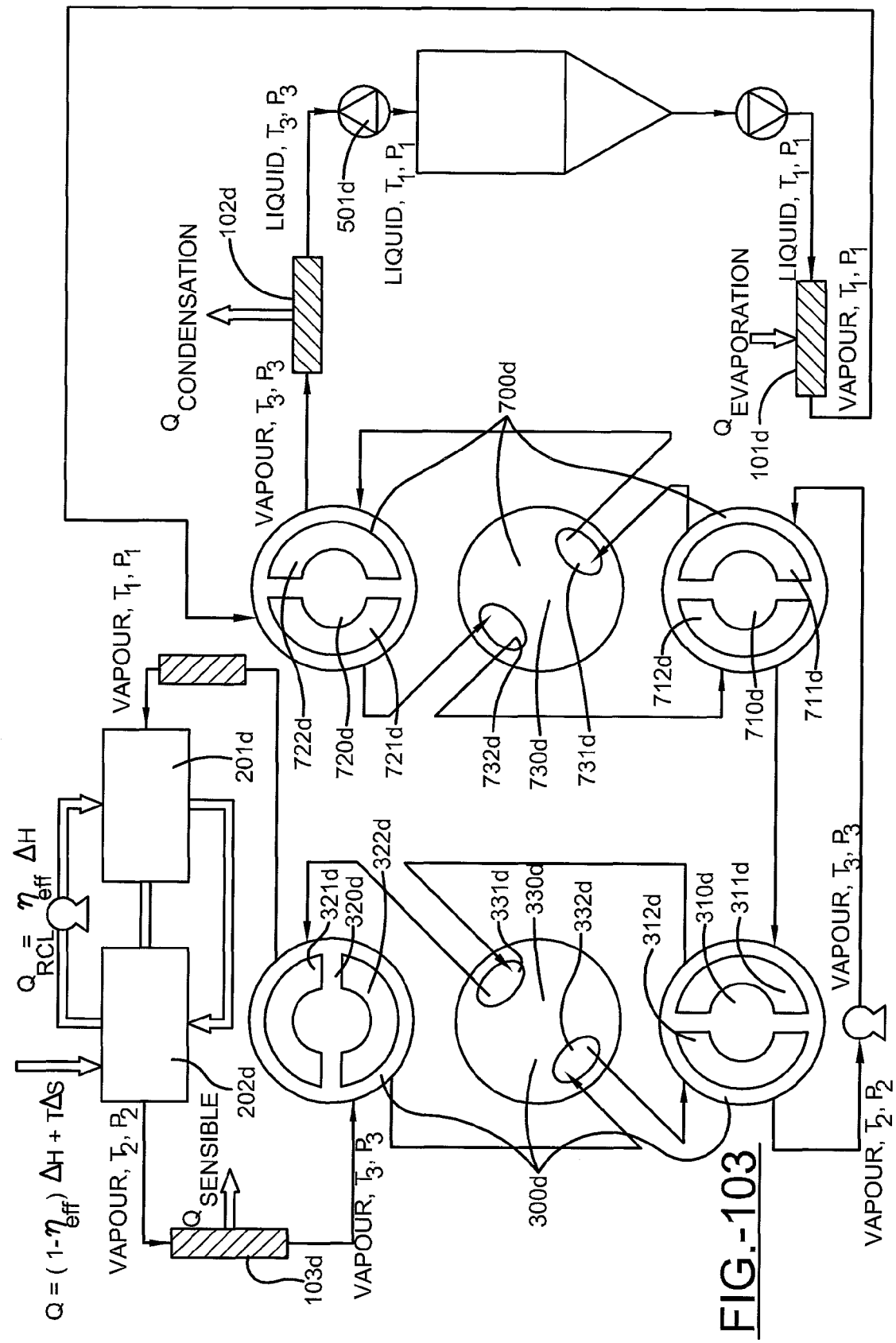
FIG. 103 shows a Thermal Wave Adsorption System including a first rotary valve assembly in a first position, a second rotary valve assembly in an adjusted fourth position, first and second regenerative adsorption beds, a first blower and a second blower, a first heat exchanger, second heat exchanger and third heat exchanger, a first expansion valve and a second expansion valve, condensate reservoir with said first bed in adsorption and said second bed in desorption and said first heat exchanger an condenser and said second heat exchanger as evaporator.

FIG. 103 illustrates said process flow diagram of a thermal wave heat pump of FIG. 93 with a first novel rotary valve assembly (300d) and its third valve member (330d) with a first through aperture (331d) and second through aperture (332d) in a first position, a second novel rotary valve assembly (700d) with a first valve member (710d) and a first aperture (711d) and second aperture (712d) without a rotational angle to a second valve member (720d) with a first aperture (721d) and second aperture (722d) to provide a constant process cycle and a third valve member (730d) with first through aperture (731d) and second through aperture (732d) in a fourth position, with said first heat exchanger (101d) as evaporator and said second heat exchanger (102d) as condenser, an expansion valve (501d) and with said first adsorption bed (201d) in adsorption and said second adsorption bed (202d) in desorption.

Figure 104:
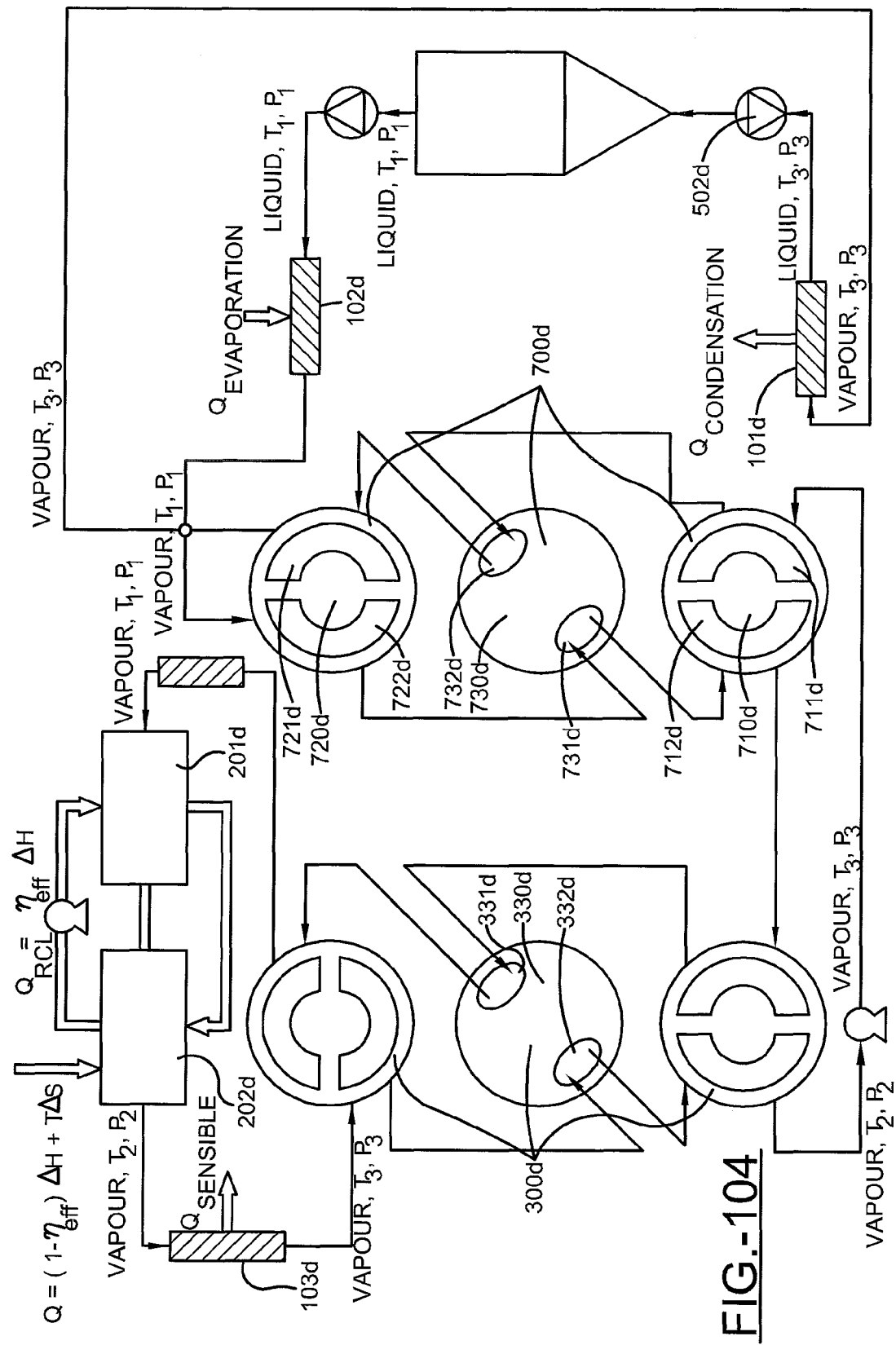
FIG. 104 shows a Thermal Wave Adsorption System with a first novel rotary valve assembly in a first position, a second novel rotary valve assembly in an alternate adjusted first position, first and second regenerative adsorption beds, a first blower and a second blower, a first heat exchanger, second heat exchanger and third heat exchanger, a first expansion valve and a second expansion valve, condensate reservoir with said first bed in adsorption and said second bed in desorption and said first heat exchanger an evaporator and said second heat exchanger as condenser.

FIG. 104 illustrates said process flow diagram of a thermal wave heat pump of FIG. 100 with a first novel rotary valve assembly (300d) and its third valve member (330d) with a first through aperture (331d) and second through aperture (332d) in a first position, a second novel rotary valve assembly (700d) with a first valve member (710d) and a first aperture (711d) and second aperture (712d) with a 180° rotational angle to a second valve member (720d) with a first aperture (721d) and second aperture (722d) to provide a constant process cycle and a third valve member (730d) with first through aperture (731d) and second through aperture (732d) in a first position, with said first heat exchanger (101d) as condenser and said second heat exchanger (102d) as evaporator, an expansion valve (502d) and with said first adsorption bed (201d) in adsorption and said second adsorption bed (202d) in desorption.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A rotary valve assembly for controlling process fluid flow comprising:
 a first valve member disposed within a fluid flow path and including at least first and second apertures formed therein through which the process fluid introduced to the rotary valve can flow, wherein a cross bar separates the first and second apertures of the first valve member;
 a second valve member including at least first and second apertures formed therein that are at least partially aligned with the said first and second apertures of said first valve member within the fluid flow path and through which the process fluid can flow through the rotary valve, wherein a cross bar separates the first and second apertures of the second valve member and wherein the cross bar of the first valve member is perpendicular to the cross bar of the second valve member; and
 a third valve member rotatably disposed within the fluid flow path between the first valve member and the second valve member and including at least first and second apertures formed therein, wherein an alignment of said first and second apertures of said third valve member relative to said first and second apertures of said first valve member and to said first and second apertures of said second valve member is adjustable to selectively establish a conduit through which the process fluid can flow.

2. The rotary valve assembly of claim 1 further comprising:
a drive mechanism drive operable to adjust a rotational position of the second valve member relative to the first valve member.

3. The rotary valve assembly of claim 1 further comprising:
a drive mechanism operable to drive the third valve member in at least one of continuous and intermittent rotation.

4. The rotary valve assembly of claim 1 further comprising:
a drive mechanism operable to drive the third valve member in at least one of constant and variable speed rotation.

5. The rotary valve assembly of claim 1 further comprising:
an electric motor operable to drive the third valve member in rotation.

6. The rotary valve assembly of claim 5 further comprising:
a controller operable to control the electric motor to rotate the third valve member in at least one of constant and variable speed rotation and in at least one of forward and reverse direction.

7. The rotary valve assembly of claim 1 further comprising:
a drive mechanism drive operable to adjust a rotational position of the third valve member relative to at least one of the second valve member and the first valve member.

8. The rotary valve assembly of claim 1 further comprising:
a pneumatic motor operable to drive the third valve member in rotation.

9. The rotary valve assembly of claim 1 further comprising:
an hydraulic motor operable to drive the third valve member in rotation.

10. The rotary valve assembly of claim 9 further comprising:
a controller operable to control the electric motor to rotate at least one of the first valve member and the second valve member in at least one of a forward and a reverse direction.

11. The rotary valve assembly according to claim 1 wherein at least one of the first and second valve members is rotationally adjustable about a central axis to a plurality of discrete angular orientations.

12. The rotary valve according to claim 11 further comprising:
a detent ring defining each of the plurality of discrete angular orientations.

* * * * *